US011206827B2

(12) United States Patent
Kraus et al.

(10) Patent No.: US 11,206,827 B2
(45) Date of Patent: *Dec. 28, 2021

(54) HERBICIDAL COMPOSITION COMPRISING CINMETHYLIN AND SPECIFIC QUINOLINECARBOXYLIC ACIDS

(71) Applicant: BASF Agro B.V., Arnhem (NL)

(72) Inventors: Helmut Kraus, Research Triangle Park, NC (US); Bernd Sievernich, Hassloch (DE); Mariano Etcheverry, Kiev (UA); Richard R. Evans, Raleigh, NC (US); Ryan Louis Nielson, Schriesheim (DE); Cyrill Zagar, Raleigh, NC (US); Rex A. Liebl, Raleigh, NC (US)

(73) Assignee: BASF AGRO B.V., Arnhem (NL)

( * ) Notice: Subject to any disclaimer, the term of this patent is extended or adjusted under 35 U.S.C. 154(b) by 727 days.

This patent is subject to a terminal disclaimer.

(21) Appl. No.: 15/740,047

(22) PCT Filed: Jul. 6, 2016

(86) PCT No.: PCT/EP2016/066004
§ 371 (c)(1),
(2) Date: Dec. 27, 2017

(87) PCT Pub. No.: WO2017/009144
PCT Pub. Date: Jan. 19, 2017

(65) Prior Publication Data
US 2020/0029562 A1  Jan. 30, 2020

Related U.S. Application Data

(60) Provisional application No. 62/190,786, filed on Jul. 10, 2015.

(30) Foreign Application Priority Data
Oct. 27, 2015 (EP) .................... 15191719

(51) Int. Cl.
*A01N 43/08* (2006.01)
*A01N 43/42* (2006.01)

(52) U.S. Cl.
CPC ............. *A01N 43/08* (2013.01); *A01N 43/42* (2013.01)

(58) Field of Classification Search
None
See application file for complete search history.

(56) References Cited

U.S. PATENT DOCUMENTS

| 4,487,945 A | 12/1984 | Payne |
| 4,670,041 A | 6/1987 | Payne |
| 5,334,576 A | 8/1994 | Doehner |
| 5,750,130 A | 5/1998 | Ferrell |
| 5,877,115 A | 3/1999 | Fenderson |
| 5,928,996 A | 7/1999 | Fenderson |
| 5,972,154 A | 10/1999 | Konya |
| 5,981,432 A | 11/1999 | Hudetz |
| 6,013,605 A | 1/2000 | Rees et al. |
| 6,090,750 A | 7/2000 | Chollet |
| 6,339,158 B1 | 1/2002 | Wepplo |
| 6,534,444 B1 | 3/2003 | Sievernich |
| 7,344,730 B1 | 3/2008 | Stadler |
| 7,375,058 B2 | 5/2008 | Zagar |
| 7,635,404 B1 | 12/2009 | Devic |
| 7,737,275 B2 | 6/2010 | Hamprecht |
| 7,846,872 B2 | 12/2010 | Zagar et al. |
| 7,847,097 B2 | 12/2010 | Gebhardt |
| 8,362,026 B2 | 1/2013 | Schmidt |
| 2004/0266623 A1 | 12/2004 | Armbruster et al. |
| 2005/0159622 A1 | 7/2005 | Hamprecht |
| 2006/0293520 A1 | 12/2006 | Hamprecht |
| 2008/0081211 A1 | 4/2008 | Tuffe |
| 2008/0153704 A1 | 6/2008 | Yamaji |
| 2008/0293941 A1 | 11/2008 | Gebhardt |
| 2008/0305954 A1 | 12/2008 | Zawierucha |
| 2009/0247408 A1 | 10/2009 | Koschnick |
| 2009/0306142 A1 | 12/2009 | Carson |
| 2010/0105562 A1 | 4/2010 | Schmidt |
| 2010/0190794 A1* | 7/2010 | Hupe ............... A01N 43/60 514/245 |
| 2010/0311588 A1 | 12/2010 | Gatzweiler |
| 2010/0323893 A1 | 12/2010 | Ikeda |
| 2011/0059849 A1 | 3/2011 | Refardt |
| 2011/0065579 A1 | 3/2011 | Sievernich |
| 2011/0098182 A1 | 4/2011 | Mann |
| 2011/0212837 A1 | 9/2011 | Angermann |
| 2011/0224077 A1 | 9/2011 | Hacker |
| 2011/0245079 A1 | 10/2011 | James |
| 2012/0108429 A1 | 5/2012 | Anderson |
| 2012/0117676 A1 | 5/2012 | Carlson |
| 2012/0263775 A1 | 10/2012 | Blei |
| 2013/0143742 A1 | 6/2013 | Ikeda |
| 2013/0237417 A1 | 9/2013 | Ikeda |
| 2013/0274106 A1 | 10/2013 | Ikeda |
| 2014/0031220 A1 | 1/2014 | Yerkes |
| 2014/0031228 A1 | 1/2014 | Mann et al. |
| 2014/0243200 A1 | 8/2014 | Mann |
| 2014/0329681 A1 | 11/2014 | Ikeda |

FOREIGN PATENT DOCUMENTS

| CN | 1368846 A | 9/2002 |
| CN | 102396466 A | 4/2012 |
| CN | 102461547 A | 5/2012 |
| CN | 103250698 A | 8/2013 |
| CN | 103283779 A | 9/2013 |

(Continued)

OTHER PUBLICATIONS

CABA Abstract 1978:121110 (1978).

(Continued)

*Primary Examiner* — Melissa L Fisher
(74) *Attorney, Agent, or Firm* — Marshall, Gerstein & Borun LLP

(57) ABSTRACT

The present invention relates to a herbicidal composition comprising specific quinolinecarboxylic acids selected from quinclorac and quinmerac. The invention also relates to methods and uses for controlling undesirable vegetation, in particular in crops.

20 Claims, No Drawings

(56) References Cited

FOREIGN PATENT DOCUMENTS

| | | |
|---|---|---|
| CN | 103314958 A | 9/2013 |
| CN | 103766372 A | 5/2014 |
| DE | 19544393 | 5/1987 |
| DE | 19900571 A1 | 7/1999 |
| EP | 0081893 | 6/1983 |
| EP | 0326305 A2 | 8/1989 |
| EP | 0398692 A2 | 11/1990 |
| EP | 0585895 A1 | 3/1994 |
| EP | 1417885 A1 | 5/2004 |
| EP | 2081893 A2 | 7/2009 |
| EP | 2777397 A1 | 9/2014 |
| EP | 3081893 A1 | 10/2016 |
| FR | 3002413 A1 | 8/2014 |
| GB | 2011416 A1 | 7/1979 |
| JP | 58013504 A2 | 1/1983 |
| JP | H06145006 | 5/1994 |
| JP | H07304610 | 11/1995 |
| JP | 2006131602 A2 | 5/2006 |
| WO | WO8802598 A1 | 4/1988 |
| WO | WO9603229 A1 | 2/1996 |
| WO | WO9821174 A1 | 5/1998 |
| WO | WO9946246 A1 | 9/1999 |
| WO | WO9965314 A1 | 12/1999 |
| WO | WO0008936 A1 | 2/2000 |
| WO | WO0183459 A2 | 11/2001 |
| WO | WO03024221 A1 | 3/2003 |
| WO | WO03097587 A2 | 11/2003 |
| WO | WO03097589 A1 | 11/2003 |
| WO | WO05054208 A1 | 6/2005 |
| WO | WO06005490 A2 | 1/2006 |
| WO | WO06063834 A2 | 6/2006 |
| WO | WO06097589 A2 | 9/2006 |
| WO | WO06125746 A1 | 11/2006 |
| WO | 2007023099 | 3/2007 |
| WO | WO2007030886 A1 | 3/2007 |
| WO | WO07048735 A2 | 5/2007 |
| WO | WO07071655 A2 | 6/2007 |
| WO | WO07133522 A2 | 11/2007 |
| WO | WO08043835 A2 | 4/2008 |
| WO | WO09010475 A2 | 1/2009 |
| WO | WO09103760 A2 | 8/2009 |
| WO | WO09115434 A2 | 9/2009 |
| WO | WO09115490 A2 | 9/2009 |
| WO | 2009127635 | 10/2009 |
| WO | WO 2009/127635 * | 10/2009 |
| WO | WO09141367 A2 | 11/2009 |
| WO | WO09153246 A2 | 12/2009 |
| WO | WO10046268 A2 | 4/2010 |
| WO | WO10089208 A1 | 8/2010 |
| WO | WO10136146 A2 | 12/2010 |
| WO | WO11023759 A2 | 3/2011 |
| WO | WO11104213 A2 | 9/2011 |
| WO | 2012057743 | 5/2012 |
| WO | WO12102703 A1 | 8/2012 |
| WO | WO13026811 A1 | 2/2013 |
| WO | WO13040163 A1 | 3/2013 |
| WO | WO13089207 A1 | 6/2013 |
| WO | WO13089208 A1 | 6/2013 |
| WO | WO13134310 A1 | 9/2013 |
| WO | WO14018395 A1 | 1/2014 |
| WO | WO14077343 A1 | 5/2014 |
| WO | 2014149557 | 9/2014 |
| WO | WO14131958 A1 | 9/2014 |
| WO | WO15007564 A1 | 1/2015 |
| WO | WO15022634 A2 | 2/2015 |
| WO | WO15022635 A1 | 2/2015 |
| WO | WO15026923 A1 | 2/2015 |
| WO | WO15041642 A1 | 3/2015 |
| WO | WO15044150 A2 | 4/2015 |
| WO | WO15052152 A1 | 4/2015 |
| WO | WO15052153 A1 | 4/2015 |
| WO | WO15052173 A1 | 4/2015 |
| WO | WO15052178 A1 | 4/2015 |
| WO | WO15091642 A1 | 6/2015 |
| WO | WO15104242 A1 | 7/2015 |
| WO | WO15104243 A1 | 7/2015 |
| WO | WO15134573 A1 | 9/2015 |
| WO | WO15151088 A1 | 10/2015 |
| WO | WO15155236 A1 | 10/2015 |
| WO | WO15158565 A1 | 10/2015 |
| WO | WO15197392 A1 | 12/2015 |
| WO | WO16062814 A1 | 4/2016 |
| WO | WO16113334 A1 | 7/2016 |
| WO | WO16116531 A1 | 7/2016 |
| WO | WO16120116 A1 | 8/2016 |
| WO | WO16120355 A2 | 8/2016 |
| WO | WO16169795 A1 | 10/2016 |
| WO | WO16180614 A1 | 11/2016 |
| WO | WO16180642 A1 | 11/2016 |
| WO | WO17009054 A1 | 1/2017 |
| WO | WO17009056 A1 | 1/2017 |
| WO | WO17009060 A1 | 1/2017 |
| WO | WO17009061 A1 | 1/2017 |
| WO | WO17009088 A1 | 1/2017 |
| WO | WO17009089 A1 | 1/2017 |
| WO | WO17009090 A1 | 1/2017 |
| WO | WO17009092 A1 | 1/2017 |
| WO | WO17009095 A1 | 1/2017 |
| WO | WO17009124 A1 | 1/2017 |
| WO | WO17009134 A1 | 1/2017 |
| WO | WO17009137 A1 | 1/2017 |
| WO | WO17009138 A1 | 1/2017 |
| WO | WO17009139 A1 | 1/2017 |
| WO | WO17009140 A1 | 1/2017 |
| WO | WO17009142 A1 | 1/2017 |
| WO | WO17009143 A1 | 1/2017 |
| WO | WO17009144 A1 | 1/2017 |
| WO | WO17009145 A1 | 1/2017 |
| WO | WO17009146 A1 | 1/2017 |
| WO | WO17009147 A1 | 1/2017 |
| WO | WO17009148 A1 | 1/2017 |
| WO | WO17021430 A1 | 2/2017 |

OTHER PUBLICATIONS

HCAPLUS Abstract 1988:217714 (1988).
Heap et al., "Global Perspective of Herbicide-Resistant Weeds," Pest Management Science, vol. 70, (2014), pp. 1306-1315.
Office Action, issued in co-pending U.S. Appl. No. 15/741,454, dated May 21, 2019.
Office Action issued in co-pending U.S. Appl. No. 15/741,458, dated Mar. 5, 2019.
Tanetani et al., "Action Mechanism of a Novel Herbicide, Pyroxasulfone," Pesticide Biochemistry and Physiology, vol. 95. pp. 47-55 (2009).
Farm Chemicals Handbook '98, Meister Publishing Co., Willoughby, OH, p. C9 (1998).
Office Action issued in co-pending U.S. Appl. No. 15/741,588 dated Mar. 4, 2019.
"The Pesticide Manual," ed. C.D.S. Tomlin, British Crop Production Council, Fourteenth Edition, (2006), entry 732, pp. 928-929. (Requested Copy From Client Feb. 15, 2018).
"The Pesticide Manual," ed. C.D.S. Tomlin, British Crop Production Council, Fourteenth Edition, (2006), entry 733, pp. 929-930. (Requested Copy From Client Feb. 15, 2018).
"The Pesticide Manual," ed. C.D.S. Tomlin, British Crop Production Council, Fourteenth Edition, (2006), entry 157 pp. 195-196.
Search Report, issued in EP Application No. 15191719.2, dated Jan. 25, 2016.
International Search Report, issued in PCT/EP2016/066004, dated Aug. 24, 2016.
International Preliminary Report on Patentability, issued in PCT/EP2016/066004, dated Jan. 16, 2018.
Office Action, issued in co-pending U.S. Appl. No. 15/739,847, dated Nov. 1, 2019.
Webster's New World Dictionary, 2nd College Edition, The World Publishing Co., New York, (1972), p. 1127.
HCAPLUS Abstract 1998:273757 (1998).

(56) References Cited

OTHER PUBLICATIONS

"The Pesticide Manual", ed. C.D.S Tomlin, British Crop Production Council, Fourteenth Edition, 2006, Entry 647, p. 815.
Final Office Action, issued in co-pending U.S. Appl. No. 15/024,462, dated Nov. 27, 2018.
Final Office Action, issued in co-pending U.S. Appl. No. 15/739,847, dated Dec. 26, 2018.
The Pesticide Manual, ed. C.D.S. Tomlin, British Crop Production Council, Fourteenth Edition, (2006), entry 388, pp. 492-493.
The Pesticide Manual, ed. C.D.S. Tomlin, British Crop Production Council, Fourteenth Edition, (2006), entry 769, pp. 972-973.
The Pesticide Manual, ed. C.D.S. Tomlin, British Crop Production Council, Fourteenth Edition, (2006), entry 567 pp. 1716-1717.
The Pesticide Manual, ed. C.D.S. Tomlin, British Crop Production Council, Fourteenth Edition, (2006), entry 568 pp. 718-719.
Database WPI, Week 199604, Thomson Scientific, London, GB; AN 1996-035789, XP002752882, Synergistic Herbicidal Composition—Contains Metolachlor or Cinmethylin, and Flupoxam, (1995).
Fhe e-Pesticide Manual, Fifteenth Edition, ed., C.D.S. Tomlin, British Crop Production Council, 2011, Entry 752, p. 1.
The Pesticide Manual, ed. C.D.S Tomlin, British Crop Production Council, Fourteenth Edition , 2006, entry 162, pp. 202-203.
The Pesticide Manual, ed. C.D.S Tomlin, British Crop Production Council, Fourteenth Edition, 2006, entry 404, p. 514.
The Pesticide Manual, ed. C.D.S Tomlin, British Crop Production Council, Fourteenth Edition , 2006, entry 55, pp. 64-65.
The Pesticide Manual, Fourteenth Edition, ed. C.D.S. Tomlin, British Crop Production Council, 2006, Entry 464, pp. 587-589.
Material Safety Data Sheet Material Name Echelon 0.30% 12-0-4 25%SCU FI, (2012), pp. 1-5, [on-line] retrieved from http://www.turfcaresupply.com/upload/documents/msds/SKU_901560_-_MSDS_US__ECHELON_0.30_12-0-4_25SCU_FL.pdf, [retrieved on Mar. 6, 2015].
Sugarcane Weed Control, 2007 Louisiana Suggested Weed Control Guide, (2007), pp. 85-99, [on-line] retrieved from http://www.lsuagcenter.com/NR/rdonlyres/719A2391-DC91-459F-B188-B03A21429994/32856/Sugarcane.pdf, [retrieved on Jan. 16, 2014].
The Pesticide Manual, ed. C.D.S. Tomlin, British Crop Production Council, Fourteenth Edition, (2006), entry 268 pp. 341-343.
Anonymous, Aerosil and Sipernat Products for Optimized Crop Protection Formulations Industry Information, (2012), pp. 1-16, [on-line] retrieved from http://www.aerosil.com/product/aerosil/Documents/II-02241-AEROSIL-and-SIPERNAT-Products-for-Optimized-Crop-Protection-EN.pdf, [retrieved on Mar. 10, 2015].
Anonymous, DuPont Velpar DF Herbicide, [on-line] retrieved from http://www.cdms.net/Idat/Id0BP011.pdf, [retrieved on Mar. 6, 2015].
Anonymous, Material Safety Data Sheet Balance WDG Herbicide, (2008), pp. 1-9, [on-line] retrieved from http://www.agrian.com/pdfs/Balance_WDG_Herbicide_MSDS.pdf, [retrieved on Mar. 10, 2015].
Blouin et al., Analysis of Synergistic and Antagonistic Effects of Herbicides Using Nonlinear Mixed-Model Methodology 1, Weed Technology, 2004, vol. 18, No. 2, pp. 464-472.
Carbonari et al., Eficácia da Utilização e Grânulos de Argila Como Veículo para a Aplicação aérea de Sulfentrazone e Isoxaflutole em área de Implantação de Eucalipto, Planta Daninha, Viçosa-MG, vol. 28, No. 1, (2010), pp. 207-212, [on-line] retrieved from http://www.scielo.br/pdf/pd/v28n1/24.pdf, [retrieved on Mar. 6, 2015].
Cespedes et al., Bentonite and Anthracite in Alginate-Based Controlled Release Formulations to Reduce Leaching of Chloridazon and Metribuzin in a Calcareous Soil, Chemosphere, vol. 92, No. 8, (2013), pp. 918-924.
Corn and Soybean Herbicide Chart, University of Wisconsin-Extension, College of Agricultural and Life Sciences, Jan. 2013; obtained from the Internet on Aug. 8, 2018: https://ag.purdue.edu/btny/weedscience/Documents/Herbicide_MOA_CornSoy_12_2012[1].pdf.
Database CAPLUS, Chemical Abstracts Service, Columbus, OH, Database Accession No. 2013:382624. XP002737177.
Dickinson and Carpenter, Home-made Granular Formulations for Applying Chemicals to Irrigated Rice, International Journal of Pest Management, vol. 23, No. 2, (1977), pp. 234-235.
Grossmann et al., The herbicide saflufenacil (KixorTM) is a new inhibitor of protoporphyrinogen IX oxidase activity, Weed Science, vol. 58, pp. 1-9 (2010).
Ibrahim, Weed Management: Country Status Paper—Egypt, Improved Weed Management in the Near East Proceedings of the FAO Expert Consultation on Improved Weed Management in the Near East, Nicosia, Cyprus, Oct. 30-Nov. 1, 1985, (1995), pp. 100-103.
Jhala et al., Tank Mixing Saflufenacil, Glufosinate, and Indaziflam Improved Burndown and Residual Weed Control, Weed Technology, 2013, vol. 27, No. 2, pp. 422-429.
Kadant Grantek's Biodac Active Ingredients & Formulations Compatible with Biodac, (2011), [on-line] retrieved from http://biodac.net/images/AI and Formulations w_Cover.pdf, [retrieved on May 7, 2014].
Li et al, Addition of Modified Bentonites in Polymer Gel Formulation of 2,4-D for Its Controlled Release in Water and Soil, Journal of Agricultural and Food Chemistry, vol. 57, No. 7, (2009), pp. 2868-2874.
Li et al., Controlled Release and Retarded Leaching of Pesticides by Encapsulating in Carboxymethyl Chitosan/Bentonite Composite Gel, Journal of Environmental Science and Health, Part B, vol. 47, No. 8, (2012), pp. 795-803.
Mojave Granular Weed Killer MSDS, (1996), p. 1, [on-line] retrieved from http://www.kellysolutions.com/erenewal s/documentsubmit/KellyData\OK\pesticide\MSDS\73718\34913-16-73718 \34913-16-73718_Mojave_Granular_Weed_Killer_10_31_2006_12_11_38_PM.pdf, [retrieved on Mar. 6, 2015].
Orsenigo, Chemical Weed Control for Sugarcane on Organic Soils of the Everglades, Everglades Station Mimeo Report 62-5, (1961), pp. 1-10 [on-line] retrieved from http://ufdc.ufl.edu/UF00067483/00001, [retrieved on Jan. 16, 2014].
Peng, Developments in Crop Science (4), The Biology and Control of Weeds in Sugarcane, Chapter 12: Application Techniques and Equipment, (1984), pp. 277-295.
Purdue Agriculture, Herbicide Formulations, available online Feb. 7, 2007, obtained at https://www.agriculture.purdue.edu/fnr/html/faculty/holt/nrcasupplement.pdf.
Schobert et al., Reactions of Chelated n3-pentadienyl Iron Complexes with Nucleophiles, Journal of Organometallic Chemistry, vol. 689, (2004), pp. 575-584.
Steward and Nelson, Evaluations of controlled Release PVC and Attaclay Formulations of 2,4-D on Eurasian Watermilfoil, Hyacinth Control Journal, (1972), pp. 35-38, [on-line] retrieved from http://www.apms.org/japm/vol10/v10p35.pdf, [retrieved on Mar. 6, 2015].
Sugar Cane Product Guide, (2010), pp. 1-4 [on-line] retrieved from http://www.farmoz.com/au/Guide/FARMOZ/Sugar_Cane_Product_Guide.pdf [retrieved on Jan. 16, 2014].
The Pesticide Manual, Fourteenth Edition, Ed. C.D_S. Tomlin, British Crop Production Council, entry 677, 2006, pp. 356-857.
The Pesticide Manual, Fourteenth Edition, Ed., C.D.S. Tomlin, British Crop Production Council, entry 5, 2006, pp. 9-10.
Visavale et al., Granulation and Drying of Modified Clay Incorporated Pesticide Formulation, Drying Technology, vol. 25, No. 7-8, (2007), pp. 1369-1376.
Yeiser, Weed Control and Seedling Performance Using OUST, Velpar, and Velpar+OUST Impregnated Diammonium Phosphate, Faculty Publications, (2002), pp. 260-265, [on-line] retrieved from http://scholarworks.sfasu.edu/cgi/viewcontent.cgi?article=1204&context=forestry, [retrieved on Mar. 6, 2015].
Webster's New World Dictionary, second college edition, The World Publishing Co., NY, (1972), p. 1127.
Office Action, issued in co-pending U.S. Appl. No. 15/740,405, dated Sep. 26, 2018.
Office Action, issued in co-pending U.S. Appl. No. 15/740,031, dated Sep. 26, 2018.
Office Action, issued in co-pending U.S. Appl. No. 15/740,425, dated Sep. 26, 2018.
Office Action, issued in co-pending U.S. Appl. No. 15/743,163, dated Sep. 26, 2018.

(56) References Cited

OTHER PUBLICATIONS

Crop Protection Database, Farm Chemical International, pethoxamid, (2013), pp. 881-882.
Office Action, issued in co-pending U.S. Appl. No. 15/543,890, dated Jul. 9, 2018.
Final Office Action, issued in co-pending U.S. Appl. No. 15/024,462, dated Jun. 13, 2017.
Office Action, issued in co-pending U.S. Appl. No. 15/024,462, dated Oct. 3, 2017.
Office Action, issued in co-pending U.S. Appl. No. 15/024,462, dated Mar. 29, 2018.
Office Action, issued in co-pending U.S. Appl. No. 15/544,574, dated Aug. 30, 2018.
Office Action, issued in co-pending U.S. Appl. No. 15/741,588, dated Aug. 7, 2018.
Office Action, issued in co-pending U.S. Appl. No. 15/740,401, dated Sep. 27, 2018.
Keifer et al., US Statutory Invention Registration No. H806, Herbicidal Clomazone Compositions and Methods of Use Tolerant to Corn and Other Crops, (Aug. 7, 1990).
Office Action, issued in co-pending U.S. Appl. No. 15/739,847, dated Jun. 26, 2018.
Office Action, issued in co-pending U.S. Appl. No. 15/741,586, dated Oct. 1, 2018.
Office Action, issued in co-pending U.S. Appl. No. 15/741,458, dated Oct. 1, 2019.
CAPLUS Abstract 2008:1253922 (2008).
Office Action issued in co-pending U.S. Appl. No. 15/024,462, dated Oct. 2, 2019.
Monquero et al., "Seletividade de Herbicidas em Variedades de cana-de-acucar," Bragantia, Campinas, v. 70, n. 2, (2011), pp. 286-293.
Azania et al., "Seletividade de Imazapic as Soqueiras de Cana-de-acucar (*Saccharum* spp.)," Planta Daninha, Vicosa-MG, v. 19, n. 2, (2001), pp. 345-350.

\* cited by examiner

HERBICIDAL COMPOSITION COMPRISING CINMETHYLIN AND SPECIFIC QUINOLINECARBOXYLIC ACIDS

This application is a National Stage application of International Application No. PCT/EP2016/066004, filed Jul. 6, 2016, which claims the benefit of U.S. Provisional Application No. 62/190,786, filed Jul. 10, 2015. This application also claims priority under 35 U.S.C. § 119 to European Patent Application No. 15191719.2, filed Oct. 27, 2015.

The present invention relates to a herbicidal composition comprising specific quinolinecarboxylic acids selected from quinclorac and quinmerac. The invention also relates to methods and uses for controlling undesirable vegetation, in particular in crops.

BACKGROUND OF THE INVENTION

In crop protection, it is desirable, in principle, to increase the specific activity of an active compound and the reliability of the effect. It is particularly desirable for the crop protection product to control the harmful plants effectively, but at the same time to be compatible with the useful plants in question. Also desirable is a broad spectrum of activity allowing the simultaneous control of harmful plants. Frequently, this cannot be achieved using a single herbicidally active compound.

Further, cases of herbicide-resistant weeds are becoming increasingly common. These biotypes survive herbicide application at doses that usually give effective control of the species. Resistant weed biotypes are a consequence of basic evolutionary processes. Individuals within a species that are best adapted to a particular practice are selected for and will increase in the population. Once a weed population is exposed to a herbicide to which one or more plants are naturally resistant, the herbicide kills susceptible individuals, but allows resistant individuals to survive and reproduce. With repeated herbicide use, resistant weeds that initially appear as isolated plants or patches in a field can quickly spread to dominate the population and the soil seed bank.

For example, herbicide resistance within weeds, in particular grass weeds such as, for example, *Alopecurus myosuroides* (ALOMY), *Apera spica-venti* (APESV) or *Lolium* species (LOLSS) has become a major concern for farmers, resulting in dramatic weed control problems, for example in cereal crops. Herbicides from the group of ACCase- and ALS-inhibitors are most affected by resistance evolution but also various other types of herbicides.

Thus, there is also a need to develop practices for preventing, delaying or managing herbicide resistance in weeds.

Quinolinecarboxylic acids are one of the chemical classes to which auxinic herbicides belong (group O of the HRAC (Herbicide Resistance Action Committee) classification). Among the quinolinecarboxylic acids, quinclorac and quinmerac have been widely commercialized as herbicides.

Quinclorac is the common name of the quinolinecarboxylic acid with the IUPAC name 7-dichloroquinoline-8-carboxylic acid and the Chemical Abstracts name 3,7-dichloro-8-quinolinecarboxylic acid (CAS RN 84087-01-4) that is described in The Pesticide Manual, Fourteenth Edition, Editor: C. D. S. Tomlin, British Crop Production Council, 2006, entry 732, pages 928-929. Quinclorac is commonly used in rice (direct-seeded and transplanted rice) as both pre- and post-emergence herbicide.

Quinmerac is the common name of the quinolinecarboxylic acid with the IUPAC name 7-chloro-3-methylquinoline-8-carboxylic acid and the Chemical Abstracts name 7-chloro-3-methyl-8-quinolinecarboxylic acid (CAS RN 90717-03-6) that is described in the The Pesticide Manual, Fourteenth Edition, Editor: C. D. S. Tomlin, British Crop Production Council, 2006, entry 733, pages 929-930. Quinmerac is a pre- and post-emergence herbicide useful to crops such as sugarbeet, cereals and oilseed rape.

WO 2009/127635 discloses a method for controlling submerged aquatic weeds by applying a herbicidally effective amount of a solid formulation of a quinolinecarboxylic acid to the bottom of the aqueous habitat of the aquatic weeds to act on submerged aquatic weeds and/or their aqueous habitat containing seeds or other propagating organs of said aquatic weeds. Said quinolinecarboxylic acid may be 3,7-dichloroquinoline-8-carboxylic acid (quinclorac) and 7-chloro-3-methylquinoline-8-carboxylic acid (quinmerac). The quinolinecarboxylic acid can be used in combination with one or more other herbicides selected from various active compounds, inter alia cinmethylin.

Nevertheless, there is still room for improvement, for example regarding the activity, spectrum of activity, application rates, compatibility with useful plants and the control of resistant weed biotypes.

SUMMARY OF THE INVENTION

It is an object of the present invention to provide herbicidal compositions, which show enhanced herbicide action against undesirable harmful plants and/or have improved compatibility with the useful plants (in particular crop plants).

In particular, it is an object of the present invention to provide herbicidal compositions, which provide weed control comparable to the individual compounds with significantly reduced application rates. It is also an object of the present invention to provide herbicidal compositions, which provide significantly enhanced weed control with application rates comparable to those of the individual compounds.

Furthermore, it is an object of the present invention to provide herbicidal compositions, which maintain or improve the level of weed control, while showing less damage in the cultured crop in comparison to the individual compounds.

In addition, the compositions according to the invention should have a broad spectrum of activity.

Another object of the present invention lies in the effective control of herbicide-resistant weed biotypes, in particular in herbicide-resistant grass weeds.

These and further objects are achieved by the herbicidal compositions, uses and methods below.

Accordingly, in one aspect of the invention there is provided a herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one quinolinecarboxylic acid selected from quinclorac (B.1), quinmerac (B.2) and agriculturally acceptable salts or esters thereof (herbicide B).

The term "herbicide A" as used herein is meant to include the racemic mixture (±)-2-exo-(2-Methylbenzyloxy)-1-methyl-4-isopropyl-7-oxabicyclo[2.2.1]heptane (herein also referred to as the "exo-(±)-isomers", CAS RN 87818-31-3)

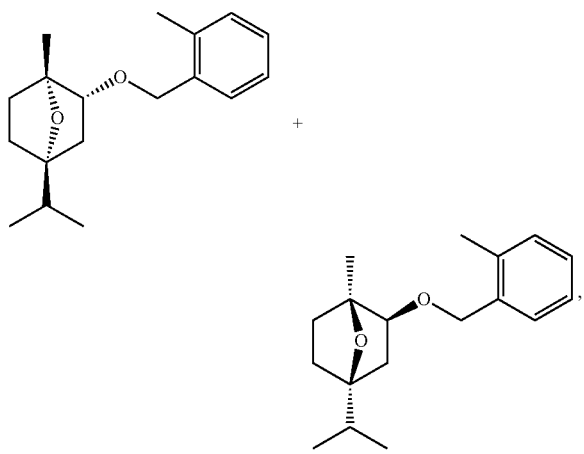

any of its individual enantiomers or any non-racemic mixture thereof. The racemic mixture contains equal parts of the two enantiomers (+)-2-exo-(2-Methylbenzyloxy)-1-methyl-4-isopropyl-7-oxabicyclo[2.2.1]heptane (herein also referred to as the "exo-(+)-isomer", CAS RN 87818-61-9) and (−)-2-exo-(2-Methylbenzyloxy)-1-methyl-4-isopropyl-7-oxabicyclo[2.2.1]heptane (herein also referred to as the "exo-(−)-isomer", CAS RN 87819-60-1). The exo-(±)-isomers, the exo-(+)-isomer and the exo-(−)-isomer including their preparation and herbicidal properties are disclosed in EP 0 081 893 A2 (see Examples 29, 34, 35 and 62). Further preparation methods of these compounds are described in U.S. Pat. No. 4,487,945 (see Embodiments 46 and 48). The racemic mixture (±)-2-exo-(2-Methylbenzyloxy)-1-methyl-4-isopropyl-7-oxabicyclo[2.2.1]heptane is also described in the The Pesticide Manual, Fourteenth Edition, Editor: C. D. S. Tomlin, British Crop Production Council, 2006, entry 157, pages 195-196 with its common name cinmethylin, its IUPAC name (1RS,2SR,4SR)-1,4-epoxy-p-menth-2-yl 2-methylbenzyl ether and its Chemical Abstracts name exo-(±)-1-methyl-4-(1-methylethyl)-2-[(2-methylphenyl)methoxy]-7-oxabicyclo[2.2.1]heptane.

In a preferred embodiment, the herbicide A is (±)-2-exo-(2-Methylbenzyloxy)-1-methyl-4-isopropyl-7-oxabicyclo[2.2.1]heptane.

In another embodiment, the herbicide A is (+)-2-exo-(2-Methylbenzyloxy)-1-methyl-4-isopropyl-7-oxabicyclo[2.2.1]heptane.

In another embodiment, the herbicide A is (−)-2-exo-(2-Methylbenzyloxy)-1-methyl-4-isopropyl-7-oxabicyclo[2.2.1]heptane.

In another embodiment, herbicide A is a non-racemic mixture of (+)-2-exo-(2-Methylbenzyloxy)-1-methyl-4-isopropyl-7-oxabicyclo[2.2.1]heptane and (−)-2-exo-(2-Methylbenzyloxy)-1-methyl-4-isopropyl-7-oxabicyclo[2.2.1]heptane. The non-racemic mixture contains unequal parts of the exo-(+)-isomer and the exo-(−)-isomer. The weight ratio of the exo-(+)-isomer to the exo-(−)-isomer in the non-racemic mixture can vary widely.

In another embodiment, the quinolinecarboxylic acid is quinclorac (herein also referred to as "herbicide B.1" or "B.1") or an agriculturally acceptable salt or ester thereof.

In another embodiment, the quinolinecarboxylic acid is quinmerac (herein also referred to as "herbicide B.2" or "B.2") or an agriculturally acceptable salt or ester thereof.

Examples of suitable agriculturally acceptable salts of quinclorac (B.1) and quinmerac (B.2) include e.g. their sodium salts, potassium salts, ammonium salts or substituted ammonium salts, in particular mono-, di- and tri-$C_1$-$C_8$-alkylammonium salts such as methylammonium, dimethylammonium and isopropylammonium, mono-, di- and tri-hydroxy-$C_2$-$C_8$-alkylannnnonium salts such as hydroxyethylammonium, di(hydroxyethyl)ammonium, tri(hydroxyethyl)ammonium, hydroxypropylammonium, di(hydroxypropyl)ammonium and tri(hydroxypropyl)ammonium salts, their diglycolamine salts and their esters, in particular its $C_1$-$C_8$-alkyl esters and $C_1$-$C_4$-alkoxy-$C_2$-$C_4$-alkyl esters, such as methylesters, ethylesters, iso-propyl, butyl, hexyl, heptyl, iso-heptyl, isooctyl, 2-ethylhexyl and butoxyethyl esters.

A particularly preferred agriculturally acceptable salt of quinclorac (B.1) is quinclorac-dimethylammonium (B.1a).

The term "herbicidal effective amount" denotes an amount of the active ingredients, which is sufficient for controlling unwanted plants, especially for controlling unwanted plants in cultivated plants and which does not result in a substantial damage to the treated plants. Such an amount can vary in a broad range and is dependent on various factors, such as the plants to be controlled, the treated cultivated plant or material, the climatic conditions and the specific composition according to the invention used.

The composition of the invention may further comprise at least one herbicide C (as defined hereinafter) which is different from the herbicides A and B.

The composition of the invention may further comprise at least one safener D (as defined hereinafter).

The composition of the invention may further comprise one or more auxiliaries customary in crop protection (as defined hereinafter).

In another aspect, the present invention relates to the use of the composition as defined herein for controlling undesirable vegetation.

The terms "plants" and "vegetation", as used herein, include germinant seeds, emerging seedlings, plants emerging from vegetative propagules, and established vegetation.

The terms "controlling" and "combating", as used herein, are synonyms.

The terms "undesirable vegetation", "harmful plants", "unwanted plants", "weeds" and "weed species", as used herein, are synonyms.

In another aspect, the present invention relates to a method for controlling undesirable vegetation which comprises applying to the vegetation or the locus thereof or applying to the soil or water to prevent the emergence or growth of the undesirable vegetation a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one quinolinecarboxylic acid selected from quinclorac (B.1), quinmerac (B.2) and agriculturally acceptable salts or esters thereof (herbicide B).

The method of the invention may further comprise applying at least one herbicide C (as defined hereinafter) which is different from the herbicides A and B. The method of the invention may further comprise applying at least one safener D. The method of the invention may further comprise applying one or more auxiliaries customary in crop protection.

The term "locus", as used herein, means the area in which the vegetation or plants are growing or will grow, typically a field.

In yet another aspect, the present invention relates to a method for controlling undesirable vegetation which comprises applying to the vegetation or the locus thereof or applying to the soil or water to prevent the emergence or growth of the undesirable vegetation the composition according to the invention.

Further embodiments of the invention are evident from the description, the examples and the claims. It is to be understood that the features mentioned above and still to be illustrated below of the subject matter of the invention can be applied not only in the combination given in each particular case but also in other combinations, without leaving the scope of the invention.

DETAILED DESCRIPTION OF THE INVENTION

Surprisingly, it has been found that the combination of (a) herbicide A and (b) the quinolinecarboxylic acids quinclorac (B.1) and quinmerac (B.2) including their agriculturally acceptable salts or esters (herbicide B) is capable of providing a synergistic herbicidal effect.

Thus, in a preferred embodiment of the compositions, uses and methods of this invention, the herbicide A and herbicide B are each present or applied in an amount sufficient to provide a synergistic herbicidal effect.

The term "synergistic herbicidal effect" refers to the herbicidal effect for a given combination of two herbicides where the herbicidal activity of the combination exceeds the total of the individual herbicidal activities of the herbicides when applied separately. For this reason, the compositions can, based on the individual components, be used at lower application rates to achieve a herbicidal effect comparable to the individual components.

In some embodiments of this invention, Colby's equation is applied to determine whether the combination of herbicide A and herbicide B shows a synergistic effect (see S. R. Colby, "Calculating synergistic and antagonistic responses of herbicide combinations", Weeds 1967, 15, pp. 20-22).

$$E=X+Y-(X \cdot Y/100)$$

where X=effect in percent using herbicide A at an application rate a;
Y=effect in percent using herbicide B at application rate b;
E=expected effect (in %) of herbicide A+ herbicide B at application rates a+b.

For three-way combinations (herbicide A+ herbicide B+ herbicide C) a modified Colby equation can be used:

$$E=X+Y+Z-[(X \cdot Y+X \cdot Z+Y \cdot Z)/100]-X \cdot Y \cdot Z/10000$$

where E, X and Y are as defined above and Z is the herbicidal effect in percent using a herbicide C (as defined herein) at an application rate c.

In Colby's equation, the value E corresponds to the effect (plant damage or injury) which is to be expected if the activity of the individual compounds is additive. If the observed effect is higher than the value E calculated according to the Colby equation, a synergistic effect is present.

In one embodiment of the present invention, the compositions, uses and methods disclosed herein are synergistic as determined by the Colby equation. Specifically, the synergistic herbicidal effect is determined according to the Colby equation.

Moreover, the compositions, uses and methods of the present invention provide excellent pre- and post-emergence control of weeds. In one embodiment, the compositions and methods are useful for controlling undesirable vegetation before their emergence (pre-emergence). In another embodiment, the compositions and methods are also useful for controlling undesirable vegetation after their emergence (post-emergence).

The compositions, uses and methods of the present invention also show good crop compatibility, i.e. the combined application of (a) herbicide A and (b) herbicide B in crops does not result in increased damage of the crop plants when compared to the individual application of herbicide A or herbicide B.

Furthermore, the compositions, uses and methods of the present invention provide effective control of herbicide resistant or tolerant weed species, in particular herbicide-resistant weed biotypes. For example, the compositions, uses and methods of the present invention can effectively control herbicide-resistant grass weeds such as, for example, *Alopecurus myosuroides* (ALOMY), *Apera spica-venti* (APESV), *Phalaris* species (PHASS) or *Lolium* species (LOLSS). The compositions, uses and methods of the present invention are also suitable for controlling herbicide-resistant broadleaf weeds such as, for example, *Papaver rhoeas* (PAPRH, corn poppy) which has evolved resistance, especially against ALS-inhibiting herbicides.

In addition, the compositions, uses and methods of the present invention can effectively control weed biotypes with target-site resistance but also weed biotypes with non-target site resistance. A particular advantage is that the compositions, uses and methods of the present invention also provide effective control of weed biotypes having both target-site resistance and non-target-site resistance, such as e.g. resistant populations of *Alopecurus myosuroides* (ALOMY) or *Lolium rigidum* (LOLRI).

"Target-site resistance", as used herein, occurs by mutation within a gene coding for an herbicide target-site enzyme (limiting the herbicide binding) or by overproduction of the target enzyme (gene overexpression or amplification).

"Non-target-site resistance", as used herein, involves mechanisms that minimize the amount of active herbicide reaching the target site (e.g. reduced herbicide uptake or translocation, increased herbicide sequestration, or enhanced herbicide metabolism).

In the compositions of the present invention the weight ratio of herbicide A (in particular (±)-2-exo-(2-Methylbenzyloxy)-1-methyl-4-isopropyl-7-oxabicyclo[2.2.1]heptane) to the herbicide B is in general in the range from 1:0.02 to 1:28, preferably in the range from 1:0.06 to 1:9.4 and more preferably in the range from 1:0.2 to 1:4.

In addition to the herbicide A and herbicide B, the composition of the invention may further comprise at least one herbicide C which is different from the herbicides A and B.

Thus, in one embodiment, the compositions of the present invention comprise herbicide A (in particular (±)-2-exo-(2-Methylbenzyloxy)-1-methyl-4-isopropyl-7-oxabicyclo [2.2.1]heptane), at least one quinolinecarboxylic acid selected from quinclorac (B.1), quinmerac (B.2) and agriculturally acceptable salts or esters thereof (herbicide B) and at least one herbicide C.

Preferably, the herbicide C is selected from the group consisting of acetochlor (C.1), aclonifen (C.2), amicarbazone (C.3), amidosulfuron (C.4), aminopyralid (C.5), amitrole (C.6), asulam (C.7), atrazine (C.8), azimsulfuron (C.9), beflubutamid (C.10), benfluralin (C.11), bensulfuron (C.12), bensulide (C.13), bentazone (C.14), benzobicyclon (C.15), bicyclopyrone (C.16), bifenox (C.17), bispyribac (C.18), bromoxynil (C.19), carbetamide (C.20), carfentrazone (C.21), chloridazon (C.22), chlorpropham (C.23), chlorsulfuron (C.24), chlorthal (C.25), chlorotoluron (C.26), clethodim (C.27), clodinafop (C.28), clomazone (C.29), clopyralid (C.30), cyclosulfamuron (C.31), cycloxydim (C.32), cyclopyrimorate (C.33), cyhalofop (C.34), 2,4-D (C.35), dazomet (C.36), 2,4-DB (C.37), desmedipham (C.38), dicamba (C.39), dichlorprop (C.40), dichlorprop-P (C.41), diclofop (C.42), diflufenican (C.43), diflufenzopyr (C.44), dinnethachlor (C.45), dimethenamid (C.46), dimethenamid-P (C.47), diquat (C.48), dithiopyr (C.49), diuron (C.50), ethametsulfuron (C.51), ethofumesate (C.52), fenoxaprop (C.53), fenoxaprop-P (C.54), fenquinotrione (C.55), flazasulfuron (C.56), florasulam (C.57), fluazifop (C.58), fluazifop-P (C.59), flucarbazone (C.60), flufenacet (C.61), flumioxazin (C.62), fluometuron (C.63), flupyrsulfuron (C.64), fluorochloridone (C.65), fluroxypyr (C.66), flurtamone (C.67), foramsulfuron (C.68), glufosinate (C.69), glufosinate-P (C.70), glyphosate (C.71), halauxifen (C.72), halosulfuron (C.73), haloxyfop-P (C.74), indaziflam (C.75), imazamox (C.76), imazapic (C.77), imazapyr (C.78), imazaquin (C.79), imazethapyr (C.80), imazosulfuron (C.81), iodosulfuron (C.82), iofensulfuron (C.83), ioxynil (C.84), isoproturon (C.85), isoxaben (C.86), isoxaflutole (C.87), lenacil (C.88), linuron (C.89), MCPA (C.90), MCPB (C.91), mecoprop (C.92), mecoprop-P (C.93), mesosulfuron (C.94), mesotrione (C.95), metam (C.96), metamitron (C.97), methiozoline (C.98), methobromuron (C.99), metolachlore (C.100), S-metolachlore (C.101), metosulam (C.102), metribuzin (C.103), metsulfuron (C.104), molinate (C.105), monosodium methyl arsenate (MSMA) (C.106), napropamide (C.107), napropamide-M (C.108), nicosulfuron (C.109), orthosulfamuron (C.110), oryzalin (C.111), oxadiargyl (C.112), oxadiazon (C.113), oxasulfuron (C.114), oxyfluorfen (C.115), pendimethalin (C.116), penoxsulam (C.117), pethoxamid (C.118), phenmedipham (C.119), picloram (C.120), picolinafen (C.121), pinoxaden (C.122), pretilachlor (C.123), prodiamine (C.124), profoxydim (C.125), prometryne (C.126), propanil (C.127), propaquizafop (C.128), propoxycarbazone (C.129), propyzamide (C.130), prosulfocarb (C.131), prosulfuron (C.132), pyraflufen (C.133), pyridate (C.134), pyroxasulfone (C.135), pyroxsulam (C.136), quinoclamine (C.137), quizalofop (C.138), quizalofop-P (C.139), rimsulfuron (C.140), saflufenacil (C.141), sethoxydim (C.142), siduron (C.143), simazine (C.144), sulcotrione (C.145), sulfentrazone (C.146), sulfosulfuron (C.147), tembotrione (C.148), tepraloxydim (C.149), terbuthylazine (C.150), thiencarbazone (C.151), thifensulfuron (C.152), tolpyralate (C.153), topramezone (C.154), tralkoxydim (C.155), tri-allate (C.156), triasulfuron (C.157), tribenuron (C.158), triclopyr (C.159), trifloxysulfuron (C.160), trifludimoxazin (C.161), trifluralin (C.162), triflusulfuron (C.163), tritosulfuron (C.164), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof.

More preferably, the herbicide C is selected from the group consisting of acetochlor (C.1), aclonifen (C.2), aminopyralid (C.5), atrazine (C.8), azimsulfuron (C.9), beflubutamid (C.10), bensulfuron (C.12), bentazone (C.14), benzobicyclon (C.15), bicyclopyrone (C.16), bispyribac (C.18), bromoxynil (C.19), carbetamide (C.20), chloridazon (C.22), chlorotoluron (C.26), clethodim (C.27), clodinafop (C.28), clomazone (C.29), clopyralid (C.30), cyclosulfamuron (C.31), cycloxydim (C.32), cyclopyrimorate (C.33), cyhalofop (C.34), 2,4-D (C.35), dicamba (C.39), diclofop (C.42), diflufenican (C.43), diflufenzopyr (C.44), dimethachlor (C.45), dimethenamid (C.46), dimethenamid-P (C.47), dithiopyr (C.49), ethametsulfuron (C.51), ethofumesate (C.52), fenoxaprop (C.53), fenoxaprop-P (C.54), fenquinotrione (C.55), flazasulfuron (C.56), florasulam (C.57), fluazifop (C.58), fluazifop-P (C.59), flucarbazone (C.60), flufenacet (C.61), flumioxazin (C.62), flupyrsulfuron (C.64), fluorochloridone (C.65), fluroxypyr (C.66), flurtamone (C.67), foramsulfuron (C.68), glufosinate (C.69), glufosinate-P (C.70), glyphosate (C.71), halauxifen (C.72), halosulfuron (C.73), haloxyfop-P (C.74), indaziflam (C.75), imazamox (C.76), imazethapyr (C.80), iodosulfuron (C.82), isoproturon (C.85), isoxaben (C.86), isoxaflutole (C.87), mecoprop (C.92), mecoprop-P (C.93), mesosulfuron (C.94), mesotrione (C.95), metolachlore (C.100), S-metolachlore (C.101), metosulam (C.102), metribuzin (C.103), metsulfuron (C.104), napropamide (C.107), napropamide-M (C.108), nicosulfuron (C.109), oryzalin (C.111), oxadiargyl (C.112), oxadiazon (C.113), oxyfluorfen (C.115), pendimethalin (C.116), penoxsulam (C.117), pethoxamid (C.118), picloram (C.120), picolinafen (C.121), pinoxaden (C.122), pretilachlor (C.123), prodiamine (C.124), profoxydim (C.125), propanil (C.127), propaquizafop (C.128), propoxycarbazone (C.129), propyzamide (C.130), prosulfocarb (C.131), pyroxasulfone (C.135), pyroxsulam (C.136), quizalofop (C.138), quizalofop-P (C.139), rimsulfuron (C.140), saflufenacil (C.141), simazine (C.144), sulcotrione (C.145), sulfentrazone (C.146), sulfosulfuron (C.147), tembotrione (C.148), tepraloxydim (C.149), terbuthylazine (C.150), thiencarbazone (C.151), thifensulfuron (C.152), tolpyralate (C.153), topramezone (C.154), tralkoxydim (C.155), tri-allate (C.156), tribenuron (C.158), trifludimoxazin (C.161), trifluralin (C.162), tritosulfuron (C.164), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof.

Even more preferably, the herbicide C is selected from the group consisting of aminopyralid (C.5), azimsulfuron (C.9), bensulfuron (C.12), bentazone (C.14), benzobicyclon (C.15), bispyribac (C.18), clethodim (C.27), clomazone (C.29), clopyralid (C.30), cyclosulfamuron (C.31), cycloxydim (C.32), cyhalofop (C.34), dimethachlor (C.45), dimethenamid (C.46), dimethenamid-P (C.47), ethametsulfuron (C.51), fenoxaprop-P (C.54), imazamox (C.76), napropamide (C.107), napropamide-M (C.108), oxadiazon (C.113), pendimethalin (C.116), penoxsulam (C.117), pethoxamid (C.118), picloram (C.120), pretilachlor (C.123), profoxydim (C.125), propanil (C.127), propaquizafop (C.128), propyzamide (C.130), quizalofop (C.138), quizalofop-P (C.139), saflufenacil (C.141), sulfentrazone (C.146), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof.

In another preferred embodiment, the herbicide C is selected from the group consisting of aminopyralid (C.5), clethodim (C.27), clomazone (C.29), clopyralid (C.30), cycloxydim (C.32), dimethachlor (C.45), dimethenamid (C.46), dimethenamid-P (C.47), ethametsulfuron (C.51), imazamox (C.76), napropamide (C.107), napropamide-M (C.108), pendimethalin (C.116), pethoxamid (C.118), picloram (C.120), propaquizafop (C.128), propyzamide (C.130), quizalofop-P (C.139), and agriculturally acceptable salts, esters or amides thereof. The aforementioned herbicides C are particularly suitable for use in oilseed rape.

In another preferred embodiment, the herbicide C is selected from the group consisting of azimsulfuron (C.9), bensulfuron (C.12), bentazone (C.14), benzobicyclon (C.15), bispyribac (C.18), cyclosulfamuron (C.31), cycloxydim (C.32), imazamox (C.76), penoxsulam (C.117), pretilachlor (C.123), profoxydim (C.125), propanil (C.127), propaquizafop (C.128), quizalofop (C.138), quizalofop-P (C.139), saflufenacil (C.141), sulfentrazone (C.146), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof. The aforementioned herbicides C are particularly suitable for use in rice.

In addition to the herbicide A, herbicide B and the optional herbicide C, the composition of the invention may further comprise at least one safener D.

Safeners are chemical compounds which prevent or reduce damage on useful plants without having a major impact on the herbicidal action of the herbicidal active components towards unwanted plants. Safeners can be applied before sowings (e.g. seed treatments), on shoots or seedlings as well as in the pre-emergence or post-emergence treatment of useful plants and their habitat.

Therefore, in one embodiment, the compositions of the present invention comprise herbicide A, herbicide B, at least one safener D and optionally at least one herbicide C.

In another embodiment, the compositions of the present invention comprise herbicide A, herbicide B, at least one herbicide C and at least one safener D.

Exemplary safeners D include benoxacor (D.1), cloquintocet (D.2), cyometrinil (D.3), cyprosulfamide (D.4), dichlormid (D.5), dicyclonon (D.6), dietholate (D.7), fenchlorazole (D.8), fenclorim (D.9), flurazole (D.10), fluxofenim (D.11), furilazole (D.12), isoxadifen (D.13), mefenpyr (D.14), mephenate (D.15), naphthaleneacetic acid (D.16), naphthalic anhydride (D.17), oxabetrinil (D.18), 4-(dichloroacetyl)-1-oxa-4-azaspiro[4.5]decane (MON4660, CAS 31-4) (D.20), N-(2-Methoxybenzoyl)-4-[(methylaminocarbonyl)amino]benzenesulfonamide (CAS 129531-12-0) (D.21), and agriculturally acceptable salts, esters or amides thereof.

Preferably, the safener D is selected from the group consisting of benoxacor (D.1), cloquintocet (D.2), cyprosulfamide (D.4), dichlormid (D.5), dicyclonon (D.6), fenchlorazole (D.8), fenclorim (D.9), flurazole (D.10), furilazole (D.12), isoxadifen (D.13), mefenpyr (D.14), 4-(dichloroacetyl)-1-oxa-4-azaspiro[4.5]decane (MON4660, CAS 71526-07-3) (D.19), 2,2,5-trimethyl-3-(dichloroacetyl)-1,3-oxazolidine (R-29148, CAS 52836-31-4) (D.20), and agriculturally acceptable salts, esters or amides thereof.

More preferably, the safener D is selected from the group consisting of benoxacor (D.1), cloquintocet-mexyl (D.2a), cyprosulfamide (D.4), dichlormid (D.5), dicyclonon (D.6), fenclorazole-ethyl (D.8a), fenclorim (D.9), flurazole (D.10), furilazole (D.12), isoxadifen-ethyl (D.13a), mefenpyr-diethyl (D.14a), 4-(dichloroacetyl)-1-oxa-4-azaspiro[4.5]decane (MON4660, CAS 71526-07-3) (D.19), and 2,2,5-trimethyl-3-(dichloroacetyl)-1,3-oxazolidine (R-29148, CAS 52836-31-4) (D.20).

Even more preferably, the safener D is selected from the group consisting of benoxacor (D.1), cloquintocet (D.2), cyprosulfamide (D.4), dichlormid (D.5), fenclorazole (D.8), fenclorim (D.9), isoxadifen (D.13), mefenpyr (D.14), and agriculturally acceptable salts, esters or amides thereof.

Still more preferably, the safener D is selected from the group consisting of benoxacor (D.1), cloquintocet-mexyl (D.2a), cyprosulfamide (D.4), dichlormid (D.5), fenclorazole-ethyl (D.8a), fenclorim (D.9), isoxadifen-ethyl (D.13a), and mefenpyr-diethyl (D.14a).

In particular, the safener D is selected from the group consisting of benoxacor (D.1), cloquintocet (D.2), cyprosulfamide (D.4), isoxadifen (D.13), mefenpyr (D.14), and agriculturally acceptable salts, esters or amides thereof. Most preferably, the safener D is selected from the group consisting of benoxacor (D.1), cloquintocet-mexyl (D.2a), cyprosulfamide (D.4), isoxadifen-ethyl (D.13a), and mefenpyr-diethyl (D.14a).

The herbicides C and safeners D are known herbicides and safeners, see, for example, The Pesticide Manual, British Crop Protection Council, 16$^{th}$ edition, 2012; The Compendium of Pesticide Common Names (http://www.alanwood.net/pesticides/); Farm Chemicals Handbook 2000 volume 86, Meister Publishing Company, 2000; B. Hock, C. Fedtke, R. R. Schmidt, Herbizide [Herbicides], Georg Thieme Verlag, Stuttgart 1995; W. H. Ahrens, Herbicide Handbook, 7th edition, Weed Science Society of America, 1994; and K. K. Hatzios, Herbicide Handbook, Supplement for the 7th edition, Weed Science Society of America, 1998. 2,2,5-Trimethyl-3-(dichloroacetyl)-1,3-oxazolidine [CAS No. 52836-31-4] is also referred to as R-29148. 4-(Dichloroacetyl)-1-oxa-4-azaspiro[4.5]decane [CAS No. 71526-07-3] is also referred to as AD-67 and MON 4660.

If the herbicides C and/or safeners D as described herein are capable of forming geometrical isomers, for example E/Z isomers, it is possible to use both, the pure isomers and mixtures thereof, in the compositions, uses and methods according to the invention.

If the herbicides C and/or safeners D as described herein have one or more centers of chirality and, as a consequence, are present as enantiomers or diastereomers, it is possible to use both, the pure enantiomers and diastereomers and their mixtures, in the compositions, uses and methods according to the invention.

If the herbicides C and/or safeners D as described herein have ionizable functional groups, they can also be employed in the form of their agriculturally acceptable salts. The term "agriculturally acceptable salts" is used herein to mean in general, the salts of those cations and the acid addition salts of those acids whose cations and anions, respectively, have no adverse effect on the herbicidal activity of the active compounds.

Preferred cations are the ions of the alkali metals, preferably of lithium, sodium and potassium, of the alkaline earth metals, preferably of calcium and magnesium, and of the transition metals, preferably of manganese, copper, zinc and iron, further ammonium and substituted ammonium in which one to four hydrogen atoms are replaced by $C_1$-$C_4$-alkyl, hydroxy-$C_1$-$C_4$-alkyl, $C_1$-$C_4$alkoxy-$C_1$-$C_4$-alkyl, hydroxy-$C_1$-$C_4$-alkoxy-$C_1$-$C_4$-alkyl, phenyl or benzyl, preferably ammonium, methylammonium, isopropylammonium, dimethylammonium, diisopropylammonium, trimethylammonium, heptylammonium, dodecylammonium, tetradecylammonium, tetramethylammonium, tetraethylammonium, tetrabutylammonium, 2-hydroxyethylammonium (oleamine salt), 2-(2-hydroxyeth-1-oxy)eth-1-ylammonium (diglycoleamine salt), di(2-hydroxyeth-1-yl)ammonium (diolamine salt), tris(2-hydroxyethyl)ammonium (trolamine salt), tris(2-hydroxypropyl)ammonium, benzyltrimethylammonium, benzyltriethylammonium, N,N,N-trimethylethanolammonium (choline salt), furthermore phosphonium ions, sulfonium ions, preferably tri($C_1$-$C_4$-alkyl)sulfonium, such as trimethylsulfonium, and sulfoxonium ions, preferably tri($C_1$-$C_4$-alkyl)sulfoxonium, and finally the salts of polybasic amines such as N,N-bis-(3-aminopropyl)methyl-amine and diethylenetriamine.

Anions of useful acid addition salts are primarily chloride, bromide, fluoride, iodide, hydrogensulfate, methylsulfate, sulfate, dihydrogenphosphate, hydrogenphosphate, nitrate, bicarbonate, carbonate, hexafluorosilicate, hexafluorophosphate, benzoate and also the anions of $C_1$-$C_4$-alkanoic acids, preferably formate, acetate, propionate and butyrate.

The herbicides C and/or safeners D as described herein having a carboxyl, hydroxy and/or an amino group can be employed in the form of the acid, in the form of an agriculturally suitable salt as mentioned above or else in the form of an agriculturally acceptable derivative, for example as amides, such as mono- and di-$C_1$-$C_6$-alkylamides or arylamides, as esters, for example as allyl esters, propargyl esters, $C_1$-$C_{10}$-alkyl esters, alkoxyalkyl esters, tefuryl ((tetrahydrofuran-2-yl)methyl) esters and also as thioesters, for example as $C_1$-$C_{10}$-alkylthio esters. Preferred mono- and di-$C_1$-$C_6$-alkylamides are the methyl and the dimethylamides. Preferred arylamides are, for example, the anilides and the 2-chloroanilides. Preferred alkyl esters are, for example, the methyl, ethyl, propyl, isopropyl, butyl, isobutyl, pentyl, mexyl (1-methylhexyl), meptyl (1-methylheptyl), heptyl, octyl or isooctyl (2-ethylhexyl) esters. Preferred $C_1$-$C_4$-alkoxy-$C_1$-$C_4$-alkyl esters are the straight-chain or branched $C_1$-$C_4$-alkoxy ethyl esters, for example the 2-methoxyethyl, 2-ethoxyethyl, 2-butoxyethyl (butotyl), 2-butoxypropyl or 3-butoxypropyl ester. An example of a straight-chain or branched $C_1$-$C_{10}$-alkylthio ester is the ethylthio ester.

Exemplary agriculturally acceptable salts or esters of aminopyralid (C.5) include aminopyralid-dimethylammonium (C.5a), aminopyralid-potassium (C.5b), aminopyralid-tris(2-hydroxypropyl)ammonium (C.5c), and mixtures thereof.

Exemplary agriculturally acceptable salts or esters of asulam (C.7) include asulam-potassium (C.7a), asulam-sodium (C.7b), and mixtures thereof.

Exemplary agriculturally acceptable salts or esters of bensulfuron (C.12) include bensulfuron-methyl (C.12a).

Exemplary agriculturally acceptable salts or esters of bentazone (C.14) include bentazone-sodium (C.14a).

Exemplary agriculturally acceptable salts or esters of bispyribac (C.18) include bispyribac-sodium (C.18a).

Exemplary agriculturally acceptable salts or esters of bromoxynil (C.19) include bromoxynil butyrate (C.19a), bromoxynil heptanoate (C.19b), bromoxynil octanoate (C.19c), bromoxynil-potassium (C.19d), and mixtures thereof.

Exemplary agriculturally acceptable salts or esters of carfentrazone (C.21) include carfentrazone-ethyl (C.21a).

Exemplary agriculturally acceptable salts or esters of chlorothal (C.25) include chlorothal-dimethyl (DCPA) (C.25a), chlorothal-monomethyl (C.25b), and mixtures thereof.

Exemplary agriculturally acceptable salts or esters of clodinafop (C.28) include clodinafop-propargyl (C.28a).

Exemplary agriculturally acceptable salts or esters of clopyralid (C.30) include clopyralid-potassium (C.30a), clopyralid-oleamine (C.30b), clopyralid-tris(2-hydroxypropyl)ammonium (C. 30c), clopyralid-methyl (C.30d), and mixtures thereof. In some embodiments, clopyralid is provided as an amine salt, such as clopyralid-oleamine salt (C.30b, see above), dimethylamine (DMA) salt (C.30e), monoethanoleamine (MEA) salt (C.30f), triisopropanoleamine (TIPA) salt (C. 30g), and mixtures thereof.

Exemplary agriculturally acceptable salts or esters of cyhalofop (C.34) include cyhalofop-butyl (C.34a).

Exemplary agriculturally acceptable salts or esters of 2,4-D (C.35) include 2,4-D-ammonium (C.35a), 2,4-D-butotyl (C.35b), 2,4-D-2-butoxypropyl (C.35c), 2,4-D-3-butoxypropyl (C.35d), 2,4-D-butyl (C.35e), 2,4-D-diethylammonium (C.35f), 2,4-D-dimethylammonium (C.35g), 2,4-D-diolamine (C.35h), 2,4-D-dodecylammonium (C.35i), 2,4-D-ethyl (C.35j), 2,4-D-2-ethylhexyl (C.35k), 2,4-D-heptylammonium (C.35l), 2,4-D-isobutyl (C.35m), 2,4-D-isooctyl (C.35n), 2,4-D-isopropyl (C.35o), 2,4-D-isopropylammonium (C.35p), 2,4-D-lithium (C.35q), 2,4-D-meptyl (C.35r), 2,4-D-methyl (C.35s), 2,4-D-octyl (C.35t), 2,4-D-pentyl (C.35u), 2,4-D-propyl (C.35v), 2,4-D-sodium (C.35w), 2,4-D-tefuryl (C.35x), 2,4-D-tetradecylammonium (C.35y), 2,4-D-triethylammonium (C.35z), 2,4-D-tris(2-hydroxypropyl)ammonium (C.35zx), 2,4-D-trolamine (C.35zy), and mixtures thereof.

Exemplary agriculturally acceptable salts or esters of dazomet (C.36) include dazomet-sodium (C.36a).

Exemplary agriculturally acceptable salts or esters of 2,4-DB (C.37) include 2,4-DB-butyl (C.37a), 2,4-DB-dimethylammonium (C.37b), 2,4-DB-isooctyl (C.37c), 2,4-DB-potassium (C.37d), 2,4-DB-sodium (C.37e), and mixtures thereof.

Exemplary agriculturally acceptable salts or esters of dicamba (C.39) include dicamba-sodium (C.39a), dicamba-potassium (C.39b), dicamba-methylammonium (C.39c), dicamba-dimethylammonium (C.39d), dicamba-isopropylammonium (C.39e), dicamba-diglycoleamine (C.39f), dicamba-oleamine (C.39g), dicamba-diolamine (C.39h), dicamba-trolamine (C.39i), dicannba-N,N-bis-(3-aminopropyl)methylamine (C.39j), dicamba-diethylenetriamine (C.39k), dicamba-methyl (C.39l), dicamba-butotyl (C.39m), and mixtures thereof.

Exemplary agriculturally acceptable salts or esters of dichloroprop include dichloroprop-butotyl (C.40a), dichloroprop-dimethylammonium (C.40b), dichloroprop-ethylammonium (C.40c), dichloroprop-2-ethylhexyl (C.40d), dichloroprop-isooctyl (C.40e), dichloroprop-methyl (C.40f), dichloroprop-potassium (C.40g), dichloroprop-sodium (C.40h), and mixtures thereof.

Exemplary agriculturally acceptable salts or esters of dichloroprop-P include dichloroprop-P-dimethylammonium (C.41a), dichloroprop-P-2-ethylhexyl (C.41b), dichloroprop-P-potassium (C.41c), dichloroprop-P-sodium (C.41d), and mixtures thereof.

Exemplary agriculturally acceptable salts or esters of diclofop (C.42) include diclofop-methyl (C.42a).

Exemplary agriculturally acceptable salts or esters of diflufenzopyr (C.44) include diflufenzopyr-sodium (C.44a).

Exemplary agriculturally acceptable salts or esters of diquat (C.48) include diquat dibromide (C.48a).

Exemplary agriculturally acceptable salts or esters of ethametsulfuron (C.51) include ethametsulfuron-methyl (C.51a).

Exemplary agriculturally acceptable salts or esters of fenoxaprop (C.53) include fenoxaprop-ethyl (C.53a).

Exemplary agriculturally acceptable salts or esters of fenoxaprop-P (C.54) include fenoxaprop-P-ethyl (C.54a).

Exemplary agriculturally acceptable salts or esters of fluazifop (C.58) include fluazifop-methyl (C.58a), fluazifop-butyl (C.58b), and mixtures thereof.

Exemplary agriculturally acceptable salts or esters of fluazifop-P (C.59) include fluazifop-P-butyl (C.59a).

Exemplary agriculturally acceptable salts or esters of flucarbazone (C.60) include flucarbazone-sodium (C.60a).

Exemplary agriculturally acceptable salts or esters of flupyrsulfuron (C.64) include flupyrsulfuron-methyl (C.64a), flupyrsulfuron-methyl-sodium (C.64b), and mixtures thereof.

Exemplary agriculturally acceptable salts or esters of fluroxypyr (C.66) include fluroxypyr-butomethyl (C.66a), fluroxypyr-meptyl (C.66b), and mixtures thereof.

Exemplary agriculturally acceptable salts or esters of glufosinate (C.69) include glufosinate-ammonium (C.69a).

Exemplary agriculturally acceptable salts or esters of glufosinate-P (C.70) include glufosinate-P-ammonium (C.70a), glufosinate-P-sodium (C.70b), and mixtures thereof.

Exemplary agriculturally acceptable salts or esters of glyphosate (C.71) include glyphosate-ammonium (C.71a), glyphosate-diammonium (C.71b), glyphosate-dimethylammonium (C.71c), glyphosate-isopropylammonium (C.71d), glyphosate-potassium (C.71e), glyphosate-sodium (C.71f), glyphosate-sesquisodium (C.71g), glyphosate-trimesium (C.71h), glyphosate-ethanoleamine (C.71i), glyphosate-diethanoleamine (C.71j), and mixtures thereof.

Exemplary agriculturally acceptable salts or esters of halauxifen (C.72) include halauxifen-methyl (C.72a).

Exemplary agriculturally acceptable salts or esters of halosulfuron (C.73) include halosulfuron-methyl (C.73a).

Exemplary agriculturally acceptable salts or esters of haloxyfop-P (C.74) include haloxyfop-P-etotyl (C.74a), haloxyfop-P-methyl (C.74b), and mixtures thereof.

Exemplary agriculturally acceptable salts or esters of imazapic (C.77) include imazapic-ammonium (C.77a).

Exemplary agriculturally acceptable salts or esters of imazapyr (C.78) include imazapyr-isopropylammonium (C.78a).

Exemplary agriculturally acceptable salts or esters of imazaquin (C.79) include imazaquin-ammonium (C.79a), imazaquin-methyl (C.79b), imazaquin-sodium (C.79c), and mixtures thereof.

Exemplary agriculturally acceptable salts or esters of imazethapyr (C.80) include imazethapyr-ammonium (C.80a).

Exemplary agriculturally acceptable salts or esters of iodosulfuron (C.82) include iodosulfuron-methyl (C.82a), iodosulfuron-methyl-sodium (C.82b), and mixtures thereof.

Exemplary agriculturally acceptable salts or esters of iofensulfuron (C.83) include iofensulfuron-sodium (C.83a).

Exemplary agriculturally acceptable salts or esters of ioxynil (C.84) include ioxynil-lithium (C.84a), ioxynil octanoate (C.84b), ioxynil-sodium (C.84c), and mixtures thereof.

Exemplary agriculturally acceptable salts or esters of MCPA (C.90) include MCPA-butotyl (C.90a), MCPA-butyl (C.90b), MCPA-dimethylammonium (C.90c), MCPA-diolamine (C.90d), MCPA-ethyl (C.90e), MCPA-2-ethylhexyl (C.90f), MCPA-isobutyl (C.90g), MCPA-isooctyl (C.90h), MCPA-isopropyl (C.90i), MCPA-methyl (C.90j), MCPA-oleamine (C.90k), MCPA-potassium (C.90l), MCPA-sodium (C.90m), MCPA-trolamine (C.90n), and mixtures thereof.

Exemplary agriculturally acceptable salts or esters of MCPB (C.91) include MCPB-ethyl (C. 91a), MCPB-methyl (C.91b), MCPB-sodium (C.91c), and mixtures thereof.

Exemplary agriculturally acceptable salts or esters of mecoprop (C.92) include mecoprop-dimethylammonium (C.92a), mecoprop-diolamine (C.92b), mecoprop-ethadyl (C.92c), mecoprop-2-ethylhexyl (C.92d), mecoprop-isooctyl (C.92e), mecoprop-methyl (C.92f), mecoprop-potassium (C.92g), mecoprop-sodium (C.92h), mecoprop-trolamine (C.92i), and mixtures thereof.

Exemplary agriculturally acceptable salts or esters of mecoprop-P (C.93) include mecoprop-P-dimethylammonium (C.93a), mecoprop-P-2-ethylhexyl (C.93b), mecoprop-P-isobutyl (C.93c), mecoprop-P-potassium (C.93d), and mixtures thereof.

Exemplary agriculturally acceptable salts or esters of mesosulfuron (C.94) include mesosulfuron-methyl (C.94a).

Exemplary agriculturally acceptable salts or esters of metam (C.96) include metam-ammonium (C.96a), metam-potassium (C.96b), metam-sodium (C.96c), and mixtures thereof.

Exemplary agriculturally acceptable salts or esters of metsulfuron (C.104) include metsulfuron-methyl (C.104a).

Exemplary agriculturally acceptable salts or esters of phenmedipham (C.119) include phenmedipham-ethyl (C.119a).

Exemplary agriculturally acceptable salts or esters of picloram (C.120) include picloram-dimethylammonium (C.120a), picloram-2-ethylhexyl (C.120b), picloram-isooctyl (C.120c), picloram-methyl (C.120d), picloram-oleamine (C.120e), picloram-potassium (C.120f), picloram-triethylammonium (C.120g), picloram-tris(2-hydroxypropyl)ammonium (C.120h), picloram-trolamine (C.120i), and mixtures thereof.

Exemplary agriculturally acceptable salts or esters of propoxycarbazone (C.129) include propoxycarbazone-sodium (C.129a).

Exemplary agriculturally acceptable salts or esters of pyraflufen (C.133) include pyraflufen-ethyl (C.133a).

Exemplary agriculturally acceptable salts or esters of quizalofop (C.138) include quizalofop-ethyl (C.138a).

Exemplary agriculturally acceptable salts or esters of quizalofop-P (C.139) include quizalofop-P-ethyl (C.139a), quizalofop-P-tefuryl (C.139b), and mixtures thereof.

Exemplary agriculturally acceptable salts or esters of thiencarbazone (C.151) include thiencarbazone-methyl (C.151a).

Exemplary agriculturally acceptable salts or esters of thifensulfuron (C.152) include thifensulfuron-methyl (C.152a).

Exemplary agriculturally acceptable salts or esters of topramezone (C.154) include topramezone-sodium (C.154a).

Exemplary agriculturally acceptable salts or esters of tribenuron (C.158) include tribenuron-methyl (C.158a).

Exemplary agriculturally acceptable salts or esters of triclopyr (C.159) include triclopyr-butotyl (C.159a), triclopyr-ethyl (C.159b), triclopyr-triethylammonium (C.159c) and mixtures thereof.

Exemplary agriculturally acceptable salts or esters of trifloxysulfuron (C.160) include trifloxysulfuron-sodium (C.160a).

Exemplary agriculturally acceptable salts or esters of triflusulfuron (C.163) include triflusulfuron-methyl (C.163a).

Exemplary agriculturally acceptable salts or esters of cloquintocet (D.2) include cloquintocet-mexyl (D.2a).

Exemplary agriculturally acceptable salts or esters of fenchlorazole (D.8) include fenchlorazole-ethyl (D.8a).

Exemplary agriculturally acceptable salts or esters of isoxadifen (D.13) include isoxadifen-ethyl (D.13a).

Exemplary agriculturally acceptable salts or esters of mefenpyr (D.14) include mefenpyr-diethyl (D.14a).

In a particular embodiment of the invention, the composition comprises herbicide A (in particular (±)-2-exo-(2-Methylbenzyloxy)-1-methyl-4-isopropyl-7-oxabicyclo[2.2.1]heptane) and herbicide B (preferably quinclorac (B.1) or quinmerac (B.2), in particular quinmerac (B.2)) as the only active ingredients.

In another particular embodiment of the invention, the composition comprises, as the only active ingredients, herbicide A (in particular (±)-2-exo-(2-Methylbenzyloxy)-1-methyl-4-isopropyl-7-oxabicyclo[2.2.1]heptane), herbicide B (preferably quinclorac (B.1) or quinmerac (B.2), in particular quinmerac (B.2)) and at least one (preferably one to three, more preferably one or two and most preferably one) safener D selected from the safeners D.1 to D.21 and agriculturally acceptable salts, esters or amides thereof (preferably selected from the group consisting of benoxacor (D.1), cloquintocet (D.2), cyprosulfamide (D.4), dichlormid (D.5), dicyclonon (D.6), fenchlorazole (D.8), fenclorim (D.9), flurazole (D.10), furilazole (D.12), isoxadifen (D.13), mefenpyr (D.14), 4-(dichloroacetyl)-1-oxa-4-azaspiro[4.5]decane (MON4660, CAS 71526-07-3) (D.19), 2,2,5-trimethyl-3-(dichloroacetyl)-1,3-oxazolidine (R-29148, CAS 52836-31-4) (D.20), and agriculturally acceptable salts, esters or amides thereof, more preferably selected from the group consisting of benoxacor (D.1), cloquintocet-mexyl (D.2a), cyprosulfamide (D.4), dichlormid (D.5), dicyclonon (D.6), fenclorazole-ethyl (D.8a), fenclorim (D.9), flurazole (D.10), furilazole (D.12), isoxadifen-ethyl (D.13a), mefenpyr-diethyl (D.14a), 4-(dichloroacetyl)-1-oxa-4-azaspiro[4.5]decane (MON4660, CAS 71526-07-3) (D.19), and 2,2,5-trimethyl-3-(dichloroacetyl)-1,3-oxazolidine (R-29148, CAS 52836-31-4) (D.20), even more preferably selected from the group consisting of benoxacor (D.1), cloquintocet-mexyl (D.2a), cyprosulfamide (D.4), dichlormid (D.5), fenclorazole-ethyl (D.8a), fenclorim (D.9), isoxadifen-ethyl (D.13a) and mefenpyr-diethyl (D.14a), and in particular selected from the group consisting of benoxacor (D.1), cloquintocet-mexyl (D.2a), cyprosulfamide (D.4), isoxadifen-ethyl (D.13a), and mefenpyr-diethyl (D.14a)).

In another particular embodiment of the invention, the composition comprises, as the only active ingredients, herbicide A (in particular (±)-2-exo-(2-Methylbenzyloxy)-1-methyl-4-isopropyl-7-oxabicyclo[2.2.1]heptane), herbicide B (preferably quinclorac (B.1) or quinmerac (B.2), in particular quinmerac (B.2)) and at least one (preferably one to three, more preferably one or two and most preferably one) herbicide C selected from the group consisting of herbicides C.1 to C.166 and agriculturally acceptable salts, esters or amides thereof (preferably selected from the group consisting of acetochlor (C.1), aclonifen (C.2), aminopyralid (C.5), atrazine (C.8), azimsulfuron (C.9), beflubutamid (C.10), bensulfuron (C.12), bentazone (C.14), benzobicyclon (C.15), bicyclopyrone (C.16), bispyribac (C.18), bromoxynil (C.19), carbetamide (C.20), chloridazon (C.22), chlorotoluron (C.26), clethodim (C.27), clodinafop (C.28), clomazone (C.29), clopyralid (C.30), cyclosulfamuron (C.31), cycloxydim (C.32), cyclopyrimorate (C.33), cyhalofop (C.34), 2,4-D (C.35), dicamba (C.39), diclofop (C.42), diflufenican (C.43), diflufenzopyr (C.44), dimethachlor (C.45), dimethenamid (C.46), dimethenamid-P (C.47), dithiopyr (C.49), ethametsulfuron (C.51), ethofumesate (C.52), fenoxaprop (C.53), fenoxaprop-P (C.54), fenquinotrione (C.55), flazasulfuron (C.56), florasulam (C.57), fluazifop (C.58), fluazifop-P (C.59), flucarbazone (C.60), flufenacet (C.61), flumioxazin (C.62), flupyrsulfuron (C.64), fluorochloridone (C.65), fluroxypyr (C.66), flurtamone (C.67), foramsulfuron (C.68), glufosinate (C.69), glufosinate-P (C.70), glyphosate (C.71), halauxifen (C.72), halosulfuron (C.73), haloxyfop-P (C.74), indaziflam (C.75), imazamox (C.76), imazethapyr (C.80), iodosulfuron (C.82), isoproturon (C.85), isoxaben (C.86), isoxaflutole (C.87), mecoprop (C.92), mecoprop-P (C.93), mesosulfuron (C.94), mesotrione (C.95), metolachlore (C.100), S-metolachlore (C.101), metosulam (C.102), metribuzin (C.103), metsulfuron (C.104), napropamide (C.107), napropamide-M (C.108), nicosulfuron (C.109), oryzalin (C.111), oxadiargyl (C.112), oxadiazon (C.113), oxyfluorfen (C.115), pendimethalin (C.116), penoxsulam (C.117), pethoxamid (C.118), picloram (C.120), picolinafen (C.121), pinoxaden (C.122), pretilachlor (C.123), prodiamine (C.124), profoxydim (C.125), propanil (C.127), propaquizafop (C.128), propoxycarbazone (C.129), propyzamide (C.130), prosulfocarb (C.131), pyroxasulfone (C.135), pyroxsulam (C.136), quizalofop (C.138), quizalofop-P (C.139), rimsulfuron (C.140), saflufenacil (C.141), simazine (C.144), sulcotrione (C.145), sulfentrazone (C.146), sulfosulfuron (C.147), tembotrione (C.148), tepraloxydim (C.149), terbuthylazine (C.150), thiencarbazone (C.151), thifensulfuron (C.152), tolpyralate (C.153), topramezone (C.154), tralkoxydim (C.155), triallate (C.156), tribenuron (C.158), trifludimoxazin (C.161), trifluralin (C.162), tritosulfuron (C.164), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof, more preferably selected from the group consisting of aminopyralid (C.5), azimsulfuron (C.9), bensulfuron (C.12), bentazone (C.14), benzobicyclon (C.15), bispyribac (C.18), clethodim (C.27), clomazone (C.29), clopyralid (C.30), cyclosulfamuron (C.31), cycloxydim (C.32), cyhalofop (C.34), dimethachlor (C.45), dimethenamid (C.46), dimethenamid-P (C.47), ethametsulfuron (C.51), fenoxaprop-P (C.54), imazamox (C.76), napropamide (C.107), napropamide-M (C.108), oxadiazon (C.113), pendimethalin (C.116), penoxsulam (C.117), pethoxamid (C.118), picloram (C.120), pretilachlor (C.123), profoxydim (C.125), propanil (C.127), propaquizafop (C.128), propyzamide (C.130), quizalofop (C.138), quizalofop-P (C.139), saflufenacil (C.141), sulfentrazone (C.146), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof and in particular selected from the group consisting of aminopyralid (C.5), clethodim (C.27), clomazone (C.29), clopyralid (C.30), cycloxydim (C.32), dimethachlor (C.45), dimethenamid (C.46), dimethenamid-P (C.47), ethametsulfuron (C.51), imazamox (C.76), napropamide (C.107), napropamide-M (C.108), pendimethalin (C.116), pethoxamid (C.118), picloram (C.120), propaquizafop (C.128), propyzamide (C.130), quizalofop-P (C.139), and agriculturally acceptable salts, esters or amides thereof).

In another particular embodiment of the invention, the composition comprises, as the only active ingredients, herbicide A (in particular (±)-2-exo-(2-Methylbenzyloxy)-1-methyl-4-isopropyl-7-oxabicyclo[2.2.1]heptane), herbicide B (preferably quinclorac (B.1) or quinmerac (B.2), in particular quinmerac (B.2)), at least one (preferably one to three, more preferably one or two and most preferably one) herbicide C selected from the group consisting of herbicides C.1 to C.166 and agriculturally acceptable salts, esters or amides thereof (preferably selected from the group consisting of acetochlor (C.1), aclonifen (C.2), aminopyralid (C.5), atrazine (C.8), azimsulfuron (C.9), beflubutamid (C.10), bensulfuron (C.12), bentazone (C.14), benzobicyclon (C.15), bicyclopyrone (C.16), bispyribac (C.18), bromoxynil (C.19), carbetamide (C.20), chloridazon (C.22), chlorotoluron (C.26), clethodim (C.27), clodinafop (C.28), clomazone (C.29), clopyralid (C.30), cyclosulfamuron (C.31), cycloxydim (C.32), cyclopyrimorate (C.33), cyhalofop (C.34), 2,4-D (C.35), dicamba (C.39), diclofop (C.42), diflufenican (C.43), diflufenzopyr (C.44), dimethachlor (C.45), dimethenamid (C.46), dimethenamid-P (C.47), dithiopyr (C.49), ethametsulfuron (C.51), ethofumesate (C.52), fenoxaprop (C.53), fenoxaprop-P (C.54), fenquinotrione (C.55), flazasulfuron (C.56), florasulam (C.57), fluazifop (C.58), fluazifop-P (C.59), flucarbazone (C.60), flufenacet (C.61), flumioxazin (C.62), flupyrsulfuron (C.64), fluorochloridone (C.65), fluroxypyr (C.66), flurtamone (C.67), foramsulfuron (C.68), glufosinate (C.69), glufosinate-P (C.70), glyphosate (C.71), halauxifen (C.72), halosulfuron (C.73), haloxyfop-P (C.74), indaziflam (C.75), imazamox (C.76), imazethapyr (C.80), iodosulfuron (C.82), isoproturon (C.85), isoxaben (C.86), isoxaflutole (C.87), mecoprop (C.92), mecoprop-P (C.93), mesosulfuron (C.94), mesotrione (C.95), metolachlore (C.100), S-metolachlor (C.101), metosulam (C.102), metribuzin (C.103), metsulfuron (C.104), napropamide (C.107), napropamide-M (C.108), nicosulfuron (C.109), oryzalin (C.111), oxadiargyl (C.112), oxadiazon (C.113), oxyfluorfen (C.115), pendimethalin (C.116), penoxsulam (C.117), pethoxamid (C.118), picloram (C.120), picolinafen (C.121), pinoxaden (C.122), pretilachlor (C.123), prodiamine (C.124), profoxydim (C.125), propanil (C.127), propaquizafop (C.128), propoxycarbazone (C.129), propyzamide (C.130), prosulfocarb (C.131), pyroxasulfone (C.135), pyroxsulam (C.136), quizalofop (C.138), quizalofop-P (C.139), rimsulfuron (C.140), saflufenacil (C.141), simazine (C.144), sulcotrione (C.145), sulfentrazone (C.146), sulfosulfuron (C.147), tembotrione (C.148), tepraloxydim (C.149), terbuthylazine (C.150), thiencarbazone (C.151), thifensulfuron (C.152), tolpyralate (C.153), topramezone (C.154), tralkoxydim (C.155), triallate (C.156), tribenuron (C.158), trifludimoxazin (C.161), trifluralin (C.162), tritosulfuron (C.164), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof, more preferably selected from the group consisting of aminopyralid (C.5), azimsulfuron (C.9), bensulfuron (C.12), bentazone (C.14), benzobicyclon (C.15), bispyribac (C.18), clethodim (C.27), clomazone (C.29), clopyralid (C.30), cyclosulfamuron (C.31), cycloxydim (C.32), cyhalofop (C.34), dimethachlor (C.45), dimethenamid (C.46), dimethenamid-P (C.47), ethametsulfuron (C.51), fenoxaprop-P (C.54), imazamox (C.76), napropamide (C.107), napropamide-M (C.108), oxadiazon (C.113), pendimethalin (C.116), penoxsulam (C.117), pethoxamid (C.118), picloram (C.120), pretilachlor (C.123), profoxydim (C.125), propanil (C.127), propaquizafop (C.128), propyzamide (C.130), quizalofop (C.138), quizalofop-P (C.139), saflufenacil (C.141), sulfentrazone (C.146), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof and in particular selected from the group consisting of aminopyralid (C.5), clethodim (C.27), clomazone (C.29), clopyralid (C.30), cycloxydim (C.32), dimethachlor (C.45), dimethenamid (C.46), dimethenamid-P (C.47), ethametsulfuron (C.51), imazamox (C.76), napropamide (C.107), napropamide-M (C.108), pendimethalin (C.116), pethoxamid (C.118), picloram (C.120), propaquizafop (C.128), propyzamide (C.130), quizalofop-P (C.139), and agriculturally acceptable salts, esters or amides thereof), and at least one (preferably one to three, more preferably one or two and most preferably one) safener D selected from the safeners D.1 to D.21 and agriculturally acceptable salts, esters or amides thereof (preferably selected from the group consisting of benoxacor (D.1), cloquintocet (D.2), cyprosulfamide (D.4), dichlormid (D.5), dicyclonon (D.6), fenchlorazole (D.8), fenclorim (D.9), flurazole (D.10), furilazole (D.12), isoxadifen (D.13), mefenpyr (D.14), 4-(dichloroacetyl)-1-oxa-4-azaspiro[4.5]decane (MON4660, CAS 71526-07-3) (D.19), 2,2,5-trimethyl-3-(dichloroacetyl)-1,3-oxazolidine (R-29148, CAS 52836-31-4) (D.20), and agriculturally acceptable salts, esters or amides thereof, more preferably selected from the group consisting of benoxacor (D.1), cloquintocet-mexyl (D.2a), cyprosulfamide (D.4), dichlormid (D.5), dicyclonon (D.6), fenchlorazole-ethyl (D.8a), fenclorim (D.9), flurazole (D.10), furilazole (D.12), isoxadifen-ethyl (D.13a), mefenpyr-diethyl (D.14a), 4-(dichloroacetyl)-1-oxa-4-azaspiro[4.5]decane (MON4660, CAS 71526-07-3) (D.19), and 2,2,5-trimethyl-3-(dichloroacetyl)-1,3-oxazolidine (R-29148, CAS 52836-31-4) (D.20), even more preferably selected from the group consisting of benoxacor (D.1), cloquintocet-mexyl (D.2a), cyprosulfamide (D.4), dichlormid (D.5), fenchlorazole-ethyl (D.8a), fenclorim (D.9), isoxadifen-ethyl (D.13a) and mefenpyr-diethyl (D.14a), and in particular selected from the group consisting of benoxacor (D.1), cloquintocet-mexyl (D.2a), cyprosulfamide (D.4), isoxadifen-ethyl (D.13a), and mefenpyr-diethyl (D.14a)).

Of particular interest are also herbicidal compositions according to the invention comprising the following combinations of three active ingredients (herbicide A+ herbicide B+ herbicide C):
A+B.1(or B.2)+C.1, A+B.1(or B.2)+C.2, A+B.1(or B.2)+C.3, A+B.1(or B.2)+C.4, A+B.1(or B.2)+C.5, A+B.1(or B.2)+C.5a, A+B.1(or B.2)+C.5b, A+B.1(or B.2)+C.5c, A+B.1(or B.2)+C.6, A+B.1(or B.2)+C.7, A+B.1(or B.2)+C.7a, A+B.1(or B.2)+C.7b, A+B.1(or B.2)+C.8, A+B.1(or B.2)+C.9, A+B.1(or B.2)+C.10, A+B.1(or B.2)+C.11, A+B.1(or B.2)+C.12, A+B.1(or B.2)+C.12a, A+B.1(or B.2)+C.13, A+B.1(or B.2)+C.14, A+B.1(or B.2)+C.14a, A+B.1(or B.2)+C.15, A+B.1(or B.2)+C.16, A+B.1(or B.2)+C.17, A+B.1(or B.2)+C.18, A+B.1(or B.2)+C.18a, A+B.1(or B.2)+C.19, A+B.1(or B.2)+C.19a, A+B.1(or B.2)+C.19b, A+B.1(or B.2)+C.19c, A+B.1(or B.2)+C.19d, A+B.1(or B.2)+C.20, A+B.1(or B.2)+C.21, A+B.1(or B.2)+C.21a, A+B.1(or B.2)+C.22, A+B.1(or B.2)+C.23, A+B.1(or B.2)+C.24, A+B.1(or B.2)+C.25, A+B.1(or B.2)+C.25a, A+B.1(or B.2)+C.25b, A+B.1(or B.2)+C.26, A+B.1(or B.2)+C.27, A+B.1(or B.2)+C.28, A+B.1(or B.2)+C.28a, A+B.1(or B.2)+C.29, A+B.1(or B.2)+C.30, A+B.1(or B.2)+C.30a, A+B.1(or B.2)+C.30b, A+B.1(or B.2)+C.30c, A+B.1(or B.2)+C.30d, A+B.1(or B.2)+C.30e, A+B.1(or B.2)+C.30f, A+B.1(or B.2)+C.30g, A+B.1(or B.2)+C.31, A+B.1(or B.2)+C.32, A+B.1(or B.2)+C.33, A+B.1(or B.2)+C.34, A+B.1(or B.2)+C.34a, A+B.1(or B.2)+C.35, A+B.1(or B.2)+C.35a, A+B.1(or B.2)+C.35b, A+B.1(or B.2)+C.35c, A+B.1(or B.2)+C.35d, A+B.1(or B.2)+C.35e, A+B.1(or B.2)+C.35f, A+B.1(or B.2)+C.35g, A+B.1(or B.2)+C.35h, A+B.1(or B.2)+C.35i, A+B.1(or B.2)+C.35j, A+B.1(or B.2)+C.35k, A+B.1(or B.2)+C.35i, A+B.1(or B.2)+C.35m, A+B.1(or B.2)+C.35n, A+B.1(or B.2)+C.35o, A+B.1(or B.2)+C.35p, A+B.1(or B.2)+C.35q, A+B.1(or B.2)+C.35r, A+B.1(or B.2)+C.35s, A+B.1(or B.2)+C.35t, A+B.1(or B.2)+C.35u, A+B.1(or B.2)+C.35v, A+B.1(or B.2)+C.35w, A+B.1(or B.2)+C.35x, A+B.1(or B.2)+C.35y, A+B.1(or B.2)+C.35z, A+B.1(or B.2)+C.35zx, A+B.1(or B.2)+C.35zy, A+B.1(or B.2)+C.36, A+B.1(or B.2)+C.36a, A+B.1(or B.2)+C.37, A+B.1(or B.2)+C.37a, A+B.1(or B.2)+C.37b, A+B.1(or B.2)+C.37c, A+B.1(or B.2)+C.37d, A+B.1(or B.2)+C.37e, A+B.1(or B.2)+C.38, A+B.1(or B.2)+C.39, A+B.1(or B.2)+C.39a, A+B.1(or B.2)+C.39b, A+B.1(or B.2)+C.39c, A+B.1(or B.2)+C.39d, A+B.1(or B.2)+C.39e, A+B.1(or B.2)+C.39f, A+B.1(or B.2)+C.39g, A+B.1(or B.2)+C.39h, A+B.1(or B.2)+C.39i, A+B.1(or B.2)+C.39j, A+B.1(or B.2)+C.39k, A+B.1(or B.2)+C.39l, A+B.1(or B.2)+C.39m, A+B.1(or B.2)+C.40, A+B.1(or B.2)+C.40a, A+B.1(or B.2)+C.40b, A+B.1(or B.2)+C.40c, A+B.1(or B.2)+C.40d, A+B.1(or B.2)+C.40e, A+B.1(or B.2)+C.40f, A+B.1(or B.2)+C.40g, A+B.1(or B.2)+C.40h, A+B.1(or B.2)+C.41, A+B.1(or B.2)+C.41a, A+B.1(or B.2)+C.41b, A+B.1(or B.2)+C.41c, A+B.1(or B.2)+C.41d, A+B.1(or B.2)+C.42, A+B.1(or B.2)+C.42a, A+B.1(or B.2)+C.43, A+B.1(or B.2)+C.44, A+B.1(or B.2)+C.44a, A+B.1(or B.2)+C.45, A+B.1(or B.2)+C.46, A+B.1(or B.2)+C.47, A+B.1(or B.2)+C.48, A+B.1(or B.2)+C.48a, A+B.1(or B.2)+C.49, A+B.1(or B.2)+C.50, A+B.1(or B.2)+C.51, A+B.1(or B.2)+C.51a, A+B.1(or B.2)+C.52, A+B.1(or B.2)+C.53, A+B.1(or B.2)+C.53a, A+B.1(or B.2)+C.54, A+B.1(or B.2)+C.54a, A+B.1(or B.2)+C.55, A+B.1(or B.2)+C.56, A+B.1(or B.2)+C.57, A+B.1(or B.2)+C.58, A+B.1(or B.2)+C.58a, A+B.1(or B.2)+C.58b, A+B.1(or B.2)+C.59, A+B.1(or B.2)+C.59a, A+B.1(or B.2)+C.60, A+B.1(or B.2)+C.60a, A+B.1(or B.2)+C.61, A+B.1(or B.2)+C.62, A+B.1(or B.2)+C.63, A+B.1(or B.2)+C.64, A+B.1(or B.2)+C.64a, A+B.1(or B.2)+C.64b, A+B.1(or B.2)+C.65, A+B.1(or B.2)+C.66, A+B.1(or B.2)+C.66a, A+B.1(or B.2)+C.66b, A+B.1(or B.2)+C.67, A+B.1(or B.2)+C.68, A+B.1(or B.2)+C.69, A+B.1(or B.2)+C.69a, A+B.1(or B.2)+C.70, A+B.1(or B.2)+C.70a, A+B.1(or B.2)+C.70b, A+B.1(or B.2)+C.71, A+B.1(or B.2)+C.71a, A+B.1(or B.2)+C.71b, A+B.1(or B.2)+C.71c, A+B.1(or B.2)+C.71d, A+B.1(or B.2)+C.71e, A+B.1(or B.2)+C.71f, A+B.1(or B.2)+C.71g, A+B.1(or B.2)+C.71h, A+B.1(or B.2)+C.71i, A+B.1(or B.2)+C.71j, A+B.1(or B.2)+C.72, A+B.1(or B.2)+C.72a, A+B.1(or B.2)+C.73, A+B.1(or B.2)+C.73a, A+B.1(or B.2)+C.74, A+B.1(or B.2)+C.74a, A+B.1(or B.2)+C.74b, A+B.1(or B.2)+C.75, A+B.1(or B.2)+C.76, A+B.1(or B.2)+C.77, A+B.1(or B.2)+C.77a, A+B.1(or B.2)+C.78, A+B.1(or B.2)+C.78a, A+B.1(or B.2)+C.79, A+B.1(or B.2)+C.79a, A+B.1(or B.2)+C.79b, A+B.1(or B.2)+C.79c, A+B.1(or B.2)+C.80, A+B.1(or B.2)+C.80a, A+B.1(or B.2)+C.81, A+B.1(or B.2)+C.82, A+B.1(or B.2)+C.82a, A+B.1(or B.2)+C.82b, A+B.1(or B.2)+C.83, A+B.1(or B.2)+C.83a, A+B.1(or B.2)+C.84, A+B.1(or B.2)+C.84a, A+B.1(or B.2)+C.84b, A+B.1(or B.2)+C.84c, A+B.1(or B.2)+C.85, A+B.1(or B.2)+C.86, A+B.1(or B.2)+C.87, A+B.1(or B.2)+C.88, A+B.1(or B.2)+C.89, A+B.1(or B.2)+C.90, A+B.1(or B.2)+C.90a, A+B.1(or B.2)+C.90b, A+B.1(or B.2)+C.90c, A+B.1(or B.2)+C.90d, A+B.1(or B.2)+C.90e, A+B.1(or B.2)+C.90f, A+B.1(or B.2)+C.90g, A+B.1(or B.2)+C.90h, A+B.1(or B.2)+C.90i, A+B.1(or B.2)+C.90j, A+B.1(or B.2)+C.90k, A+B.1(or B.2)+C.90l, A+B.1(or B.2)+C.90m, A+B.1(or B.2)+C.90n, A+B.1(or B.2)+C.91, A+B.1(or B.2)+C.91a, A+B.1(or B.2)+C.91b, A+B.1(or B.2)+C.91c, A+B.1(or B.2)+C.92, A+B.1(or B.2)+C.92a, A+B.1(or B.2)+C.92b, A+B.1(or B.2)+C.92c, A+B.1(or B.2)+C.92d, A+B.1(or B.2)+C.92e, A+B.1(or B.2)+C.92f, A+B.1(or B.2)+C.92g, A+B.1(or B.2)+C.92h, A+B.1(or B.2)+C.92i, A+B.1(or B.2)+C.93, A+B.1(or B.2)+C.93a, A+B.1(or B.2)+C.93b, A+B.1(or B.2)+C.93c, A+B.1(or B.2)+C.93d, A+B.1(or B.2)+C.94, A+B.1(or B.2)+C.94a, A+B.1(or B.2)+C.95, A+B.1(or B.2)+C.96, A+B.1(or B.2)+C.96a, A+B.1(or B.2)+C.96b, A+B.1(or B.2)+C.96c, A+B.1(or B.2)+C.97, A+B.1(or B.2)+C.98, A+B.1(or B.2)+C.99, A+B.1(or B.2)+C.100, A+B.1(or B.2)+C.101, A+B.1(or B.2)+C.102, A+B.1(or B.2)+C.103, A+B.1(or B.2)+C.104, A+B.1(or B.2)+C.104a, A+B.1(or B.2)+C.105, A+B.1(or B.2)+C.106, A+B.1(or B.2)+C.107, A+B.1(or B.2)+C.108, A+B.1(or B.2)+C.109, A+B.1(or B.2)+C.110, A+B.1(or B.2)+C.111, A+B.1(or B.2)+C.112, A+B.1(or B.2)+C.113, A+B.1(or B.2)+C.114, A+B.1(or B.2)+C.115, A+B.1(or B.2)+C.116, A+B.1(or B.2)+C.117, A+B.1(or B.2)+C.118, A+B.1(or B.2)+C.119, A+B.1(or B.2)+C.119a, A+B.1(or B.2)+C.120, A+B.1(or B.2)+C.120a, A+B.1(or B.2)+C.120b, A+B.1(or B.2)+C.120c, A+B.1(or B.2)+C.120d, A+B.1(or B.2)+C.120e, A+B.1(or B.2)+C.120f, A+B.1(or B.2)+C.120g, A+B.1(or B.2)+C.120h, A+B.1(or B.2)+C.120i, A+B.1(or B.2)+C.121, A+B.1(or B.2)+C.122, A+B.1(or B.2)+C.123, A+B.1(or B.2)+C.124, A+B.1(or B.2)+C.125, A+B.1(or B.2)+C.126, A+B.1(or B.2)+C.127, A+B.1(or B.2)+C.128, A+B.1(or B.2)+C.129, A+B.1(or B.2)+C.129a, A+B.1(or B.2)+C.130, A+B.1(or B.2)+C.131, A+B.1(or B.2)+C.132, A+B.1(or B.2)+C.133, A+B.1(or B.2)+C.133a, A+B.1(or B.2)+C.134, A+B.1(or B.2)+C.135, A+B.1(or B.2)+C.136, A+B.1(or B.2)+C.137, A+B.1(or B.2)+C.138, A+B.1(or B.2)+C.138a, A+B.1(or B.2)+C.139, A+B.1(or B.2)+C.139a, A+B.1(or B.2)+C.139b, A+B.1(or B.2)+C.140, A+B.1(or B.2)+C.141, A+B.1(or B.2)+C.142, A+B.1(or B.2)+C.143, A+B.1(or B.2)+C.144, A+B.1(or B.2)+C.145, A+B.1(or B.2)+C.146, A+B.1(or B.2)+C.147, A+B.1(or B.2)+C.148, A+B.1(or B.2)+C.149, A+B.1(or B.2)+C.150, A+B.1(or B.2)+C.151, A+B.1(or B.2)+C.151a, A+B.1(or B.2)+C.152, A+B.1(or B.2)+C.152a, A+B.1(or B.2)+C.153, A+B.1(or B.2)+C.154, A+B.1(or B.2)+C.154a, A+B.1(or B.2)+C.155, A+B.1(or B.2)+C.156, A+B.1(or B.2)+C.157, A+B.1(or B.2)+C.158, A+B.1(or B.2)+C.158a, A+B.1(or B.2)+C.159, A+B.1(or B.2)+C.159a, A+B.1(or B.2)+C.159b, A+B.1(or B.2)+C.159c, A+B.1(or B.2)+C.160, A+B.1(or B.2)+C.160a, A+B.1(or B.2)+C.161, A+B.1(or B.2)+C.162, A+B.1(or B.2)+C.163, A+B.1(or B.2)+C.163a, A+B.1(or B.2)+C.164, A+B.1(or B.2)+C.165, A+B.1(or B.2)+C.166, Of particular interest are also herbicidal compositions according to the invention comprising the following combinations of three active ingredients (herbicide A+ herbicide B+ safener D):

A+B.1(or B.2)+D.1, A+B.1(or B.2)+D.2, A+B.1(or B.2)+D.2a, A+B.1(or B.2)+D.3, A+B.1(or B.2)+D.4, A+B.1(or B.2)+D.5, A+B.1(or B.2)+D.6, A+B.1(or B.2)+D.7, A+B.1(or B.2)+D.8, A+B.1(or B.2)+D.8a, A+B.1(or B.2)+D.9, A+B.1(or B.2)+D.10, A+B.1(or B.2)+D.11, A+B.1(or B.2)+D.12, A+B.1(or B.2)+D.13, A+B.1(or B.2)+D.13a, A+B.1(or B.2)+D.14, A+B.1(or B.2)+D.14a, A+B.1(or B.2)+D.15, A+B.1(or B.2)+D.16, A+B.1(or B.2)+D.17, A+B.1(or B.2)+D.18, A+B.1(or B.2)+D.19, A+B.1(or B.2)+D.20, A+B.1(or B.2)+D.21,

Of particular interest are also herbicidal compositions according to the invention comprising the following combinations of four active ingredients (herbicide A+ herbicide B+ herbicide C+ safener D):

A+B.1(or B.2)+C.1+D.1, A+B.1(or B.2)+C.2+D.1, A+B.1(or B.2)+C.3+D.1, A+B.1(or B.2)+C.4+D.1, A+B.1(or B.2)+C.5+D.1, A+B.1(or B.2)+C.5a+D.1, A+B.1(or B.2)+C.5b+D.1, A+B.1(or B.2)+C.5c+D.1, A+B.1(or B.2)+C.6+

D.1, A+B.1(or B.2)+C.7+D.1, A+B.1(or B.2)+C.7a+D.1, A+B.1(or B.2)+C.7b+D.1, A+B.1(or B.2)+C.8+D.1, A+B.1(or B.2)+C.9+D.1, A+B.1(or B.2)+C.10+D.1, A+B.1(or B.2)+C.11+D.1, A+B.1(or B.2)+C.12+D.1, A+B.1(or B.2)+C.12a+D.1, A+B.1(or B.2)+C.13+D.1, A+B.1(or B.2)+C.14+D.1, A+B.1(or B.2)+C.14a+D.1, A+B.1(or B.2)+C.15+D.1, A+B.1(or B.2)+C.16+D.1, A+B.1(or B.2)+C.17+D.1, A+B.1(or B.2)+C.18+D.1, A+B.1(or B.2)+C.18a+D.1, A+B.1(or B.2)+C.19+D.1, A+B.1(or B.2)+C.19a+D.1, A+B.1(or B.2)+C.19b+D.1, A+B.1(or B.2)+C.19c+D.1, A+B.1(or B.2)+C.19d+D.1, A+B.1(or B.2)+C.20+D.1, A+B.1(or B.2)+C.21+D.1, A+B.1(or B.2)+C.21a+D.1, A+B.1(or B.2)+C.22+D.1, A+B.1(or B.2)+C.23+D.1, A+B.1(or B.2)+C.24+D.1, A+B.1(or B.2)+C.25+D.1, A+B.1(or B.2)+C.25a+D.1, A+B.1(or B.2)+C.25b+D.1, A+B.1(or B.2)+C.26+D.1, A+B.1(or B.2)+C.27+D.1, A+B.1(or B.2)+C.28+D.1, A+B.1(or B.2)+C.28a+D.1, A+B.1(or B.2)+C.29+D.1, A+B.1(or B.2)+C.30+D.1, A+B.1(or B.2)+C.30a+D.1, A+B.1(or B.2)+C.30b+D.1, A+B.1(or B.2)+C.30c+D.1, A+B.1(or B.2)+C.30d+D.1, A+B.1(or B.2)+C.30e+D.1, A+B.1(or B.2)+C.30f+D.1, A+B.1(or B.2)+C.30g+D.1, A+B.1(or B.2)+C.31+D.1, A+B.1(or B.2)+C.32+D.1, A+B.1(or B.2)+C.33+D.1, A+B.1(or B.2)+C.34+D.1, A+B.1(or B.2)+C.34a+D.1, A+B.1(or B.2)+C.35+D.1, A+B.1(or B.2)+C.35a+D.1, A+B.1(or B.2)+C.35b+D.1, A+B.1(or B.2)+C.35c+D.1, A+B.1(or B.2)+C.35d+D.1, A+B.1(or B.2)+C.35e+D.1, A+B.1(or B.2)+C.35f+D.1, A+B.1(or B.2)+C.35g+D.1, A+B.1(or B.2)+C.35h+D.1, A+B.1(or B.2)+C.35i+D.1, A+B.1(or B.2)+C.35j+D.1, A+B.1(or B.2)+C.35k+D.1, A+B.1(or B.2)+C.35l+D.1, A+B.1(or B.2)+C.35m+D.1, A+B.1(or B.2)+C.35n+D.1, A+B.1(or B.2)+C.35o+D.1, A+B.1(or B.2)+C.35p+D.1, A+B.1(or B.2)+C.35q+D.1, A+B.1(or B.2)+C.35r+D.1, A+B.1(or B.2)+C.35s+D.1, A+B.1(or B.2)+C.35t+D.1, A+B.1(or B.2)+C.35u+D.1, A+B.1(or B.2)+C.35v+D.1, A+B.1(or B.2)+C.35w+D.1, A+B.1(or B.2)+C.35x+D.1, A+B.1(or B.2)+C.35y+D.1, A+B.1(or B.2)+C.35z+D.1, A+B.1(or B.2)+C.35zx+D.1, A+B.1(or B.2)+C.35zy+D.1, A+B.1(or B.2)+C.36+D.1, A+B.1(or B.2)+C.36a+D.1, A+B.1(or B.2)+C.37+D.1, A+B.1(or B.2)+C.37a+D.1, A+B.1(or B.2)+C.37b+D.1, A+B.1(or B.2)+C.37c+D.1, A+B.1(or B.2)+C.37d+D.1, A+B.1(or B.2)+C.37e+D.1, A+B.1(or B.2)+C.38+D.1, A+B.1(or B.2)+C.39+D.1, A+B.1(or B.2)+C.39a+D.1, A+B.1(or B.2)+C.39b+D.1, A+B.1(or B.2)+C.39c+D.1, A+B.1(or B.2)+C.39d+D.1, A+B.1(or B.2)+C.39e+D.1, A+B.1(or B.2)+C.39f+D.1, A+B.1(or B.2)+C.39g+D.1, A+B.1(or B.2)+C.39h+D.1, A+B.1(or B.2)+C.39i+D.1, A+B.1(or B.2)+C.39j+D.1, A+B.1(or B.2)+C.39k+D.1, A+B.1(or B.2)+C.39l+D.1, A+B.1(or B.2)+C.39m+D.1, A+B.1(or B.2)+C.40+D.1, A+B.1(or B.2)+C.40a+D.1, A+B.1(or B.2)+C.40b+D.1, A+B.1(or B.2)+C.40c+D.1, A+B.1(or B.2)+C.40d+D.1, A+B.1(or B.2)+C.40e+D.1, A+B.1(or B.2)+C.40f+D.1, A+B.1(or B.2)+C.40g+D.1, A+B.1(or B.2)+C.40h+D.1, A+B.1(or B.2)+C.41+D.1, A+B.1(or B.2)+C.41a+D.1, A+B.1(or B.2)+C.41b+D.1, A+B.1(or B.2)+C.41c+D.1, A+B.1(or B.2)+C.41d+D.1, A+B.1(or B.2)+C.42+D.1, A+B.1(or B.2)+C.42a+D.1, A+B.1(or B.2)+C.43+D.1, A+B.1(or B.2)+C.44+D.1, A+B.1(or B.2)+C.44a+D.1, A+B.1(or B.2)+C.45+D.1, A+B.1(or B.2)+C.46+D.1, A+B.1(or B.2)+C.47+D.1, A+B.1(or B.2)+C.48+D.1, A+B.1(or B.2)+C.48a+D.1, A+B.1(or B.2)+C.49+D.1, A+B.1(or B.2)+C.50+D.1, A+B.1(or B.2)+C.51+D.1, A+B.1(or B.2)+C.51a+D.1, A+B.1(or B.2)+C.52+D.1, A+B.1(or B.2)+C.53+D.1, A+B.1(or B.2)+C.53a+D.1, A+B.1(or B.2)+C.54+D.1, A+B.1(or B.2)+C.54a+D.1, A+B.1(or B.2)+C.55+D.1, A+B.1(or B.2)+C.56+D.1, A+B.1(or B.2)+C.57+D.1, A+B.1(or B.2)+C.58+D.1, A+B.1(or B.2)+C.58a+D.1, A+B.1(or B.2)+C.58b+D.1, A+B.1(or B.2)+C.59+D.1, A+B.1(or B.2)+C.59a+D.1, A+B.1(or B.2)+C.60+D.1, A+B.1(or B.2)+C.60a+D.1, A+B.1(or B.2)+C.61+D.1, A+B.1(or B.2)+C.62+D.1, A+B.1(or B.2)+C.63+D.1, A+B.1(or B.2)+C.64+D.1, A+B.1(or B.2)+C.64a+D.1, A+B.1(or B.2)+C.64b+D.1, A+B.1(or B.2)+C.65+D.1, A+B.1(or B.2)+C.66+D.1, A+B.1(or B.2)+C.66a+D.1, A+B.1(or B.2)+C.66b+D.1, A+B.1(or B.2)+C.67+D.1, A+B.1(or B.2)+C.68+D.1, A+B.1(or B.2)+C.69+D.1, A+B.1(or B.2)+C.69a+D.1, A+B.1(or B.2)+C.70+D.1, A+B.1(or B.2)+C.70a+D.1, A+B.1(or B.2)+C.70b+D.1, A+B.1(or B.2)+C.71+D.1, A+B.1(or B.2)+C.71a+D.1, A+B.1(or B.2)+C.71b+D.1, A+B.1(or B.2)+C.71c+D.1, A+B.1(or B.2)+C.71d+D.1, A+B.1(or B.2)+C.71e+D.1, A+B.1(or B.2)+C.71f+D.1, A+B.1(or B.2)+C.71g+D.1, A+B.1(or B.2)+C.71h+D.1, A+B.1(or B.2)+C.71i+D.1, A+B.1(or B.2)+C.71j+D.1, A+B.1(or B.2)+C.72+D.1, A+B.1(or B.2)+C.72a+D.1, A+B.1(or B.2)+C.73+D.1, A+B.1(or B.2)+C.73a+D.1, A+B.1(or B.2)+C.74+D.1, A+B.1(or B.2)+C.74a+D.1, A+B.1(or B.2)+C.74b+D.1, A+B.1(or B.2)+C.75+D.1, A+B.1(or B.2)+C.76+D.1, A+B.1(or B.2)+C.77+D.1, A+B.1(or B.2)+C.77a+D.1, A+B.1(or B.2)+C.78+D.1, A+B.1(or B.2)+C.78a+D.1, A+B.1(or B.2)+C.79+D.1, A+B.1(or B.2)+C.79a+D.1, A+B.1(or B.2)+C.79b+D.1, A+B.1(or B.2)+C.79c+D.1, A+B.1(or B.2)+C.80+D.1, A+B.1(or B.2)+C.80a+D.1, A+B.1(or B.2)+C.81+D.1, A+B.1(or B.2)+C.82+D.1, A+B.1(or B.2)+C.82a+D.1, A+B.1(or B.2)+C.82b+D.1, A+B.1(or B.2)+C.83+D.1, A+B.1(or B.2)+C.83a+D.1, A+B.1(or B.2)+C.84+D.1, A+B.1(or B.2)+C.84a+D.1, A+B.1(or B.2)+C.84b+D.1, A+B.1(or B.2)+C.84c+D.1, A+B.1(or B.2)+C.85+D.1, A+B.1(or B.2)+C.86+D.1, A+B.1(or B.2)+C.87+D.1, A+B.1(or B.2)+C.88+D.1, A+B.1(or B.2)+C.89+D.1, A+B.1(or B.2)+C.90+D.1, A+B.1(or B.2)+C.90a+D.1, A+B.1(or B.2)+C.90b+D.1, A+B.1(or B.2)+C.90c+D.1, A+B.1(or B.2)+C.90d+D.1, A+B.1(or B.2)+C.90e+D.1, A+B.1(or B.2)+C.90f+D.1, A+B.1(or B.2)+C.90g+D.1, A+B.1(or B.2)+C.90h+D.1, A+B.1(or B.2)+C.90i+D.1, A+B.1(or B.2)+C.90j+D.1, A+B.1(or B.2)+C.90k+D.1, A+B.1(or B.2)+C.90l+D.1, A+B.1(or B.2)+C.90m+D.1, A+B.1(or B.2)+C.90n+D.1, A+B.1(or B.2)+C.91+D.1, A+B.1(or B.2)+C.91a+D.1, A+B.1(or B.2)+C.91b+D.1, A+B.1(or B.2)+C.91c+D.1, A+B.1(or B.2)+C.92+D.1, A+B.1(or B.2)+C.92a+D.1, A+B.1(or B.2)+C.92b+D.1, A+B.1(or B.2)+C.92c+D.1, A+B.1(or B.2)+C.92d+D.1, A+B.1(or B.2)+C.92e+D.1, A+B.1(or B.2)+C.92f+D.1, A+B.1(or B.2)+C.92g+D.1, A+B.1(or B.2)+C.92h+D.1, A+B.1(or B.2)+C.92i+D.1, A+B.1(or B.2)+C.93+D.1, A+B.1(or B.2)+C.93a+D.1, A+B.1(or B.2)+C.93b+D.1, A+B.1(or B.2)+C.93c+D.1, A+B.1(or B.2)+C.93d+D.1, A+B.1(or B.2)+C.94+D.1, A+B.1(or B.2)+C.94a+D.1, A+B.1(or B.2)+C.95+D.1, A+B.1(or B.2)+C.96+D.1, A+B.1(or B.2)+C.96a+D.1, A+B.1(or B.2)+C.96b+D.1, A+B.1(or B.2)+C.96c+D.1, A+B.1(or B.2)+C.97+D.1, A+B.1(or B.2)+C.98+D.1, A+B.1(or B.2)+C.99+D.1, A+B.1(or B.2)+C.100+D.1, A+B.1(or B.2)+C.101+D.1, A+B.1(or B.2)+C.102+D.1, A+B.1(or B.2)+C.103+D.1, A+B.1(or B.2)+C.104+D.1, A+B.1(or B.2)+C.104a+D.1, A+B.1(or B.2)+C.105+D.1, A+B.1(or B.2)+C.106+D.1, A+B.1(or B.2)+C.107+D.1, A+B.1(or B.2)+C.108+D.1, A+B.1(or B.2)+C.109+D.1, A+B.1(or B.2)+C.110+D.1, A+B.1(or B.2)+C.111+D.1, A+B.1(or B.2)+C.112+D.1, A+B.1(or B.2)+C.113+D.1, A+B.1(or B.2)+C.114+D.1, A+B.1(or B.2)+C.115+D.1, A+B.1(or B.2)+C.116+D.1, A+B.1(or B.2)+C.117+D.1,

A+B.1(or B.2)+C.118+D.1, A+B.1(or B.2)+C.119+D.1, A+B.1(or B.2)+C.119a+D.1, A+B.1(or B.2)+C.120+D.1, A+B.1(or B.2)+C.120a+D.1, A+B.1(or B.2)+C.120b+D.1, A+B.1(or B.2)+C.120c+D.1, A+B.1(or B.2)+C.120d+D.1, A+B.1(or B.2)+C.120e+D.1, A+B.1(or B.2)+C.120f+D.1, A+B.1(or B.2)+C.120g+D.1, A+B.1(or B.2)+C.120h+D.1, A+B.1(or B.2)+C.120i+D.1, A+B.1(or B.2)+C.121+D.1, A+B.1(or B.2)+C.122+D.1, A+B.1(or B.2)+C.123+D.1, A+B.1(or B.2)+C.124+D.1, A+B.1(or B.2)+C.125+D.1, A+B.1(or B.2)+C.126+D.1, A+B.1(or B.2)+C.127+D.1, A+B.1(or B.2)+C.128+D.1, A+B.1(or B.2)+C.129+D.1, A+B.1(or B.2)+C.129a+D.1, A+B.1(or B.2)+C.130+D.1, A+B.1(or B.2)+C.131+D.1, A+B.1(or B.2)+C.132+D.1, A+B.1(or B.2)+C.133+D.1, A+B.1(or B.2)+C.133a+D.1, A+B.1(or B.2)+C.134+D.1, A+B.1(or B.2)+C.135+D.1, A+B.1(or B.2)+C.136+D.1, A+B.1(or B.2)+C.137+D.1, A+B.1(or B.2)+C.138+D.1, A+B.1(or B.2)+C.138a+D.1, A+B.1(or B.2)+C.139+D.1, A+B.1(or B.2)+C.139a+D.1, A+B.1(or B.2)+C.139b+D.1, A+B.1(or B.2)+C.140+D.1, A+B.1(or B.2)+C.141+D.1, A+B.1(or B.2)+C.142+D.1, A+B.1(or B.2)+C.143+D.1, A+B.1(or B.2)+C.144+D.1, A+B.1(or B.2)+C.145+D.1, A+B.1(or B.2)+C.146+D.1, A+B.1(or B.2)+C.147+D.1, A+B.1(or B.2)+C.148+D.1, A+B.1(or B.2)+C.149+D.1, A+B.1(or B.2)+C.150+D.1, A+B.1(or B.2)+C.151+D.1, A+B.1(or B.2)+C.151a+D.1, A+B.1(or B.2)+C.152+D.1, A+B.1(or B.2)+C.152a+D.1, A+B.1(or B.2)+C.153+D.1, A+B.1(or B.2)+C.154+D.1, A+B.1(or B.2)+C.154a+D.1, A+B.1(or B.2)+C.155+D.1, A+B.1(or B.2)+C.156+D.1, A+B.1(or B.2)+C.157+D.1, A+B.1(or B.2)+C.158+D.1, A+B.1(or B.2)+C.158a+D.1, A+B.1(or B.2)+C.159+D.1, A+B.1(or B.2)+C.159a+D.1, A+B.1(or B.2)+C.159b+D.1, A+B.1(or B.2)+C.159c+D.1, A+B.1(or B.2)+C.160+D.1, A+B.1(or B.2)+C.160a+D.1, A+B.1(or B.2)+C.161+D.1, A+B.1(or B.2)+C.162+D.1, A+B.1(or B.2)+C.163+D.1, A+B.1(or B.2)+C.163a+D.1, A+B.1(or B.2)+C.164+D.1, A+B.1(or B.2)+C.165+D.1, A+B.1(or B.2)+C.166+D.1, A+B.1(or B.2)+C.1+D.2a, A+B.1(or B.2)+C.2+D.2a, A+B.1(or B.2)+C.3+D.2a, A+B.1(or B.2)+C.4+D.2a, A+B.1(or B.2)+C.5+D.2a, A+B.1(or B.2)+C.5a+D.2a, A+B.1(or B.2)+C.5b+D.2a, A+B.1(or B.2)+C.5c+D.2a, A+B.1(or B.2)+C.6+D.2a, A+B.1(or B.2)+C.7+D.2a, A+B.1(or B.2)+C.7a+D.2a, A+B.1(or B.2)+C.7b+D.2a, A+B.1(or B.2)+C.8+D.2a, A+B.1(or B.2)+C.9+D.2a, A+B.1(or B.2)+C.10+D.2a, A+B.1(or B.2)+C.11+D.2a, A+B.1(or B.2)+C.12+D.2a, A+B.1(or B.2)+C.12a+D.2a, A+B.1(or B.2)+C.13+D.2a, A+B.1(or B.2)+C.14+D.2a, A+B.1(or B.2)+C.14a+D.2a, A+B.1(or B.2)+C.15+D.2a, A+B.1(or B.2)+C.16+D.2a, A+B.1(or B.2)+C.17+D.2a, A+B.1(or B.2)+C.18+D.2a, A+B.1(or B.2)+C.18a+D.2a, A+B.1(or B.2)+C.19+D.2a, A+B.1(or B.2)+C.19a+D.2a, A+B.1(or B.2)+C.19b+D.2a, A+B.1(or B.2)+C.19c+D.2a, A+B.1(or B.2)+C.19d+D.2a, A+B.1(or B.2)+C.20+D.2a, A+B.1(or B.2)+C.21+D.2a, A+B.1(or B.2)+C.21a+D.2a, A+B.1(or B.2)+C.22+D.2a, A+B.1(or B.2)+C.23+D.2a, A+B.1(or B.2)+C.24+D.2a, A+B.1(or B.2)+C.25+D.2a, A+B.1(or B.2)+C.25a+D.2a, A+B.1(or B.2)+C.25b+D.2a, A+B.1(or B.2)+C.26+D.2a, A+B.1(or B.2)+C.27+D.2a, A+B.1(or B.2)+C.28+D.2a, A+B.1(or B.2)+C.28a+D.2a, A+B.1(or B.2)+C.29+D.2a, A+B.1(or B.2)+C.30+D.2a, A+B.1(or B.2)+C.30a+D.2a, A+B.1(or B.2)+C.30b+D.2a, A+B.1(or B.2)+C.30c+D.2a, A+B.1(or B.2)+C.30d+D.2a, A+B.1(or B.2)+C.30e+D.2a, A+B.1(or B.2)+C.30f+D.2a, A+B.1(or B.2)+C.30g+D.2a, A+B.1(or B.2)+C.31+D.2a, A+B.1(or B.2)+C.32+D.2a, A+B.1(or B.2)+C.33+D.2a, A+B.1(or B.2)+C.34+D.2a, A+B.1(or B.2)+C.34a+D.2a, A+B.1(or B.2)+C.35+D.2a, A+B.1(or B.2)+C.35a+D.2a, A+B.1(or B.2)+C.35b+D.2a, A+B.1(or B.2)+C.35c+D.2a, A+B.1(or B.2)+C.35d+D.2a, A+B.1(or B.2)+C.35e+D.2a, A+B.1(or B.2)+C.35f+D.2a, A+B.1(or B.2)+C.35g+D.2a, A+B.1(or B.2)+C.35h+D.2a, A+B.1(or B.2)+C.35i+D.2a, A+B.1(or B.2)+C.35j+D.2a, A+B.1(or B.2)+C.35k+D.2a, A+B.1(or B.2)+C.35l+D.2a, A+B.1(or B.2)+C.35m+D.2a, A+B.1(or B.2)+C.35n+D.2a, A+B.1(or B.2)+C.35o+D.2a, A+B.1(or B.2)+C.35p+D.2a, A+B.1(or B.2)+C.35q+D.2a, A+B.1(or B.2)+C.35r+D.2a, A+B.1(or B.2)+C.35s+D.2a, A+B.1(or B.2)+C.35t+D.2a, A+B.1(or B.2)+C.35u+D.2a, A+B.1(or B.2)+C.35v+D.2a, A+B.1(or B.2)+C.35w+D.2a, A+B.1(or B.2)+C.35x+D.2a, A+B.1(or B.2)+C.35y+D.2a, A+B.1(or B.2)+C.35z+D.2a, A+B.1(or B.2)+C.35zx+D.2a, A+B.1(or B.2)+C.35zy+D.2a, A+B.1(or B.2)+C.36+D.2a, A+B.1(or B.2)+C.36a+D.2a, A+B.1(or B.2)+C.37+D.2a, A+B.1(or B.2)+C.37a+D.2a, A+B.1(or B.2)+C.37b+D.2a, A+B.1(or B.2)+C.37c+D.2a, A+B.1(or B.2)+C.37d+D.2a, A+B.1(or B.2)+C.37e+D.2a, A+B.1(or B.2)+C.38+D.2a, A+B.1(or B.2)+C.39+D.2a, A+B.1(or B.2)+C.39a+D.2a, A+B.1(or B.2)+C.39b+D.2a, A+B.1(or B.2)+C.39c+D.2a, A+B.1(or B.2)+C.39d+D.2a, A+B.1(or B.2)+C.39e+D.2a, A+B.1(or B.2)+C.39f+D.2a, A+B.1(or B.2)+C.39g+D.2a, A+B.1(or B.2)+C.39h+D.2a, A+B.1(or B.2)+C.39i+D.2a, A+B.1(or B.2)+C.39j+D.2a, A+B.1(or B.2)+C.39k+D.2a, A+B.1(or B.2)+C.39l+D.2a, A+B.1(or B.2)+C.39m+D.2a, A+B.1(or B.2)+C.40+D.2a, A+B.1(or B.2)+C.40a+D.2a, A+B.1(or B.2)+C.40b+D.2a, A+B.1(or B.2)+C.40c+D.2a, A+B.1(or B.2)+C.40d+D.2a, A+B.1(or B.2)+C.40e+D.2a, A+B.1(or B.2)+C.40f+D.2a, A+B.1(or B.2)+C.40g+D.2a, A+B.1(or B.2)+C.40h+D.2a, A+B.1(or B.2)+C.41+D.2a, A+B.1(or B.2)+C.41a+D.2a, A+B.1(or B.2)+C.41b+D.2a, A+B.1(or B.2)+C.41c+D.2a, A+B.1(or B.2)+C.41d+D.2a, A+B.1(or B.2)+C.42+D.2a, A+B.1(or B.2)+C.42a+D.2a, A+B.1(or B.2)+C.43+D.2a, A+B.1(or B.2)+C.44+D.2a, A+B.1(or B.2)+C.44a+D.2a, A+B.1(or B.2)+C.45+D.2a, A+B.1(or B.2)+C.46+D.2a, A+B.1(or B.2)+C.47+D.2a, A+B.1(or B.2)+C.48+D.2a, A+B.1(or B.2)+C.48a+D.2a, A+B.1(or B.2)+C.49+D.2a, A+B.1(or B.2)+C.50+D.2a, A+B.1(or B.2)+C.51+D.2a, A+B.1(or B.2)+C.51a+D.2a, A+B.1(or B.2)+C.52+D.2a, A+B.1(or B.2)+C.53+D.2a, A+B.1(or B.2)+C.53a+D.2a, A+B.1(or B.2)+C.54+D.2a, A+B.1(or B.2)+C.54a+D.2a, A+B.1(or B.2)+C.55+D.2a, A+B.1(or B.2)+C.56+D.2a, A+B.1(or B.2)+C.57+D.2a, A+B.1(or B.2)+C.58+D.2a, A+B.1(or B.2)+C.58a+D.2a, A+B.1(or B.2)+C.58b+D.2a, A+B.1(or B.2)+C.59+D.2a, A+B.1(or B.2)+C.59a+D.2a, A+B.1(or B.2)+C.60+D.2a, A+B.1(or B.2)+C.60a+D.2a, A+B.1(or B.2)+C.61+D.2a, A+B.1(or B.2)+C.62+D.2a, A+B.1(or B.2)+C.63+D.2a, A+B.1(or B.2)+C.64+D.2a, A+B.1(or B.2)+C.64a+D.2a, A+B.1(or B.2)+C.64b+D.2a, A+B.1(or B.2)+C.65+D.2a, A+B.1(or B.2)+C.66+D.2a, A+B.1(or B.2)+C.66a+D.2a, A+B.1(or B.2)+C.66b+D.2a, A+B.1(or B.2)+C.67+D.2a, A+B.1(or B.2)+C.68+D.2a, A+B.1(or B.2)+C.69+D.2a, A+B.1(or B.2)+C.69a+D.2a, A+B.1(or B.2)+C.70+D.2a, A+B.1(or B.2)+C.70a+D.2a, A+B.1(or B.2)+C.70b+D.2a, A+B.1(or B.2)+C.71+D.2a, A+B.1(or B.2)+C.71a+D.2a, A+B.1(or B.2)+C.71b+D.2a, A+B.1(or B.2)+C.71c+D.2a, A+B.1(or B.2)+C.71d+D.2a, A+B.1(or B.2)+C.71e+D.2a, A+B.1(or B.2)+C.71f+D.2a, A+B.1(or B.2)+C.71g+D.2a, A+B.1(or B.2)+C.71h+D.2a, A+B.1(or B.2)+C.71i+D.2a, A+B.1(or B.2)+C.71j+D.2a, A+B.1(or B.2)+C.72+D.2a, A+B.1(or B.2)+C.72a+D.2a, A+B.1(or B.2)+C.73+D.2a, A+B.1(or B.2)+C.73a+D.2a, A+B.1(or B.2)+C.74+D.2a, A+B.1(or B.2)+C.74a+D.2a, A+B.1(or B.2)+C.74b+D.2a, A+B.1(or B.2)+C.75+D.2a, A+B.1(or B.2)+C.76+D.2a, A+B.1(or B.2)+C.77+D.2a, A+B.1(or B.2)+C.77a+D.2a, A+B.1(or B.2)+C.78+D.2a, A+B.1(or B.2)+C.78a+D.2a, A+B.1(or B.2)+C.79+D.2a, A+B.1(or B.2)+C.79a+

D.2a, A+B.1(or B.2)+C.79b+D.2a, A+B.1(or B.2)+C.79c+
D.2a, A+B.1(or B.2)+C.80+D.2a, A+B.1(or B.2)+C.80a+
D.2a, A+B.1(or B.2)+C.81+D.2a, A+B.1(or B.2)+C.82+
D.2a, A+B.1(or B.2)+C.82a+D.2a, A+B.1(or B.2)+C.82b+
D.2a, A+B.1(or B.2)+C.83+D.2a, A+B.1(or B.2)+C.83a+
D.2a, A+B.1(or B.2)+C.84+D.2a, A+B.1(or B.2)+C.84a+
D.2a, A+B.1(or B.2)+C.84b+D.2a, A+B.1(or B.2)+C.84c+
D.2a, A+B.1(or B.2)+C.85+D.2a, A+B.1(or B.2)+C.86+
D.2a, A+B.1(or B.2)+C.87+D.2a, A+B.1(or B.2)+C.88+
D.2a, A+B.1(or B.2)+C.89+D.2a, A+B.1(or B.2)+C.90+
D.2a, A+B.1(or B.2)+C.90a+D.2a, A+B.1(or B.2)+C.90b+
D.2a, A+B.1(or B.2)+C.90c+D.2a, A+B.1(or B.2)+C.90d+
D.2a, A+B.1(or B.2)+C.90e+D.2a, A+B.1(or B.2)+C.90f+
D.2a, A+B.1(or B.2)+C.90g+D.2a, A+B.1(or B.2)+C.90h+
D.2a, A+B.1(or B.2)+C.90i+D.2a, A+B.1(or B.2)+C.90j+
D.2a, A+B.1(or B.2)+C.90k+D.2a, A+B.1(or B.2)+C.90l+
D.2a, A+B.1(or B.2)+C.90m+D.2a, A+B.1(or B.2)+C.90n+
D.2a, A+B.1(or B.2)+C.91+D.2a, A+B.1(or B.2)+C.91a+
D.2a, A+B.1(or B.2)+C.91b+D.2a, A+B.1(or B.2)+C.91c+
D.2a, A+B.1(or B.2)+C.92+D.2a, A+B.1(or B.2)+C.92a+
D.2a, A+B.1(or B.2)+C.92b+D.2a, A+B.1(or B.2)+C.92c+
D.2a, A+B.1(or B.2)+C.92d+D.2a, A+B.1(or B.2)+C.92e+
D.2a, A+B.1(or B.2)+C.92f+D.2a, A+B.1(or B.2)+C.92g+
D.2a, A+B.1(or B.2)+C.92h+D.2a, A+B.1(or B.2)+C.92i+
D.2a, A+B.1(or B.2)+C.93+D.2a, A+B.1(or B.2)+C.93a+
D.2a, A+B.1(or B.2)+C.93b+D.2a, A+B.1(or B.2)+C.93c+
D.2a, A+B.1(or B.2)+C.93d+D.2a, A+B.1(or B.2)+C.94+
D.2a, A+B.1(or B.2)+C.94a+D.2a, A+B.1(or B.2)+C.95+
D.2a, A+B.1(or B.2)+C.96+D.2a, A+B.1(or B.2)+C.96a+
D.2a, A+B.1(or B.2)+C.96b+D.2a, A+B.1(or B.2)+C.96c+
D.2a, A+B.1(or B.2)+C.97+D.2a, A+B.1(or B.2)+C.98+
D.2a, A+B.1(or B.2)+C.99+D.2a, A+B.1(or B.2)+C.100+
D.2a, A+B.1(or B.2)+C.101+D.2a, A+B.1(or B.2)+C.102+
D.2a, A+B.1(or B.2)+C.103+D.2a, A+B.1(or B.2)+C.104+
D.2a, A+B.1(or B.2)+C.104a+D.2a, A+B.1(or B.2)+C.105+
D.2a, A+B.1(or B.2)+C.106+D.2a, A+B.1(or B.2)+C.107+
D.2a, A+B.1(or B.2)+C.108+D.2a, A+B.1(or B.2)+C.109+
D.2a, A+B.1(or B.2)+C.110+D.2a, A+B.1(or B.2)+C.111+
D.2a, A+B.1(or B.2)+C.112+D.2a, A+B.1(or B.2)+C.113+
D.2a, A+B.1(or B.2)+C.114+D.2a, A+B.1(or B.2)+C.115+
D.2a, A+B.1(or B.2)+C.116+D.2a, A+B.1(or B.2)+C.117+
D.2a, A+B.1(or B.2)+C.118+D.2a, A+B.1(or B.2)+C.119+
D.2a, A+B.1(or B.2)+C.119a+D.2a, A+B.1(or B.2)+C.120+
D.2a, A+B.1(or B.2)+C.120a+D.2a, A+B.1(or B.2)+C.120b+D.2a, A+B.1(or B.2)+C.120c+D.2a, A+B.1(or B.2)+C.120d+D.2a, A+B.1(or B.2)+C.120e+D.2a, A+B.1(or B.2)+C.120f+D.2a, A+B.1(or B.2)+C.120g+D.2a, A+B.1(or B.2)+C.120h+D.2a, A+B.1(or B.2)+C.120i+D.2a, A+B.1(or B.2)+C.121+D.2a, A+B.1(or B.2)+C.122+D.2a, A+B.1(or B.2)+C.123+D.2a, A+B.1(or B.2)+C.124+D.2a, A+B.1(or B.2)+C.125+D.2a, A+B.1(or B.2)+C.126+D.2a, A+B.1(or B.2)+C.127+D.2a, A+B.1(or B.2)+C.128+D.2a, A+B.1(or B.2)+C.129+D.2a, A+B.1(or B.2)+C.129a+D.2a, A+B.1(or B.2)+C.130+D.2a, A+B.1(or B.2)+C.131+D.2a, A+B.1(or B.2)+C.132+D.2a, A+B.1(or B.2)+C.133+D.2a, A+B.1(or B.2)+C.133a+D.2a, A+B.1(or B.2)+C.134+D.2a, A+B.1(or B.2)+C.135+D.2a, A+B.1(or B.2)+C.136+D.2a, A+B.1(or B.2)+C.137+D.2a, A+B.1(or B.2)+C.138+D.2a, A+B.1(or B.2)+C.138a+D.2a, A+B.1(or B.2)+C.139+D.2a, A+B.1(or B.2)+C.139a+D.2a, A+B.1(or B.2)+C.139b+D.2a, A+B.1(or B.2)+C.140+D.2a, A+B.1(or B.2)+C.141+D.2a, A+B.1(or B.2)+C.142+D.2a, A+B.1(or B.2)+C.143+D.2a, A+B.1(or B.2)+C.144+D.2a, A+B.1(or B.2)+C.145+D.2a, A+B.1(or B.2)+C.146+D.2a, A+B.1(or B.2)+C.147+D.2a, A+B.1(or B.2)+C.148+D.2a, A+B.1(or B.2)+C.149+D.2a, A+B.1(or B.2)+C.150+D.2a, A+B.1(or B.2)+C.151+D.2a, A+B.1(or B.2)+C.151a+D.2a, A+B.1(or B.2)+C.152+D.2a, A+B.1(or B.2)+C.152a+D.2a, A+B.1(or B.2)+C.153+D.2a, A+B.1(or B.2)+C.154+D.2a, A+B.1(or B.2)+C.154a+D.2a, A+B.1(or B.2)+C.155+D.2a, A+B.1(or B.2)+C.156+D.2a, A+B.1(or B.2)+C.157+D.2a, A+B.1(or B.2)+C.158+D.2a, A+B.1(or B.2)+C.158a+D.2a, A+B.1(or B.2)+C.159+D.2a, A+B.1(or B.2)+C.159a+D.2a, A+B.1(or B.2)+C.159b+D.2a, A+B.1(or B.2)+C.159c+D.2a, A+B.1(or B.2)+C.160+D.2a, A+B.1(or B.2)+C.160a+D.2a, A+B.1(or B.2)+C.161+D.2a, A+B.1(or B.2)+C.162+D.2a, A+B.1(or B.2)+C.163+D.2a, A+B.1(or B.2)+C.163a+D.2a, A+B.1(or B.2)+C.164+D.2a, A+B.1(or B.2)+C.165+D.2a, A+B.1(or B.2)+C.166+D.2a,

A+B.1(or B.2)+C.1+D.4, A+B.1(or B.2)+C.2+D.4, A+B.1(or B.2)+C.3+D.4, A+B.1(or B.2)+C.4+D.4, A+B.1(or B.2)+C.5+D.4, A+B.1(or B.2)+C.5a+D.4, A+B.1(or B.2)+C.5b+D.4, A+B.1(or B.2)+C.5c+D.4, A+B.1(or B.2)+C.6+D.4, A+B.1(or B.2)+C.7+D.4, A+B.1(or B.2)+C.7a+D.4, A+B.1(or B.2)+C.7b+D.4, A+B.1(or B.2)+C.8+D.4, A+B.1(or B.2)+C.9+D.4, A+B.1(or B.2)+C.10+D.4, A+B.1(or B.2)+C.11+D.4, A+B.1(or B.2)+C.12+D.4, A+B.1(or B.2)+C.12a+D.4, A+B.1(or B.2)+C.13+D.4, A+B.1(or B.2)+C.14+D.4, A+B.1(or B.2)+C.14a+D.4, A+B.1(or B.2)+C.15+D.4, A+B.1(or B.2)+C.16+D.4, A+B.1(or B.2)+C.17+D.4, A+B.1(or B.2)+C.18+D.4, A+B.1(or B.2)+C.18a+D.4, A+B.1(or B.2)+C.19+D.4, A+B.1(or B.2)+C.19a+D.4, A+B.1(or B.2)+C.19b+D.4, A+B.1(or B.2)+C.19c+D.4, A+B.1(or B.2)+C.19d+D.4, A+B.1(or B.2)+C.20+D.4, A+B.1(or B.2)+C.21+D.4, A+B.1(or B.2)+C.21a+D.4, A+B.1(or B.2)+C.22+D.4, A+B.1(or B.2)+C.23+D.4, A+B.1(or B.2)+C.24+D.4, A+B.1(or B.2)+C.25+D.4, A+B.1(or B.2)+C.25a+D.4, A+B.1(or B.2)+C.25b+D.4, A+B.1(or B.2)+C.26+D.4, A+B.1(or B.2)+C.27+D.4, A+B.1(or B.2)+C.28+D.4, A+B.1(or B.2)+C.28a+D.4, A+B.1(or B.2)+C.29+D.4, A+B.1(or B.2)+C.30+D.4, A+B.1(or B.2)+C.30a+D.4, A+B.1(or B.2)+C.30b+D.4, A+B.1(or B.2)+C.30c+D.4, A+B.1(or B.2)+C.30d+D.4, A+B.1(or B.2)+C.30e+D.4, A+B.1(or B.2)+C.30f+D.4, A+B.1(or B.2)+C.30g+D.4, A+B.1(or B.2)+C.31+D.4, A+B.1(or B.2)+C.32+D.4, A+B.1(or B.2)+C.33+D.4, A+B.1(or B.2)+C.34+D.4, A+B.1(or B.2)+C.34a+D.4, A+B.1(or B.2)+C.35+D.4, A+B.1(or B.2)+C.35a+D.4, A+B.1(or B.2)+C.35b+D.4, A+B.1(or B.2)+C.35c+D.4, A+B.1(or B.2)+C.35d+D.4, A+B.1(or B.2)+C.35e+D.4, A+B.1(or B.2)+C.35f+D.4, A+B.1(or B.2)+C.35g+D.4, A+B.1(or B.2)+C.35h+D.4, A+B.1(or B.2)+C.35i+D.4, A+B.1(or B.2)+C.35j+D.4, A+B.1(or B.2)+C.35k+D.4, A+B.1(or B.2)+C.35l+D.4, A+B.1(or B.2)+C.35m+D.4, A+B.1(or B.2)+C.35n+D.4, A+B.1(or B.2)+C.35o+D.4, A+B.1(or B.2)+C.35p+D.4, A+B.1(or B.2)+C.35q+D.4, A+B.1(or B.2)+C.35r+D.4, A+B.1(or B.2)+C.35s+D.4, A+B.1(or B.2)+C.35t+D.4, A+B.1(or B.2)+C.35u+D.4, A+B.1(or B.2)+C.35v+D.4, A+B.1(or B.2)+C.35w+D.4, A+B.1(or B.2)+C.35x+D.4, A+B.1(or B.2)+C.35y+D.4, A+B.1(or B.2)+C.35z+D.4, A+B.1(or B.2)+C.35zx+D.4, A+B.1(or B.2)+C.35zy+D.4, A+B.1(or B.2)+C.36+D.4, A+B.1(or B.2)+C.36a+D.4, A+B.1(or B.2)+C.37+D.4, A+B.1(or B.2)+C.37a+D.4, A+B.1(or B.2)+C.37b+D.4, A+B.1(or B.2)+C.37c+D.4, A+B.1(or B.2)+C.37d+D.4, A+B.1(or B.2)+C.37e+D.4, A+B.1(or B.2)+C.38+D.4, A+B.1(or B.2)+C.39+D.4, A+B.1(or B.2)+C.39a+D.4, A+B.1(or B.2)+C.39b+D.4, A+B.1(or B.2)+C.39c+D.4, A+B.1(or B.2)+C.39d+D.4, A+B.1(or B.2)+C.39e+D.4, A+B.1(or B.2)+C.39f+D.4, A+B.1(or B.2)+C.39g+D.4, A+B.1(or B.2)+C.39h+D.4, A+B.1(or B.2)+C.39i+D.4, A+B.1(or B.2)+C.39j+D.4, A+B.1(or B.2)+C.39k+D.4, A+B.1(or B.2)+C.39l+D.4, A+B.1(or B.2)+C.39m+D.4, A+B.1(or B.2)+C.40+D.4, A+B.1(or B.2)+C.40a+D.4, A+B.1(or B.2)+C.40b+D.4, A+B.1(or B.2)+C.40c+D.4,

A+B.1(or B.2)+C.40d+D.4, A+B.1(or B.2)+C.40e+D.4,
A+B.1(or B.2)+C.40f+D.4, A+B.1(or B.2)+C.40g+D.4,
A+B.1(or B.2)+C.40h+D.4, A+B.1(or B.2)+C.41+D.4,
A+B.1(or B.2)+C.41a+D.4, A+B.1(or B.2)+C.41b+D.4,
A+B.1(or B.2)+C.41c+D.4, A+B.1(or B.2)+C.41d+D.4,
A+B.1(or B.2)+C.42+D.4, A+B.1(or B.2)+C.42a+D.4,
A+B.1(or B.2)+C.43+D.4, A+B.1(or B.2)+C.44+D.4,
A+B.1(or B.2)+C.44a+D.4, A+B.1(or B.2)+C.45+D.4,
A+B.1(or B.2)+C.46+D.4, A+B.1(or B.2)+C.47+D.4,
A+B.1(or B.2)+C.48+D.4, A+B.1(or B.2)+C.48a+D.4,
A+B.1(or B.2)+C.49+D.4, A+B.1(or B.2)+C.50+D.4,
A+B.1(or B.2)+C.51+D.4, A+B.1(or B.2)+C.51a+D.4,
A+B.1(or B.2)+C.52+D.4, A+B.1(or B.2)+C.53+D.4,
A+B.1(or B.2)+C.53a+D.4, A+B.1(or B.2)+C.54+D.4,
A+B.1(or B.2)+C.54a+D.4, A+B.1(or B.2)+C.55+D.4,
A+B.1(or B.2)+C.56+D.4, A+B.1(or B.2)+C.57+D.4,
A+B.1(or B.2)+C.58+D.4, A+B.1(or B.2)+C.58a+D.4,
A+B.1(or B.2)+C.58b+D.4, A+B.1(or B.2)+C.59+D.4,
A+B.1(or B.2)+C.59a+D.4, A+B.1(or B.2)+C.60+D.4,
A+B.1(or B.2)+C.60a+D.4, A+B.1(or B.2)+C.61+D.4,
A+B.1(or B.2)+C.62+D.4, A+B.1(or B.2)+C.63+D.4,
A+B.1(or B.2)+C.64+D.4, A+B.1(or B.2)+C.64a+D.4,
A+B.1(or B.2)+C.64b+D.4, A+B.1(or B.2)+C.65+D.4,
A+B.1(or B.2)+C.66+D.4, A+B.1(or B.2)+C.66a+D.4,
A+B.1(or B.2)+C.66b+D.4, A+B.1(or B.2)+C.67+D.4,
A+B.1(or B.2)+C.68+D.4, A+B.1(or B.2)+C.69+D.4,
A+B.1(or B.2)+C.69a+D.4, A+B.1(or B.2)+C.70+D.4,
A+B.1(or B.2)+C.70a+D.4, A+B.1(or B.2)+C.70b+D.4,
A+B.1(or B.2)+C.71+D.4, A+B.1(or B.2)+C.71a+D.4,
A+B.1(or B.2)+C.71b+D.4, A+B.1(or B.2)+C.71c+D.4,
A+B.1(or B.2)+C.71d+D.4, A+B.1(or B.2)+C.71e+D.4,
A+B.1(or B.2)+C.71f+D.4, A+B.1(or B.2)+C.71g+D.4,
A+B.1(or B.2)+C.71h+D.4, A+B.1(or B.2)+C.71i+D.4,
A+B.1(or B.2)+C.71j+D.4, A+B.1(or B.2)+C.72+D.4,
A+B.1(or B.2)+C.72a+D.4, A+B.1(or B.2)+C.73+D.4,
A+B.1(or B.2)+C.73a+D.4, A+B.1(or B.2)+C.74+D.4,
A+B.1(or B.2)+C.74a+D.4, A+B.1(or B.2)+C.74b+D.4,
A+B.1(or B.2)+C.75+D.4, A+B.1(or B.2)+C.76+D.4,
A+B.1(or B.2)+C.77+D.4, A+B.1(or B.2)+C.77a+D.4,
A+B.1(or B.2)+C.78+D.4, A+B.1(or B.2)+C.78a+D.4,
A+B.1(or B.2)+C.79+D.4, A+B.1(or B.2)+C.79a+D.4,
A+B.1(or B.2)+C.79b+D.4, A+B.1(or B.2)+C.79c+D.4,
A+B.1(or B.2)+C.80+D.4, A+B.1(or B.2)+C.80a+D.4,
A+B.1(or B.2)+C.81+D.4, A+B.1(or B.2)+C.82+D.4,
A+B.1(or B.2)+C.82a+D.4, A+B.1(or B.2)+C.82b+D.4,
A+B.1(or B.2)+C.83+D.4, A+B.1(or B.2)+C.83a+D.4,
A+B.1(or B.2)+C.84+D.4, A+B.1(or B.2)+C.84a+D.4,
A+B.1(or B.2)+C.84b+D.4, A+B.1(or B.2)+C.84c+D.4,
A+B.1(or B.2)+C.85+D.4, A+B.1(or B.2)+C.86+D.4,
A+B.1(or B.2)+C.87+D.4, A+B.1(or B.2)+C.88+D.4,
A+B.1(or B.2)+C.89+D.4, A+B.1(or B.2)+C.90+D.4,
A+B.1(or B.2)+C.90a+D.4, A+B.1(or B.2)+C.90b+D.4,
A+B.1(or B.2)+C.90c+D.4, A+B.1(or B.2)+C.90d+D.4,
A+B.1(or B.2)+C.90e+D.4, A+B.1(or B.2)+C.90f+D.4,
A+B.1(or B.2)+C.90g+D.4, A+B.1(or B.2)+C.90h+D.4,
A+B.1(or B.2)+C.90i+D.4, A+B.1(or B.2)+C.90j+D.4,
A+B.1(or B.2)+C.90k+D.4, A+B.1(or B.2)+C.90l+D.4,
A+B.1(or B.2)+C.90m+D.4, A+B.1(or B.2)+C.90n+D.4,
A+B.1(or B.2)+C.91+D.4, A+B.1(or B.2)+C.91a+D.4,
A+B.1(or B.2)+C.91b+D.4, A+B.1(or B.2)+C.91c+D.4,
A+B.1(or B.2)+C.92+D.4, A+B.1(or B.2)+C.92a+D.4,
A+B.1(or B.2)+C.92b+D.4, A+B.1(or B.2)+C.92c+D.4,
A+B.1(or B.2)+C.92d+D.4, A+B.1(or B.2)+C.92e+D.4,
A+B.1(or B.2)+C.92f+D.4, A+B.1(or B.2)+C.92g+D.4,
A+B.1(or B.2)+C.92h+D.4, A+B.1(or B.2)+C.92i+D.4,
A+B.1(or B.2)+C.93+D.4, A+B.1(or B.2)+C.93a+D.4,
A+B.1(or B.2)+C.93b+D.4, A+B.1(or B.2)+C.93c+D.4,
A+B.1(or B.2)+C.93d+D.4, A+B.1(or B.2)+C.94+D.4,
A+B.1(or B.2)+C.94a+D.4, A+B.1(or B.2)+C.95+D.4,
A+B.1(or B.2)+C.96+D.4, A+B.1(or B.2)+C.96a+D.4,
A+B.1(or B.2)+C.96b+D.4, A+B.1(or B.2)+C.96c+D.4,
A+B.1(or B.2)+C.97+D.4, A+B.1(or B.2)+C.98+D.4,
A+B.1(or B.2)+C.99+D.4, A+B.1(or B.2)+C.100+D.4,
A+B.1(or B.2)+C.101+D.4, A+B.1(or B.2)+C.102+D.4,
A+B.1(or B.2)+C.103+D.4, A+B.1(or B.2)+C.104+D.4,
A+B.1(or B.2)+C.104a+D.4, A+B.1(or B.2)+C.105+D.4,
A+B.1(or B.2)+C.106+D.4, A+B.1(or B.2)+C.107+D.4,
A+B.1(or B.2)+C.108+D.4, A+B.1(or B.2)+C.109+D.4,
A+B.1(or B.2)+C.110+D.4, A+B.1(or B.2)+C.111+D.4,
A+B.1(or B.2)+C.112+D.4, A+B.1(or B.2)+C.113+D.4,
A+B.1(or B.2)+C.114+D.4, A+B.1(or B.2)+C.115+D.4,
A+B.1(or B.2)+C.116+D.4, A+B.1(or B.2)+C.117+D.4,
A+B.1(or B.2)+C.118+D.4, A+B.1(or B.2)+C.119+D.4,
A+B.1(or B.2)+C.119a+D.4, A+B.1(or B.2)+C.120+D.4,
A+B.1(or B.2)+C.120a+D.4, A+B.1(or B.2)+C.120b+D.4,
A+B.1(or B.2)+C.120c+D.4, A+B.1(or B.2)+C.120d+D.4,
A+B.1(or B.2)+C.120e+D.4, A+B.1(or B.2)+C.120f+D.4,
A+B.1(or B.2)+C.120g+D.4, A+B.1(or B.2)+C.120h+D.4,
A+B.1(or B.2)+C.120i+D.4, A+B.1(or B.2)+C.121+D.4,
A+B.1(or B.2)+C.122+D.4, A+B.1(or B.2)+C.123+D.4,
A+B.1(or B.2)+C.124+D.4, A+B.1(or B.2)+C.125+D.4,
A+B.1(or B.2)+C.126+D.4, A+B.1(or B.2)+C.127+D.4,
A+B.1(or B.2)+C.128+D.4, A+B.1(or B.2)+C.129+D.4,
A+B.1(or B.2)+C.129a+D.4, A+B.1(or B.2)+C.130+D.4,
A+B.1(or B.2)+C.131+D.4, A+B.1(or B.2)+C.132+D.4,
A+B.1(or B.2)+C.133+D.4, A+B.1(or B.2)+C.133a+D.4,
A+B.1(or B.2)+C.134+D.4, A+B.1(or B.2)+C.135+D.4,
A+B.1(or B.2)+C.136+D.4, A+B.1(or B.2)+C.137+D.4,
A+B.1(or B.2)+C.138+D.4, A+B.1(or B.2)+C.138a+D.4,
A+B.1(or B.2)+C.139+D.4, A+B.1(or B.2)+C.139a+D.4,
A+B.1(or B.2)+C.139b+D.4, A+B.1(or B.2)+C.140+D.4,
A+B.1(or B.2)+C.141+D.4, A+B.1(or B.2)+C.142+D.4,
A+B.1(or B.2)+C.143+D.4, A+B.1(or B.2)+C.144+D.4,
A+B.1(or B.2)+C.145+D.4, A+B.1(or B.2)+C.146+D.4,
A+B.1(or B.2)+C.147+D.4, A+B.1(or B.2)+C.148+D.4,
A+B.1(or B.2)+C.149+D.4, A+B.1(or B.2)+C.150+D.4,
A+B.1(or B.2)+C.151+D.4, A+B.1(or B.2)+C.151a+D.4,
A+B.1(or B.2)+C.152+D.4, A+B.1(or B.2)+C.152a+D.4,
A+B.1(or B.2)+C.153+D.4, A+B.1(or B.2)+C.154+D.4,
A+B.1(or B.2)+C.154a+D.4, A+B.1(or B.2)+C.155+D.4,
A+B.1(or B.2)+C.156+D.4, A+B.1(or B.2)+C.157+D.4,
A+B.1(or B.2)+C.158+D.4, A+B.1(or B.2)+C.158a+D.4,
A+B.1(or B.2)+C.159+D.4, A+B.1(or B.2)+C.159a+D.4,
A+B.1(or B.2)+C.159b+D.4, A+B.1(or B.2)+C.159c+D.4,
A+B.1(or B.2)+C.160+D.4, A+B.1(or B.2)+C.160a+D.4,
A+B.1(or B.2)+C.161+D.4, A+B.1(or B.2)+C.162+D.4,
A+B.1(or B.2)+C.163+D.4, A+B.1(or B.2)+C.163a+D.4,
A+B.1(or B.2)+C.164+D.4, A+B.1(or B.2)+C.165+D.4,
A+B.1(or B.2)+C.166+D.4,
A+B.1(or B.2)+C.1+D.5, A+B.1(or B.2)+C.2+D.5, A+B.1 (or B.2)+C.3+D.5, A+B.1(or B.2)+C.4+D.5, A+B.1(or B.2)+C.5+D.5, A+B.1(or B.2)+C.5a+D.5, A+B.1(or B.2)+ C.5b+D.5, A+B.1(or B.2)+C.5c+D.5, A+B.1(or B.2)+C.6+ D.5, A+B.1(or B.2)+C.7+D.5, A+B.1(or B.2)+C.7a+D.5, A+B.1(or B.2)+C.7b+D.5, A+B.1(or B.2)+C.8+D.5, A+B.1 (or B.2)+C.9+D.5, A+B.1(or B.2)+C.10+D.5, A+B.1(or B.2)+C.11+D.5, A+B.1(or B.2)+C.12+D.5, A+B.1(or B.2)+ C.12a+D.5, A+B.1(or B.2)+C.13+D.5, A+B.1(or B.2)+ C.14+D.5, A+B.1(or B.2)+C.14a+D.5, A+B.1(or B.2)+ C.15+D.5, A+B.1(or B.2)+C.16+D.5, A+B.1(or B.2)+C.17+ D.5, A+B.1(or B.2)+C.18+D.5, A+B.1(or B.2)+C.18a+D.5, A+B.1(or B.2)+C.19+D.5, A+B.1(or B.2)+C.19a+D.5, A+B.1(or B.2)+C.19b+D.5, A+B.1(or B.2)+C.19c+D.5, A+B.1(or B.2)+C.19d+D.5, A+B.1(or B.2)+C.20+D.5,

A+B.1(or B.2)+C.21+D.5, A+B.1(or B.2)+C.21a+D.5,
A+B.1(or B.2)+C.22+D.5, A+B.1(or B.2)+C.23+D.5,
A+B.1(or B.2)+C.24+D.5, A+B.1(or B.2)+C.25+D.5,
A+B.1(or B.2)+C.25a+D.5, A+B.1(or B.2)+C.25b+D.5,
A+B.1(or B.2)+C.26+D.5, A+B.1(or B.2)+C.27+D.5,
A+B.1(or B.2)+C.28+D.5, A+B.1(or B.2)+C.28a+D.5,
A+B.1(or B.2)+C.29+D.5, A+B.1(or B.2)+C.30+D.5,
A+B.1(or B.2)+C.30a+D.5, A+B.1(or B.2)+C.30b+D.5,
A+B.1(or B.2)+C.30c+D.5, A+B.1(or B.2)+C.30d+D.5,
A+B.1(or B.2)+C.30e+D.5, A+B.1(or B.2)+C.30f+D.5,
A+B.1(or B.2)+C.30g+D.5, A+B.1(or B.2)+C.31+D.5,
A+B.1(or B.2)+C.32+D.5, A+B.1(or B.2)+C.33+D.5,
A+B.1(or B.2)+C.34+D.5, A+B.1(or B.2)+C.34a+D.5,
A+B.1(or B.2)+C.35+D.5, A+B.1(or B.2)+C.35a+D.5,
A+B.1(or B.2)+C.35b+D.5, A+B.1(or B.2)+C.35c+D.5,
A+B.1(or B.2)+C.35d+D.5, A+B.1(or B.2)+C.35e+D.5,
A+B.1(or B.2)+C.35f+D.5, A+B.1(or B.2)+C.35g+D.5,
A+B.1(or B.2)+C.35h+D.5, A+B.1(or B.2)+C.35i+D.5,
A+B.1(or B.2)+C.35j+D.5, A+B.1(or B.2)+C.35k+D.5,
A+B.1(or B.2)+C.35l+D.5, A+B.1(or B.2)+C.35m+D.5,
A+B.1(or B.2)+C.35n+D.5, A+B.1(or B.2)+C.35o+D.5,
A+B.1(or B.2)+C.35p+D.5, A+B.1(or B.2)+C.35q+D.5,
A+B.1(or B.2)+C.35r+D.5, A+B.1(or B.2)+C.35s+D.5,
A+B.1(or B.2)+C.35t+D.5, A+B.1(or B.2)+C.35u+D.5,
A+B.1(or B.2)+C.35v+D.5, A+B.1(or B.2)+C.35w+D.5,
A+B.1(or B.2)+C.35x+D.5, A+B.1(or B.2)+C.35y+D.5,
A+B.1(or B.2)+C.35z+D.5, A+B.1(or B.2)+C.35zx+D.5,
A+B.1(or B.2)+C.35zy+D.5, A+B.1(or B.2)+C.36+D.5,
A+B.1(or B.2)+C.36a+D.5, A+B.1(or B.2)+C.37+D.5,
A+B.1(or B.2)+C.37a+D.5, A+B.1(or B.2)+C.37b+D.5,
A+B.1(or B.2)+C.37c+D.5, A+B.1(or B.2)+C.37d+D.5,
A+B.1(or B.2)+C.37e+D.5, A+B.1(or B.2)+C.38+D.5,
A+B.1(or B.2)+C.39+D.5, A+B.1(or B.2)+C.39a+D.5,
A+B.1(or B.2)+C.39b+D.5, A+B.1(or B.2)+C.39c+D.5,
A+B.1(or B.2)+C.39d+D.5, A+B.1(or B.2)+C.39e+D.5,
A+B.1(or B.2)+C.39f+D.5, A+B.1(or B.2)+C.39g+D.5,
A+B.1(or B.2)+C.39h+D.5, A+B.1(or B.2)+C.39i+D.5,
A+B.1(or B.2)+C.39j+D.5, A+B.1(or B.2)+C.39k+D.5,
A+B.1(or B.2)+C.39l+D.5, A+B.1(or B.2)+C.39m+D.5,
A+B.1(or B.2)+C.40+D.5, A+B.1(or B.2)+C.40a+D.5,
A+B.1(or B.2)+C.40b+D.5, A+B.1(or B.2)+C.40c+D.5,
A+B.1(or B.2)+C.40d+D.5, A+B.1(or B.2)+C.40e+D.5,
A+B.1(or B.2)+C.40f+D.5, A+B.1(or B.2)+C.40g+D.5,
A+B.1(or B.2)+C.40h+D.5, A+B.1(or B.2)+C.41+D.5,
A+B.1(or B.2)+C.41a+D.5, A+B.1(or B.2)+C.41b+D.5,
A+B.1(or B.2)+C.41c+D.5, A+B.1(or B.2)+C.41d+D.5,
A+B.1(or B.2)+C.42+D.5, A+B.1(or B.2)+C.42a+D.5,
A+B.1(or B.2)+C.43+D.5, A+B.1(or B.2)+C.44+D.5,
A+B.1(or B.2)+C.44a+D.5, A+B.1(or B.2)+C.45+D.5,
A+B.1(or B.2)+C.46+D.5, A+B.1(or B.2)+C.47+D.5,
A+B.1(or B.2)+C.48+D.5, A+B.1(or B.2)+C.48a+D.5,
A+B.1(or B.2)+C.49+D.5, A+B.1(or B.2)+C.50+D.5,
A+B.1(or B.2)+C.51+D.5, A+B.1(or B.2)+C.51a+D.5,
A+B.1(or B.2)+C.52+D.5, A+B.1(or B.2)+C.53+D.5,
A+B.1(or B.2)+C.53a+D.5, A+B.1(or B.2)+C.54+D.5,
A+B.1(or B.2)+C.54a+D.5, A+B.1(or B.2)+C.55+D.5,
A+B.1(or B.2)+C.56+D.5, A+B.1(or B.2)+C.57+D.5,
A+B.1(or B.2)+C.58+D.5, A+B.1(or B.2)+C.58a+D.5,
A+B.1(or B.2)+C.58b+D.5, A+B.1(or B.2)+C.59+D.5,
A+B.1(or B.2)+C.59a+D.5, A+B.1(or B.2)+C.60+D.5,
A+B.1(or B.2)+C.60a+D.5, A+B.1(or B.2)+C.61+D.5,
A+B.1(or B.2)+C.62+D.5, A+B.1(or B.2)+C.63+D.5,
A+B.1(or B.2)+C.64+D.5, A+B.1(or B.2)+C.64a+D.5,
A+B.1(or B.2)+C.64b+D.5, A+B.1(or B.2)+C.65+D.5,
A+B.1(or B.2)+C.66+D.5, A+B.1(or B.2)+C.66a+D.5,
A+B.1(or B.2)+C.66b+D.5, A+B.1(or B.2)+C.67+D.5,
A+B.1(or B.2)+C.68+D.5, A+B.1(or B.2)+C.69+D.5,
A+B.1(or B.2)+C.69a+D.5, A+B.1(or B.2)+C.70+D.5,
A+B.1(or B.2)+C.70a+D.5, A+B.1(or B.2)+C.70b+D.5,
A+B.1(or B.2)+C.71+D.5, A+B.1(or B.2)+C.71a+D.5,
A+B.1(or B.2)+C.71b+D.5, A+B.1(or B.2)+C.71c+D.5,
A+B.1(or B.2)+C.71d+D.5, A+B.1(or B.2)+C.71e+D.5,
A+B.1(or B.2)+C.71f+D.5, A+B.1(or B.2)+C.71g+D.5,
A+B.1(or B.2)+C.71h+D.5, A+B.1(or B.2)+C.71i+D.5,
A+B.1(or B.2)+C.71j+D.5, A+B.1(or B.2)+C.72+D.5,
A+B.1(or B.2)+C.72a+D.5, A+B.1(or B.2)+C.73+D.5,
A+B.1(or B.2)+C.73a+D.5, A+B.1(or B.2)+C.74+D.5,
A+B.1(or B.2)+C.74a+D.5, A+B.1(or B.2)+C.74b+D.5,
A+B.1(or B.2)+C.75+D.5, A+B.1(or B.2)+C.76+D.5,
A+B.1(or B.2)+C.77+D.5, A+B.1(or B.2)+C.77a+D.5,
A+B.1(or B.2)+C.78+D.5, A+B.1(or B.2)+C.78a+D.5,
A+B.1(or B.2)+C.79+D.5, A+B.1(or B.2)+C.79a+D.5,
A+B.1(or B.2)+C.79b+D.5, A+B.1(or B.2)+C.79c+D.5,
A+B.1(or B.2)+C.80+D.5, A+B.1(or B.2)+C.80a+D.5,
A+B.1(or B.2)+C.81+D.5, A+B.1(or B.2)+C.82+D.5,
A+B.1(or B.2)+C.82a+D.5, A+B.1(or B.2)+C.82b+D.5,
A+B.1(or B.2)+C.83+D.5, A+B.1(or B.2)+C.83a+D.5,
A+B.1(or B.2)+C.84+D.5, A+B.1(or B.2)+C.84a+D.5,
A+B.1(or B.2)+C.84b+D.5, A+B.1(or B.2)+C.84c+D.5,
A+B.1(or B.2)+C.85+D.5, A+B.1(or B.2)+C.86+D.5,
A+B.1(or B.2)+C.87+D.5, A+B.1(or B.2)+C.88+D.5,
A+B.1(or B.2)+C.89+D.5, A+B.1(or B.2)+C.90+D.5,
A+B.1(or B.2)+C.90a+D.5, A+B.1(or B.2)+C.90b+D.5,
A+B.1(or B.2)+C.90c+D.5, A+B.1(or B.2)+C.90d+D.5,
A+B.1(or B.2)+C.90e+D.5, A+B.1(or B.2)+C.90f+D.5,
A+B.1(or B.2)+C.90g+D.5, A+B.1(or B.2)+C.90h+D.5,
A+B.1(or B.2)+C.90i+D.5, A+B.1(or B.2)+C.90j+D.5,
A+B.1(or B.2)+C.90k+D.5, A+B.1(or B.2)+C.90l+D.5,
A+B.1(or B.2)+C.90m+D.5, A+B.1(or B.2)+C.90n+D.5,
A+B.1(or B.2)+C.91+D.5, A+B.1(or B.2)+C.91a+D.5,
A+B.1(or B.2)+C.91b+D.5, A+B.1(or B.2)+C.91c+D.5,
A+B.1(or B.2)+C.92+D.5, A+B.1(or B.2)+C.92a+D.5,
A+B.1(or B.2)+C.92b+D.5, A+B.1(or B.2)+C.92c+D.5,
A+B.1(or B.2)+C.92d+D.5, A+B.1(or B.2)+C.92e+D.5,
A+B.1(or B.2)+C.92f+D.5, A+B.1(or B.2)+C.92g+D.5,
A+B.1(or B.2)+C.92h+D.5, A+B.1(or B.2)+C.92i+D.5,
A+B.1(or B.2)+C.93+D.5, A+B.1(or B.2)+C.93a+D.5,
A+B.1(or B.2)+C.93b+D.5, A+B.1(or B.2)+C.93c+D.5,
A+B.1(or B.2)+C.93d+D.5, A+B.1(or B.2)+C.94+D.5,
A+B.1(or B.2)+C.94a+D.5, A+B.1(or B.2)+C.95+D.5,
A+B.1(or B.2)+C.96+D.5, A+B.1(or B.2)+C.96a+D.5,
A+B.1(or B.2)+C.96b+D.5, A+B.1(or B.2)+C.96c+D.5,
A+B.1(or B.2)+C.97+D.5, A+B.1(or B.2)+C.98+D.5,
A+B.1(or B.2)+C.99+D.5, A+B.1(or B.2)+C.100+D.5,
A+B.1(or B.2)+C.101+D.5, A+B.1(or B.2)+C.102+D.5,
A+B.1(or B.2)+C.103+D.5, A+B.1(or B.2)+C.104+D.5,
A+B.1(or B.2)+C.104a+D.5, A+B.1(or B.2)+C.105+D.5,
A+B.1(or B.2)+C.106+D.5, A+B.1(or B.2)+C.107+D.5,
A+B.1(or B.2)+C.108+D.5, A+B.1(or B.2)+C.109+D.5,
A+B.1(or B.2)+C.110+D.5, A+B.1(or B.2)+C.111+D.5,
A+B.1(or B.2)+C.112+D.5, A+B.1(or B.2)+C.113+D.5,
A+B.1(or B.2)+C.114+D.5, A+B.1(or B.2)+C.115+D.5,
A+B.1(or B.2)+C.116+D.5, A+B.1(or B.2)+C.117+D.5,
A+B.1(or B.2)+C.118+D.5, A+B.1(or B.2)+C.119+D.5,
A+B.1(or B.2)+C.119a+D.5, A+B.1(or B.2)+C.120+D.5,
A+B.1(or B.2)+C.120a+D.5, A+B.1(or B.2)+C.120b+D.5,
A+B.1(or B.2)+C.120c+D.5, A+B.1(or B.2)+C.120d+D.5,
A+B.1(or B.2)+C.120e+D.5, A+B.1(or B.2)+C.120f+D.5,
A+B.1(or B.2)+C.120g+D.5, A+B.1(or B.2)+C.120h+D.5,
A+B.1(or B.2)+C.120i+D.5, A+B.1(or B.2)+C.121+D.5,
A+B.1(or B.2)+C.122+D.5, A+B.1(or B.2)+C.123+D.5,
A+B.1(or B.2)+C.124+D.5, A+B.1(or B.2)+C.125+D.5,
A+B.1(or B.2)+C.126+D.5, A+B.1(or B.2)+C.127+D.5,
A+B.1(or B.2)+C.128+D.5, A+B.1(or B.2)+C.129+D.5,

A+B.1(or B.2)+C.129a+D.5, A+B.1(or B.2)+C.130+D.5, A+B.1(or B.2)+C.131+D.5, A+B.1(or B.2)+C.132+D.5, A+B.1(or B.2)+C.133+D.5, A+B.1(or B.2)+C.133a+D.5, A+B.1(or B.2)+C.134+D.5, A+B.1(or B.2)+C.135+D.5, A+B.1(or B.2)+C.136+D.5, A+B.1(or B.2)+C.137+D.5, A+B.1(or B.2)+C.138+D.5, A+B.1(or B.2)+C.138a+D.5, A+B.1(or B.2)+C.139+D.5, A+B.1(or B.2)+C.139a+D.5, A+B.1(or B.2)+C.139b+D.5, A+B.1(or B.2)+C.140+D.5, A+B.1(or B.2)+C.141+D.5, A+B.1(or B.2)+C.142+D.5, A+B.1(or B.2)+C.143+D.5, A+B.1(or B.2)+C.144+D.5, A+B.1(or B.2)+C.145+D.5, A+B.1(or B.2)+C.146+D.5, A+B.1(or B.2)+C.147+D.5, A+B.1(or B.2)+C.148+D.5, A+B.1(or B.2)+C.149+D.5, A+B.1(or B.2)+C.150+D.5, A+B.1(or B.2)+C.151+D.5, A+B.1(or B.2)+C.151a+D.5, A+B.1(or B.2)+C.152+D.5, A+B.1(or B.2)+C.152a+D.5, A+B.1(or B.2)+C.153+D.5, A+B.1(or B.2)+C.154+D.5, A+B.1(or B.2)+C.154a+D.5, A+B.1(or B.2)+C.155+D.5, A+B.1(or B.2)+C.156+D.5, A+B.1(or B.2)+C.157+D.5, A+B.1(or B.2)+C.158+D.5, A+B.1(or B.2)+C.158a+D.5, A+B.1(or B.2)+C.159+D.5, A+B.1(or B.2)+C.159a+D.5, A+B.1(or B.2)+C.159b+D.5, A+B.1(or B.2)+C.159c+D.5, A+B.1(or B.2)+C.160+D.5, A+B.1(or B.2)+C.160a+D.5, A+B.1(or B.2)+C.161+D.5, A+B.1(or B.2)+C.162+D.5, A+B.1(or B.2)+C.163+D.5, A+B.1(or B.2)+C.163a+D.5, A+B.1(or B.2)+C.164+D.5, A+B.1(or B.2)+C.165+D.5, A+B.1(or B.2)+C.166+D.5,

A+B.1(or B.2)+C.1+D.6, A+B.1(or B.2)+C.2+D.6, A+B.1(or B.2)+C.3+D.6, A+B.1(or B.2)+C.4+D.6, A+B.1(or B.2)+C.5+D.6, A+B.1(or B.2)+C.5a+D.6, A+B.1(or B.2)+C.5b+D.6, A+B.1(or B.2)+C.5c+D.6, A+B.1(or B.2)+C.6+D.6, A+B.1(or B.2)+C.7+D.6, A+B.1(or B.2)+C.7a+D.6, A+B.1(or B.2)+C.7b+D.6, A+B.1(or B.2)+C.8+D.6, A+B.1(or B.2)+C.9+D.6, A+B.1(or B.2)+C.10+D.6, A+B.1(or B.2)+C.11+D.6, A+B.1(or B.2)+C.12+D.6, A+B.1(or B.2)+C.12a+D.6, A+B.1(or B.2)+C.13+D.6, A+B.1(or B.2)+C.14+D.6, A+B.1(or B.2)+C.14a+D.6, A+B.1(or B.2)+C.15+D.6, A+B.1(or B.2)+C.16+D.6, A+B.1(or B.2)+C.17+D.6, A+B.1(or B.2)+C.18+D.6, A+B.1(or B.2)+C.18a+D.6, A+B.1(or B.2)+C.19+D.6, A+B.1(or B.2)+C.19a+D.6, A+B.1(or B.2)+C.19b+D.6, A+B.1(or B.2)+C.19c+D.6, A+B.1(or B.2)+C.19d+D.6, A+B.1(or B.2)+C.20+D.6, A+B.1(or B.2)+C.21+D.6, A+B.1(or B.2)+C.21a+D.6, A+B.1(or B.2)+C.22+D.6, A+B.1(or B.2)+C.23+D.6, A+B.1(or B.2)+C.24+D.6, A+B.1(or B.2)+C.25+D.6, A+B.1(or B.2)+C.25a+D.6, A+B.1(or B.2)+C.25b+D.6, A+B.1(or B.2)+C.26+D.6, A+B.1(or B.2)+C.27+D.6, A+B.1(or B.2)+C.28+D.6, A+B.1(or B.2)+C.28a+D.6, A+B.1(or B.2)+C.29+D.6, A+B.1(or B.2)+C.30+D.6, A+B.1(or B.2)+C.30a+D.6, A+B.1(or B.2)+C.30b+D.6, A+B.1(or B.2)+C.30c+D.6, A+B.1(or B.2)+C.30d+D.6, A+B.1(or B.2)+C.30e+D.6, A+B.1(or B.2)+C.30f+D.6, A+B.1(or B.2)+C.30g+D.6, A+B.1(or B.2)+C.31+D.6, A+B.1(or B.2)+C.32+D.6, A+B.1(or B.2)+C.33+D.6, A+B.1(or B.2)+C.34+D.6, A+B.1(or B.2)+C.34a+D.6, A+B.1(or B.2)+C.35+D.6, A+B.1(or B.2)+C.35a+D.6, A+B.1(or B.2)+C.35b+D.6, A+B.1(or B.2)+C.35c+D.6, A+B.1(or B.2)+C.35d+D.6, A+B.1(or B.2)+C.35e+D.6, A+B.1(or B.2)+C.35f+D.6, A+B.1(or B.2)+C.35g+D.6, A+B.1(or B.2)+C.35h+D.6, A+B.1(or B.2)+C.35i+D.6, A+B.1(or B.2)+C.35j+D.6, A+B.1(or B.2)+C.35k+D.6, A+B.1(or B.2)+C.35l+D.6, A+B.1(or B.2)+C.35m+D.6, A+B.1(or B.2)+C.35n+D.6, A+B.1(or B.2)+C.35o+D.6, A+B.1(or B.2)+C.35p+D.6, A+B.1(or B.2)+C.35q+D.6, A+B.1(or B.2)+C.35r+D.6, A+B.1(or B.2)+C.35s+D.6, A+B.1(or B.2)+C.35t+D.6, A+B.1(or B.2)+C.35u+D.6, A+B.1(or B.2)+C.35v+D.6, A+B.1(or B.2)+C.35w+D.6, A+B.1(or B.2)+C.35x+D.6, A+B.1(or B.2)+C.35y+D.6, A+B.1(or B.2)+C.35z+D.6, A+B.1(or B.2)+C.35zx+D.6, A+B.1(or B.2)+C.35zy+D.6, A+B.1(or B.2)+C.36+D.6, A+B.1(or B.2)+C.36a+D.6, A+B.1(or B.2)+C.37+D.6, A+B.1(or B.2)+C.37a+D.6, A+B.1(or B.2)+C.37b+D.6, A+B.1(or B.2)+C.37c+D.6, A+B.1(or B.2)+C.37d+D.6, A+B.1(or B.2)+C.37e+D.6, A+B.1(or B.2)+C.38+D.6, A+B.1(or B.2)+C.39+D.6, A+B.1(or B.2)+C.39a+D.6, A+B.1(or B.2)+C.39b+D.6, A+B.1(or B.2)+C.39c+D.6, A+B.1(or B.2)+C.39d+D.6, A+B.1(or B.2)+C.39e+D.6, A+B.1(or B.2)+C.39f+D.6, A+B.1(or B.2)+C.39g+D.6, A+B.1(or B.2)+C.39h+D.6, A+B.1(or B.2)+C.39i+D.6, A+B.1(or B.2)+C.39j+D.6, A+B.1(or B.2)+C.39k+D.6, A+B.1(or B.2)+C.39l+D.6, A+B.1(or B.2)+C.39m+D.6, A+B.1(or B.2)+C.40+D.6, A+B.1(or B.2)+C.40a+D.6, A+B.1(or B.2)+C.40b+D.6, A+B.1(or B.2)+C.40c+D.6, A+B.1(or B.2)+C.40d+D.6, A+B.1(or B.2)+C.40e+D.6, A+B.1(or B.2)+C.40f+D.6, A+B.1(or B.2)+C.40g+D.6, A+B.1(or B.2)+C.40h+D.6, A+B.1(or B.2)+C.41+D.6, A+B.1(or B.2)+C.41a+D.6, A+B.1(or B.2)+C.41b+D.6, A+B.1(or B.2)+C.41c+D.6, A+B.1(or B.2)+C.41d+D.6, A+B.1(or B.2)+C.42+D.6, A+B.1(or B.2)+C.42a+D.6, A+B.1(or B.2)+C.43+D.6, A+B.1(or B.2)+C.44+D.6, A+B.1(or B.2)+C.44a+D.6, A+B.1(or B.2)+C.45+D.6, A+B.1(or B.2)+C.46+D.6, A+B.1(or B.2)+C.47+D.6, A+B.1(or B.2)+C.48+D.6, A+B.1(or B.2)+C.48a+D.6, A+B.1(or B.2)+C.49+D.6, A+B.1(or B.2)+C.50+D.6, A+B.1(or B.2)+C.51+D.6, A+B.1(or B.2)+C.51a+D.6, A+B.1(or B.2)+C.52+D.6, A+B.1(or B.2)+C.53+D.6, A+B.1(or B.2)+C.53a+D.6, A+B.1(or B.2)+C.54+D.6, A+B.1(or B.2)+C.54a+D.6, A+B.1(or B.2)+C.55+D.6, A+B.1(or B.2)+C.56+D.6, A+B.1(or B.2)+C.57+D.6, A+B.1(or B.2)+C.58+D.6, A+B.1(or B.2)+C.58a+D.6, A+B.1(or B.2)+C.58b+D.6, A+B.1(or B.2)+C.59+D.6, A+B.1(or B.2)+C.59a+D.6, A+B.1(or B.2)+C.60+D.6, A+B.1(or B.2)+C.60a+D.6, A+B.1(or B.2)+C.61+D.6, A+B.1(or B.2)+C.62+D.6, A+B.1(or B.2)+C.63+D.6, A+B.1(or B.2)+C.64+D.6, A+B.1(or B.2)+C.64a+D.6, A+B.1(or B.2)+C.64b+D.6, A+B.1(or B.2)+C.65+D.6, A+B.1(or B.2)+C.66+D.6, A+B.1(or B.2)+C.66a+D.6, A+B.1(or B.2)+C.66b+D.6, A+B.1(or B.2)+C.67+D.6, A+B.1(or B.2)+C.68+D.6, A+B.1(or B.2)+C.69+D.6, A+B.1(or B.2)+C.69a+D.6, A+B.1(or B.2)+C.70+D.6, A+B.1(or B.2)+C.70a+D.6, A+B.1(or B.2)+C.70b+D.6, A+B.1(or B.2)+C.71+D.6, A+B.1(or B.2)+C.71a+D.6, A+B.1(or B.2)+C.71b+D.6, A+B.1(or B.2)+C.71c+D.6, A+B.1(or B.2)+C.71d+D.6, A+B.1(or B.2)+C.71e+D.6, A+B.1(or B.2)+C.71f+D.6, A+B.1(or B.2)+C.71g+D.6, A+B.1(or B.2)+C.71h+D.6, A+B.1(or B.2)+C.71i+D.6, A+B.1(or B.2)+C.71j+D.6, A+B.1(or B.2)+C.72+D.6, A+B.1(or B.2)+C.72a+D.6, A+B.1(or B.2)+C.73+D.6, A+B.1(or B.2)+C.73a+D.6, A+B.1(or B.2)+C.74+D.6, A+B.1(or B.2)+C.74a+D.6, A+B.1(or B.2)+C.74b+D.6, A+B.1(or B.2)+C.75+D.6, A+B.1(or B.2)+C.76+D.6, A+B.1(or B.2)+C.77+D.6, A+B.1(or B.2)+C.77a+D.6, A+B.1(or B.2)+C.78+D.6, A+B.1(or B.2)+C.78a+D.6, A+B.1(or B.2)+C.79+D.6, A+B.1(or B.2)+C.79a+D.6, A+B.1(or B.2)+C.79b+D.6, A+B.1(or B.2)+C.79c+D.6, A+B.1(or B.2)+C.80+D.6, A+B.1(or B.2)+C.80a+D.6, A+B.1(or B.2)+C.81+D.6, A+B.1(or B.2)+C.82+D.6, A+B.1(or B.2)+C.82a+D.6, A+B.1(or B.2)+C.82b+D.6, A+B.1(or B.2)+C.83+D.6, A+B.1(or B.2)+C.83a+D.6, A+B.1(or B.2)+C.84+D.6, A+B.1(or B.2)+C.84a+D.6, A+B.1(or B.2)+C.84b+D.6, A+B.1(or B.2)+C.84c+D.6, A+B.1(or B.2)+C.85+D.6, A+B.1(or B.2)+C.86+D.6, A+B.1(or B.2)+C.87+D.6, A+B.1(or B.2)+C.88+D.6, A+B.1(or B.2)+C.89+D.6, A+B.1(or B.2)+C.90+D.6, A+B.1(or B.2)+C.90a+D.6, A+B.1(or B.2)+C.90b+D.6,

A+B.1(or B.2)+C.90c+D.6, A+B.1(or B.2)+C.90d+D.6, A+B.1(or B.2)+C.90e+D.6, A+B.1(or B.2)+C.90f+D.6, A+B.1(or B.2)+C.90g+D.6, A+B.1(or B.2)+C.90h+D.6, A+B.1(or B.2)+C.90i+D.6, A+B.1(or B.2)+C.90j+D.6, A+B.1(or B.2)+C.90k+D.6, A+B.1(or B.2)+C.90l+D.6, A+B.1(or B.2)+C.90m+D.6, A+B.1(or B.2)+C.90n+D.6, A+B.1(or B.2)+C.91+D.6, A+B.1(or B.2)+C.91a+D.6, A+B.1(or B.2)+C.91b+D.6, A+B.1(or B.2)+C.91c+D.6, A+B.1(or B.2)+C.92+D.6, A+B.1(or B.2)+C.92a+D.6, A+B.1(or B.2)+C.92b+D.6, A+B.1(or B.2)+C.92c+D.6, A+B.1(or B.2)+C.92d+D.6, A+B.1(or B.2)+C.92e+D.6, A+B.1(or B.2)+C.92f+D.6, A+B.1(or B.2)+C.92g+D.6, A+B.1(or B.2)+C.92h+D.6, A+B.1(or B.2)+C.92i+D.6, A+B.1(or B.2)+C.93+D.6, A+B.1(or B.2)+C.93a+D.6, A+B.1(or B.2)+C.93b+D.6, A+B.1(or B.2)+C.93c+D.6, A+B.1(or B.2)+C.93d+D.6, A+B.1(or B.2)+C.94+D.6, A+B.1(or B.2)+C.94a+D.6, A+B.1(or B.2)+C.95+D.6, A+B.1(or B.2)+C.96+D.6, A+B.1(or B.2)+C.96a+D.6, A+B.1(or B.2)+C.96b+D.6, A+B.1(or B.2)+C.96c+D.6, A+B.1(or B.2)+C.97+D.6, A+B.1(or B.2)+C.98+D.6, A+B.1(or B.2)+C.99+D.6, A+B.1(or B.2)+C.100+D.6, A+B.1(or B.2)+C.101+D.6, A+B.1(or B.2)+C.102+D.6, A+B.1(or B.2)+C.103+D.6, A+B.1(or B.2)+C.104+D.6, A+B.1(or B.2)+C.104a+D.6, A+B.1(or B.2)+C.105+D.6, A+B.1(or B.2)+C.106+D.6, A+B.1(or B.2)+C.107+D.6, A+B.1(or B.2)+C.108+D.6, A+B.1(or B.2)+C.109+D.6, A+B.1(or B.2)+C.110+D.6, A+B.1(or B.2)+C.111+D.6, A+B.1(or B.2)+C.112+D.6, A+B.1(or B.2)+C.113+D.6, A+B.1(or B.2)+C.114+D.6, A+B.1(or B.2)+C.115+D.6, A+B.1(or B.2)+C.116+D.6, A+B.1(or B.2)+C.117+D.6, A+B.1(or B.2)+C.118+D.6, A+B.1(or B.2)+C.119+D.6, A+B.1(or B.2)+C.119a+D.6, A+B.1(or B.2)+C.120+D.6, A+B.1(or B.2)+C.120a+D.6, A+B.1(or B.2)+C.120b+D.6, A+B.1(or B.2)+C.120c+D.6, A+B.1(or B.2)+C.120d+D.6, A+B.1(or B.2)+C.120e+D.6, A+B.1(or B.2)+C.120f+D.6, A+B.1(or B.2)+C.120g+D.6, A+B.1(or B.2)+C.120h+D.6, A+B.1(or B.2)+C.120i+D.6, A+B.1(or B.2)+C.121+D.6, A+B.1(or B.2)+C.122+D.6, A+B.1(or B.2)+C.123+D.6, A+B.1(or B.2)+C.124+D.6, A+B.1(or B.2)+C.125+D.6, A+B.1(or B.2)+C.126+D.6, A+B.1(or B.2)+C.127+D.6, A+B.1(or B.2)+C.128+D.6, A+B.1(or B.2)+C.129+D.6, A+B.1(or B.2)+C.129a+D.6, A+B.1(or B.2)+C.130+D.6, A+B.1(or B.2)+C.131+D.6, A+B.1(or B.2)+C.132+D.6, A+B.1(or B.2)+C.133+D.6, A+B.1(or B.2)+C.133a+D.6, A+B.1(or B.2)+C.134+D.6, A+B.1(or B.2)+C.135+D.6, A+B.1(or B.2)+C.136+D.6, A+B.1(or B.2)+C.137+D.6, A+B.1(or B.2)+C.138+D.6, A+B.1(or B.2)+C.138a+D.6, A+B.1(or B.2)+C.139+D.6, A+B.1(or B.2)+C.139a+D.6, A+B.1(or B.2)+C.139b+D.6, A+B.1(or B.2)+C.140+D.6, A+B.1(or B.2)+C.141+D.6, A+B.1(or B.2)+C.142+D.6, A+B.1(or B.2)+C.143+D.6, A+B.1(or B.2)+C.144+D.6, A+B.1(or B.2)+C.145+D.6, A+B.1(or B.2)+C.146+D.6, A+B.1(or B.2)+C.147+D.6, A+B.1(or B.2)+C.148+D.6, A+B.1(or B.2)+C.149+D.6, A+B.1(or B.2)+C.150+D.6, A+B.1(or B.2)+C.151+D.6, A+B.1(or B.2)+C.151a+D.6, A+B.1(or B.2)+C.152+D.6, A+B.1(or B.2)+C.152a+D.6, A+B.1(or B.2)+C.153+D.6, A+B.1(or B.2)+C.154+D.6, A+B.1(or B.2)+C.154a+D.6, A+B.1(or B.2)+C.155+D.6, A+B.1(or B.2)+C.156+D.6, A+B.1(or B.2)+C.157+D.6, A+B.1(or B.2)+C.158+D.6, A+B.1(or B.2)+C.158a+D.6, A+B.1(or B.2)+C.159+D.6, A+B.1(or B.2)+C.159a+D.6, A+B.1(or B.2)+C.159b+D.6, A+B.1(or B.2)+C.159c+D.6, A+B.1(or B.2)+C.160+D.6, A+B.1(or B.2)+C.160a+D.6, A+B.1(or B.2)+C.161+D.6, A+B.1(or B.2)+C.162+D.6, A+B.1(or B.2)+C.163+D.6, A+B.1(or B.2)+C.163a+D.6, A+B.1(or B.2)+C.164+D.6, A+B.1(or B.2)+C.165+D.6, A+B.1(or B.2)+C.166+D.6,

A+B.1(or B.2)+C.1+D.8a, A+B.1(or B.2)+C.2+D.8a, A+B.1(or B.2)+C.3+D.8a, A+B.1(or B.2)+C.4+D.8a, A+B.1(or B.2)+C.5+D.8a, A+B.1(or B.2)+C.5a+D.8a, A+B.1(or B.2)+C.5b+D.8a, A+B.1(or B.2)+C.5c+D.8a, A+B.1(or B.2)+C.6+D.8a, A+B.1(or B.2)+C.7+D.8a, A+B.1(or B.2)+C.7a+D.8a, A+B.1(or B.2)+C.7b+D.8a, A+B.1(or B.2)+C.8+D.8a, A+B.1(or B.2)+C.9+D.8a, A+B.1(or B.2)+C.10+D.8a, A+B.1(or B.2)+C.11+D.8a, A+B.1(or B.2)+C.12+D.8a, A+B.1(or B.2)+C.12a+D.8a, A+B.1(or B.2)+C.13+D.8a, A+B.1(or B.2)+C.14+D.8a, A+B.1(or B.2)+C.14a+D.8a, A+B.1(or B.2)+C.15+D.8a, A+B.1(or B.2)+C.16+D.8a, A+B.1(or B.2)+C.17+D.8a, A+B.1(or B.2)+C.18+D.8a, A+B.1(or B.2)+C.18a+D.8a, A+B.1(or B.2)+C.19+D.8a, A+B.1(or B.2)+C.19a+D.8a, A+B.1(or B.2)+C.19b+D.8a, A+B.1(or B.2)+C.19c+D.8a, A+B.1(or B.2)+C.19d+D.8a, A+B.1(or B.2)+C.20+D.8a, A+B.1(or B.2)+C.21+D.8a, A+B.1(or B.2)+C.21a+D.8a, A+B.1(or B.2)+C.22+D.8a, A+B.1(or B.2)+C.23+D.8a, A+B.1(or B.2)+C.24+D.8a, A+B.1(or B.2)+C.25+D.8a, A+B.1(or B.2)+C.25a+D.8a, A+B.1(or B.2)+C.25b+D.8a, A+B.1(or B.2)+C.26+D.8a, A+B.1(or B.2)+C.27+D.8a, A+B.1(or B.2)+C.28+D.8a, A+B.1(or B.2)+C.28a+D.8a, A+B.1(or B.2)+C.29+D.8a, A+B.1(or B.2)+C.30+D.8a, A+B.1(or B.2)+C.30a+D.8a, A+B.1(or B.2)+C.30b+D.8a, A+B.1(or B.2)+C.30c+D.8a, A+B.1(or B.2)+C.30d+D.8a, A+B.1(or B.2)+C.30e+D.8a, A+B.1(or B.2)+C.30f+D.8a, A+B.1(or B.2)+C.30g+D.8a, A+B.1(or B.2)+C.31+D.8a, A+B.1(or B.2)+C.32+D.8a, A+B.1(or B.2)+C.33+D.8a, A+B.1(or B.2)+C.34+D.8a, A+B.1(or B.2)+C.34a+D.8a, A+B.1(or B.2)+C.35+D.8a, A+B.1(or B.2)+C.35a+D.8a, A+B.1(or B.2)+C.35b+D.8a, A+B.1(or B.2)+C.35c+D.8a, A+B.1(or B.2)+C.35d+D.8a, A+B.1(or B.2)+C.35e+D.8a, A+B.1(or B.2)+C.35f+D.8a, A+B.1(or B.2)+C.35g+D.8a, A+B.1(or B.2)+C.35h+D.8a, A+B.1(or B.2)+C.35i+D.8a, A+B.1(or B.2)+C.35j+D.8a, A+B.1(or B.2)+C.35k+D.8a, A+B.1(or B.2)+C.35l+D.8a, A+B.1(or B.2)+C.35m+D.8a, A+B.1(or B.2)+C.35n+D.8a, A+B.1(or B.2)+C.35o+D.8a, A+B.1(or B.2)+C.35p+D.8a, A+B.1(or B.2)+C.35q+D.8a, A+B.1(or B.2)+C.35r+D.8a, A+B.1(or B.2)+C.35s+D.8a, A+B.1(or B.2)+C.35t+D.8a, A+B.1(or B.2)+C.35u+D.8a, A+B.1(or B.2)+C.35v+D.8a, A+B.1(or B.2)+C.35w+D.8a, A+B.1(or B.2)+C.35x+D.8a, A+B.1(or B.2)+C.35y+D.8a, A+B.1(or B.2)+C.35z+D.8a, A+B.1(or B.2)+C.35zx+D.8a, A+B.1(or B.2)+C.35zy+D.8a, A+B.1(or B.2)+C.36+D.8a, A+B.1(or B.2)+C.36a+D.8a, A+B.1(or B.2)+C.37+D.8a, A+B.1(or B.2)+C.37a+D.8a, A+B.1(or B.2)+C.37b+D.8a, A+B.1(or B.2)+C.37c+D.8a, A+B.1(or B.2)+C.37d+D.8a, A+B.1(or B.2)+C.37e+D.8a, A+B.1(or B.2)+C.38+D.8a, A+B.1(or B.2)+C.39+D.8a, A+B.1(or B.2)+C.39a+D.8a, A+B.1(or B.2)+C.39b+D.8a, A+B.1(or B.2)+C.39c+D.8a, A+B.1(or B.2)+C.39d+D.8a, A+B.1(or B.2)+C.39e+D.8a, A+B.1(or B.2)+C.39f+D.8a, A+B.1(or B.2)+C.39g+D.8a, A+B.1(or B.2)+C.39h+D.8a, A+B.1(or B.2)+C.39i+D.8a, A+B.1(or B.2)+C.39j+D.8a, A+B.1(or B.2)+C.39k+D.8a, A+B.1(or B.2)+C.39l+D.8a, A+B.1(or B.2)+C.39m+D.8a, A+B.1(or B.2)+C.40+D.8a, A+B.1(or B.2)+C.40a+D.8a, A+B.1(or B.2)+C.40b+D.8a, A+B.1(or B.2)+C.40c+D.8a, A+B.1(or B.2)+C.40d+D.8a, A+B.1(or B.2)+C.40e+D.8a, A+B.1(or B.2)+C.40f+D.8a, A+B.1(or B.2)+C.40g+D.8a, A+B.1(or B.2)+C.40h+D.8a, A+B.1(or B.2)+C.41+D.8a, A+B.1(or B.2)+C.41a+D.8a, A+B.1(or B.2)+C.41b+D.8a, A+B.1(or B.2)+C.41c+D.8a, A+B.1(or B.2)+C.41d+D.8a, A+B.1(or B.2)+C.42+D.8a, A+B.1(or B.2)+C.42a+D.8a, A+B.1(or B.2)+C.43+D.8a, A+B.1(or B.2)+C.44+D.8a, A+B.1(or B.2)+C.44a+D.8a, A+B.1(or B.2)+C.45+D.8a, A+B.1(or B.2)+C.46+D.8a, A+B.1(or B.2)+C.47+D.8a, A+B.1(or B.2)+C.48+D.8a, A+B.1(or B.2)+C.48a+D.8a, A+B.1(or B.2)+C.49+D.8a,

A+B.1(or B.2)+C.50+D.8a, A+B.1(or B.2)+C.51+D.8a,
A+B.1(or B.2)+C.51a+D.8a, A+B.1(or B.2)+C.52+D.8a,
A+B.1(or B.2)+C.53+D.8a, A+B.1(or B.2)+C.53a+D.8a,
A+B.1(or B.2)+C.54+D.8a, A+B.1(or B.2)+C.54a+D.8a,
A+B.1(or B.2)+C.55+D.8a, A+B.1(or B.2)+C.56+D.8a,
A+B.1(or B.2)+C.57+D.8a, A+B.1(or B.2)+C.58+D.8a,
A+B.1(or B.2)+C.58a+D.8a, A+B.1(or B.2)+C.58b+D.8a,
A+B.1(or B.2)+C.59+D.8a, A+B.1(or B.2)+C.59a+D.8a,
A+B.1(or B.2)+C.60+D.8a, A+B.1(or B.2)+C.60a+D.8a,
A+B.1(or B.2)+C.61+D.8a, A+B.1(or B.2)+C.62+D.8a,
A+B.1(or B.2)+C.63+D.8a, A+B.1(or B.2)+C.64+D.8a,
A+B.1(or B.2)+C.64a+D.8a, A+B.1(or B.2)+C.64b+D.8a,
A+B.1(or B.2)+C.65+D.8a, A+B.1(or B.2)+C.66+D.8a,
A+B.1(or B.2)+C.66a+D.8a, A+B.1(or B.2)+C.66b+D.8a,
A+B.1(or B.2)+C.67+D.8a, A+B.1(or B.2)+C.68+D.8a,
A+B.1(or B.2)+C.69+D.8a, A+B.1(or B.2)+C.69a+D.8a,
A+B.1(or B.2)+C.70+D.8a, A+B.1(or B.2)+C.70a+D.8a,
A+B.1(or B.2)+C.70b+D.8a, A+B.1(or B.2)+C.71+D.8a,
A+B.1(or B.2)+C.71a+D.8a, A+B.1(or B.2)+C.71b+D.8a,
A+B.1(or B.2)+C.71c+D.8a, A+B.1(or B.2)+C.71d+D.8a,
A+B.1(or B.2)+C.71e+D.8a, A+B.1(or B.2)+C.71f+D.8a,
A+B.1(or B.2)+C.71g+D.8a, A+B.1(or B.2)+C.71h+D.8a,
A+B.1(or B.2)+C.71i+D.8a, A+B.1(or B.2)+C.71j+D.8a,
A+B.1(or B.2)+C.72+D.8a, A+B.1(or B.2)+C.72a+D.8a,
A+B.1(or B.2)+C.73+D.8a, A+B.1(or B.2)+C.73a+D.8a,
A+B.1(or B.2)+C.74+D.8a, A+B.1(or B.2)+C.74a+D.8a,
A+B.1(or B.2)+C.74b+D.8a, A+B.1(or B.2)+C.75+D.8a,
A+B.1(or B.2)+C.76+D.8a, A+B.1(or B.2)+C.77+D.8a,
A+B.1(or B.2)+C.77a+D.8a, A+B.1(or B.2)+C.78+D.8a,
A+B.1(or B.2)+C.78a+D.8a, A+B.1(or B.2)+C.79+D.8a,
A+B.1(or B.2)+C.79a+D.8a, A+B.1(or B.2)+C.79b+D.8a,
A+B.1(or B.2)+C.79c+D.8a, A+B.1(or B.2)+C.80+D.8a,
A+B.1(or B.2)+C.80a+D.8a, A+B.1(or B.2)+C.81+D.8a,
A+B.1(or B.2)+C.82+D.8a, A+B.1(or B.2)+C.82a+D.8a,
A+B.1(or B.2)+C.82b+D.8a, A+B.1(or B.2)+C.83+D.8a,
A+B.1(or B.2)+C.83a+D.8a, A+B.1(or B.2)+C.84+D.8a,
A+B.1(or B.2)+C.84a+D.8a, A+B.1(or B.2)+C.84b+D.8a,
A+B.1(or B.2)+C.84c+D.8a, A+B.1(or B.2)+C.85+D.8a,
A+B.1(or B.2)+C.86+D.8a, A+B.1(or B.2)+C.87+D.8a,
A+B.1(or B.2)+C.88+D.8a, A+B.1(or B.2)+C.89+D.8a,
A+B.1(or B.2)+C.90+D.8a, A+B.1(or B.2)+C.90a+D.8a,
A+B.1(or B.2)+C.90b+D.8a, A+B.1(or B.2)+C.90c+D.8a,
A+B.1(or B.2)+C.90d+D.8a, A+B.1(or B.2)+C.90e+D.8a,
A+B.1(or B.2)+C.90f+D.8a, A+B.1(or B.2)+C.90g+D.8a,
A+B.1(or B.2)+C.90h+D.8a, A+B.1(or B.2)+C.90i+D.8a,
A+B.1(or B.2)+C.90j+D.8a, A+B.1(or B.2)+C.90k+D.8a,
A+B.1(or B.2)+C.90l+D.8a, A+B.1(or B.2)+C.90m+D.8a,
A+B.1(or B.2)+C.90n+D.8a, A+B.1(or B.2)+C.91+D.8a,
A+B.1(or B.2)+C.91a+D.8a, A+B.1(or B.2)+C.91b+D.8a,
A+B.1(or B.2)+C.91c+D.8a, A+B.1(or B.2)+C.92+D.8a,
A+B.1(or B.2)+C.92a+D.8a, A+B.1(or B.2)+C.92b+D.8a,
A+B.1(or B.2)+C.92c+D.8a, A+B.1(or B.2)+C.92d+D.8a,
A+B.1(or B.2)+C.92e+D.8a, A+B.1(or B.2)+C.92f+D.8a,
A+B.1(or B.2)+C.92g+D.8a, A+B.1(or B.2)+C.92h+D.8a,
A+B.1(or B.2)+C.92i+D.8a, A+B.1(or B.2)+C.93+D.8a,
A+B.1(or B.2)+C.93a+D.8a, A+B.1(or B.2)+C.93b+D.8a,
A+B.1(or B.2)+C.93c+D.8a, A+B.1(or B.2)+C.93d+D.8a,
A+B.1(or B.2)+C.94+D.8a, A+B.1(or B.2)+C.94a+D.8a,
A+B.1(or B.2)+C.95+D.8a, A+B.1(or B.2)+C.96+D.8a,
A+B.1(or B.2)+C.96a+D.8a, A+B.1(or B.2)+C.96b+D.8a,
A+B.1(or B.2)+C.96c+D.8a, A+B.1(or B.2)+C.97+D.8a,
A+B.1(or B.2)+C.98+D.8a, A+B.1(or B.2)+C.99+D.8a,
A+B.1(or B.2)+C.100+D.8a, A+B.1(or B.2)+C.101+D.8a,
A+B.1(or B.2)+C.102+D.8a, A+B.1(or B.2)+C.103+D.8a,
A+B.1(or B.2)+C.104+D.8a, A+B.1(or B.2)+C.104a+D.8a,
A+B.1(or B.2)+C.105+D.8a, A+B.1(or B.2)+C.106+D.8a,
A+B.1(or B.2)+C.107+D.8a, A+B.1(or B.2)+C.108+D.8a,
A+B.1(or B.2)+C.109+D.8a, A+B.1(or B.2)+C.110+D.8a,
A+B.1(or B.2)+C.111+D.8a, A+B.1(or B.2)+C.112+D.8a,
A+B.1(or B.2)+C.113+D.8a, A+B.1(or B.2)+C.114+D.8a,
A+B.1(or B.2)+C.115+D.8a, A+B.1(or B.2)+C.116+D.8a,
A+B.1(or B.2)+C.117+D.8a, A+B.1(or B.2)+C.118+D.8a,
A+B.1(or B.2)+C.119+D.8a, A+B.1(or B.2)+C.119a+D.8a,
A+B.1(or B.2)+C.120+D.8a, A+B.1(or B.2)+C.120a+D.8a,
A+B.1(or B.2)+C.120b+D.8a, A+B.1(or B.2)+C.120c+D.8a, A+B.1(or B.2)+C.120d+D.8a, A+B.1(or B.2)+C.120e+D.8a, A+B.1(or B.2)+C.120f+D.8a, A+B.1(or B.2)+C.120g+D.8a, A+B.1(or B.2)+C.120h+D.8a, A+B.1(or B.2)+C.120i+D.8a, A+B.1(or B.2)+C.121+D.8a, A+B.1(or B.2)+C.122+D.8a, A+B.1(or B.2)+C.123+D.8a, A+B.1(or B.2)+C.124+D.8a, A+B.1(or B.2)+C.125+D.8a, A+B.1(or B.2)+C.126+D.8a, A+B.1(or B.2)+C.127+D.8a, A+B.1(or B.2)+C.128+D.8a, A+B.1(or B.2)+C.129+D.8a, A+B.1(or B.2)+C.129a+D.8a, A+B.1(or B.2)+C.130+D.8a, A+B.1(or B.2)+C.131+D.8a, A+B.1(or B.2)+C.132+D.8a, A+B.1(or B.2)+C.133+D.8a, A+B.1(or B.2)+C.133a+D.8a, A+B.1(or B.2)+C.134+D.8a, A+B.1(or B.2)+C.135+D.8a, A+B.1(or B.2)+C.136+D.8a, A+B.1(or B.2)+C.137+D.8a, A+B.1(or B.2)+C.138+D.8a, A+B.1(or B.2)+C.138a+D.8a, A+B.1(or B.2)+C.139+D.8a, A+B.1(or B.2)+C.139a+D.8a, A+B.1(or B.2)+C.139b+D.8a, A+B.1(or B.2)+C.140+D.8a, A+B.1(or B.2)+C.141+D.8a, A+B.1(or B.2)+C.142+D.8a, A+B.1(or B.2)+C.143+D.8a, A+B.1(or B.2)+C.144+D.8a, A+B.1(or B.2)+C.145+D.8a, A+B.1(or B.2)+C.146+D.8a, A+B.1(or B.2)+C.147+D.8a, A+B.1(or B.2)+C.148+D.8a, A+B.1(or B.2)+C.149+D.8a, A+B.1(or B.2)+C.150+D.8a, A+B.1(or B.2)+C.151+D.8a, A+B.1(or B.2)+C.151a+D.8a, A+B.1(or B.2)+C.152+D.8a, A+B.1(or B.2)+C.152a+D.8a, A+B.1(or B.2)+C.153+D.8a, A+B.1(or B.2)+C.154+D.8a, A+B.1(or B.2)+C.154a+D.8a, A+B.1(or B.2)+C.155+D.8a, A+B.1(or B.2)+C.156+D.8a, A+B.1(or B.2)+C.157+D.8a, A+B.1(or B.2)+C.158+D.8a, A+B.1(or B.2)+C.158a+D.8a, A+B.1(or B.2)+C.159+D.8a, A+B.1(or B.2)+C.159a+D.8a, A+B.1(or B.2)+C.159b+D.8a, A+B.1(or B.2)+C.159c+D.8a,
A+B.1(or B.2)+C.160+D.8a, A+B.1(or B.2)+C.160a+D.8a,
A+B.1(or B.2)+C.161+D.8a, A+B.1(or B.2)+C.162+D.8a,
A+B.1(or B.2)+C.163+D.8a, A+B.1(or B.2)+C.163a+D.8a,
A+B.1(or B.2)+C.164+D.8a, A+B.1(or B.2)+C.165+D.8a,
A+B.1(or B.2)+C.166+D.8a,
A+B.1(or B.2)+C.1+D.9, A+B.1(or B.2)+C.2+D.9, A+B.1(or B.2)+C.3+D.9, A+B.1(or B.2)+C.4+D.9, A+B.1(or B.2)+C.5+D.9, A+B.1(or B.2)+C.5a+D.9, A+B.1(or B.2)+C.5b+D.9, A+B.1(or B.2)+C.5c+D.9, A+B.1(or B.2)+C.6+D.9, A+B.1(or B.2)+C.7+D.9, A+B.1(or B.2)+C.7a+D.9, A+B.1(or B.2)+C.7b+D.9, A+B.1(or B.2)+C.8+D.9, A+B.1(or B.2)+C.9+D.9, A+B.1(or B.2)+C.10+D.9, A+B.1(or B.2)+C.11+D.9, A+B.1(or B.2)+C.12+D.9, A+B.1(or B.2)+C.12a+D.9, A+B.1(or B.2)+C.13+D.9, A+B.1(or B.2)+C.14+D.9, A+B.1(or B.2)+C.14a+D.9, A+B.1(or B.2)+C.15+D.9, A+B.1(or B.2)+C.16+D.9, A+B.1(or B.2)+C.17+D.9, A+B.1(or B.2)+C.18+D.9, A+B.1(or B.2)+C.18a+D.9, A+B.1(or B.2)+C.19+D.9, A+B.1(or B.2)+C.19a+D.9, A+B.1(or B.2)+C.19b+D.9, A+B.1(or B.2)+C.19c+D.9, A+B.1(or B.2)+C.19d+D.9, A+B.1(or B.2)+C.20+D.9, A+B.1(or B.2)+C.21+D.9, A+B.1(or B.2)+C.21a+D.9, A+B.1(or B.2)+C.22+D.9, A+B.1(or B.2)+C.23+D.9, A+B.1(or B.2)+C.24+D.9, A+B.1(or B.2)+C.25+D.9, A+B.1(or B.2)+C.25a+D.9, A+B.1(or B.2)+C.25b+D.9, A+B.1(or B.2)+C.26+D.9, A+B.1(or B.2)+C.27+D.9, A+B.1(or B.2)+C.28+D.9, A+B.1(or B.2)+C.28a+D.9, A+B.1(or B.2)+C.29+D.9, A+B.1(or B.2)+C.30+D.9, A+B.1(or B.2)+C.30a+D.9, A+B.1(or B.2)+C.30b+D.9, A+B.1(or B.2)+C.30c+D.9, A+B.1(or B.2)+C.30d+D.9, A+B.1(or B.2)+C.30e+D.9, A+B.1(or B.2)+C.30f+D.9,

A+B.1(or B.2)+C.30g+D.9, A+B.1(or B.2)+C.31+D.9,
A+B.1(or B.2)+C.32+D.9, A+B.1(or B.2)+C.33+D.9,
A+B.1(or B.2)+C.34+D.9, A+B.1(or B.2)+C.34a+D.9,
A+B.1(or B.2)+C.35+D.9, A+B.1(or B.2)+C.35a+D.9,
A+B.1(or B.2)+C.35b+D.9, A+B.1(or B.2)+C.35c+D.9,
A+B.1(or B.2)+C.35d+D.9, A+B.1(or B.2)+C.35e+D.9,
A+B.1(or B.2)+C.35f+D.9, A+B.1(or B.2)+C.35g+D.9,
A+B.1(or B.2)+C.35h+D.9, A+B.1(or B.2)+C.35i+D.9,
A+B.1(or B.2)+C.35j+D.9, A+B.1(or B.2)+C.35k+D.9,
A+B.1(or B.2)+C.35l+D.9, A+B.1(or B.2)+C.35m+D.9,
A+B.1(or B.2)+C.35n+D.9, A+B.1(or B.2)+C.35o+D.9,
A+B.1(or B.2)+C.35p+D.9, A+B.1(or B.2)+C.35q+D.9,
A+B.1(or B.2)+C.35r+D.9, A+B.1(or B.2)+C.35s+D.9,
A+B.1(or B.2)+C.35t+D.9, A+B.1(or B.2)+C.35u+D.9,
A+B.1(or B.2)+C.35v+D.9, A+B.1(or B.2)+C.35w+D.9,
A+B.1(or B.2)+C.35x+D.9, A+B.1(or B.2)+C.35y+D.9,
A+B.1(or B.2)+C.35z+D.9, A+B.1(or B.2)+C.35zx+D.9,
A+B.1(or B.2)+C.35zy+D.9, A+B.1(or B.2)+C.36+D.9,
A+B.1(or B.2)+C.36a+D.9, A+B.1(or B.2)+C.37+D.9,
A+B.1(or B.2)+C.37a+D.9, A+B.1(or B.2)+C.37b+D.9,
A+B.1(or B.2)+C.37c+D.9, A+B.1(or B.2)+C.37d+D.9,
A+B.1(or B.2)+C.37e+D.9, A+B.1(or B.2)+C.38+D.9,
A+B.1(or B.2)+C.39+D.9, A+B.1(or B.2)+C.39a+D.9,
A+B.1(or B.2)+C.39b+D.9, A+B.1(or B.2)+C.39c+D.9,
A+B.1(or B.2)+C.39d+D.9, A+B.1(or B.2)+C.39e+D.9,
A+B.1(or B.2)+C.39f+D.9, A+B.1(or B.2)+C.39g+D.9,
A+B.1(or B.2)+C.39h+D.9, A+B.1(or B.2)+C.39i+D.9,
A+B.1(or B.2)+C.39j+D.9, A+B.1(or B.2)+C.39k+D.9,
A+B.1(or B.2)+C.39l+D.9, A+B.1(or B.2)+C.39m+D.9,
A+B.1(or B.2)+C.40+D.9, A+B.1(or B.2)+C.40a+D.9,
A+B.1(or B.2)+C.40b+D.9, A+B.1(or B.2)+C.40c+D.9,
A+B.1(or B.2)+C.40d+D.9, A+B.1(or B.2)+C.40e+D.9,
A+B.1(or B.2)+C.40f+D.9, A+B.1(or B.2)+C.40g+D.9,
A+B.1(or B.2)+C.40h+D.9, A+B.1(or B.2)+C.41+D.9,
A+B.1(or B.2)+C.41a+D.9, A+B.1(or B.2)+C.41b+D.9,
A+B.1(or B.2)+C.41c+D.9, A+B.1(or B.2)+C.41d+D.9,
A+B.1(or B.2)+C.42+D.9, A+B.1(or B.2)+C.42a+D.9,
A+B.1(or B.2)+C.43+D.9, A+B.1(or B.2)+C.44+D.9,
A+B.1(or B.2)+C.44a+D.9, A+B.1(or B.2)+C.45+D.9,
A+B.1(or B.2)+C.46+D.9, A+B.1(or B.2)+C.47+D.9,
A+B.1(or B.2)+C.48+D.9, A+B.1(or B.2)+C.48a+D.9,
A+B.1(or B.2)+C.49+D.9, A+B.1(or B.2)+C.50+D.9,
A+B.1(or B.2)+C.51+D.9, A+B.1(or B.2)+C.51a+D.9,
A+B.1(or B.2)+C.52+D.9, A+B.1(or B.2)+C.53+D.9,
A+B.1(or B.2)+C.53a+D.9, A+B.1(or B.2)+C.54+D.9,
A+B.1(or B.2)+C.54a+D.9, A+B.1(or B.2)+C.55+D.9,
A+B.1(or B.2)+C.56+D.9, A+B.1(or B.2)+C.57+D.9,
A+B.1(or B.2)+C.58+D.9, A+B.1(or B.2)+C.58a+D.9,
A+B.1(or B.2)+C.58b+D.9, A+B.1(or B.2)+C.59+D.9,
A+B.1(or B.2)+C.59a+D.9, A+B.1(or B.2)+C.60+D.9,
A+B.1(or B.2)+C.60a+D.9, A+B.1(or B.2)+C.61+D.9,
A+B.1(or B.2)+C.62+D.9, A+B.1(or B.2)+C.63+D.9,
A+B.1(or B.2)+C.64+D.9, A+B.1(or B.2)+C.64a+D.9,
A+B.1(or B.2)+C.64b+D.9, A+B.1(or B.2)+C.65+D.9,
A+B.1(or B.2)+C.66+D.9, A+B.1(or B.2)+C.66a+D.9,
A+B.1(or B.2)+C.66b+D.9, A+B.1(or B.2)+C.67+D.9,
A+B.1(or B.2)+C.68+D.9, A+B.1(or B.2)+C.69+D.9,
A+B.1(or B.2)+C.69a+D.9, A+B.1(or B.2)+C.70+D.9,
A+B.1(or B.2)+C.70a+D.9, A+B.1(or B.2)+C.70b+D.9,
A+B.1(or B.2)+C.71+D.9, A+B.1(or B.2)+C.71a+D.9,
A+B.1(or B.2)+C.71b+D.9, A+B.1(or B.2)+C.71c+D.9,
A+B.1(or B.2)+C.71d+D.9, A+B.1(or B.2)+C.71e+D.9,
A+B.1(or B.2)+C.71f+D.9, A+B.1(or B.2)+C.71g+D.9,
A+B.1(or B.2)+C.71h+D.9, A+B.1(or B.2)+C.71i+D.9,
A+B.1(or B.2)+C.71j+D.9, A+B.1(or B.2)+C.72+D.9,
A+B.1(or B.2)+C.72a+D.9, A+B.1(or B.2)+C.73+D.9,
A+B.1(or B.2)+C.73a+D.9, A+B.1(or B.2)+C.74+D.9,
A+B.1(or B.2)+C.74a+D.9, A+B.1(or B.2)+C.74b+D.9,
A+B.1(or B.2)+C.75+D.9, A+B.1(or B.2)+C.76+D.9,
A+B.1(or B.2)+C.77+D.9, A+B.1(or B.2)+C.77a+D.9,
A+B.1(or B.2)+C.78+D.9, A+B.1(or B.2)+C.78a+D.9,
A+B.1(or B.2)+C.79+D.9, A+B.1(or B.2)+C.79a+D.9,
A+B.1(or B.2)+C.79b+D.9, A+B.1(or B.2)+C.79c+D.9,
A+B.1(or B.2)+C.80+D.9, A+B.1(or B.2)+C.80a+D.9,
A+B.1(or B.2)+C.81+D.9, A+B.1(or B.2)+C.82+D.9,
A+B.1(or B.2)+C.82a+D.9, A+B.1(or B.2)+C.82b+D.9,
A+B.1(or B.2)+C.83+D.9, A+B.1(or B.2)+C.83a+D.9,
A+B.1(or B.2)+C.84+D.9, A+B.1(or B.2)+C.84a+D.9,
A+B.1(or B.2)+C.84b+D.9, A+B.1(or B.2)+C.84c+D.9,
A+B.1(or B.2)+C.85+D.9, A+B.1(or B.2)+C.86+D.9,
A+B.1(or B.2)+C.87+D.9, A+B.1(or B.2)+C.88+D.9,
A+B.1(or B.2)+C.89+D.9, A+B.1(or B.2)+C.90+D.9,
A+B.1(or B.2)+C.90a+D.9, A+B.1(or B.2)+C.90b+D.9,
A+B.1(or B.2)+C.90c+D.9, A+B.1(or B.2)+C.90d+D.9,
A+B.1(or B.2)+C.90e+D.9, A+B.1(or B.2)+C.90f+D.9,
A+B.1(or B.2)+C.90g+D.9, A+B.1(or B.2)+C.90h+D.9,
A+B.1(or B.2)+C.90i+D.9, A+B.1(or B.2)+C.90j+D.9,
A+B.1(or B.2)+C.90k+D.9, A+B.1(or B.2)+C.90l+D.9,
A+B.1(or B.2)+C.90m+D.9, A+B.1(or B.2)+C.90n+D.9,
A+B.1(or B.2)+C.91+D.9, A+B.1(or B.2)+C.91a+D.9,
A+B.1(or B.2)+C.91b+D.9, A+B.1(or B.2)+C.91c+D.9,
A+B.1(or B.2)+C.92+D.9, A+B.1(or B.2)+C.92a+D.9,
A+B.1(or B.2)+C.92b+D.9, A+B.1(or B.2)+C.92c+D.9,
A+B.1(or B.2)+C.92d+D.9, A+B.1(or B.2)+C.92e+D.9,
A+B.1(or B.2)+C.92f+D.9, A+B.1(or B.2)+C.92g+D.9,
A+B.1(or B.2)+C.92h+D.9, A+B.1(or B.2)+C.92i+D.9,
A+B.1(or B.2)+C.93+D.9, A+B.1(or B.2)+C.93a+D.9,
A+B.1(or B.2)+C.93b+D.9, A+B.1(or B.2)+C.93c+D.9,
A+B.1(or B.2)+C.93d+D.9, A+B.1(or B.2)+C.94+D.9,
A+B.1(or B.2)+C.94a+D.9, A+B.1(or B.2)+C.95+D.9,
A+B.1(or B.2)+C.96+D.9, A+B.1(or B.2)+C.96a+D.9,
A+B.1(or B.2)+C.96b+D.9, A+B.1(or B.2)+C.96c+D.9,
A+B.1(or B.2)+C.97+D.9, A+B.1(or B.2)+C.98+D.9,
A+B.1(or B.2)+C.99+D.9, A+B.1(or B.2)+C.100+D.9,
A+B.1(or B.2)+C.101+D.9, A+B.1(or B.2)+C.102+D.9,
A+B.1(or B.2)+C.103+D.9, A+B.1(or B.2)+C.104+D.9,
A+B.1(or B.2)+C.104a+D.9, A+B.1(or B.2)+C.105+D.9,
A+B.1(or B.2)+C.106+D.9, A+B.1(or B.2)+C.107+D.9,
A+B.1(or B.2)+C.108+D.9, A+B.1(or B.2)+C.109+D.9,
A+B.1(or B.2)+C.110+D.9, A+B.1(or B.2)+C.111+D.9,
A+B.1(or B.2)+C.112+D.9, A+B.1(or B.2)+C.113+D.9,
A+B.1(or B.2)+C.114+D.9, A+B.1(or B.2)+C.115+D.9,
A+B.1(or B.2)+C.116+D.9, A+B.1(or B.2)+C.117+D.9,
A+B.1(or B.2)+C.118+D.9, A+B.1(or B.2)+C.119+D.9,
A+B.1(or B.2)+C.119a+D.9, A+B.1(or B.2)+C.120+D.9,
A+B.1(or B.2)+C.120a+D.9, A+B.1(or B.2)+C.120b+D.9,
A+B.1(or B.2)+C.120c+D.9, A+B.1(or B.2)+C.120d+D.9,
A+B.1(or B.2)+C.120e+D.9, A+B.1(or B.2)+C.120f+D.9,
A+B.1(or B.2)+C.120g+D.9, A+B.1(or B.2)+C.120h+D.9,
A+B.1(or B.2)+C.120i+D.9, A+B.1(or B.2)+C.121+D.9,
A+B.1(or B.2)+C.122+D.9, A+B.1(or B.2)+C.123+D.9,
A+B.1(or B.2)+C.124+D.9, A+B.1(or B.2)+C.125+D.9,
A+B.1(or B.2)+C.126+D.9, A+B.1(or B.2)+C.127+D.9,
A+B.1(or B.2)+C.128+D.9, A+B.1(or B.2)+C.129+D.9,
A+B.1(or B.2)+C.129a+D.9, A+B.1(or B.2)+C.130+D.9,
A+B.1(or B.2)+C.131+D.9, A+B.1(or B.2)+C.132+D.9,
A+B.1(or B.2)+C.133+D.9, A+B.1(or B.2)+C.133a+D.9,
A+B.1(or B.2)+C.134+D.9, A+B.1(or B.2)+C.135+D.9,
A+B.1(or B.2)+C.136+D.9, A+B.1(or B.2)+C.137+D.9,
A+B.1(or B.2)+C.138+D.9, A+B.1(or B.2)+C.138a+D.9,
A+B.1(or B.2)+C.139+D.9, A+B.1(or B.2)+C.139a+D.9,
A+B.1(or B.2)+C.139b+D.9, A+B.1(or B.2)+C.140+D.9,
A+B.1(or B.2)+C.141+D.9, A+B.1(or B.2)+C.142+D.9,
A+B.1(or B.2)+C.143+D.9, A+B.1(or B.2)+C.144+D.9,

A+B.1(or B.2)+C.145+D.9, A+B.1(or B.2)+C.146+D.9,
A+B.1(or B.2)+C.147+D.9, A+B.1(or B.2)+C.148+D.9,
A+B.1(or B.2)+C.149+D.9, A+B.1(or B.2)+C.150+D.9,
A+B.1(or B.2)+C.151+D.9, A+B.1(or B.2)+C.151a+D.9,
A+B.1(or B.2)+C.152+D.9, A+B.1(or B.2)+C.152a+D.9,
A+B.1(or B.2)+C.153+D.9, A+B.1(or B.2)+C.154+D.9,
A+B.1(or B.2)+C.154a+D.9, A+B.1(or B.2)+C.155+D.9,
A+B.1(or B.2)+C.156+D.9, A+B.1(or B.2)+C.157+D.9,
A+B.1(or B.2)+C.158+D.9, A+B.1(or B.2)+C.158a+D.9,
A+B.1(or B.2)+C.159+D.9, A+B.1(or B.2)+C.159a+D.9,
A+B.1(or B.2)+C.159b+D.9, A+B.1(or B.2)+C.159c+D.9,
A+B.1(or B.2)+C.160+D.9, A+B.1(or B.2)+C.160a+D.9,
A+B.1(or B.2)+C.161+D.9, A+B.1(or B.2)+C.162+D.9,
A+B.1(or B.2)+C.163+D.9, A+B.1(or B.2)+C.163a+D.9,
A+B.1(or B.2)+C.164+D.9, A+B.1(or B.2)+C.165+D.9,
A+B.1(or B.2)+C.166+D.9,
A+B.1(or B.2)+C.1+D.10, A+B.1(or B.2)+C.2+D.10,
A+B.1(or B.2)+C.3+D.10, A+B.1(or B.2)+C.4+D.10,
A+B.1(or B.2)+C.5+D.10, A+B.1(or B.2)+C.5a+D.10,
A+B.1(or B.2)+C.5b+D.10, A+B.1(or B.2)+C.5c+D.10,
A+B.1(or B.2)+C.6+D.10, A+B.1(or B.2)+C.7+D.10,
A+B.1(or B.2)+C.7a+D.10, A+B.1(or B.2)+C.7b+D.10,
A+B.1(or B.2)+C.8+D.10, A+B.1(or B.2)+C.9+D.10,
A+B.1(or B.2)+C.10+D.10, A+B.1(or B.2)+C.11+D.10,
A+B.1(or B.2)+C.12+D.10, A+B.1(or B.2)+C.12a+D.10,
A+B.1(or B.2)+C.13+D.10, A+B.1(or B.2)+C.14+D.10,
A+B.1(or B.2)+C.14a+D.10, A+B.1(or B.2)+C.15+D.10,
A+B.1(or B.2)+C.16+D.10, A+B.1(or B.2)+C.17+D.10,
A+B.1(or B.2)+C.18+D.10, A+B.1(or B.2)+C.18a+D.10,
A+B.1(or B.2)+C.19+D.10, A+B.1(or B.2)+C.19a+D.10,
A+B.1(or B.2)+C.19b+D.10, A+B.1(or B.2)+C.19c+D.10,
A+B.1(or B.2)+C.19d+D.10, A+B.1(or B.2)+C.20+D.10,
A+B.1(or B.2)+C.21+D.10, A+B.1(or B.2)+C.21a+D.10,
A+B.1(or B.2)+C.22+D.10, A+B.1(or B.2)+C.23+D.10,
A+B.1(or B.2)+C.24+D.10, A+B.1(or B.2)+C.25+D.10,
A+B.1(or B.2)+C.25a+D.10, A+B.1(or B.2)+C.25b+D.10,
A+B.1(or B.2)+C.26+D.10, A+B.1(or B.2)+C.27+D.10,
A+B.1(or B.2)+C.28+D.10, A+B.1(or B.2)+C.28a+D.10,
A+B.1(or B.2)+C.29+D.10, A+B.1(or B.2)+C.30+D.10,
A+B.1(or B.2)+C.30a+D.10, A+B.1(or B.2)+C.30b+D.10,
A+B.1(or B.2)+C.30c+D.10, A+B.1(or B.2)+C.30d+D.10,
A+B.1(or B.2)+C.30e+D.10, A+B.1(or B.2)+C.30f+D.10,
A+B.1(or B.2)+C.30g+D.10, A+B.1(or B.2)+C.31+D.10,
A+B.1(or B.2)+C.32+D.10, A+B.1(or B.2)+C.33+D.10,
A+B.1(or B.2)+C.34+D.10, A+B.1(or B.2)+C.34a+D.10,
A+B.1(or B.2)+C.35+D.10, A+B.1(or B.2)+C.35a+D.10,
A+B.1(or B.2)+C.35b+D.10, A+B.1(or B.2)+C.35c+D.10,
A+B.1(or B.2)+C.35d+D.10, A+B.1(or B.2)+C.35e+D.10,
A+B.1(or B.2)+C.35f+D.10, A+B.1(or B.2)+C.35g+D.10,
A+B.1(or B.2)+C.35h+D.10, A+B.1(or B.2)+C.35i+D.10,
A+B.1(or B.2)+C.35j+D.10, A+B.1(or B.2)+C.35k+D.10,
A+B.1(or B.2)+C.35l+D.10, A+B.1(or B.2)+C.35m+D.10,
A+B.1(or B.2)+C.35n+D.10, A+B.1(or B.2)+C.35o+D.10,
A+B.1(or B.2)+C.35p+D.10, A+B.1(or B.2)+C.35q+D.10,
A+B.1(or B.2)+C.35r+D.10, A+B.1(or B.2)+C.35s+D.10,
A+B.1(or B.2)+C.35t+D.10, A+B.1(or B.2)+C.35u+D.10,
A+B.1(or B.2)+C.35v+D.10, A+B.1(or B.2)+C.35w+D.10,
A+B.1(or B.2)+C.35x+D.10, A+B.1(or B.2)+C.35y+D.10,
A+B.1(or B.2)+C.35z+D.10, A+B.1(or B.2)+C.35zx+D.10,
A+B.1(or B.2)+C.35zy+D.10, A+B.1(or B.2)+C.36+D.10,
A+B.1(or B.2)+C.36a+D.10, A+B.1(or B.2)+C.37+D.10,
A+B.1(or B.2)+C.37a+D.10, A+B.1(or B.2)+C.37b+D.10,
A+B.1(or B.2)+C.37c+D.10, A+B.1(or B.2)+C.37d+D.10,
A+B.1(or B.2)+C.37e+D.10, A+B.1(or B.2)+C.38+D.10,
A+B.1(or B.2)+C.39+D.10, A+B.1(or B.2)+C.39a+D.10,
A+B.1(or B.2)+C.39b+D.10, A+B.1(or B.2)+C.39c+D.10,
A+B.1(or B.2)+C.39d+D.10, A+B.1(or B.2)+C.39e+D.10,
A+B.1(or B.2)+C.39f+D.10, A+B.1(or B.2)+C.39g+D.10,
A+B.1(or B.2)+C.39h+D.10, A+B.1(or B.2)+C.39i+D.10,
A+B.1(or B.2)+C.39j+D.10, A+B.1(or B.2)+C.39k+D.10,
A+B.1(or B.2)+C.39l+D.10, A+B.1(or B.2)+C.39m+D.10,
A+B.1(or B.2)+C.40+D.10, A+B.1(or B.2)+C.40a+D.10,
A+B.1(or B.2)+C.40b+D.10, A+B.1(or B.2)+C.40c+D.10,
A+B.1(or B.2)+C.40d+D.10, A+B.1(or B.2)+C.40e+D.10,
A+B.1(or B.2)+C.40f+D.10, A+B.1(or B.2)+C.40g+D.10,
A+B.1(or B.2)+C.40h+D.10, A+B.1(or B.2)+C.41+D.10,
A+B.1(or B.2)+C.41a+D.10, A+B.1(or B.2)+C.41b+D.10,
A+B.1(or B.2)+C.41c+D.10, A+B.1(or B.2)+C.41d+D.10,
A+B.1(or B.2)+C.42+D.10, A+B.1(or B.2)+C.42a+D.10,
A+B.1(or B.2)+C.43+D.10, A+B.1(or B.2)+C.44+D.10,
A+B.1(or B.2)+C.44a+D.10, A+B.1(or B.2)+C.45+D.10,
A+B.1(or B.2)+C.46+D.10, A+B.1(or B.2)+C.47+D.10,
A+B.1(or B.2)+C.48+D.10, A+B.1(or B.2)+C.48a+D.10,
A+B.1(or B.2)+C.49+D.10, A+B.1(or B.2)+C.50+D.10,
A+B.1(or B.2)+C.51+D.10, A+B.1(or B.2)+C.51a+D.10,
A+B.1(or B.2)+C.52+D.10, A+B.1(or B.2)+C.53+D.10,
A+B.1(or B.2)+C.53a+D.10, A+B.1(or B.2)+C.54+D.10,
A+B.1(or B.2)+C.54a+D.10, A+B.1(or B.2)+C.55+D.10,
A+B.1(or B.2)+C.56+D.10, A+B.1(or B.2)+C.57+D.10,
A+B.1(or B.2)+C.58+D.10, A+B.1(or B.2)+C.58a+D.10,
A+B.1(or B.2)+C.58b+D.10, A+B.1(or B.2)+C.59+D.10,
A+B.1(or B.2)+C.59a+D.10, A+B.1(or B.2)+C.60+D.10,
A+B.1(or B.2)+C.60a+D.10, A+B.1(or B.2)+C.61+D.10,
A+B.1(or B.2)+C.62+D.10, A+B.1(or B.2)+C.63+D.10,
A+B.1(or B.2)+C.64+D.10, A+B.1(or B.2)+C.64a+D.10,
A+B.1(or B.2)+C.64b+D.10, A+B.1(or B.2)+C.65+D.10,
A+B.1(or B.2)+C.66+D.10, A+B.1(or B.2)+C.66a+D.10,
A+B.1(or B.2)+C.66b+D.10, A+B.1(or B.2)+C.67+D.10,
A+B.1(or B.2)+C.68+D.10, A+B.1(or B.2)+C.69+D.10,
A+B.1(or B.2)+C.69a+D.10, A+B.1(or B.2)+C.70+D.10,
A+B.1(or B.2)+C.70a+D.10, A+B.1(or B.2)+C.70b+D.10,
A+B.1(or B.2)+C.71+D.10, A+B.1(or B.2)+C.71a+D.10,
A+B.1(or B.2)+C.71b+D.10, A+B.1(or B.2)+C.71c+D.10,
A+B.1(or B.2)+C.71d+D.10, A+B.1(or B.2)+C.71e+D.10,
A+B.1(or B.2)+C.71f+D.10, A+B.1(or B.2)+C.71g+D.10,
A+B.1(or B.2)+C.71h+D.10, A+B.1(or B.2)+C.71i+D.10,
A+B.1(or B.2)+C.71j+D.10, A+B.1(or B.2)+C.72+D.10,
A+B.1(or B.2)+C.72a+D.10, A+B.1(or B.2)+C.73+D.10,
A+B.1(or B.2)+C.73a+D.10, A+B.1(or B.2)+C.74+D.10,
A+B.1(or B.2)+C.74a+D.10, A+B.1(or B.2)+C.74b+D.10,
A+B.1(or B.2)+C.75+D.10, A+B.1(or B.2)+C.76+D.10,
A+B.1(or B.2)+C.77+D.10, A+B.1(or B.2)+C.77a+D.10,
A+B.1(or B.2)+C.78+D.10, A+B.1(or B.2)+C.78a+D.10,
A+B.1(or B.2)+C.79+D.10, A+B.1(or B.2)+C.79a+D.10,
A+B.1(or B.2)+C.79b+D.10, A+B.1(or B.2)+C.79c+D.10,
A+B.1(or B.2)+C.80+D.10, A+B.1(or B.2)+C.80a+D.10,
A+B.1(or B.2)+C.81+D.10, A+B.1(or B.2)+C.82+D.10,
A+B.1(or B.2)+C.82a+D.10, A+B.1(or B.2)+C.82b+D.10,
A+B.1(or B.2)+C.83+D.10, A+B.1(or B.2)+C.83a+D.10,
A+B.1(or B.2)+C.84+D.10, A+B.1(or B.2)+C.84a+D.10,
A+B.1(or B.2)+C.84b+D.10, A+B.1(or B.2)+C.84c+D.10,
A+B.1(or B.2)+C.85+D.10, A+B.1(or B.2)+C.86+D.10,
A+B.1(or B.2)+C.87+D.10, A+B.1(or B.2)+C.88+D.10,
A+B.1(or B.2)+C.89+D.10, A+B.1(or B.2)+C.90+D.10,
A+B.1(or B.2)+C.90a+D.10, A+B.1(or B.2)+C.90b+D.10,
A+B.1(or B.2)+C.90c+D.10, A+B.1(or B.2)+C.90d+D.10,
A+B.1(or B.2)+C.90e+D.10, A+B.1(or B.2)+C.90f+D.10,
A+B.1(or B.2)+C.90g+D.10, A+B.1(or B.2)+C.90h+D.10,
A+B.1(or B.2)+C.90i+D.10, A+B.1(or B.2)+C.90j+D.10,
A+B.1(or B.2)+C.90k+D.10, A+B.1(or B.2)+C.90l+D.10,
A+B.1(or B.2)+C.90m+D.10, A+B.1(or B.2)+C.90n+D.10,
A+B.1(or B.2)+C.91+D.10, A+B.1(or B.2)+C.91a+D.10,
A+B.1(or B.2)+C.91b+D.10, A+B.1(or B.2)+C.91c+D.10,
A+B.1(or B.2)+C.92+D.10, A+B.1(or B.2)+C.92a+D.10,

A+B.1(or B.2)+C.92b+D.10, A+B.1(or B.2)+C.92c+D.10, A+B.1(or B.2)+C.92d+D.10, A+B.1(or B.2)+C.92e+D.10, A+B.1(or B.2)+C.92f+D.10, A+B.1(or B.2)+C.92g+D.10, A+B.1(or B.2)+C.92h+D.10, A+B.1(or B.2)+C.92i+D.10, A+B.1(or B.2)+C.93+D.10, A+B.1(or B.2)+C.93a+D.10, A+B.1(or B.2)+C.93b+D.10, A+B.1(or B.2)+C.93c+D.10, A+B.1(or B.2)+C.93d+D.10, A+B.1(or B.2)+C.94+D.10, A+B.1(or B.2)+C.94a+D.10, A+B.1(or B.2)+C.95+D.10, A+B.1(or B.2)+C.96+D.10, A+B.1(or B.2)+C.96a+D.10, A+B.1(or B.2)+C.96b+D.10, A+B.1(or B.2)+C.96c+D.10, A+B.1(or B.2)+C.97+D.10, A+B.1(or B.2)+C.98+D.10, A+B.1(or B.2)+C.99+D.10, A+B.1(or B.2)+C.100+D.10, A+B.1(or B.2)+C.101+D.10, A+B.1(or B.2)+C.102+D.10, A+B.1(or B.2)+C.103+D.10, A+B.1(or B.2)+C.104+D.10, A+B.1(or B.2)+C.104a+D.10, A+B.1(or B.2)+C.105+D.10, A+B.1(or B.2)+C.106+D.10, A+B.1(or B.2)+C.107+D.10, A+B.1(or B.2)+C.108+D.10, A+B.1(or B.2)+C.109+D.10, A+B.1(or B.2)+C.110+D.10, A+B.1(or B.2)+C.111+D.10, A+B.1(or B.2)+C.112+D.10, A+B.1(or B.2)+C.113+D.10, A+B.1(or B.2)+C.114+D.10, A+B.1(or B.2)+C.115+D.10, A+B.1(or B.2)+C.116+D.10, A+B.1(or B.2)+C.117+D.10, A+B.1(or B.2)+C.118+D.10, A+B.1(or B.2)+C.119+D.10, A+B.1(or B.2)+C.119a+D.10, A+B.1(or B.2)+C.120+D.10, A+B.1(or B.2)+C.120a+D.10, A+B.1(or B.2)+C.120b+D.10, A+B.1(or B.2)+C.120c+D.10, A+B.1(or B.2)+C.120d+D.10, A+B.1(or B.2)+C.120e+D.10, A+B.1(or B.2)+C.120f+D.10, A+B.1(or B.2)+C.120g+D.10, A+B.1(or B.2)+C.120h+D.10, A+B.1(or B.2)+C.120i+D.10, A+B.1(or B.2)+C.121+D.10, A+B.1(or B.2)+C.122+D.10, A+B.1(or B.2)+C.123+D.10, A+B.1(or B.2)+C.124+D.10, A+B.1(or B.2)+C.125+D.10, A+B.1(or B.2)+C.126+D.10, A+B.1(or B.2)+C.127+D.10, A+B.1(or B.2)+C.128+D.10, A+B.1(or B.2)+C.129+D.10, A+B.1(or B.2)+C.129a+D.10, A+B.1(or B.2)+C.130+D.10, A+B.1(or B.2)+C.131+D.10, A+B.1(or B.2)+C.132+D.10, A+B.1(or B.2)+C.133+D.10, A+B.1(or B.2)+C.133a+D.10, A+B.1(or B.2)+C.134+D.10, A+B.1(or B.2)+C.135+D.10, A+B.1(or B.2)+C.136+D.10, A+B.1(or B.2)+C.137+D.10, A+B.1(or B.2)+C.138+D.10, A+B.1(or B.2)+C.138a+D.10, A+B.1(or B.2)+C.139+D.10, A+B.1(or B.2)+C.139a+D.10, A+B.1(or B.2)+C.139b+D.10, A+B.1(or B.2)+C.140+D.10, A+B.1(or B.2)+C.141+D.10, A+B.1(or B.2)+C.142+D.10, A+B.1(or B.2)+C.143+D.10, A+B.1(or B.2)+C.144+D.10, A+B.1(or B.2)+C.145+D.10, A+B.1(or B.2)+C.146+D.10, A+B.1(or B.2)+C.147+D.10, A+B.1(or B.2)+C.148+D.10, A+B.1(or B.2)+C.149+D.10, A+B.1(or B.2)+C.150+D.10, A+B.1(or B.2)+C.151+D.10, A+B.1(or B.2)+C.151a+D.10, A+B.1(or B.2)+C.152+D.10, A+B.1(or B.2)+C.152a+D.10, A+B.1(or B.2)+C.153+D.10, A+B.1(or B.2)+C.154+D.10, A+B.1(or B.2)+C.154a+D.10, A+B.1(or B.2)+C.155+D.10, A+B.1(or B.2)+C.156+D.10, A+B.1(or B.2)+C.157+D.10, A+B.1(or B.2)+C.158+D.10, A+B.1(or B.2)+C.158a+D.10, A+B.1(or B.2)+C.159+D.10, A+B.1(or B.2)+C.159a+D.10, A+B.1(or B.2)+C.159b+D.10, A+B.1(or B.2)+C.159c+D.10, A+B.1(or B.2)+C.160+D.10, A+B.1(or B.2)+C.160a+D.10, A+B.1(or B.2)+C.161+D.10, A+B.1(or B.2)+C.162+D.10, A+B.1(or B.2)+C.163+D.10, A+B.1(or B.2)+C.163a+D.10, A+B.1(or B.2)+C.164+D.10, A+B.1(or B.2)+C.165+D.10, A+B.1(or B.2)+C.166+D.10,

A+B.1(or B.2)+C.1+D.12, A+B.1(or B.2)+C.2+D.12, A+B.1(or B.2)+C.3+D.12, A+B.1(or B.2)+C.4+D.12, A+B.1(or B.2)+C.5+D.12, A+B.1(or B.2)+C.5a+D.12, A+B.1(or B.2)+C.5b+D.12, A+B.1(or B.2)+C.5c+D.12, A+B.1(or B.2)+C.6+D.12, A+B.1(or B.2)+C.7+D.12, A+B.1(or B.2)+C.7a+D.12, A+B.1(or B.2)+C.7b+D.12, A+B.1(or B.2)+C.8+D.12, A+B.1(or B.2)+C.9+D.12, A+B.1(or B.2)+C.10+D.12, A+B.1(or B.2)+C.11+D.12, A+B.1(or B.2)+C.12+D.12, A+B.1(or B.2)+C.12a+D.12, A+B.1(or B.2)+C.13+D.12, A+B.1(or B.2)+C.14+D.12, A+B.1(or B.2)+C.14a+D.12, A+B.1(or B.2)+C.15+D.12, A+B.1(or B.2)+C.16+D.12, A+B.1(or B.2)+C.17+D.12, A+B.1(or B.2)+C.18+D.12, A+B.1(or B.2)+C.18a+D.12, A+B.1(or B.2)+C.19+D.12, A+B.1(or B.2)+C.19a+D.12, A+B.1(or B.2)+C.19b+D.12, A+B.1(or B.2)+C.19c+D.12, A+B.1(or B.2)+C.19d+D.12, A+B.1(or B.2)+C.20+D.12, A+B.1(or B.2)+C.21+D.12, A+B.1(or B.2)+C.21a+D.12, A+B.1(or B.2)+C.22+D.12, A+B.1(or B.2)+C.23+D.12, A+B.1(or B.2)+C.24+D.12, A+B.1(or B.2)+C.25+D.12, A+B.1(or B.2)+C.25a+D.12, A+B.1(or B.2)+C.25b+D.12, A+B.1(or B.2)+C.26+D.12, A+B.1(or B.2)+C.27+D.12, A+B.1(or B.2)+C.28+D.12, A+B.1(or B.2)+C.28a+D.12, A+B.1(or B.2)+C.29+D.12, A+B.1(or B.2)+C.30+D.12, A+B.1(or B.2)+C.30a+D.12, A+B.1(or B.2)+C.30b+D.12, A+B.1(or B.2)+C.30c+D.12, A+B.1(or B.2)+C.30d+D.12, A+B.1(or B.2)+C.30e+D.12, A+B.1(or B.2)+C.30f+D.12, A+B.1(or B.2)+C.30g+D.12, A+B.1(or B.2)+C.31+D.12, A+B.1(or B.2)+C.32+D.12, A+B.1(or B.2)+C.33+D.12, A+B.1(or B.2)+C.34+D.12, A+B.1(or B.2)+C.34a+D.12, A+B.1(or B.2)+C.35+D.12, A+B.1(or B.2)+C.35a+D.12, A+B.1(or B.2)+C.35b+D.12, A+B.1(or B.2)+C.35c+D.12, A+B.1(or B.2)+C.35d+D.12, A+B.1(or B.2)+C.35e+D.12, A+B.1(or B.2)+C.35f+D.12, A+B.1(or B.2)+C.35g+D.12, A+B.1(or B.2)+C.35h+D.12, A+B.1(or B.2)+C.35i+D.12, A+B.1(or B.2)+C.35j+D.12, A+B.1(or B.2)+C.35k+D.12, A+B.1(or B.2)+C.35l+D.12, A+B.1(or B.2)+C.35m+D.12, A+B.1(or B.2)+C.35n+D.12, A+B.1(or B.2)+C.35o+D.12, A+B.1(or B.2)+C.35p+D.12, A+B.1(or B.2)+C.35q+D.12, A+B.1(or B.2)+C.35r+D.12, A+B.1(or B.2)+C.35s+D.12, A+B.1(or B.2)+C.35t+D.12, A+B.1(or B.2)+C.35u+D.12, A+B.1(or B.2)+C.35v+D.12, A+B.1(or B.2)+C.35w+D.12, A+B.1(or B.2)+C.35x+D.12, A+B.1(or B.2)+C.35y+D.12, A+B.1(or B.2)+C.35z+D.12, A+B.1(or B.2)+C.35zx+D.12, A+B.1(or B.2)+C.35zy+D.12, A+B.1(or B.2)+C.36+D.12, A+B.1(or B.2)+C.36a+D.12, A+B.1(or B.2)+C.37+D.12, A+B.1(or B.2)+C.37a+D.12, A+B.1(or B.2)+C.37b+D.12, A+B.1(or B.2)+C.37c+D.12, A+B.1(or B.2)+C.37d+D.12, A+B.1(or B.2)+C.37e+D.12, A+B.1(or B.2)+C.38+D.12, A+B.1(or B.2)+C.39+D.12, A+B.1(or B.2)+C.39a+D.12, A+B.1(or B.2)+C.39b+D.12, A+B.1(or B.2)+C.39c+D.12, A+B.1(or B.2)+C.39d+D.12, A+B.1(or B.2)+C.39e+D.12, A+B.1(or B.2)+C.39f+D.12, A+B.1(or B.2)+C.39g+D.12, A+B.1(or B.2)+C.39h+D.12, A+B.1(or B.2)+C.39i+D.12, A+B.1(or B.2)+C.39j+D.12, A+B.1(or B.2)+C.39k+D.12, A+B.1(or B.2)+C.39l+D.12, A+B.1(or B.2)+C.39m+D.12, A+B.1(or B.2)+C.40+D.12, A+B.1(or B.2)+C.40a+D.12, A+B.1(or B.2)+C.40b+D.12, A+B.1(or B.2)+C.40c+D.12, A+B.1(or B.2)+C.40d+D.12, A+B.1(or B.2)+C.40e+D.12, A+B.1(or B.2)+C.40f+D.12, A+B.1(or B.2)+C.40g+D.12, A+B.1(or B.2)+C.40h+D.12, A+B.1(or B.2)+C.41+D.12, A+B.1(or B.2)+C.41a+D.12, A+B.1(or B.2)+C.41b+D.12, A+B.1(or B.2)+C.41c+D.12, A+B.1(or B.2)+C.41d+D.12, A+B.1(or B.2)+C.42+D.12, A+B.1(or B.2)+C.42a+D.12, A+B.1(or B.2)+C.43+D.12, A+B.1(or B.2)+C.44+D.12, A+B.1(or B.2)+C.44a+D.12, A+B.1(or B.2)+C.45+D.12, A+B.1(or B.2)+C.46+D.12, A+B.1(or B.2)+C.47+D.12, A+B.1(or B.2)+C.48+D.12, A+B.1(or B.2)+C.48a+D.12, A+B.1(or B.2)+C.49+D.12, A+B.1(or B.2)+C.50+D.12, A+B.1(or B.2)+C.51+D.12, A+B.1(or B.2)+C.51a+D.12, A+B.1(or B.2)+C.52+D.12, A+B.1(or B.2)+C.53+D.12, A+B.1(or B.2)+C.53a+D.12, A+B.1(or B.2)+C.54+D.12, A+B.1(or B.2)+C.54a+D.12, A+B.1(or B.2)+C.55+D.12, A+B.1(or B.2)+C.56+D.12, A+B.1(or B.2)+C.57+D.12, A+B.1(or B.2)+C.58+D.12, A+B.1(or B.2)+C.58a+D.12, A+B.1(or B.2)+C.58b+D.12, A+B.1(or B.2)+C.59+D.12,

A+B.1(or B.2)+C.59a+D.12, A+B.1(or B.2)+C.60+D.12, A+B.1(or B.2)+C.60a+D.12, A+B.1(or B.2)+C.61+D.12, A+B.1(or B.2)+C.62+D.12, A+B.1(or B.2)+C.63+D.12, A+B.1(or B.2)+C.64+D.12, A+B.1(or B.2)+C.64a+D.12, A+B.1(or B.2)+C.64b+D.12, A+B.1(or B.2)+C.65+D.12, A+B.1(or B.2)+C.66+D.12, A+B.1(or B.2)+C.66a+D.12, A+B.1(or B.2)+C.66b+D.12, A+B.1(or B.2)+C.67+D.12, A+B.1(or B.2)+C.68+D.12, A+B.1(or B.2)+C.69+D.12, A+B.1(or B.2)+C.69a+D.12, A+B.1(or B.2)+C.70+D.12, A+B.1(or B.2)+C.70a+D.12, A+B.1(or B.2)+C.70b+D.12, A+B.1(or B.2)+C.71+D.12, A+B.1(or B.2)+C.71a+D.12, A+B.1(or B.2)+C.71b+D.12, A+B.1(or B.2)+C.71c+D.12, A+B.1(or B.2)+C.71d+D.12, A+B.1(or B.2)+C.71e+D.12, A+B.1(or B.2)+C.71f+D.12, A+B.1(or B.2)+C.71g+D.12, A+B.1(or B.2)+C.71h+D.12, A+B.1(or B.2)+C.71i+D.12, A+B.1(or B.2)+C.71j+D.12, A+B.1(or B.2)+C.72+D.12, A+B.1(or B.2)+C.72a+D.12, A+B.1(or B.2)+C.73+D.12, A+B.1(or B.2)+C.73a+D.12, A+B.1(or B.2)+C.74+D.12, A+B.1(or B.2)+C.74a+D.12, A+B.1(or B.2)+C.74b+D.12, A+B.1(or B.2)+C.75+D.12, A+B.1(or B.2)+C.76+D.12, A+B.1(or B.2)+C.77+D.12, A+B.1(or B.2)+C.77a+D.12, A+B.1(or B.2)+C.78+D.12, A+B.1(or B.2)+C.78a+D.12, A+B.1(or B.2)+C.79+D.12, A+B.1(or B.2)+C.79a+D.12, A+B.1(or B.2)+C.79b+D.12, A+B.1(or B.2)+C.79c+D.12, A+B.1(or B.2)+C.80+D.12, A+B.1(or B.2)+C.80a+D.12, A+B.1(or B.2)+C.81+D.12, A+B.1(or B.2)+C.82+D.12, A+B.1(or B.2)+C.82a+D.12, A+B.1(or B.2)+C.82b+D.12, A+B.1(or B.2)+C.83+D.12, A+B.1(or B.2)+C.83a+D.12, A+B.1(or B.2)+C.84+D.12, A+B.1(or B.2)+C.84a+D.12, A+B.1(or B.2)+C.84b+D.12, A+B.1(or B.2)+C.84c+D.12, A+B.1(or B.2)+C.85+D.12, A+B.1(or B.2)+C.86+D.12, A+B.1(or B.2)+C.87+D.12, A+B.1(or B.2)+C.88+D.12, A+B.1(or B.2)+C.89+D.12, A+B.1(or B.2)+C.90+D.12, A+B.1(or B.2)+C.90a+D.12, A+B.1(or B.2)+C.90b+D.12, A+B.1(or B.2)+C.90c+D.12, A+B.1(or B.2)+C.90d+D.12, A+B.1(or B.2)+C.90e+D.12, A+B.1(or B.2)+C.90f+D.12, A+B.1(or B.2)+C.90g+D.12, A+B.1(or B.2)+C.90h+D.12, A+B.1(or B.2)+C.90i+D.12, A+B.1(or B.2)+C.90j+D.12, A+B.1(or B.2)+C.90k+D.12, A+B.1(or B.2)+C.90l+D.12, A+B.1(or B.2)+C.90m+D.12, A+B.1(or B.2)+C.90n+D.12, A+B.1(or B.2)+C.91+D.12, A+B.1(or B.2)+C.91a+D.12, A+B.1(or B.2)+C.91b+D.12, A+B.1(or B.2)+C.91c+D.12, A+B.1(or B.2)+C.92+D.12, A+B.1(or B.2)+C.92a+D.12, A+B.1(or B.2)+C.92b+D.12, A+B.1(or B.2)+C.92c+D.12, A+B.1(or B.2)+C.92d+D.12, A+B.1(or B.2)+C.92e+D.12, A+B.1(or B.2)+C.92f+D.12, A+B.1(or B.2)+C.92g+D.12, A+B.1(or B.2)+C.92h+D.12, A+B.1(or B.2)+C.92i+D.12, A+B.1(or B.2)+C.93+D.12, A+B.1(or B.2)+C.93a+D.12, A+B.1(or B.2)+C.93b+D.12, A+B.1(or B.2)+C.93c+D.12, A+B.1(or B.2)+C.93d+D.12, A+B.1(or B.2)+C.94+D.12, A+B.1(or B.2)+C.94a+D.12, A+B.1(or B.2)+C.95+D.12, A+B.1(or B.2)+C.96+D.12, A+B.1(or B.2)+C.96a+D.12, A+B.1(or B.2)+C.96b+D.12, A+B.1(or B.2)+C.96c+D.12, A+B.1(or B.2)+C.97+D.12, A+B.1(or B.2)+C.98+D.12, A+B.1(or B.2)+C.99+D.12, A+B.1(or B.2)+C.100+D.12, A+B.1(or B.2)+C.101+D.12, A+B.1(or B.2)+C.102+D.12, A+B.1(or B.2)+C.103+D.12, A+B.1(or B.2)+C.104+D.12, A+B.1(or B.2)+C.104a+D.12, A+B.1(or B.2)+C.105+D.12, A+B.1(or B.2)+C.106+D.12, A+B.1(or B.2)+C.107+D.12, A+B.1(or B.2)+C.108+D.12, A+B.1(or B.2)+C.109+D.12, A+B.1(or B.2)+C.110+D.12, A+B.1(or B.2)+C.111+D.12, A+B.1(or B.2)+C.112+D.12, A+B.1(or B.2)+C.113+D.12, A+B.1(or B.2)+C.114+D.12, A+B.1(or B.2)+C.115+D.12, A+B.1(or B.2)+C.116+D.12, A+B.1(or B.2)+C.117+D.12, A+B.1(or B.2)+C.118+D.12, A+B.1(or B.2)+C.119+D.12, A+B.1(or B.2)+C.119a+D.12, A+B.1(or B.2)+C.120+D.12, A+B.1(or B.2)+C.120a+D.12, A+B.1(or B.2)+C.120b+D.12, A+B.1(or B.2)+C.120c+D.12, A+B.1(or B.2)+C.120d+D.12, A+B.1(or B.2)+C.120e+D.12, A+B.1(or B.2)+C.120f+D.12, A+B.1(or B.2)+C.120g+D.12, A+B.1(or B.2)+C.120h+D.12, A+B.1(or B.2)+C.120i+D.12, A+B.1(or B.2)+C.121+D.12, A+B.1(or B.2)+C.122+D.12, A+B.1(or B.2)+C.123+D.12, A+B.1(or B.2)+C.124+D.12, A+B.1(or B.2)+C.125+D.12, A+B.1(or B.2)+C.126+D.12, A+B.1(or B.2)+C.127+D.12, A+B.1(or B.2)+C.128+D.12, A+B.1(or B.2)+C.129+D.12, A+B.1(or B.2)+C.129a+D.12, A+B.1(or B.2)+C.130+D.12, A+B.1(or B.2)+C.131+D.12, A+B.1(or B.2)+C.132+D.12, A+B.1(or B.2)+C.133+D.12, A+B.1(or B.2)+C.133a+D.12, A+B.1(or B.2)+C.134+D.12, A+B.1(or B.2)+C.135+D.12, A+B.1(or B.2)+C.136+D.12, A+B.1(or B.2)+C.137+D.12, A+B.1(or B.2)+C.138+D.12, A+B.1(or B.2)+C.138a+D.12, A+B.1(or B.2)+C.139+D.12, A+B.1(or B.2)+C.139a+D.12, A+B.1(or B.2)+C.139b+D.12, A+B.1(or B.2)+C.140+D.12, A+B.1(or B.2)+C.141+D.12, A+B.1(or B.2)+C.142+D.12, A+B.1(or B.2)+C.143+D.12, A+B.1(or B.2)+C.144+D.12, A+B.1(or B.2)+C.145+D.12, A+B.1(or B.2)+C.146+D.12, A+B.1(or B.2)+C.147+D.12, A+B.1(or B.2)+C.148+D.12, A+B.1(or B.2)+C.149+D.12, A+B.1(or B.2)+C.150+D.12, A+B.1(or B.2)+C.151+D.12, A+B.1(or B.2)+C.151a+D.12, A+B.1(or B.2)+C.152+D.12, A+B.1(or B.2)+C.152a+D.12, A+B.1(or B.2)+C.153+D.12, A+B.1(or B.2)+C.154+D.12, A+B.1(or B.2)+C.154a+D.12, A+B.1(or B.2)+C.155+D.12, A+B.1(or B.2)+C.156+D.12, A+B.1(or B.2)+C.157+D.12, A+B.1(or B.2)+C.158+D.12, A+B.1(or B.2)+C.158a+D.12, A+B.1(or B.2)+C.159+D.12, A+B.1(or B.2)+C.159a+D.12, A+B.1(or B.2)+C.159b+D.12, A+B.1(or B.2)+C.159c+D.12, A+B.1(or B.2)+C.160+D.12, A+B.1(or B.2)+C.160a+D.12, A+B.1(or B.2)+C.161+D.12, A+B.1(or B.2)+C.162+D.12, A+B.1(or B.2)+C.163+D.12, A+B.1(or B.2)+C.163a+D.12, A+B.1(or B.2)+C.164+D.12, A+B.1(or B.2)+C.165+D.12, A+B.1(or B.2)+C.166+D.12,

A+B.1(or B.2)+C.1+D.13a, A+B.1(or B.2)+C.2+D.13a, A+B.1(or B.2)+C.3+D.13a, A+B.1(or B.2)+C.4+D.13a, A+B.1(or B.2)+C.5+D.13a, A+B.1(or B.2)+C.5a+D.13a, A+B.1(or B.2)+C.5b+D.13a, A+B.1(or B.2)+C.5c+D.13a, A+B.1(or B.2)+C.6+D.13a, A+B.1(or B.2)+C.7+D.13a, A+B.1(or B.2)+C.7a+D.13a, A+B.1(or B.2)+C.7b+D.13a, A+B.1(or B.2)+C.8+D.13a, A+B.1(or B.2)+C.9+D.13a, A+B.1(or B.2)+C.10+D.13a, A+B.1(or B.2)+C.11+D.13a, A+B.1(or B.2)+C.12+D.13a, A+B.1(or B.2)+C.12a+D.13a, A+B.1(or B.2)+C.13+D.13a, A+B.1(or B.2)+C.14+D.13a, A+B.1(or B.2)+C.14a+D.13a, A+B.1(or B.2)+C.15+D.13a, A+B.1(or B.2)+C.16+D.13a, A+B.1(or B.2)+C.17+D.13a, A+B.1(or B.2)+C.18+D.13a, A+B.1(or B.2)+C.18a+D.13a, A+B.1(or B.2)+C.19+D.13a, A+B.1(or B.2)+C.19a+D.13a, A+B.1(or B.2)+C.19b+D.13a, A+B.1(or B.2)+C.19c+D.13a, A+B.1(or B.2)+C.19d+D.13a, A+B.1(or B.2)+C.20+D.13a, A+B.1(or B.2)+C.21+D.13a, A+B.1(or B.2)+C.21a+D.13a, A+B.1(or B.2)+C.22+D.13a, A+B.1(or B.2)+C.23+D.13a, A+B.1(or B.2)+C.24+D.13a, A+B.1(or B.2)+C.25+D.13a, A+B.1(or B.2)+C.25a+D.13a, A+B.1(or B.2)+C.25b+D.13a, A+B.1(or B.2)+C.26+D.13a, A+B.1(or B.2)+C.27+D.13a, A+B.1(or B.2)+C.28+D.13a, A+B.1(or B.2)+C.28a+D.13a, A+B.1(or B.2)+C.29+D.13a, A+B.1(or B.2)+C.30+D.13a, A+B.1(or B.2)+C.30a+D.13a, A+B.1(or B.2)+C.30b+D.13a, A+B.1(or B.2)+C.30c+D.13a, A+B.1(or B.2)+C.30d+D.13a, A+B.1(or B.2)+C.30e+D.13a, A+B.1(or B.2)+C.30f+D.13a, A+B.1(or B.2)+C.30g+D.13a, A+B.1(or B.2)+C.31+D.13a, A+B.1(or B.2)+C.32+D.13a, A+B.1(or B.2)+C.33+D.13a, A+B.1(or B.2)+C.34+D.13a, A+B.1(or B.2)+C.34a+D.13a, A+B.1(or B.2)+C.35+D.13a, A+B.1(or B.2)+C.35a+D.13a, A+B.1(or B.2)+C.35b+D.13a, A+B.1(or B.2)+C.35c+D.13a, A+B.1(or B.2)+C.35d+D.13a, A+B.1(or

B.2)+C.35e+D.13a, A+B.1(or B.2)+C.35f+D.13a, A+B.1(or B.2)+C.35g+D.13a, A+B.1(or B.2)+C.35h+D.13a, A+B.1(or B.2)+C.35i+D.13a, A+B.1(or B.2)+C.35j+D.13a, A+B.1(or B.2)+C.35k+D.13a, A+B.1(or B.2)+C.35l+D.13a, A+B.1(or B.2)+C.35m+D.13a, A+B.1(or B.2)+C.35n+D.13a, A+B.1(or B.2)+C.35o+D.13a, A+B.1(or B.2)+C.35p+D.13a, A+B.1(or B.2)+C.35q+D.13a, A+B.1(or B.2)+C.35r+D.13a, A+B.1(or B.2)+C.35s+D.13a, A+B.1(or B.2)+C.35t+D.13a, A+B.1(or B.2)+C.35u+D.13a, A+B.1(or B.2)+C.35v+D.13a, A+B.1(or B.2)+C.35w+D.13a, A+B.1(or B.2)+C.35x+D.13a, A+B.1(or B.2)+C.35y+D.13a, A+B.1(or B.2)+C.35z+D.13a, A+B.1(or B.2)+C.35zx+D.13a, A+B.1(or B.2)+C.35zy+D.13a, A+B.1(or B.2)+C.36+D.13a, A+B.1(or B.2)+C.36a+D.13a, A+B.1(or B.2)+C.37+D.13a, A+B.1(or B.2)+C.37a+D.13a, A+B.1(or B.2)+C.37b+D.13a, A+B.1(or B.2)+C.37c+D.13a, A+B.1(or B.2)+C.37d+D.13a, A+B.1(or B.2)+C.37e+D.13a, A+B.1(or B.2)+C.38+D.13a, A+B.1(or B.2)+C.39+D.13a, A+B.1(or B.2)+C.39a+D.13a, A+B.1(or B.2)+C.39b+D.13a, A+B.1(or B.2)+C.39c+D.13a, A+B.1(or B.2)+C.39d+D.13a, A+B.1(or B.2)+C.39e+D.13a, A+B.1(or B.2)+C.39f+D.13a, A+B.1(or B.2)+C.39g+D.13a, A+B.1(or B.2)+C.39h+D.13a, A+B.1(or B.2)+C.39i+D.13a, A+B.1(or B.2)+C.39j+D.13a, A+B.1(or B.2)+C.39k+D.13a, A+B.1(or B.2)+C.39l+D.13a, A+B.1(or B.2)+C.39m+D.13a, A+B.1(or B.2)+C.40+D.13a, A+B.1(or B.2)+C.40a+D.13a, A+B.1(or B.2)+C.40b+D.13a, A+B.1(or B.2)+C.40c+D.13a, A+B.1(or B.2)+C.40d+D.13a, A+B.1(or B.2)+C.40e+D.13a, A+B.1(or B.2)+C.40f+D.13a, A+B.1(or B.2)+C.40g+D.13a, A+B.1(or B.2)+C.40h+D.13a, A+B.1(or B.2)+C.41+D.13a, A+B.1(or B.2)+C.41a+D.13a, A+B.1(or B.2)+C.41b+D.13a, A+B.1(or B.2)+C.41c+D.13a, A+B.1(or B.2)+C.41d+D.13a, A+B.1(or B.2)+C.42+D.13a, A+B.1(or B.2)+C.42a+D.13a, A+B.1(or B.2)+C.43+D.13a, A+B.1(or B.2)+C.44+D.13a, A+B.1(or B.2)+C.44a+D.13a, A+B.1(or B.2)+C.45+D.13a, A+B.1(or B.2)+C.46+D.13a, A+B.1(or B.2)+C.47+D.13a, A+B.1(or B.2)+C.48+D.13a, A+B.1(or B.2)+C.48a+D.13a, A+B.1(or B.2)+C.49+D.13a, A+B.1(or B.2)+C.50+D.13a, A+B.1(or B.2)+C.51+D.13a, A+B.1(or B.2)+C.51a+D.13a, A+B.1(or B.2)+C.52+D.13a, A+B.1(or B.2)+C.53+D.13a, A+B.1(or B.2)+C.53a+D.13a, A+B.1(or B.2)+C.54+D.13a, A+B.1(or B.2)+C.54a+D.13a, A+B.1(or B.2)+C.55+D.13a, A+B.1(or B.2)+C.56+D.13a, A+B.1(or B.2)+C.57+D.13a, A+B.1(or B.2)+C.58+D.13a, A+B.1(or B.2)+C.58a+D.13a, A+B.1(or B.2)+C.58b+D.13a, A+B.1(or B.2)+C.59+D.13a, A+B.1(or B.2)+C.59a+D.13a, A+B.1(or B.2)+C.60+D.13a, A+B.1(or B.2)+C.60a+D.13a, A+B.1(or B.2)+C.61+D.13a, A+B.1(or B.2)+C.62+D.13a, A+B.1(or B.2)+C.63+D.13a, A+B.1(or B.2)+C.64+D.13a, A+B.1(or B.2)+C.64a+D.13a, A+B.1(or B.2)+C.64b+D.13a, A+B.1(or B.2)+C.65+D.13a, A+B.1(or B.2)+C.66+D.13a, A+B.1(or B.2)+C.66a+D.13a, A+B.1(or B.2)+C.66b+D.13a, A+B.1(or B.2)+C.67+D.13a, A+B.1(or B.2)+C.68+D.13a, A+B.1(or B.2)+C.69+D.13a, A+B.1(or B.2)+C.69a+D.13a, A+B.1(or B.2)+C.70+D.13a, A+B.1(or B.2)+C.70a+D.13a, A+B.1(or B.2)+C.70b+D.13a, A+B.1(or B.2)+C.71+D.13a, A+B.1(or B.2)+C.71a+D.13a, A+B.1(or B.2)+C.71b+D.13a, A+B.1(or B.2)+C.71c+D.13a, A+B.1(or B.2)+C.71d+D.13a, A+B.1(or B.2)+C.71e+D.13a, A+B.1(or B.2)+C.71f+D.13a, A+B.1(or B.2)+C.71g+D.13a, A+B.1(or B.2)+C.71h+D.13a, A+B.1(or B.2)+C.71i+D.13a, A+B.1(or B.2)+C.71j+D.13a, A+B.1(or B.2)+C.72+D.13a, A+B.1(or B.2)+C.72a+D.13a, A+B.1(or B.2)+C.73+D.13a, A+B.1(or B.2)+C.73a+D.13a, A+B.1(or B.2)+C.74+D.13a, A+B.1(or B.2)+C.74a+D.13a, A+B.1(or B.2)+C.74b+D.13a, A+B.1(or B.2)+C.75+D.13a, A+B.1(or B.2)+C.76+D.13a, A+B.1(or B.2)+C.77+D.13a, A+B.1(or B.2)+C.77a+D.13a, A+B.1(or B.2)+C.78+D.13a, A+B.1(or B.2)+C.78a+D.13a, A+B.1(or B.2)+C.79+D.13a, A+B.1(or B.2)+C.79a+D.13a, A+B.1(or B.2)+C.79b+D.13a, A+B.1(or B.2)+C.79c+D.13a, A+B.1(or B.2)+C.80+D.13a, A+B.1(or B.2)+C.80a+D.13a, A+B.1(or B.2)+C.81+D.13a, A+B.1(or B.2)+C.82+D.13a, A+B.1(or B.2)+C.82a+D.13a, A+B.1(or B.2)+C.82b+D.13a, A+B.1(or B.2)+C.83+D.13a, A+B.1(or B.2)+C.83a+D.13a, A+B.1(or B.2)+C.84+D.13a, A+B.1(or B.2)+C.84a+D.13a, A+B.1(or B.2)+C.84b+D.13a, A+B.1(or B.2)+C.84c+D.13a, A+B.1(or B.2)+C.85+D.13a, A+B.1(or B.2)+C.86+D.13a, A+B.1(or B.2)+C.87+D.13a, A+B.1(or B.2)+C.88+D.13a, A+B.1(or B.2)+C.89+D.13a, A+B.1(or B.2)+C.90+D.13a, A+B.1(or B.2)+C.90a+D.13a, A+B.1(or B.2)+C.90b+D.13a, A+B.1(or B.2)+C.90c+D.13a, A+B.1(or B.2)+C.90d+D.13a, A+B.1(or B.2)+C.90e+D.13a, A+B.1(or B.2)+C.90f+D.13a, A+B.1(or B.2)+C.90g+D.13a, A+B.1(or B.2)+C.90h+D.13a, A+B.1(or B.2)+C.90i+D.13a, A+B.1(or B.2)+C.90j+D.13a, A+B.1(or B.2)+C.90k+D.13a, A+B.1(or B.2)+C.90l+D.13a, A+B.1(or B.2)+C.90m+D.13a, A+B.1(or B.2)+C.90n+D.13a, A+B.1(or B.2)+C.91+D.13a, A+B.1(or B.2)+C.91a+D.13a, A+B.1(or B.2)+C.91b+D.13a, A+B.1(or B.2)+C.91c+D.13a, A+B.1(or B.2)+C.92+D.13a, A+B.1(or B.2)+C.92a+D.13a, A+B.1(or B.2)+C.92b+D.13a, A+B.1(or B.2)+C.92c+D.13a, A+B.1(or B.2)+C.92d+D.13a, A+B.1(or B.2)+C.92e+D.13a, A+B.1(or B.2)+C.92f+D.13a, A+B.1(or B.2)+C.92g+D.13a, A+B.1(or B.2)+C.92h+D.13a, A+B.1(or B.2)+C.92i+D.13a, A+B.1(or B.2)+C.93+D.13a, A+B.1(or B.2)+C.93a+D.13a, A+B.1(or B.2)+C.93b+D.13a, A+B.1(or B.2)+C.93c+D.13a, A+B.1(or B.2)+C.93d+D.13a, A+B.1(or B.2)+C.94+D.13a, A+B.1(or B.2)+C.94a+D.13a, A+B.1(or B.2)+C.95+D.13a, A+B.1(or B.2)+C.96+D.13a, A+B.1(or B.2)+C.96a+D.13a, A+B.1(or B.2)+C.96b+D.13a, A+B.1(or B.2)+C.96c+D.13a, A+B.1(or B.2)+C.97+D.13a, A+B.1(or B.2)+C.98+D.13a, A+B.1(or B.2)+C.99+D.13a, A+B.1(or B.2)+C.100+D.13a, A+B.1(or B.2)+C.101+D.13a, A+B.1(or B.2)+C.102+D.13a, A+B.1(or B.2)+C.103+D.13a, A+B.1(or B.2)+C.104+D.13a, A+B.1(or B.2)+C.104a+D.13a, A+B.1(or B.2)+C.105+D.13a, A+B.1(or B.2)+C.106+D.13a, A+B.1(or B.2)+C.107+D.13a, A+B.1(or B.2)+C.108+D.13a, A+B.1(or B.2)+C.109+D.13a, A+B.1(or B.2)+C.110+D.13a, A+B.1(or B.2)+C.111+D.13a, A+B.1(or B.2)+C.112+D.13a, A+B.1(or B.2)+C.113+D.13a, A+B.1(or B.2)+C.114+D.13a, A+B.1(or B.2)+C.115+D.13a, A+B.1(or B.2)+C.116+D.13a, A+B.1(or B.2)+C.117+D.13a, A+B.1(or B.2)+C.118+D.13a, A+B.1(or B.2)+C.119+D.13a, A+B.1(or B.2)+C.119a+D.13a, A+B.1(or B.2)+C.120+D.13a, A+B.1(or B.2)+C.120a+D.13a, A+B.1(or B.2)+C.120b+D.13a, A+B.1(or B.2)+C.120c+D.13a, A+B.1(or B.2)+C.120d+D.13a, A+B.1(or B.2)+C.120e+D.13a, A+B.1(or B.2)+C.120f+D.13a, A+B.1(or B.2)+C.120g+D.13a, A+B.1(or B.2)+C.120h+D.13a, A+B.1(or B.2)+C.120i+D.13a, A+B.1(or B.2)+C.121+D.13a, A+B.1(or B.2)+C.122+D.13a, A+B.1(or B.2)+C.123+D.13a, A+B.1(or B.2)+C.124+D.13a, A+B.1(or B.2)+C.125+D.13a, A+B.1(or B.2)+C.126+D.13a, A+B.1(or B.2)+C.127+D.13a, A+B.1(or B.2)+C.128+D.13a, A+B.1(or B.2)+C.129+D.13a, A+B.1(or B.2)+C.129a+D.13a, A+B.1(or B.2)+C.130+D.13a, A+B.1(or B.2)+C.131+D.13a, A+B.1(or B.2)+C.132+D.13a, A+B.1(or B.2)+C.133+D.13a, A+B.1(or B.2)+C.133a+D.13a, A+B.1(or B.2)+C.134+D.13a, A+B.1(or B.2)+C.135+D.13a, A+B.1(or B.2)+C.136+D.13a, A+B.1(or B.2)+C.137+D.13a, A+B.1(or B.2)+C.138+D.13a, A+B.1(or B.2)+C.138a+D.13a, A+B.1(or B.2)+C.139+D.13a, A+B.1(or B.2)+C.139a+D.13a, A+B.1(or B.2)+C.139b+D.13a, A+B.1(or B.2)+C.140+D.13a, A+B.1(or B.2)+C.141+D.13a, A+B.1(or B.2)+C.142+D.13a, A+B.1(or B.2)+C.143+D.13a, A+B.1(or B.2)+C.144+D.13a,

A+B.1(or B.2)+C.145+D.13a, A+B.1(or B.2)+C.146+D.13a, A+B.1(or B.2)+C.147+D.13a, A+B.1(or B.2)+C.148+D.13a, A+B.1(or B.2)+C.149+D.13a, A+B.1(or B.2)+C.150+D.13a, A+B.1(or B.2)+C.151+D.13a, A+B.1(or B.2)+C.151a+D.13a, A+B.1(or B.2)+C.152+D.13a, A+B.1(or B.2)+C.152a+D.13a, A+B.1(or B.2)+C.153+D.13a, A+B.1(or B.2)+C.154+D.13a, A+B.1(or B.2)+C.154a+D.13a, A+B.1(or B.2)+C.155+D.13a, A+B.1(or B.2)+C.156+D.13a, A+B.1(or B.2)+C.157+D.13a, A+B.1(or B.2)+C.158+D.13a, A+B.1(or B.2)+C.158a+D.13a, A+B.1(or B.2)+C.159+D.13a, A+B.1(or B.2)+C.159a+D.13a, A+B.1(or B.2)+C.159b+D.13a, A+B.1(or B.2)+C.159c+D.13a, A+B.1(or B.2)+C.160+D.13a, A+B.1(or B.2)+C.160a+D.13a, A+B.1(or B.2)+C.161+D.13a, A+B.1(or B.2)+C.162+D.13a, A+B.1(or B.2)+C.163+D.13a, A+B.1(or B.2)+C.163a+D.13a, A+B.1(or B.2)+C.164+D.13a, A+B.1(or B.2)+C.165+D.13a, A+B.1(or B.2)+C.166+D.13a,

A+B.1(or B.2)+C.1+D.14a, A+B.1(or B.2)+C.2+D.14a, A+B.1(or B.2)+C.3+D.14a, A+B.1(or B.2)+C.4+D.14a, A+B.1(or B.2)+C.5+D.14a, A+B.1(or B.2)+C.5a+D.14a, A+B.1(or B.2)+C.5b+D.14a, A+B.1(or B.2)+C.5c+D.14a, A+B.1(or B.2)+C.6+D.14a, A+B.1(or B.2)+C.7+D.14a, A+B.1(or B.2)+C.7a+D.14a, A+B.1(or B.2)+C.7b+D.14a, A+B.1(or B.2)+C.8+D.14a, A+B.1(or B.2)+C.9+D.14a, A+B.1(or B.2)+C.10+D.14a, A+B.1(or B.2)+C.11+D.14a, A+B.1(or B.2)+C.12+D.14a, A+B.1(or B.2)+C.12a+D.14a, A+B.1(or B.2)+C.13+D.14a, A+B.1(or B.2)+C.14+D.14a, A+B.1(or B.2)+C.14a+D.14a, A+B.1(or B.2)+C.15+D.14a, A+B.1(or B.2)+C.16+D.14a, A+B.1(or B.2)+C.17+D.14a, A+B.1(or B.2)+C.18+D.14a, A+B.1(or B.2)+C.18a+D.14a, A+B.1(or B.2)+C.19+D.14a, A+B.1(or B.2)+C.19a+D.14a, A+B.1(or B.2)+C.19b+D.14a, A+B.1(or B.2)+C.19c+D.14a, A+B.1(or B.2)+C.19d+D.14a, A+B.1(or B.2)+C.20+D.14a, A+B.1(or B.2)+C.21+D.14a, A+B.1(or B.2)+C.21a+D.14a, A+B.1(or B.2)+C.22+D.14a, A+B.1(or B.2)+C.23+D.14a, A+B.1(or B.2)+C.24+D.14a, A+B.1(or B.2)+C.25+D.14a, A+B.1(or B.2)+C.25a+D.14a, A+B.1(or B.2)+C.25b+D.14a, A+B.1(or B.2)+C.26+D.14a, A+B.1(or B.2)+C.27+D.14a, A+B.1(or B.2)+C.28+D.14a, A+B.1(or B.2)+C.28a+D.14a, A+B.1(or B.2)+C.29+D.14a, A+B.1(or B.2)+C.30+D.14a, A+B.1(or B.2)+C.30a+D.14a, A+B.1(or B.2)+C.30b+D.14a, A+B.1(or B.2)+C.30c+D.14a, A+B.1(or B.2)+C.30d+D.14a, A+B.1(or B.2)+C.30e+D.14a, A+B.1(or B.2)+C.30f+D.14a, A+B.1(or B.2)+C.30g+D.14a, A+B.1(or B.2)+C.31+D.14a, A+B.1(or B.2)+C.32+D.14a, A+B.1(or B.2)+C.33+D.14a, A+B.1(or B.2)+C.34+D.14a, A+B.1(or B.2)+C.34a+D.14a, A+B.1(or B.2)+C.35+D.14a, A+B.1(or B.2)+C.35a+D.14a, A+B.1(or B.2)+C.35b+D.14a, A+B.1(or B.2)+C.35c+D.14a, A+B.1(or B.2)+C.35d+D.14a, A+B.1(or B.2)+C.35e+D.14a, A+B.1(or B.2)+C.35f+D.14a, A+B.1(or B.2)+C.35g+D.14a, A+B.1(or B.2)+C.35h+D.14a, A+B.1(or B.2)+C.35i+D.14a, A+B.1(or B.2)+C.35j+D.14a, A+B.1(or B.2)+C.35k+D.14a, A+B.1(or B.2)+C.35l+D.14a, A+B.1(or B.2)+C.35m+D.14a, A+B.1(or B.2)+C.35n+D.14a, A+B.1(or B.2)+C.35o+D.14a, A+B.1(or B.2)+C.35p+D.14a, A+B.1(or B.2)+C.35q+D.14a, A+B.1(or B.2)+C.35r+D.14a, A+B.1(or B.2)+C.35s+D.14a, A+B.1(or B.2)+C.35t+D.14a, A+B.1(or B.2)+C.35u+D.14a, A+B.1(or B.2)+C.35v+D.14a, A+B.1(or B.2)+C.35w+D.14a, A+B.1(or B.2)+C.35x+D.14a, A+B.1(or B.2)+C.35y+D.14a, A+B.1(or B.2)+C.35z+D.14a, A+B.1(or B.2)+C.35zx+D.14a, A+B.1(or B.2)+C.35zy+D.14a, A+B.1(or B.2)+C.36+D.14a, A+B.1(or B.2)+C.36a+D.14a, A+B.1(or B.2)+C.37+D.14a, A+B.1(or B.2)+C.37a+D.14a, A+B.1(or B.2)+C.37b+D.14a, A+B.1(or B.2)+C.37c+D.14a, A+B.1(or B.2)+C.37d+D.14a, A+B.1(or B.2)+C.37e+D.14a, A+B.1(or B.2)+C.38+D.14a, A+B.1(or B.2)+C.39+D.14a, A+B.1(or B.2)+C.39a+D.14a, A+B.1(or B.2)+C.39b+D.14a, A+B.1(or B.2)+C.39c+D.14a, A+B.1(or B.2)+C.39d+D.14a, A+B.1(or B.2)+C.39e+D.14a, A+B.1(or B.2)+C.39f+D.14a, A+B.1(or B.2)+C.39g+D.14a, A+B.1(or B.2)+C.39h+D.14a, A+B.1(or B.2)+C.39i+D.14a, A+B.1(or B.2)+C.39j+D.14a, A+B.1(or B.2)+C.39k+D.14a, A+B.1(or B.2)+C.39l+D.14a, A+B.1(or B.2)+C.39m+D.14a, A+B.1(or B.2)+C.40+D.14a, A+B.1(or B.2)+C.40a+D.14a, A+B.1(or B.2)+C.40b+D.14a, A+B.1(or B.2)+C.40c+D.14a, A+B.1(or B.2)+C.40d+D.14a, A+B.1(or B.2)+C.40e+D.14a, A+B.1(or B.2)+C.40f+D.14a, A+B.1(or B.2)+C.40g+D.14a, A+B.1(or B.2)+C.40h+D.14a, A+B.1(or B.2)+C.41+D.14a, A+B.1(or B.2)+C.41a+D.14a, A+B.1(or B.2)+C.41b+D.14a, A+B.1(or B.2)+C.41c+D.14a, A+B.1(or B.2)+C.41d+D.14a, A+B.1(or B.2)+C.42+D.14a, A+B.1(or B.2)+C.42a+D.14a, A+B.1(or B.2)+C.43+D.14a, A+B.1(or B.2)+C.44+D.14a, A+B.1(or B.2)+C.44a+D.14a, A+B.1(or B.2)+C.45+D.14a, A+B.1(or B.2)+C.46+D.14a, A+B.1(or B.2)+C.47+D.14a, A+B.1(or B.2)+C.48+D.14a, A+B.1(or B.2)+C.48a+D.14a, A+B.1(or B.2)+C.49+D.14a, A+B.1(or B.2)+C.50+D.14a, A+B.1(or B.2)+C.51+D.14a, A+B.1(or B.2)+C.51a+D.14a, A+B.1(or B.2)+C.52+D.14a, A+B.1(or B.2)+C.53+D.14a, A+B.1(or B.2)+C.53a+D.14a, A+B.1(or B.2)+C.54+D.14a, A+B.1(or B.2)+C.54a+D.14a, A+B.1(or B.2)+C.55+D.14a, A+B.1(or B.2)+C.56+D.14a, A+B.1(or B.2)+C.57+D.14a, A+B.1(or B.2)+C.58+D.14a, A+B.1(or B.2)+C.58a+D.14a, A+B.1(or B.2)+C.58b+D.14a, A+B.1(or B.2)+C.59+D.14a, A+B.1(or B.2)+C.59a+D.14a, A+B.1(or B.2)+C.60+D.14a, A+B.1(or B.2)+C.60a+D.14a, A+B.1(or B.2)+C.61+D.14a, A+B.1(or B.2)+C.62+D.14a, A+B.1(or B.2)+C.63+D.14a, A+B.1(or B.2)+C.64+D.14a, A+B.1(or B.2)+C.64a+D.14a, A+B.1(or B.2)+C.64b+D.14a, A+B.1(or B.2)+C.65+D.14a, A+B.1(or B.2)+C.66+D.14a, A+B.1(or B.2)+C.66a+D.14a, A+B.1(or B.2)+C.66b+D.14a, A+B.1(or B.2)+C.67+D.14a, A+B.1(or B.2)+C.68+D.14a, A+B.1(or B.2)+C.69+D.14a, A+B.1(or B.2)+C.69a+D.14a, A+B.1(or B.2)+C.70+D.14a, A+B.1(or B.2)+C.70a+D.14a, A+B.1(or B.2)+C.70b+D.14a, A+B.1(or B.2)+C.71+D.14a, A+B.1(or B.2)+C.71a+D.14a, A+B.1(or B.2)+C.71b+D.14a, A+B.1(or B.2)+C.71c+D.14a, A+B.1(or B.2)+C.71d+D.14a, A+B.1(or B.2)+C.71e+D.14a, A+B.1(or B.2)+C.71f+D.14a, A+B.1(or B.2)+C.71g+D.14a, A+B.1(or B.2)+C.71h+D.14a, A+B.1(or B.2)+C.71i+D.14a, A+B.1(or B.2)+C.71j+D.14a, A+B.1(or B.2)+C.72+D.14a, A+B.1(or B.2)+C.72a+D.14a, A+B.1(or B.2)+C.73+D.14a, A+B.1(or B.2)+C.73a+D.14a, A+B.1(or B.2)+C.74+D.14a, A+B.1(or B.2)+C.74a+D.14a, A+B.1(or B.2)+C.74b+D.14a, A+B.1(or B.2)+C.75+D.14a, A+B.1(or B.2)+C.76+D.14a, A+B.1(or B.2)+C.77+D.14a, A+B.1(or B.2)+C.77a+D.14a, A+B.1(or B.2)+C.78+D.14a, A+B.1(or B.2)+C.78a+D.14a, A+B.1(or B.2)+C.79+D.14a, A+B.1(or B.2)+C.79a+D.14a, A+B.1(or B.2)+C.79b+D.14a, A+B.1(or B.2)+C.79c+D.14a, A+B.1(or B.2)+C.80+D.14a, A+B.1(or B.2)+C.80a+D.14a, A+B.1(or B.2)+C.81+D.14a, A+B.1(or B.2)+C.82+D.14a, A+B.1(or B.2)+C.82a+D.14a, A+B.1(or B.2)+C.82b+D.14a, A+B.1(or B.2)+C.83+D.14a, A+B.1(or B.2)+C.83a+D.14a, A+B.1(or B.2)+C.84+D.14a, A+B.1(or B.2)+C.84a+D.14a, A+B.1(or B.2)+C.84b+D.14a, A+B.1(or B.2)+C.84c+D.14a, A+B.1(or B.2)+C.85+D.14a, A+B.1(or B.2)+C.86+D.14a, A+B.1(or B.2)+C.87+D.14a, A+B.1(or B.2)+C.88+D.14a, A+B.1(or B.2)+C.89+D.14a, A+B.1(or B.2)+C.90+D.14a, A+B.1(or B.2)+C.90a+D.14a, A+B.1(or B.2)+C.90b+D.14a, A+B.1(or B.2)+C.90c+D.14a, A+B.1(or B.2)+C.90d+D.14a, A+B.1(or B.2)+C.90e+D.14a, A+B.1(or B.2)+C.90f+D.14a, A+B.1(or B.2)+C.90g+D.14a, A+B.1(or B.2)+C.90h+D.14a, A+B.1(or B.2)+C.90i+D.14a, A+B.1(or B.2)+C.90j+D.14a, A+B.1(or B.2)+C.90k+D.14a, A+B.1(or B.2)+C.90l+D.14a,

A+B.1(or B.2)+C.90m+D.14a, A+B.1(or B.2)+C.90n+D.14a, A+B.1(or B.2)+C.91+D.14a, A+B.1(or B.2)+C.91a+D.14a, A+B.1(or B.2)+C.91b+D.14a, A+B.1(or B.2)+C.91c+D.14a, A+B.1(or B.2)+C.92+D.14a, A+B.1(or B.2)+C.92a+D.14a, A+B.1(or B.2)+C.92b+D.14a, A+B.1(or B.2)+C.92c+D.14a, A+B.1(or B.2)+C.92d+D.14a, A+B.1(or B.2)+C.92e+D.14a, A+B.1(or B.2)+C.92f+D.14a, A+B.1(or B.2)+C.92g+D.14a, A+B.1(or B.2)+C.92h+D.14a, A+B.1(or B.2)+C.92i+D.14a, A+B.1(or B.2)+C.93+D.14a, A+B.1(or B.2)+C.93a+D.14a, A+B.1(or B.2)+C.93b+D.14a, A+B.1(or B.2)+C.93c+D.14a, A+B.1(or B.2)+C.93d+D.14a, A+B.1(or B.2)+C.94+D.14a, A+B.1(or B.2)+C.94a+D.14a, A+B.1(or B.2)+C.95+D.14a, A+B.1(or B.2)+C.96+D.14a, A+B.1(or B.2)+C.96a+D.14a, A+B.1(or B.2)+C.96b+D.14a, A+B.1(or B.2)+C.96c+D.14a, A+B.1(or B.2)+C.97+D.14a, A+B.1(or B.2)+C.98+D.14a, A+B.1(or B.2)+C.99+D.14a, A+B.1(or B.2)+C.100+D.14a, A+B.1(or B.2)+C.101+D.14a, A+B.1(or B.2)+C.102+D.14a, A+B.1(or B.2)+C.103+D.14a, A+B.1(or B.2)+C.104+D.14a, A+B.1(or B.2)+C.104a+D.14a, A+B.1(or B.2)+C.105+D.14a, A+B.1(or B.2)+C.106+D.14a, A+B.1(or B.2)+C.107+D.14a, A+B.1(or B.2)+C.108+D.14a, A+B.1(or B.2)+C.109+D.14a, A+B.1(or B.2)+C.110+D.14a, A+B.1(or B.2)+C.111+D.14a, A+B.1(or B.2)+C.112+D.14a, A+B.1(or B.2)+C.113+D.14a, A+B.1(or B.2)+C.114+D.14a, A+B.1(or B.2)+C.115+D.14a, A+B.1(or B.2)+C.116+D.14a, A+B.1(or B.2)+C.117+D.14a, A+B.1(or B.2)+C.118+D.14a, A+B.1(or B.2)+C.119+D.14a, A+B.1(or B.2)+C.119a+D.14a, A+B.1(or B.2)+C.120+D.14a, A+B.1(or B.2)+C.120a+D.14a, A+B.1(or B.2)+C.120b+D.14a, A+B.1(or B.2)+C.120c+D.14a, A+B.1(or B.2)+C.120d+D.14a, A+B.1(or B.2)+C.120e+D.14a, A+B.1(or B.2)+C.120f+D.14a, A+B.1(or B.2)+C.120g+D.14a, A+B.1(or B.2)+C.120h+D.14a, A+B.1(or B.2)+C.120i+D.14a, A+B.1(or B.2)+C.121+D.14a, A+B.1(or B.2)+C.122+D.14a, A+B.1(or B.2)+C.123+D.14a, A+B.1(or B.2)+C.124+D.14a, A+B.1(or B.2)+C.125+D.14a, A+B.1(or B.2)+C.126+D.14a, A+B.1(or B.2)+C.127+D.14a, A+B.1(or B.2)+C.128+D.14a, A+B.1(or B.2)+C.129+D.14a, A+B.1(or B.2)+C.129a+D.14a, A+B.1(or B.2)+C.130+D.14a, A+B.1(or B.2)+C.131+D.14a, A+B.1(or B.2)+C.132+D.14a, A+B.1(or B.2)+C.133+D.14a, A+B.1(or B.2)+C.133a+D.14a, A+B.1(or B.2)+C.134+D.14a, A+B.1(or B.2)+C.135+D.14a, A+B.1(or B.2)+C.136+D.14a, A+B.1(or B.2)+C.137+D.14a, A+B.1(or B.2)+C.138+D.14a, A+B.1(or B.2)+C.138a+D.14a, A+B.1(or B.2)+C.139+D.14a, A+B.1(or B.2)+C.139a+D.14a, A+B.1(or B.2)+C.139b+D.14a, A+B.1(or B.2)+C.140+D.14a, A+B.1(or B.2)+C.141+D.14a, A+B.1(or B.2)+C.142+D.14a, A+B.1(or B.2)+C.143+D.14a, A+B.1(or B.2)+C.144+D.14a, A+B.1(or B.2)+C.145+D.14a, A+B.1(or B.2)+C.146+D.14a, A+B.1(or B.2)+C.147+D.14a, A+B.1(or B.2)+C.148+D.14a, A+B.1(or B.2)+C.149+D.14a, A+B.1(or B.2)+C.150+D.14a, A+B.1(or B.2)+C.151+D.14a, A+B.1(or B.2)+C.151a+D.14a, A+B.1(or B.2)+C.152+D.14a, A+B.1(or B.2)+C.152a+D.14a, A+B.1(or B.2)+C.153+D.14a, A+B.1(or B.2)+C.154+D.14a, A+B.1(or B.2)+C.154a+D.14a, A+B.1(or B.2)+C.155+D.14a, A+B.1(or B.2)+C.156+D.14a, A+B.1(or B.2)+C.157+D.14a, A+B.1(or B.2)+C.158+D.14a, A+B.1(or B.2)+C.158a+D.14a, A+B.1(or B.2)+C.159+D.14a, A+B.1(or B.2)+C.159a+D.14a, A+B.1(or B.2)+C.159b+D.14a, A+B.1(or B.2)+C.159c+D.14a, A+B.1(or B.2)+C.160+D.14a, A+B.1(or B.2)+C.160a+D.14a, A+B.1(or B.2)+C.161+D.14a, A+B.1(or B.2)+C.162+D.14a, A+B.1(or B.2)+C.163+D.14a, A+B.1(or B.2)+C.163a+D.14a, A+B.1(or B.2)+C.164+D.14a, A+B.1(or B.2)+C.165+D.14a, A+B.1(or B.2)+C.166+D.14a,

A+B.1(or B.2)+C.1+D.19, A+B.1(or B.2)+C.2+D.19, A+B.1(or B.2)+C.3+D.19, A+B.1(or B.2)+C.4+D.19, A+B.1(or B.2)+C.5+D.19, A+B.1(or B.2)+C.5a+D.19, A+B.1(or B.2)+C.5b+D.19, A+B.1(or B.2)+C.5c+D.19, A+B.1(or B.2)+C.6+D.19, A+B.1(or B.2)+C.7+D.19, A+B.1(or B.2)+C.7a+D.19, A+B.1(or B.2)+C.7b+D.19, A+B.1(or B.2)+C.8+D.19, A+B.1(or B.2)+C.9+D.19, A+B.1(or B.2)+C.10+D.19, A+B.1(or B.2)+C.11+D.19, A+B.1(or B.2)+C.12+D.19, A+B.1(or B.2)+C.12a+D.19, A+B.1(or B.2)+C.13+D.19, A+B.1(or B.2)+C.14+D.19, A+B.1(or B.2)+C.14a+D.19, A+B.1(or B.2)+C.15+D.19, A+B.1(or B.2)+C.16+D.19, A+B.1(or B.2)+C.17+D.19, A+B.1(or B.2)+C.18+D.19, A+B.1(or B.2)+C.18a+D.19, A+B.1(or B.2)+C.19+D.19, A+B.1(or B.2)+C.19a+D.19, A+B.1(or B.2)+C.19b+D.19, A+B.1(or B.2)+C.19c+D.19, A+B.1(or B.2)+C.19d+D.19, A+B.1(or B.2)+C.20+D.19, A+B.1(or B.2)+C.21+D.19, A+B.1(or B.2)+C.21a+D.19, A+B.1(or B.2)+C.22+D.19, A+B.1(or B.2)+C.23+D.19, A+B.1(or B.2)+C.24+D.19, A+B.1(or B.2)+C.25+D.19, A+B.1(or B.2)+C.25a+D.19, A+B.1(or B.2)+C.25b+D.19, A+B.1(or B.2)+C.26+D.19, A+B.1(or B.2)+C.27+D.19, A+B.1(or B.2)+C.28+D.19, A+B.1(or B.2)+C.28a+D.19, A+B.1(or B.2)+C.29+D.19, A+B.1(or B.2)+C.30+D.19, A+B.1(or B.2)+C.30a+D.19, A+B.1(or B.2)+C.30b+D.19, A+B.1(or B.2)+C.30c+D.19, A+B.1(or B.2)+C.30d+D.19, A+B.1(or B.2)+C.30e+D.19, A+B.1(or B.2)+C.30f+D.19, A+B.1(or B.2)+C.30g+D.19, A+B.1(or B.2)+C.31+D.19, A+B.1(or B.2)+C.32+D.19, A+B.1(or B.2)+C.33+D.19, A+B.1(or B.2)+C.34+D.19, A+B.1(or B.2)+C.34a+D.19, A+B.1(or B.2)+C.35+D.19, A+B.1(or B.2)+C.35a+D.19, A+B.1(or B.2)+C.35b+D.19, A+B.1(or B.2)+C.35c+D.19, A+B.1(or B.2)+C.35d+D.19, A+B.1(or B.2)+C.35e+D.19, A+B.1(or B.2)+C.35f+D.19, A+B.1(or B.2)+C.35g+D.19, A+B.1(or B.2)+C.35h+D.19, A+B.1(or B.2)+C.35i+D.19, A+B.1(or B.2)+C.35j+D.19, A+B.1(or B.2)+C.35k+D.19, A+B.1(or B.2)+C.35l+D.19, A+B.1(or B.2)+C.35m+D.19, A+B.1(or B.2)+C.35n+D.19, A+B.1(or B.2)+C.35o+D.19, A+B.1(or B.2)+C.35p+D.19, A+B.1(or B.2)+C.35q+D.19, A+B.1(or B.2)+C.35r+D.19, A+B.1(or B.2)+C.35s+D.19, A+B.1(or B.2)+C.35t+D.19, A+B.1(or B.2)+C.35u+D.19, A+B.1(or B.2)+C.35v+D.19, A+B.1(or B.2)+C.35w+D.19, A+B.1(or B.2)+C.35x+D.19, A+B.1(or B.2)+C.35y+D.19, A+B.1(or B.2)+C.35z+D.19, A+B.1(or B.2)+C.35zx+D.19, A+B.1(or B.2)+C.35zy+D.19, A+B.1(or B.2)+C.36+D.19, A+B.1(or B.2)+C.36a+D.19, A+B.1(or B.2)+C.37+D.19, A+B.1(or B.2)+C.37a+D.19, A+B.1(or B.2)+C.37b+D.19, A+B.1(or B.2)+C.37c+D.19, A+B.1(or B.2)+C.37d+D.19, A+B.1(or B.2)+C.37e+D.19, A+B.1(or B.2)+C.38+D.19, A+B.1(or B.2)+C.39+D.19, A+B.1(or B.2)+C.39a+D.19, A+B.1(or B.2)+C.39b+D.19, A+B.1(or B.2)+C.39c+D.19, A+B.1(or B.2)+C.39d+D.19, A+B.1(or B.2)+C.39e+D.19, A+B.1(or B.2)+C.39f+D.19, A+B.1(or B.2)+C.39g+D.19, A+B.1(or B.2)+C.39h+D.19, A+B.1(or B.2)+C.39i+D.19, A+B.1(or B.2)+C.39j+D.19, A+B.1(or B.2)+C.39k+D.19, A+B.1(or B.2)+C.39l+D.19, A+B.1(or B.2)+C.39m+D.19, A+B.1(or B.2)+C.40+D.19, A+B.1(or B.2)+C.40a+D.19, A+B.1(or B.2)+C.40b+D.19, A+B.1(or B.2)+C.40c+D.19, A+B.1(or B.2)+C.40d+D.19, A+B.1(or B.2)+C.40e+D.19, A+B.1(or B.2)+C.40f+D.19, A+B.1(or B.2)+C.40g+D.19, A+B.1(or B.2)+C.40h+D.19, A+B.1(or B.2)+C.41+D.19, A+B.1(or B.2)+C.41a+D.19, A+B.1(or B.2)+C.41b+D.19, A+B.1(or B.2)+C.41c+D.19, A+B.1(or B.2)+C.41d+D.19, A+B.1(or B.2)+C.42+D.19, A+B.1(or B.2)+C.42a+D.19, A+B.1(or B.2)+C.43+D.19, A+B.1(or B.2)+C.44+D.19,

A+B.1(or B.2)+C.44a+D.19, A+B.1(or B.2)+C.45+D.19, A+B.1(or B.2)+C.46+D.19, A+B.1(or B.2)+C.47+D.19, A+B.1(or B.2)+C.48+D.19, A+B.1(or B.2)+C.48a+D.19, A+B.1(or B.2)+C.49+D.19, A+B.1(or B.2)+C.50+D.19, A+B.1(or B.2)+C.51+D.19, A+B.1(or B.2)+C.51a+D.19, A+B.1(or B.2)+C.52+D.19, A+B.1(or B.2)+C.53+D.19, A+B.1(or B.2)+C.53a+D.19, A+B.1(or B.2)+C.54+D.19, A+B.1(or B.2)+C.54a+D.19, A+B.1(or B.2)+C.55+D.19, A+B.1(or B.2)+C.56+D.19, A+B.1(or B.2)+C.57+D.19, A+B.1(or B.2)+C.58+D.19, A+B.1(or B.2)+C.58a+D.19, A+B.1(or B.2)+C.58b+D.19, A+B.1(or B.2)+C.59+D.19, A+B.1(or B.2)+C.59a+D.19, A+B.1(or B.2)+C.60+D.19, A+B.1(or B.2)+C.60a+D.19, A+B.1(or B.2)+C.61+D.19, A+B.1(or B.2)+C.62+D.19, A+B.1(or B.2)+C.63+D.19, A+B.1(or B.2)+C.64+D.19, A+B.1(or B.2)+C.64a+D.19, A+B.1(or B.2)+C.64b+D.19, A+B.1(or B.2)+C.65+D.19, A+B.1(or B.2)+C.66+D.19, A+B.1(or B.2)+C.66a+D.19, A+B.1(or B.2)+C.66b+D.19, A+B.1(or B.2)+C.67+D.19, A+B.1(or B.2)+C.68+D.19, A+B.1(or B.2)+C.69+D.19, A+B.1(or B.2)+C.69a+D.19, A+B.1(or B.2)+C.70+D.19, A+B.1(or B.2)+C.70a+D.19, A+B.1(or B.2)+C.70b+D.19, A+B.1(or B.2)+C.71+D.19, A+B.1(or B.2)+C.71a+D.19, A+B.1(or B.2)+C.71b+D.19, A+B.1(or B.2)+C.71c+D.19, A+B.1(or B.2)+C.71d+D.19, A+B.1(or B.2)+C.71e+D.19, A+B.1(or B.2)+C.71f+D.19, A+B.1(or B.2)+C.71g+D.19, A+B.1(or B.2)+C.71h+D.19, A+B.1(or B.2)+C.71i+D.19, A+B.1(or B.2)+C.71j+D.19, A+B.1(or B.2)+C.72+D.19, A+B.1(or B.2)+C.72a+D.19, A+B.1(or B.2)+C.73+D.19, A+B.1(or B.2)+C.73a+D.19, A+B.1(or B.2)+C.74+D.19, A+B.1(or B.2)+C.74a+D.19, A+B.1(or B.2)+C.74b+D.19, A+B.1(or B.2)+C.75+D.19, A+B.1(or B.2)+C.76+D.19, A+B.1(or B.2)+C.77+D.19, A+B.1(or B.2)+C.77a+D.19, A+B.1(or B.2)+C.78+D.19, A+B.1(or B.2)+C.78a+D.19, A+B.1(or B.2)+C.79+D.19, A+B.1(or B.2)+C.79a+D.19, A+B.1(or B.2)+C.79b+D.19, A+B.1(or B.2)+C.79c+D.19, A+B.1(or B.2)+C.80+D.19, A+B.1(or B.2)+C.80a+D.19, A+B.1(or B.2)+C.81+D.19, A+B.1(or B.2)+C.82+D.19, A+B.1(or B.2)+C.82a+D.19, A+B.1(or B.2)+C.82b+D.19, A+B.1(or B.2)+C.83+D.19, A+B.1(or B.2)+C.83a+D.19, A+B.1(or B.2)+C.84+D.19, A+B.1(or B.2)+C.84a+D.19, A+B.1(or B.2)+C.84b+D.19, A+B.1(or B.2)+C.84c+D.19, A+B.1(or B.2)+C.85+D.19, A+B.1(or B.2)+C.86+D.19, A+B.1(or B.2)+C.87+D.19, A+B.1(or B.2)+C.88+D.19, A+B.1(or B.2)+C.89+D.19, A+B.1(or B.2)+C.90+D.19, A+B.1(or B.2)+C.90a+D.19, A+B.1(or B.2)+C.90b+D.19, A+B.1(or B.2)+C.90c+D.19, A+B.1(or B.2)+C.90d+D.19, A+B.1(or B.2)+C.90e+D.19, A+B.1(or B.2)+C.90f+D.19, A+B.1(or B.2)+C.90g+D.19, A+B.1(or B.2)+C.90h+D.19, A+B.1(or B.2)+C.90i+D.19, A+B.1(or B.2)+C.90j+D.19, A+B.1(or B.2)+C.90k+D.19, A+B.1(or B.2)+C.90l+D.19, A+B.1(or B.2)+C.90m+D.19, A+B.1(or B.2)+C.90n+D.19, A+B.1(or B.2)+C.91+D.19, A+B.1(or B.2)+C.91a+D.19, A+B.1(or B.2)+C.91b+D.19, A+B.1(or B.2)+C.91c+D.19, A+B.1(or B.2)+C.92+D.19, A+B.1(or B.2)+C.92a+D.19, A+B.1(or B.2)+C.92b+D.19, A+B.1(or B.2)+C.92c+D.19, A+B.1(or B.2)+C.92d+D.19, A+B.1(or B.2)+C.92e+D.19, A+B.1(or B.2)+C.92f+D.19, A+B.1(or B.2)+C.92g+D.19, A+B.1(or B.2)+C.92h+D.19, A+B.1(or B.2)+C.92i+D.19, A+B.1(or B.2)+C.93+D.19, A+B.1(or B.2)+C.93a+D.19, A+B.1(or B.2)+C.93b+D.19, A+B.1(or B.2)+C.93c+D.19, A+B.1(or B.2)+C.93d+D.19, A+B.1(or B.2)+C.94+D.19, A+B.1(or B.2)+C.94a+D.19, A+B.1(or B.2)+C.95+D.19, A+B.1(or B.2)+C.96+D.19, A+B.1(or B.2)+C.96a+D.19, A+B.1(or B.2)+C.96b+D.19, A+B.1(or B.2)+C.96c+D.19, A+B.1(or B.2)+C.97+D.19, A+B.1(or B.2)+C.98+D.19, A+B.1(or B.2)+C.99+D.19, A+B.1(or B.2)+C.100+D.19, A+B.1(or B.2)+C.101+D.19, A+B.1(or B.2)+C.102+D.19, A+B.1(or B.2)+C.103+D.19, A+B.1(or B.2)+C.104+D.19, A+B.1(or B.2)+C.104a+D.19, A+B.1(or B.2)+C.105+D.19, A+B.1(or B.2)+C.106+D.19, A+B.1(or B.2)+C.107+D.19, A+B.1(or B.2)+C.108+D.19, A+B.1(or B.2)+C.109+D.19, A+B.1(or B.2)+C.110+D.19, A+B.1(or B.2)+C.111+D.19, A+B.1(or B.2)+C.112+D.19, A+B.1(or B.2)+C.113+D.19, A+B.1(or B.2)+C.114+D.19, A+B.1(or B.2)+C.115+D.19, A+B.1(or B.2)+C.116+D.19, A+B.1(or B.2)+C.117+D.19, A+B.1(or B.2)+C.118+D.19, A+B.1(or B.2)+C.119+D.19, A+B.1(or B.2)+C.119a+D.19, A+B.1(or B.2)+C.120+D.19, A+B.1(or B.2)+C.120a+D.19, A+B.1(or B.2)+C.120b+D.19, A+B.1(or B.2)+C.120c+D.19, A+B.1(or B.2)+C.120d+D.19, A+B.1(or B.2)+C.120e+D.19, A+B.1(or B.2)+C.120f+D.19, A+B.1(or B.2)+C.120g+D.19, A+B.1(or B.2)+C.120h+D.19, A+B.1(or B.2)+C.120i+D.19, A+B.1(or B.2)+C.121+D.19, A+B.1(or B.2)+C.122+D.19, A+B.1(or B.2)+C.123+D.19, A+B.1(or B.2)+C.124+D.19, A+B.1(or B.2)+C.125+D.19, A+B.1(or B.2)+C.126+D.19, A+B.1(or B.2)+C.127+D.19, A+B.1(or B.2)+C.128+D.19, A+B.1(or B.2)+C.129+D.19, A+B.1(or B.2)+C.129a+D.19, A+B.1(or B.2)+C.130+D.19, A+B.1(or B.2)+C.131+D.19, A+B.1(or B.2)+C.132+D.19, A+B.1(or B.2)+C.133+D.19, A+B.1(or B.2)+C.133a+D.19, A+B.1(or B.2)+C.134+D.19, A+B.1(or B.2)+C.135+D.19, A+B.1(or B.2)+C.136+D.19, A+B.1(or B.2)+C.137+D.19, A+B.1(or B.2)+C.138+D.19, A+B.1(or B.2)+C.138a+D.19, A+B.1(or B.2)+C.139+D.19, A+B.1(or B.2)+C.139a+D.19, A+B.1(or B.2)+C.139b+D.19, A+B.1(or B.2)+C.140+D.19, A+B.1(or B.2)+C.141+D.19, A+B.1(or B.2)+C.142+D.19, A+B.1(or B.2)+C.143+D.19, A+B.1(or B.2)+C.144+D.19, A+B.1(or B.2)+C.145+D.19, A+B.1(or B.2)+C.146+D.19, A+B.1(or B.2)+C.147+D.19, A+B.1(or B.2)+C.148+D.19, A+B.1(or B.2)+C.149+D.19, A+B.1(or B.2)+C.150+D.19, A+B.1(or B.2)+C.151+D.19, A+B.1(or B.2)+C.151a+D.19, A+B.1(or B.2)+C.152+D.19, A+B.1(or B.2)+C.152a+D.19, A+B.1(or B.2)+C.153+D.19, A+B.1(or B.2)+C.154+D.19, A+B.1(or B.2)+C.154a+D.19, A+B.1(or B.2)+C.155+D.19, A+B.1(or B.2)+C.156+D.19, A+B.1(or B.2)+C.157+D.19, A+B.1(or B.2)+C.158+D.19, A+B.1(or B.2)+C.158a+D.19, A+B.1(or B.2)+C.159+D.19, A+B.1(or B.2)+C.159a+D.19, A+B.1(or B.2)+C.159b+D.19, A+B.1(or B.2)+C.159c+D.19, A+B.1(or B.2)+C.160+D.19, A+B.1(or B.2)+C.160a+D.19, A+B.1(or B.2)+C.161+D.19, A+B.1(or B.2)+C.162+D.19, A+B.1(or B.2)+C.163+D.19, A+B.1(or B.2)+C.163a+D.19, A+B.1(or B.2)+C.164+D.19, A+B.1(or B.2)+C.165+D.19, A+B.1(or B.2)+C.166+D.19,

A+B.1(or B.2)+C.1+D.20, A+B.1(or B.2)+C.2+D.20, A+B.1(or B.2)+C.3+D.20, A+B.1(or B.2)+C.4+D.20, A+B.1(or B.2)+C.5+D.20, A+B.1(or B.2)+C.5a+D.20, A+B.1(or B.2)+C.5b+D.20, A+B.1(or B.2)+C.5c+D.20, A+B.1(or B.2)+C.6+D.20, A+B.1(or B.2)+C.7+D.20, A+B.1(or B.2)+C.7a+D.20, A+B.1(or B.2)+C.7b+D.20, A+B.1(or B.2)+C.8+D.20, A+B.1(or B.2)+C.9+D.20, A+B.1(or B.2)+C.10+D.20, A+B.1(or B.2)+C.11+D.20, A+B.1(or B.2)+C.12+D.20, A+B.1(or B.2)+C.12a+D.20, A+B.1(or B.2)+C.13+D.20, A+B.1(or B.2)+C.14+D.20, A+B.1(or B.2)+C.14a+D.20, A+B.1(or B.2)+C.15+D.20, A+B.1(or B.2)+C.16+D.20, A+B.1(or B.2)+C.17+D.20, A+B.1(or B.2)+C.18+D.20, A+B.1(or B.2)+C.18a+D.20, A+B.1(or B.2)+C.19+D.20, A+B.1(or B.2)+C.19a+D.20, A+B.1(or B.2)+C.19b+D.20, A+B.1(or B.2)+C.19c+D.20, A+B.1(or B.2)+C.19d+D.20, A+B.1(or B.2)+C.20+D.20, A+B.1(or B.2)+C.21+D.20, A+B.1(or B.2)+C.21a+D.20, A+B.1(or B.2)+C.22+D.20, A+B.1(or B.2)+C.23+D.20, A+B.1(or B.2)+C.24+D.20, A+B.1(or B.2)+C.25+D.20, A+B.1(or B.2)+C.25a+D.20, A+B.1(or B.2)+C.25b+D.20, A+B.1(or B.2)+C.26+D.20, A+B.1(or B.2)+C.27+D.20,

A+B.1(or B.2)+C.28+D.20, A+B.1(or B.2)+C.28a+D.20,
A+B.1(or B.2)+C.29+D.20, A+B.1(or B.2)+C.30+D.20,
A+B.1(or B.2)+C.30a+D.20, A+B.1(or B.2)+C.30b+D.20,
A+B.1(or B.2)+C.30c+D.20, A+B.1(or B.2)+C.30d+D.20,
A+B.1(or B.2)+C.30e+D.20, A+B.1(or B.2)+C.30f+D.20,
A+B.1(or B.2)+C.30g+D.20, A+B.1(or B.2)+C.31+D.20,
A+B.1(or B.2)+C.32+D.20, A+B.1(or B.2)+C.33+D.20,
A+B.1(or B.2)+C.34+D.20, A+B.1(or B.2)+C.34a+D.20,
A+B.1(or B.2)+C.35+D.20, A+B.1(or B.2)+C.35a+D.20,
A+B.1(or B.2)+C.35b+D.20, A+B.1(or B.2)+C.35c+D.20,
A+B.1(or B.2)+C.35d+D.20, A+B.1(or B.2)+C.35e+D.20,
A+B.1(or B.2)+C.35f+D.20, A+B.1(or B.2)+C.35g+D.20,
A+B.1(or B.2)+C.35h+D.20, A+B.1(or B.2)+C.35i+D.20,
A+B.1(or B.2)+C.35j+D.20, A+B.1(or B.2)+C.35k+D.20,
A+B.1(or B.2)+C.35l+D.20, A+B.1(or B.2)+C.35m+D.20,
A+B.1(or B.2)+C.35n+D.20, A+B.1(or B.2)+C.35o+D.20,
A+B.1(or B.2)+C.35p+D.20, A+B.1(or B.2)+C.35q+D.20,
A+B.1(or B.2)+C.35r+D.20, A+B.1(or B.2)+C.35s+D.20,
A+B.1(or B.2)+C.35t+D.20, A+B.1(or B.2)+C.35u+D.20,
A+B.1(or B.2)+C.35v+D.20, A+B.1(or B.2)+C.35w+D.20,
A+B.1(or B.2)+C.35x+D.20, A+B.1(or B.2)+C.35y+D.20,
A+B.1(or B.2)+C.35z+D.20, A+B.1(or B.2)+C.35zx+D.20,
A+B.1(or B.2)+C.35zy+D.20, A+B.1(or B.2)+C.36+D.20,
A+B.1(or B.2)+C.36a+D.20, A+B.1(or B.2)+C.37+D.20,
A+B.1(or B.2)+C.37a+D.20, A+B.1(or B.2)+C.37b+D.20,
A+B.1(or B.2)+C.37c+D.20, A+B.1(or B.2)+C.37d+D.20,
A+B.1(or B.2)+C.37e+D.20, A+B.1(or B.2)+C.38+D.20,
A+B.1(or B.2)+C.39+D.20, A+B.1(or B.2)+C.39a+D.20,
A+B.1(or B.2)+C.39b+D.20, A+B.1(or B.2)+C.39c+D.20,
A+B.1(or B.2)+C.39d+D.20, A+B.1(or B.2)+C.39e+D.20,
A+B.1(or B.2)+C.39f+D.20, A+B.1(or B.2)+C.39g+D.20,
A+B.1(or B.2)+C.39h+D.20, A+B.1(or B.2)+C.39i+D.20,
A+B.1(or B.2)+C.39j+D.20, A+B.1(or B.2)+C.39k+D.20,
A+B.1(or B.2)+C.39l+D.20, A+B.1(or B.2)+C.39m+D.20,
A+B.1(or B.2)+C.40+D.20, A+B.1(or B.2)+C.40a+D.20,
A+B.1(or B.2)+C.40b+D.20, A+B.1(or B.2)+C.40c+D.20,
A+B.1(or B.2)+C.40d+D.20, A+B.1(or B.2)+C.40e+D.20,
A+B.1(or B.2)+C.40f+D.20, A+B.1(or B.2)+C.40g+D.20,
A+B.1(or B.2)+C.40h+D.20, A+B.1(or B.2)+C.41+D.20,
A+B.1(or B.2)+C.41a+D.20, A+B.1(or B.2)+C.41b+D.20,
A+B.1(or B.2)+C.41c+D.20, A+B.1(or B.2)+C.41d+D.20,
A+B.1(or B.2)+C.42+D.20, A+B.1(or B.2)+C.42a+D.20,
A+B.1(or B.2)+C.43+D.20, A+B.1(or B.2)+C.44+D.20,
A+B.1(or B.2)+C.44a+D.20, A+B.1(or B.2)+C.45+D.20,
A+B.1(or B.2)+C.46+D.20, A+B.1(or B.2)+C.47+D.20,
A+B.1(or B.2)+C.48+D.20, A+B.1(or B.2)+C.48a+D.20,
A+B.1(or B.2)+C.49+D.20, A+B.1(or B.2)+C.50+D.20,
A+B.1(or B.2)+C.51+D.20, A+B.1(or B.2)+C.51a+D.20,
A+B.1(or B.2)+C.52+D.20, A+B.1(or B.2)+C.53+D.20,
A+B.1(or B.2)+C.53a+D.20, A+B.1(or B.2)+C.54+D.20,
A+B.1(or B.2)+C.54a+D.20, A+B.1(or B.2)+C.55+D.20,
A+B.1(or B.2)+C.56+D.20, A+B.1(or B.2)+C.57+D.20,
A+B.1(or B.2)+C.58+D.20, A+B.1(or B.2)+C.58a+D.20,
A+B.1(or B.2)+C.58b+D.20, A+B.1(or B.2)+C.59+D.20,
A+B.1(or B.2)+C.59a+D.20, A+B.1(or B.2)+C.60+D.20,
A+B.1(or B.2)+C.60a+D.20, A+B.1(or B.2)+C.61+D.20,
A+B.1(or B.2)+C.62+D.20, A+B.1(or B.2)+C.63+D.20,
A+B.1(or B.2)+C.64+D.20, A+B.1(or B.2)+C.64a+D.20,
A+B.1(or B.2)+C.64b+D.20, A+B.1(or B.2)+C.65+D.20,
A+B.1(or B.2)+C.66+D.20, A+B.1(or B.2)+C.66a+D.20,
A+B.1(or B.2)+C.66b+D.20, A+B.1(or B.2)+C.67+D.20,
A+B.1(or B.2)+C.68+D.20, A+B.1(or B.2)+C.69+D.20,
A+B.1(or B.2)+C.69a+D.20, A+B.1(or B.2)+C.70+D.20,
A+B.1(or B.2)+C.70a+D.20, A+B.1(or B.2)+C.70b+D.20,
A+B.1(or B.2)+C.71+D.20, A+B.1(or B.2)+C.71a+D.20,
A+B.1(or B.2)+C.71b+D.20, A+B.1(or B.2)+C.71c+D.20,
A+B.1(or B.2)+C.71d+D.20, A+B.1(or B.2)+C.71e+D.20,
A+B.1(or B.2)+C.71f+D.20, A+B.1(or B.2)+C.71g+D.20,
A+B.1(or B.2)+C.71h+D.20, A+B.1(or B.2)+C.71i+D.20,
A+B.1(or B.2)+C.71j+D.20, A+B.1(or B.2)+C.72+D.20,
A+B.1(or B.2)+C.72a+D.20, A+B.1(or B.2)+C.73+D.20,
A+B.1(or B.2)+C.73a+D.20, A+B.1(or B.2)+C.74+D.20,
A+B.1(or B.2)+C.74a+D.20, A+B.1(or B.2)+C.74b+D.20,
A+B.1(or B.2)+C.75+D.20, A+B.1(or B.2)+C.76+D.20,
A+B.1(or B.2)+C.77+D.20, A+B.1(or B.2)+C.77a+D.20,
A+B.1(or B.2)+C.78+D.20, A+B.1(or B.2)+C.78a+D.20,
A+B.1(or B.2)+C.79+D.20, A+B.1(or B.2)+C.79a+D.20,
A+B.1(or B.2)+C.79b+D.20, A+B.1(or B.2)+C.79c+D.20,
A+B.1(or B.2)+C.80+D.20, A+B.1(or B.2)+C.80a+D.20,
A+B.1(or B.2)+C.81+D.20, A+B.1(or B.2)+C.82+D.20,
A+B.1(or B.2)+C.82a+D.20, A+B.1(or B.2)+C.82b+D.20,
A+B.1(or B.2)+C.83+D.20, A+B.1(or B.2)+C.83a+D.20,
A+B.1(or B.2)+C.84+D.20, A+B.1(or B.2)+C.84a+D.20,
A+B.1(or B.2)+C.84b+D.20, A+B.1(or B.2)+C.84c+D.20,
A+B.1(or B.2)+C.85+D.20, A+B.1(or B.2)+C.86+D.20,
A+B.1(or B.2)+C.87+D.20, A+B.1(or B.2)+C.88+D.20,
A+B.1(or B.2)+C.89+D.20, A+B.1(or B.2)+C.90+D.20,
A+B.1(or B.2)+C.90a+D.20, A+B.1(or B.2)+C.90b+D.20,
A+B.1(or B.2)+C.90c+D.20, A+B.1(or B.2)+C.90d+D.20,
A+B.1(or B.2)+C.90e+D.20, A+B.1(or B.2)+C.90f+D.20,
A+B.1(or B.2)+C.90g+D.20, A+B.1(or B.2)+C.90h+D.20,
A+B.1(or B.2)+C.90i+D.20, A+B.1(or B.2)+C.90j+D.20,
A+B.1(or B.2)+C.90k+D.20, A+B.1(or B.2)+C.90l+D.20,
A+B.1(or B.2)+C.90m+D.20, A+B.1(or B.2)+C.90n+D.20,
A+B.1(or B.2)+C.91+D.20, A+B.1(or B.2)+C.91a+D.20,
A+B.1(or B.2)+C.91b+D.20, A+B.1(or B.2)+C.91c+D.20,
A+B.1(or B.2)+C.92+D.20, A+B.1(or B.2)+C.92a+D.20,
A+B.1(or B.2)+C.92b+D.20, A+B.1(or B.2)+C.92c+D.20,
A+B.1(or B.2)+C.92d+D.20, A+B.1(or B.2)+C.92e+D.20,
A+B.1(or B.2)+C.92f+D.20, A+B.1(or B.2)+C.92g+D.20,
A+B.1(or B.2)+C.92h+D.20, A+B.1(or B.2)+C.92i+D.20,
A+B.1(or B.2)+C.93+D.20, A+B.1(or B.2)+C.93a+D.20,
A+B.1(or B.2)+C.93b+D.20, A+B.1(or B.2)+C.93c+D.20,
A+B.1(or B.2)+C.93d+D.20, A+B.1(or B.2)+C.94+D.20,
A+B.1(or B.2)+C.94a+D.20, A+B.1(or B.2)+C.95+D.20,
A+B.1(or B.2)+C.96+D.20, A+B.1(or B.2)+C.96a+D.20,
A+B.1(or B.2)+C.96b+D.20, A+B.1(or B.2)+C.96c+D.20,
A+B.1(or B.2)+C.97+D.20, A+B.1(or B.2)+C.98+D.20,
A+B.1(or B.2)+C.99+D.20, A+B.1(or B.2)+C.100+D.20,
A+B.1(or B.2)+C.101+D.20, A+B.1(or B.2)+C.102+D.20,
A+B.1(or B.2)+C.103+D.20, A+B.1(or B.2)+C.104+D.20,
A+B.1(or B.2)+C.104a+D.20, A+B.1(or B.2)+C.105+D.20,
A+B.1(or B.2)+C.106+D.20, A+B.1(or B.2)+C.107+D.20,
A+B.1(or B.2)+C.108+D.20, A+B.1(or B.2)+C.109+D.20,
A+B.1(or B.2)+C.110+D.20, A+B.1(or B.2)+C.111+D.20,
A+B.1(or B.2)+C.112+D.20, A+B.1(or B.2)+C.113+D.20,
A+B.1(or B.2)+C.114+D.20, A+B.1(or B.2)+C.115+D.20,
A+B.1(or B.2)+C.116+D.20, A+B.1(or B.2)+C.117+D.20,
A+B.1(or B.2)+C.118+D.20, A+B.1(or B.2)+C.119+D.20,
A+B.1(or B.2)+C.119a+D.20, A+B.1(or B.2)+C.120+D.20,
A+B.1(or B.2)+C.120a+D.20, A+B.1(or B.2)+C.120b+D.20, A+B.1(or B.2)+C.120c+D.20, A+B.1(or B.2)+C.120d+D.20, A+B.1(or B.2)+C.120e+D.20, A+B.1(or B.2)+C.120f+D.20, A+B.1(or B.2)+C.120g+D.20, A+B.1(or B.2)+C.120h+D.20, A+B.1(or B.2)+C.120i+D.20,
A+B.1(or B.2)+C.121+D.20, A+B.1(or B.2)+C.122+D.20,
A+B.1(or B.2)+C.123+D.20, A+B.1(or B.2)+C.124+D.20,
A+B.1(or B.2)+C.125+D.20, A+B.1(or B.2)+C.126+D.20,
A+B.1(or B.2)+C.127+D.20, A+B.1(or B.2)+C.128+D.20,
A+B.1(or B.2)+C.129+D.20, A+B.1(or B.2)+C.129a+D.20,
A+B.1(or B.2)+C.130+D.20, A+B.1(or B.2)+C.131+D.20,
A+B.1(or B.2)+C.132+D.20, A+B.1(or B.2)+C.133+D.20,
A+B.1(or B.2)+C.133a+D.20, A+B.1(or B.2)+C.134+D.20,
A+B.1(or B.2)+C.135+D.20, A+B.1(or B.2)+C.136+D.20,

A+B.1(or B.2)+C.137+D.20, A+B.1(or B.2)+C.138+D.20, A+B.1(or B.2)+C.138a+D.20, A+B.1(or B.2)+C.139+D.20, A+B.1(or B.2)+C.139a+D.20, A+B.1(or B.2)+C.139b+D.20, A+B.1(or B.2)+C.140+D.20, A+B.1(or B.2)+C.141+D.20, A+B.1(or B.2)+C.142+D.20, A+B.1(or B.2)+C.143+D.20, A+B.1(or B.2)+C.144+D.20, A+B.1(or B.2)+C.145+D.20, A+B.1(or B.2)+C.146+D.20, A+B.1(or B.2)+C.147+D.20, A+B.1(or B.2)+C.148+D.20, A+B.1(or B.2)+C.149+D.20, A+B.1(or B.2)+C.150+D.20, A+B.1(or B.2)+C.151+D.20, A+B.1(or B.2)+C.151a+D.20, A+B.1(or B.2)+C.152+D.20, A+B.1(or B.2)+C.152a+D.20, A+B.1(or B.2)+C.153+D.20, A+B.1(or B.2)+C.154+D.20, A+B.1(or B.2)+C.154a+D.20, A+B.1(or B.2)+C.155+D.20, A+B.1(or B.2)+C.156+D.20, A+B.1(or B.2)+C.157+D.20, A+B.1(or B.2)+C.158+D.20, A+B.1(or B.2)+C.158a+D.20, A+B.1(or B.2)+C.159+D.20, A+B.1(or B.2)+C.159a+D.20, A+B.1(or B.2)+C.159b+D.20, A+B.1(or B.2)+C.159c+D.20, A+B.1(or B.2)+C.160+D.20, A+B.1(or B.2)+C.160a+D.20, A+B.1(or B.2)+C.161+D.20, A+B.1(or B.2)+C.162+D.20, A+B.1(or B.2)+C.163+D.20, A+B.1(or B.2)+C.163a+D.20, A+B.1(or B.2)+C.164+D.20, A+B.1(or B.2)+C.165+D.20, A+B.1(or B.2)+C.166+D.20.

In one embodiment of the compositions of this invention, the weight ratio of herbicide A (in particular (±)-2-exo-(2-Methylbenzyloxy)-1-methyl-4-isopropyl-7-oxabicyclo[2.2.1]heptane) to herbicide C is in general in the range from 1:0.002 to 1:128, preferably from 1:0.0026 to 1:86 and more preferably from 1:0.004 to 1:64, wherein each herbicide C being an ester or a salt of an acid is calculated as the acid. The aforementioned weight ratios are particularly suitable for use in oilseed rape.

In another embodiment, the weight ratio of herbicide A (in particular (±)-2-exo-(2-Methylbenzyloxy)-1-methyl-4-isopropyl-7-oxabicyclo[2.2.1]heptane) to herbicide C is in the range from 1:0.002 to 1:36, preferably from 1:0.002 to 1:24 and more preferably from 1:0.004 to 1:18, wherein each herbicide C being an ester or a salt of an acid is calculated as the acid. The aforementioned weight ratios are particularly suitable for use in rice.

In one embodiment of the compositions of this invention, the weight ratio of herbicide B (preferably quinclorac (B.1) or quinmerac (B.2), in particular quinmerac (B.2)) to herbicide C is in general in the range from 1:0.0014 to 1:320, preferably from 1:0.0028 to 1:143 and more preferably from 1:0.005 to 1:64, wherein each herbicide C being an ester or a salt of an acid is calculated as the acid. The aforementioned weight ratios are particularly suitable for use in oilseed rape.

In another embodiment, the weight ratio of herbicide B (preferably quinclorac (B.1) or quinmerac (B.2), in particular quinclorac (B.1)) to herbicide C is in the range from 1:0.001 to 1:90, preferably from 1:0.002 to 1:40 and more preferably from 1:0.005 to 1:18, wherein each herbicide C being an ester or a salt of an acid is calculated as the acid. The aforementioned weight ratios are particularly suitable for use in rice.

The composition contains the safener D in an effective amount, which is generally at least 0.1% by weight, in particular at least 0.2 or at least 0.5% by weight, based on the total amount of herbicide A, herbicide B and, if present, herbicide C.

The weight ratio of the herbicide A (in particular (±)-2-exo-(2-Methylbenzyloxy)-1-methyl-4-isopropyl-7-oxabicyclo[2.2.1]heptane) to the safener D is generally in the range from 1:0.002 to 1:24, preferably from 1:0.004 to 1:12 and more preferably from 1:0.012 to 1:5, wherein each safener D being an ester or a salt of an acid is calculated as the acid.

The weight ratio of the herbicide B (preferably quinclorac (B.1) or quinmerac (B.2), in particular quinmerac (B.2)) to the safener D is generally in the range from 1:0.0005 to 1:5, preferably from 1:0.001 to 1:3 and more preferably from 1:0.0025 to 1:1, wherein each safener D being an ester or a salt of an acid is calculated as the acid.

In the methods and uses of the invention, the herbicide A and the herbicide B are preferably applied within the same weight ratios as defined herein for the composition of this invention.

In the methods and uses of the invention, the herbicide A and the herbicide C are preferably applied within the same weight ratios as defined herein for the composition of this invention.

In the methods and uses of the invention, the herbicide B and the herbicide C are preferably applied within the same weight ratios as defined herein for the composition of this invention.

In the methods and uses of the invention, the herbicide A and the safener D are preferably applied within the same weight ratios as defined herein for the composition of this invention.

In the methods and uses of the invention, the herbicide B and the safener D are preferably applied within the same weight ratios as defined herein for the composition of this invention.

In the methods and uses of the invention, the herbicide A, the herbicide B and, if present, the herbicide C and/or the safener D can be applied jointly or separately.

In the methods and uses of the invention, the herbicide A, herbicide B and, if present, the herbicide C and/or the safener D can be applied simultaneously or in succession.

Preferably, the herbicide A, herbicide B and, if present, the herbicide C and/or the safener D are applied simultaneously to the undesirable vegetation. In another embodiment, the herbicide A, herbicide B and, if present, the herbicide C and/or the safener D are provided as herbicidal composition according to the invention (e.g. a tank mixture containing the herbicide A, the herbicide B and, if present, the herbicide C and/or the safener D) being applied to the undesirable vegetation. Thus, in some embodiments of the method of this invention, the herbicidal composition of this invention is applied to the undesirable vegetation or the locus thereof with or applied to the soil or water to prevent the emergence or growth of the undesirable vegetation.

In case of separate or successive application, the order of the application of the herbicide A, the herbicide B and, if present, the herbicide C and/or the safener D is of minor importance. It is only necessary that the herbicide A, the herbicide B and, if present, the herbicide C and/or the safener D are applied in a time frame that allows simultaneous action of the active ingredients on the plants to be controlled and/or safened, preferably within a time frame of at most 14 days, in particular at most 7 days.

In the methods and uses of the invention, the herbicide A, herbicide B and, if present, the herbicide C and/or the safener D (or the composition according to the invention) can be applied pre-emergence (before the emergence of undesirable vegetation) or post-emergence (i.e., during and/or after emergence of the undesirable vegetation).

Preferably, the herbicide A, herbicide B and, if present, the herbicide C and/or the safener D (or the composition according to the invention) are/is applied before the emergence of the undesirable vegetation (pre-emergence).

More preferably, the herbicide A, herbicide B and, if present, the herbicide C and/or the safener D (or the composition according to the invention) are/is applied before or during the emergence of the undesirable vegetation (pre-emergence or early-post emergence).

In another embodiment, the herbicide A, herbicide B and, if present, the herbicide C and/or the safener D (or the composition according to the invention) are/is applied after emergence of the undesirable vegetation.

In case of post-emergence treatment, the herbicide A, herbicide B and, if present, the herbicide C and/or the safener D (or the composition according to the invention) are/is preferably applied after the undesirable vegetation has emerged and has developed up to 6 leaves.

The compositions and methods of the present invention are suitable for controlling a large number of undesirable vegetation (harmful plants), including monocotyledonous weeds and dicotyledonous weeds.

In one embodiment, the undesirable vegetation is selected from monocotyledonous weed species. Preferably, the undesirable vegetation is selected from the family Poaceae. More preferably, the undesirable vegetation is selected from the tribes Aveneae, Bromeae, Paniceae and Poeae. In one embodiment, the undesirable vegetation is selected from the tribe Aveneae. In another embodiment, the undesirable vegetation is selected from the tribe Bromeae. In yet another embodiment, the undesirable vegetation is selected from the tribe Paniceae. In still another embodiment, the undesirable vegetation is selected from the tribe Poeae.

In particular, the compositions and methods of the present invention may be used for controlling annual weeds such as gramineous weeds (grass weeds) including, but not limited to, the genera *Aegilops* such as *Aegilops cylindrical* (AEGCY, jointed goatgrass); *Agropyron* such as *Agropyron repens* (AGRRE, common couchgrass); *Alopecurus* such as *Alopecurus myosuroides* (ALOMY, blackgrass) or *Alopecurus aequalis* (ALOAE, foxtail); *Apera* such as *Apera spica-venti* (APESV, silky wind grass); *Avena* such as *Avena fatua* (AVEFA, wild oat) or *Avena sterilis* subsp. *Sterilis* (AVEST, sterile oat); *Brachiaria* such as *Brachiaria plantaginea* (BRAPL, Alexander grass) or *Brachiaria decumbens* (BRADC, Surinam grass); *Bromus* such as *Bromus inermis* (BROIN, awnless brome), *Bromus sterilis* (BROST, barren bromegrass), *Bromus tectorum* (BROTE, cheatgrass), *Bromus arvensis* (BROAV, field bromegrass), *Bromus secalinus* (BROSE, rye bromegrass) or *Bromus hordeacus* (BROMO, lopgrass); *Cenchrus* such as *Cenchrus echinatus* (CCHEC, Mossman River grass); *Cynodon* such as *Cynodon dactylon* (CYNDA, bermudagrass); *Digitaria* such as *Digitaria ciliaris* (DIGAD, southern crabgrass), *Digitaria sanguinalis* (DIGSA, hairy crabgrass), *Digitaria insularis* (TRCIN, sourgrass) or *Digitaria ischaemum* (DIGIS, smooth crabgrass); *Echinochloa* such as *Echinochloa colonum* (ECHCO, awnless barnyardgrass), *Echinochloa crus-galli* (ECHCG, common barnyard grass), *Echinochloa crus-pavonis* (ECHCV, Gulf cockspurgrass), *Echinochloa oryzoides* (ECHOR, early barnyardgrass) or *Echinochloa phyllogogon* (ECHPH, late barnyardgrass); *Eleusine* such as *Eleusine indica* (ELEIN, Indian goosegrass); *Ischaemum* such as *Ischaemum rugusom* (ISCRU, muraina grass); *Leptochloa* such as *Leptochloa chinensis* (LEFCH, Chinese sprangletop), *Leptochloa fascicularis* (LEFFA, salt-meadow grass), *Leptochloa filiformis* (LEFPC, thread sprangletop), *Leptochloa mucronata* (LEFFI, red sprangletop), *Leptochloa panicoides* (LEFPA, tighthead sprangletop), *Leptochloa scabra* (LEFSC) or *Leptochloa virgata* (LEFVI, tropical sprangletop); *Lolium* such as *Lolium multiflorum* (LOLMU, Italian ryegrass), *Lolium perenne* (LOLPE, English ryegrass) or *Lolium rigidum* (LOLRI, annual rye-grass); *Panicum* such as *Panicum capillare* (PANCA, tumble panicgrass), *Panicum dichotomiflorum* (PANDI, smooth witchgrass), *Panicum laevifolium* (PANLF, sweet panicgrass) or *Panicum miliaceum* (PANMI, common millet); *Phalaris* such as *Phalaris minor* (PHAMI, lesser canary grass), *Phalaris paradoxa* (PHAPA, paradoxagrass), *Phalaris canariensis* (PHACA, canarygrass) or *Phalaris brachystachys* (PHABR, short-spiked canarygrass); *Poa* such as *Poa annua* (POAAN, annual bluegrass), *Poa pratensis* (POAPR, Kentucky bluegrass) or *Poa trivialis* (POATR, rough meadowgrass); *Rottboellia* such as *Rottboellia exaltata* (ROOEX, guinea-fowl grass); *Setaria* such as *Setaria faberi* (SETFA, giant foxtail), *Setaria glauca* (PESGL, pearl millet), *Setaria italic* (SETIT, Italian millet), *Setaria pumila* (SETPU, yellow foxtail), *Setaria verticillata* (SETVE, bristly foxtail) or *Setaria viridis* (SETVI, green foxtail); and *Sorghum* such as *Sorghum halepense* (SORHA, Johnson grass).

Preferably, the undesirable vegetation is a monocotyledonous weed species selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria* and *Sorghum*. More preferably, the undesirable vegetation is a monocotyledonous weed species selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia,* and *Setaria*. Even more preferably, the undesirable vegetation is selected from the genera *Alopecurus, Apera, Avena, Digitaria, Echinochloa, Leptochloa, Lolium, Phalaris, Poa* and *Setaria*. In particular, the undesirable vegetation is selected from the genera *Alopecurus, Apera, Avena, Echinochloa, Leptochloa, Lolium, Phalaris* and *Poa*. Most preferably, the undesirable vegetation is selected from the genera *Alopecurus, Avena, Lolium* and *Phalaris*.

In another embodiment, the undesirable vegetation is a monocotyledonous weed species selected from the genera *Alopecurus, Avena, Digitaria, Echinochloa, Lolium, Setaria* and *Sorghum*.

In yet another embodiment, the undesirable vegetation is a monocotyledonous weed species selected from the genera *Alopecurus, Apera, Lolium* and *Poa*.

In still another embodiment, the undesirable vegetation is a monocotyledonous weed species selected from the genera *Echinochloa, Leptochloa* and *Setaria*.

In another embodiment, the undesirable vegetation is a monocotyledonous weed species selected from *Agropyron repens, Alopecurus myosuroides, Alopecurus aequalis, Apera spica-venti, Avena fatua, Avena sterilis* subsp. *sterilis, Brachiaria plantaginea, Brachiaria decumbens, Bromus inermis, Bromus sterilis, Bromus tectorum, Bromus arvensis, Bromus secalinus, Bromus hordeacus, Cynodon dactylon, Digitaria ciliaris, Digitaria sanguinalis, Digitaria insularis, Digitaria ischaemum, Echinochloa colona, Echinochloa crus-galli, Echinochloa crus-pavonis, Echinochloa erecta, Echinochloa oryzoides, Echinochloa phyllogogon, Eleusine indica, Ischaemum rugusom, Leptochloa chinensis, Leptochloa fascicularis, Leptochloa filliformis, Leptochloa panicoides, Leptochloa scabra, Leptochloa virgata, Lolium multiflorum, Lolium perenne, Lolium rigidum, Panicum capillare, Panicum dichotomiflorum, Panicum laevifolium, Panicum miliaceum, Phalaris minor, Phalaris paradoxa, Phalaris canariensis, Phalaris brachystachys, Poa annua, Poa pratensis, Poa trivialis, Rottboellia exaltata, Setaria faberi, Setaria glauca, Setaria italica, Setaria pumila, Setaria verticillata, Setaria viridis* and *Sorghum halepense*.

Preferably, the undesirable vegetation is a monocotyledonous weed species selected from *Agropyron repens, Alopecurus myosuroides, Alopecurus aequalis, Apera spica-venti, Avena fatua, Avena sterilis* subsp. *sterilis, Brachiaria plantaginea, Brachiaria decumbens, Bromus inermis, Bromus sterilis, Bromus tectorum, Bromus arvensis, Bromus secalinus, Bromus hordeacus, Cynodon dactylon, Digitaria ciliaris, Digitaria sanguinalis, Digitaria insularis, Digitaria ischaemum, Echinochloa colona, Echinochloa crus-galli, Echinochloa crus-pavonis, Echinochloa erecta, Echinochloa oryzoides, Echinochloa phyllogogon, Eleusine indica, Ischaemum rugusom, Leptochloa chinensis, Leptochloa fascicularis, Leptochloa filliformis, Leptochloa panicoides, Leptochloa scabra, Leptochloa virgata, Lolium multiflorum, Lolium perenne, Lolium rigidum, Panicum capillare, Panicum dichotomiflorum, Panicum laevifolium, Panicum miliaceum, Phalaris minor, Phalaris paradoxa, Phalaris canariensis, Phalaris brachystachys, Poa annua, Poa pratensis, Poa trivialis, Rottboellia exaltata, Setaria faberi, Setaria glauca, Setaria italica, Setaria pumila, Setaria verticillata,* and *Setaria viridis.*

In particular, the monocotyledonous weed species is selected from *Alopecurus myosuroides, Alopecurus aequalis, Apera spica-venti, Avena fatua, Avena sterilis* subsp. *sterilis, Echinochloa crus-galli, Echinochloa oryzoides, Leptochloa chinensis, Lolium multiflorum, Lolium perenne, Lolium rigidum, Phalaris minor, Phalaris paradoxa, Phalaris canariensis, Phalaris brachystachys, Poa annua, Poa pratensis* and *Poa trivialis*, more preferably from *Alopecurus myosuroides, Alopecurus aequalis, Apera spica-venti, Avena fatua, Echinochloa grus-galli, Echinochloa oryzoides, Leptochloa chinensis, Lolium multiflorum, Lolium rigidum, Phalaris minor* and *Poa annua*, and most preferably from *Alopecurus myosuroides, Avena fatua, Lolium multiflorum, Lolium rigidum* and *Phalaris minor.*

In another embodiment, the monocotyledonous weed species is selected from *Alopecurus myosuroides, Avena fatua, Digitaria sanguinalis, Echinochloa crus-galli, Lolium multiflorum, Setaria viridis* and *Sorghum halepense.*

In yet another embodiment, the monocotyledonous weed species is selected from *Alopecurus myosuroides, Apera spica-venti, Lolium multiflorum* and *Poa annua.*

In still another embodiment, the monocotyledonous weed species is selected from *Echinochloa grus-galli, Leptochloa chinensis* and *Setaria viridis.*

The compositions and methods of the present invention are also suitable for controlling a large number of dicotyledonous weeds, in particular broadleaf weeds including, but not limited to, *Polygonum* species such as *Polygonum convolvulus* (POLCO, wild buckwheat), *Amaranthus* species such as *Amaranthus albus* (AMAAL, tumble pigweed), *Amaranthus blitoides* (AMABL, mat amaranth), *Amaranthus hybridus* (AMACH, green pigweed), *Amaranthus palmeri* (AMAPA, Palmer amaranth), *Amaranthus powellii* (AMAPO, Powell amaranth), *Amaranthus retroflexus* (AMARE, redroot pigweed), *Amaranthus tuberculatus* (AMATU, rough-fruit amaranth), *Amaranthus rudis* (AMATA, tall amaranth) or *Amaranthus viridis* (AMAVI, slender amaranth), *Aethusa* species such as *Aethusa cynapium* (AETCY, fool's parsley), *Ammi* species such as *Ammi majus* (AMIMI), *Conium* species such as *Conium maculatum* (COIMA, poison hemlock), *Chenopodium* species such as *Chenopodium album* (CHEAL, common lambsquarters), *Chenopodium ficifolium* (CHEFI, fig-leaved goosefoot), *Chenopodium polyspermum* (CHEPO, many-seeded goosefoot) or *Chenopodium hybridum* (CHEHY, maple-leaf goosefoot), *Sida* species such as *Sida spinosa* L. (SIDSP, prickly sida), *Ambrosia* species such as *Ambrosia artemisiifolia* (AMBEL, common ragweed), *Acanthospermum* species, *Anthemis* species such as *Anthemis arvensis* (ANTAR, field chamomile), *Atriplex* species, *Cirsium* species, *Convolvulus* species, *Conyza* species such as *Conyza bonariensis* (ERIBO, hairy horseweed) or *Conyza canadensis* (ERICA, Canada horseweed), *Cassia* species, *Commelina* species, *Datura* species, *Euphorbia* species, *Geranium* species such as *Geranium dissectum* (GERDI, cut-leaf geranium), *Geranium pusillium* (GERPU, small-flower geranium) or *Geranium rotundifolium* (GERRT, round-leaved cranesbill), *Galinsoga* species, *Ipomoea* species such as *Ipomoea hederacea* (IPOHE, morningglory), *Lamium* species, *Malva* species, *Matricaria* species such as *Matricaria chamomilla* (MATCH, wild chamomile), *Matricaria discoidea* (MATMT, pineapple weed) or *Matricaria inodora* (MATIN, false chamomille), *Sysimbrium* species, *Solanum* species, *Xanthium* species, *Veronica* species, *Viola* species, *Stellaria* species such as *Stellaria media* (STEME, common chickweed), *Abutilon theophrasti* (ABUTH, velvet leaf), Hemp sesbania (*Sesbania exaltata* Cory, SEBEX, Colorado river hemp), *Anoda cristata* (ANVCR, cottonweed), *Bidens pilosa* (BIDPI, common blackjack), *Centaurea* species such as *Centaurea cyanus* (CENCY, cornflower), *Galeopsis tetrahit* (GAETE common hemp nettle), *Galium aparine* (GALAP, cleavers or goosegrass), *Galium spurium* (GALSP, false cleavers), *Galium tricornutum* (GALTC, corn cleavers), *Helianthus annuus* (HELAN, common sunflower), *Desmodium tortuosum* (DEDTO, giant beggar weed), *Kochia scoparia* (KCHSC, mock cypress), *Mercurialis annua* (MERAN, annual mercury), *Myosotis arvensis* (MYOAR, field forget-me-not), *Papaver rhoeas* (PAPRH, common poppy), *Salsola kali* (SASKA, prickly glasswort), *Sonchus arvensis* (SONAR, corn sowthistle), *Tagetes minuta* (TAGMI, Mexican marigold), *Richardia brasiliensis* (RCHBR, Brazil pusley), cruciferous weeds such as *Raphanus raphanistrum* (RAPRA, wild radish), *Sinapis alba* (SINAL, white mustard), *Sinapis arvensis* (SINAR, wild mustard), *Thlaspi arvense* (THLAR, fanweed), *Descurainia Sophia* (DESSO, flixweed), *Capsella bursa-pastoris* (CAPBP, shepherd's purse), *Sisymbrium* species such as *Sisymbrium officinale* (SSYOF, hedge mustard) or *Sisymbrium orientale* (SSYOR, oriental mustard), *Brassica kaber* (SINAR, wild mustard).

Preferably, the undesirable vegetation is a dicotyledonous weed species selected from the genera *Abutilon, Amaranthus, Ambrosia, Ammi, Anthemis, Capsella, Centaurea, Chenopodium, Conium, Conyza, Descurainia, Galium, Geranium, Kochia, Matricaria, Papaver, Polygonum, Raphanus, Sinapis, Sisymbrium, Stellaria* and *Thlaspi*. More preferably, the undesirable vegetation is a dicotyledonous weed species selected from the genera *Amaranthus, Ambrosia, Aethusa, Ammi, Conium, Anthemis, Capsella, Centaurea, Chenopodium, Conyza, Descurainia, Galium, Geranium, Kochia, Matricaria, Papaver, Raphanus, Sinapis, Sisymbrium, Stellaria* and *Thlaspi*, even more preferably from the genera *Anthemis, Centaurea, Galium, Geranium, Matricaria, Papaver, Sisymbrium* and *Stellaria.*

In another embodiment, the undesirable vegetation is a dicotyledonous weed species selected from the genera *Abutilon, Amaranthus, Anthemis, Geranium, Papaver, Polygonum* and *Stellaria.*

Still more preferably, the dicotyledonous weed species is selected from *Abutilon theophrasti, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus*

*viridis, Ambrosia artemisiifolia, Aethusa cynapium, Ammi majus, Conium maculatum, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Geranium dissectum, Geranium pusillum, Geranium rotundifolium, Kochia scoparia, Matricaria chamomilla, Matricaria discoidea, Matricaria inodora, Papaver rhoeas, Polygonum convolvulus, Raphanus raphanistrum, Sinapis alba, Sinapis arvensis, Sisymbrium officinale, Sisymbrium orientale, Stellaria media*, and *Thlaspi arvense*.

In particular, the dicotyledonous weed species is selected from *Amaranthus albus, Amaranthus blitoides, Amaranthus hybridus, Amaranthus palmed, Amaranthus powellii, Amaranthus retroflexus, Amaranthus tuberculatus, Amaranthus rudis, Amaranthus viridis, Ambrosia artemisiifolia, Aethusa cynapium, Ammi majus, Conium maculatum, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Geranium dissectum, Geranium pusillum, Geranium rotundifolium, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media*, and *Thlaspi arvense*. Most preferably, the dicotyledonous weed species is selected from *Anthemis arvensis, Centaurea cyanus, Galium aparine, Geranium dissectum, Geranium pusillum, Geranium rotundifolium Matricaria chamomilla, Matricaria inodora, Papaver rhoeas, Sisymbrium officinale* and *Stellaria media*.

In another embodiment, the dicotyledonous weed species is selected from *Abutilon theophrasti, Amaranthus retroflexus, Anthemis arvensis, Geranium dissectum, Papaver rhoeas, Polygonum convolvulus* and *Stellaria media*.

In another embodiment, the undesirable vegetation is selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Aethusa, Abutilon, Amaranthus, Ambrosia, Ammi, Anthemis, Capsella, Centaurea, Chenopodium, Conium, Conyza, Descurainia, Galium, Geranium, Kochia, Matricaria, Papaver, Polygonum, Raphanus, Sinapis, Sisymbrium, Stellaria* and *Thlaspi*.

Preferably, the undesirable vegetation is selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Aethusa, Amaranthus, Ambrosia, Ammi, Anthemis, Capsella, Centaurea, Chenopodium, Conium, Conyza, Descurainia, Galium, Kochia, Matricaria, Papaver, Raphanus, Sinapis, Sisymbrium, Stellaria* and *Thlaspi*. More preferably, the undesirable vegetation is selected from the genera *Alopecurus, Apera, Digitaria, Echinochloa, Leptochloa, Lolium, Phalaris, Poa, Setaria, Aethusa, Amaranthus, Ammi, Anthemis, Capsella, Centaurea, Chenopodium, Conium, Descurania, Galium, Kochia, Matricaria, Papaver, Sisymbrium, Stellaria* and *Thlaspi*, still more preferably selected from the genera *Alopecurus, Apera, Echinochloa, Leptochloa, Lolium, Phalaris, Poa, Amaranthus, Chenopodium, Galium, Matricaria, Papaver* and *Stellaria*, even more preferably selected from the genera *Alopecurus, Echinochloa, Lolium, Phalaris, Poa, Amaranthus, Chenopodium, Galium, Matricaria, Papaver* and *Stellaria*, yet more preferably selected from the genera *Alopecurus, Echinochloa, Lolium, Phalaris, Poa, Galium* and *Papaver* and in particular selected from the genera *Alopecurus, Lolium, Phalaris, Galium* and *Papaver*.

In another embodiment, the undesirable vegetation is selected from the genera *Alopecurus, Avena, Digitaria, Echinochloa, Lolium, Setaria, Sorghum, Abutilon, Amaranthus, Anthemis, Geranium, Papaver, Polygonum* and *Stellaria*.

In yet another embodiment, the undesirable vegetation is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Sorghum halepense, Abutilon theophrasti, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisiifolia, Aethusa cynapium, Ammi majus, Conium maculatum, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Geranium dissectum, Kochia scoparia, Matricaria chamomilla, Matricaria discoidea, Matricaria inodora, Papaver rhoeas, Polygonum convolvulus, Raphanus raphanistrum, Sinapis alba, Sinapis arvensis, Sisymbrium officinale, Sisymbrium orientale, Stellaria media* and *Thlaspi arvense*, preferably selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisiifolia, Aethusa cynapium, Ammi majus, Conium maculatum, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum,*

*Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, more preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumilla, Setaria verticillata, Setaria viridis, Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Galium aparine, Kochia scoparia, Matricaria chamomilla, Matricaria inodora, Papaver rhoeas, Sisymbrium officinale, Stellaria media* and *Thlaspi arvense*, even more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Amaranthus powellii, Amaranthus retroflexus, Amaranthus tuberculatus, Amaranthus rudis, Chenopodium album, Galium aparine, Matricaria chamomilla, Matricaria inodora, Papaver rhoeas* and *Stellaria media*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua, Galium aparine* and in particular selected from the group consisting of *Alopecurus myosuroides, Lolium multiflorum, Lolium rigidum, Phalaris minor* and *Galium aparine*.

In another embodiment, the undesirable vegetation is selected from the group consisting of *Alopecurus myosuroides, Avena fatua, Digitaria sanguinalis, Echinochloa crus-galli, Lolium multiflorum, Setaria viridis, Sorghum halepense, Abutilon theophrasti, Amaranthus retroflexus, Anthemis arvensis, Geranium dissectum, Papaver rhoeas, Polygonum convolvulus* and *Stellaria media*.

In another embodiment, the undesirable vegetation is a herbicide resistant or tolerant weed species.

Exemplary herbicide resistant or tolerant weed species include, but are not limited to, biotypes resistant or tolerant to herbicides selected from the group consisting of acetyl CoA carboxylase (ACCase) inhibitors (HRAC Group A), acetolactate synthase (ALS) inhibitors (HRAC Group B), photosystem II (PS II) inhibitors (HRAC Groups C1, C2 and C3), photosystem I (PS I) inhibitors (HRAC Group D), protoporphyrinogen oxidase (PPO) inhibitors (HRAC Group E), 4-hydroxyphenyl-pyruvate-dioxygenase (HPPD) inhibitors (HRAC Group F1), phytoene desaturase (PDS) inhibitors (HRAC Group F2), carotenoid biosynthesis inhibitors (HRAC Group F3), DOXP synthase inhibitors (HRAC Group F4), 5-enolpymvylshikimate-3-phosphate (EPSP) inhibitors (HRAC Group G), glutamine synthetase inhibitors (HRAC Group H), DHP synthase inhibitors (HRAC Group I), inhibitors of microtubuli assembly (HRAC Group K1), inhibitors of mitosis/microtubuli organization (HRAC Group K2), very long chain fatty acid (VLCFA) inhibitors (HRAC Group K3), Inhibitors of cell wall synthesis (HRAC Group L), uncoupler (membrane disruption) (HRAC Group M), Inhibitors of lipid synthesis (HRAC Group N), synthetic auxins (HRAC Group O), auxin transport inhibitors (HRAC Group P) and herbicides with unknown mode of action (HRAC Group Z).

Preferably, the herbicide resistant or tolerant weed species is selected from biotypes resistant or tolerant to herbicides selected from the group consisting of acetyl CoA carboxylase (ACCase) inhibitors (HRAC Group A), acetolactate synthase (ALS) inhibitors (HRAC Group B), photosystem II (PS II) inhibitors (HRAC Groups C1, C2 and C3), protoporphyrinogen oxidase (PPO) inhibitors (HRAC Group E), 4-hydroxyphenyl-pyruvate-dioxygenase (HPPD) inhibitors (HRAC Group F1), phytoene desaturase (PDS) inhibitors (HRAC Group F2), 5-enolpymvylshikimate-3-phosphate (EPSP) inhibitors (HRAC Group G), inhibitors of microtubuli assembly (HRAC Group K1), very long chain fatty acid (VLCFA) inhibitors (HRAC Group K3), Inhibitors of cell wall synthesis (HRAC Group L) and inhibitors of lipid synthesis (HRAC Group N).

More preferably, the herbicide resistant or tolerant weed species is selected from biotypes resistant or tolerant to herbicides selected from the group consisting of acetyl CoA carboxylase (ACCase) inhibitors (HRAC Group A), acetolactate synthase (ALS) inhibitors (HRAC Group B), photosystem II (PS II) inhibitors (HRAC Groups C1, C2 and C3), inhibitors of microtubuli assembly (HRAC Group K1), very long chain fatty acid (VLCFA) inhibitors (HRAC Group K3) and inhibitors of lipid synthesis (HRAC Group N).

In particular, the herbicide resistant or tolerant weed species is selected from biotypes with resistance or tolerance to at least one herbicide selected from the group consisting of acetyl CoA carboxylase (ACCase) inhibitors (HRAC Group A), acetolactate synthase (ALS) inhibitors (HRAC Group B) and photosystem II (PS II) inhibitors (HRAC Groups C1, C2 and C3).

In another embodiment, the resistant or tolerant biotype is selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Aethusa, Abutilon, Amaranthus, Ambrosia, Ammi, Anthemis, Capsella, Centaurea, Chenopodium, Conium, Conyza, Descurainia, Galium, Geranium, Kochia, Matricaria, Papaver, Polygonum, Raphanus, Sinapis, Sisymbrium, Stellaria* and *Thlaspi*.

Preferably, the resistant or tolerant biotype is selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Anthemis, Amaranthus, Ambrosia, Capsella, Centaurea, Chenopodium, Conyza, Descurainia, Galium, Kochia, Matricaria, Papaver, Raphanus, Sinapis, Sisymbrium, Stellaria* and *Thlaspi*.

More preferably, the resistant or tolerant biotype is selected from the genera *Alopecurus, Apera, Digitaria, Echinochloa, Leptochloa, Lolium, Phalaris, Poa, Setaria, Amaranthus, Anthemis, Capsella, Centaurea, Chenopodium, Descurania, Kochia, Matricaria, Papaver, Sisymbrium, Stellaria* and *Thlaspi*, still more preferably selected from the genera *Alopecurus, Apera, Echinochloa, Leptochloa, Lolium, Phalaris, Poa, Amaranthus, Chenopodium, Matricaria, Papaver* and *Stellaria*, even more preferably selected from the genera *Alopecurus, Echinochloa, Lolium, Phalaris, Poa, Amaranthus, Chenopodium, Matricaria, Papaver* and *Stellaria*, yet more preferably selected from the genera *Alopecurus, Echinochloa, Lolium, Phalaris, Poa* and *Papaver* and in particular selected from the genera *Alopecurus, Lolium, Phalaris* and *Papaver*.

In another embodiment, the resistant or tolerant biotype is selected from the genera *Alopecurus, Apera, Digitaria,*

*Echinochloa, Leptochloa, Phalaris, Poa, Setaria, Amaranthus, Anthemis, Capsella, Centaurea, Chenopodium, Descurania, Kochia, Matricaria, Papaver, Sisymbrium, Stellaria* and *Thlaspi*, more preferably selected from the genera *Alopecurus, Apera, Echinochloa, Leptochloa, Phalaris, Poa, Amaranthus, Chenopodium, Matricaria, Papaver* and *Stellaria*, even more preferably selected from the genera *Alopecurus, Echinochloa, Phalaris, Poa, Amaranthus, Chenopodium, Matricaria, Papaver* and *Stellaria*, yet more preferably selected from the genera *Alopecurus, Echinochloa, Phalaris, Poa* and *Papaver* and in particular selected from the genera *Alopecurus, Phalaris* and *Papaver*.

In another embodiment, the resistant or tolerant biotype is selected from the genera *Alopecurus, Avena, Digitaria, Echinochloa, Lolium, Setaria, Sorghum, Abutilon, Amaranthus, Anthemis, Geranium, Papaver, Polygonum* and *Stellaria*.

In one embodiment, the resistant or tolerant biotype is a monocotyledonous weed species selected from the genera *Alopecurus, Apera, Digitaria, Echinochloa, Leptochloa, Lolium, Phalaris, Poa* and *Setaria*, preferably selected from the genera *Alopecurus, Apera, Echinochloa, Leptochloa, Lolium, Phalaris* and *Poa*, more preferably selected from the genera *Alopecurus, Echinochloa, Lolium, Phalaris* and *Poa*, and in particular selected from the genera *Alopecurus, Lolium* and *Phalaris*.

In another embodiment, the resistant or tolerant biotype is a monocotyledonous weed species, preferably a monocotyledonous weed species selected from the genera *Alopecurus, Apera, Digitaria, Echinochloa, Leptochloa, Phalaris, Poa* and *Setaria*, preferably selected from the genera *Alopecurus, Apera, Echinochloa, Leptochloa, Phalaris* and *Poa*, more preferably selected from the genera *Alopecurus, Echinochloa, Phalaris* and *Poa*, and in particular selected from the genera *Alopecurus* and *Phalaris*.

In another embodiment, the resistant or tolerant biotype is a dicotyledonous weed species, preferably a dicotyledonous weed species selected from the genera *Amaranthus, Anthemis, Capsella, Centaurea, Chenopodium, Descurania, Kochia, Matricaria, Papaver, Sisymbrium, Stellaria* and *Thlaspi*, more preferably selected from the genera *Amaranthus, Chenopodium, Matricaria, Papaver* and *Stellaria* and in particular selected from the genus *Papaver*.

In another embodiment, the resistant or tolerant biotype is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Sorghum halepense, Abutilon theophrasti, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisiifolia, Aethusa cynapium, Ammi majus, Conium maculatum, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Geranium dissectum, Kochia scoparia, Matricaria chamomilla, Matricaria discoidea, Matricaria inodora, Papaver rhoeas, Polygonum convolvulus, Raphanus raphanistrum, Sinapis alba, Sinapis arvensis, Sisymbrium officinale, Sisymbrium orientale, Stellaria media* and *Thlaspi arvense*.

In particular, the resistant or tolerant biotype is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisiifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumila, Setaria verticillata, Setaria viridis, Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua*, and in particular selected from the group consisting of *Alopecurus myosuroides, Lolium multiflorum, Lolium rigidum* and *Phalaris minor*.

In another embodiment, the resistant or tolerant biotype is selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata, Setaria viridis, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisiifolia, Anthemis arvensis, Capsella bursa-pastoris, Centaurea cyanus, Chenopodium album, Chenopodium ficifolium, Chenopodium polyspermum, Chenopodium hybridum, Conyza bonariensis, Conyza canadensis, Descurania sophia, Galium aparine, Galium spurium, Galium tricornutum, Kochia scoparia, Matricaria chamomilla, Matricaria discoidea, Matricaria inodora, Papaver rhoeas, Raphanus raphanistrum, Sinapis alba, Sinapis arvensis, Sisymbrium officinale, Sisymbrium orientale, Stellaria media* and *Thlaspi arvense*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Phalaris brachystachys, Phalaris minor, Phalaris paradoxa, Poa annua, Poa trivialis, Setaria faberi, Setaria glauca, Setaria pumila, Setaria verticillata, Setaria viridis, Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, more preferably selected from the group consisting of *Alopecurus myosuroides, Alopecurus aequalis, Apera spica-venti, Echinochloa crus-galli, Echinochloa oryzoides, Leptochloa chinensis, Phalaris brachystachys, Phalaris minor, Phalaris paradoxa, Poa annua, Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, especially preferably selected from the group consisting of *Alopecurus myosuroides, Alopecurus aequalis, Apera spica-venti, Echinochloa crus-galli, Echinochloa oryzoides, Leptochloa chinensis, Phalaris minor* and *Poa annua*, and in particular *Alopecurus myosuroides* or *Phalaris minor*.

In another embodiment, the resistant or tolerant biotype is selected from the group consisting of *Alopecurus myosuroides, Avena fatua, Digitaria sanguinalis, Echinochloa crus-galli, Lolium multiflorum, Setaria viridis, Sorghum halepense, Abutilon theophrasti, Amaranthus retroflexus, Anthemis arvensis, Geranium dissectum, Papaver rhoeas, Polygonum convolvulus* and *Stellaria media*.

In one embodiment, the resistant or tolerant biotype is a monocotyledonous weed species selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumilla, Setaria verticillata* and *Setaria viridis*, preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa* and *Poa annua*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua* and in particular selected from the group consisting of *Alopecurus myosuroides, Lolium multiflorum, Lolium rigidum* and *Phalaris minor*.

In another embodiment, the resistant or tolerant biotype is a dicotyledonous weed species selected from the group consisting of *Amaranthus powellii, Amaranthus retroflexus, Amaranthus tuberculatus, Amaranthus rudis, Anthemis arvensis, Capsella bursa-pastoris, Centaurea cyanus, Chenopodium album, Descurania sophia, Kochia scoparia, Matricaria chamomilla, Matricaria inodora, Papaver rhoeas, Sisymbrium officinale, Stellaria media* and *Thlaspi arvense*, preferably selected from the group consisting of *Amaranthus powellii, Amaranthus retroflexus, Amaranthus tuberculatus, Amaranthus rudis, Chenopodium album, Matricaria chamomilla, Matricaria inodora, Papaver rhoeas* and *Stellaria media*, and more preferably *Papaver rhoeas*.

In particular, the compositions, uses and methods of this invention are suitable for controlling ACCase-resistant grass weeds, more specifically ACCase-resistant grass weeds selected from the group consisting of *Alopecurus myosuroides, Alopecurus aequalis, Apera spica-venti, Avena fatua, Avena sterilis, Brachiaria plantaginea, Brachiaria decumbens, Bromus secalinus, Bromus sterilis, Bromus tectorum, Digitaria ciliaris, Digitaria insularis, Digitaria ischaemum, Digitaria sanguinalis, Echinochloa colona, Echinochloa crus-galli, Echinochloa crus-pavonis, Echinochloa erecta, Echinochloa oryzoides, Echinochloa phyllogogon, Eleusine indica, Ischaemum rugosum, Leptochloa chinensis, Leptochloa panicoides, Leptochloa scabra, Leptochloa virgata, Lolium multiflorum, Lolium perenne, Lolium rigidum, Panicum capillare, Panicum dichotomiflorum, Phalaris brachystachyx, Phalaris minor, Phalaris paradoxa, Poa annua, Poa pratensis, Poa trivialis, Rottboellia exaltata, Setaria faberi, Setaria glauca, Setaria pumila, Setaria verticillata* and *Setaria viridis*, preferably selected from the group consisting of *Alopecurus myosuroides, Alopecurus aequalis, Apera spica-venti, Digitaria ischaemum, Digitaria sanguinalis, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa, Poa annua, Poa trivialis, Setaria faberi, Setaria glauca, Setaria pumila, Setaria verticillata* and *Setaria viridis*, more preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium perenne, Lolium rigidum, Phalaris brachystachys, Phalaris minor, Phalaris paradoxa* and *Poa annua*, especially preferably selected from the group consisting of *Alopecurus myosuroides, Alopecurus aequalis, Apera spica-venti, Echinochloa crus-galli, Echinochloa oryzoides, Leptochloa chinensis, Lolium multiflorum, Lolium rigidum, Phalaris minor* and *Poa annua*, and in particular selected from the group consisting of *Alopecurus myosuroides*, *Lolium multiflorum*, *Lolium rigidum* and *Phalaris minor*.

The compositions, uses and methods of this invention are also suitable for controlling ALS-resistant grass weeds, more specifically ALS-resistant grass weeds selected from the group consisting of *Alopecurus myosuroides*, *Alopecurus aequalis*, *Apera spica-venti*, *Avena fatua*, *Avena sterilis*, *Brachiaria plantaginea*, *Brachiaria decumbens*, *Bromus secalinus*, *Bromus sterilis*, *Bromus tectorum*, *Digitaria ciliaris*, *Digitaria insularis*, *Digitaria ischaemum*, *Digitaria sanguinalis*, *Echinochloa colona*, *Echinochloa crus-galli*, *Echinochloa crus-pavonis*, *Echinochloa erecta*, *Echinochloa oryzoides*, *Echinochloa phyllogogon*, *Eleusine indica*, *Ischaemum rugosum*, *Leptochloa chinensis*, *Leptochloa panicoides*, *Leptochloa scabra*, *Leptochloa virgata*, *Lolium multiflorum*, *Lolium perenne*, *Lolium rigidum*, *Panicum capillare*, *Panicum dichotomiflorum*, *Phalaris brachystachyx*, *Phalaris minor*, *Phalaris paradoxa*, *Poa annua*, *Poa pratensis*, *Poa trivialis*, *Rottboellia exaltata*, *Setaria faberi*, *Setaria glauca*, *Setaria pumila*, *Setaria verticillata* and *Setaria viridis*, preferably selected from the group consisting of *Alopecurus myosuroides*, *Alopecurus aequalis*, *Apera spica-venti*, *Digitaria ischaemum*, *Digitaria sanguinalis*, *Echinochloa crus-galli*, *Echinochloa oryzoides*, *Leptochloa chinensis*, *Lolium multiflorum*, *Lolium perenne*, *Lolium rigidum*, *Phalaris brachystachys*, *Phalaris minor*, *Phalaris paradoxa*, *Poa annua*, *Poa trivialis*, *Setaria faberi*, *Setaria glauca*, *Setaria pumilla*, *Setaria verticillata* and *Setaria viridis*, more preferably selected from the group consisting of *Alopecurus myosuroides*, *Alopecurus aequalis*, *Apera spica-venti*, *Echinochloa crus-galli*, *Echinochloa oryzoides*, *Leptochloa chinensis*, *Lolium multiflorum*, *Lolium perenne*, *Lolium rigidum*, *Phalaris brachystachys*, *Phalaris minor*, *Phalaris paradoxa* and *Poa annua*, especially preferably selected from the group consisting of *Alopecurus myosuroides*, *Alopecurus aequalis*, *Apera spica-venti*, *Echinochloa crus-galli*, *Echinochloa oryzoides*, *Leptochloa chinensis*, *Lolium multiflorum*, *Lolium rigidum Phalaris minor* and *Poa annua*, and in particular selected from the group consisting of *Alopecurus myosuroides*, *Lolium multiflorum*, *Lolium rigidum* and *Phalaris minor*.

The compositions, uses and methods of this invention are also suitable for controlling ALS-resistant dicotyledonous weeds, more specifically ALS-resistant dicotyledonous weeds selected from the group consisting of *Amaranthus albus*, *Amaranthus blitoides*, *Amaranthus hybridus*, *Amaranthus palmeri*, *Amaranthus powellii*, *Amaranthus retroflexus*, *Amaranthus tuberculatus*, *Amaranthus rudis*, *Amaranthus viridis*, *Ambrosia artemisiifolia*, *Anthemis arvensis*, *Capsella bursa-pastoris*, *Centaurea cyanus*, *Chenopodium album*, *Chenopodium ficifolium*, *Chenopodium polyspermum*, *Chenopodium hybridum*, *Conyza bonariensis*, *Conyza canadensis*, *Descurania sophia*, *Galium aparine*, *Galium spurium*, *Galium tricornutum*, *Kochia scoparia*, *Matricaria chamomilla*, *Matricaria discoidea*, *Matricaria inodora*, *Papaver rhoeas*, *Raphanus raphanistrum*, *Sinapis alba*, *Sinapis arvensis*, *Sisymbrium officinale*, *Sisymbrium orientale*, *Stellaria media*, and *Thlaspi arvense*, preferably selected from the group consisting of *Amaranthus powellii*, *Amaranthus retroflexus*, *Amaranthus tuberculatus*, *Amaranthus rudis*, *Anthemis arvensis*, *Capsella bursa-pastoris*, *Centaurea cyanus*, *Chenopodium album*, *Descurania sophia*, *Kochia scoparia*, *Matricaria chamomilla*, *Matricaria inodora*, *Papaver rhoeas*, *Sisymbrium officinale*, *Stellaria media* and *Thlaspi arvense*, more preferably selected from the group consisting of *Amaranthus powellii*, *Amaranthus retroflexus*, *Amaranthus tuberculatus*, *Amaranthus rudis*, *Chenopodium album*, *Matricaria chamomilla*, *Matricaria inodora*, *Papaver rhoeas* and *Stellaria media*, and in particular *Papaver rhoeas*.

In particular, the compositions, uses and methods of this invention are suitable for controlling PS II-resistant grass weeds, more specifically PS II-resistant grass weeds selected from the group consisting of *Alopecurus myosuroides*, *Alopecurus aequalis*, *Apera spica-venti*, *Avena fatua*, *Avena sterilis*, *Brachiaria plantaginea*, *Brachiaria decumbens*, *Bromus secalinus*, *Bromus sterilis*, *Bromus tectorum*, *Digitaria ciliaris*, *Digitaria insularis*, *Digitaria ischaemum*, *Digitaria sanguinalis*, *Echinochloa colona*, *Echinochloa crus-galli*, *Echinochloa crus-pavonis*, *Echinochloa erecta*, *Echinochloa oryzoides*, *Echinochloa phyllogogon*, *Eleusine indica*, *Ischaemum rugosum*, *Leptochloa chinensis*, *Leptochloa panicoides*, *Leptochloa scabra*, *Leptochloa virgata*, *Lolium multiflorum*, *Lolium perenne*, *Lolium rigidum*, *Panicum capillare*, *Panicum dichotomiflorum*, *Phalaris brachystachyx*, *Phalaris minor*, *Phalaris paradoxa*, *Poa annua*, *Poa pratensis*, *Poa trivialis*, *Rottboellia exaltata*, *Setaria faberi*, *Setaria glauca*, *Setaria pumila*, *Setaria verticillata* and *Setaria viridis*, preferably selected from the group consisting of *Alopecurus myosuroides*, *Alopecurus aequalis*, *Apera spica-venti*, *Digitaria ischaemum*, *Digitaria sanguinalis*, *Echinochloa crus-galli*, *Echinochloa oryzoides*, *Leptochloa chinensis*, *Lolium multiflorum*, *Lolium perenne*, *Lolium rigidum*, *Phalaris brachystachys*, *Phalaris minor*, *Phalaris paradoxa*, *Poa annua*, *Poa trivialis*, *Setaria faberi*, *Setaria glauca*, *Setaria pumilla*, *Setaria verticillata* and *Setaria viridis*, more preferably selected from the group consisting of *Alopecurus myosuroides*, *Alopecurus aequalis*, *Apera spica-venti*, *Echinochloa crus-galli*, *Echinochloa oryzoides*, *Leptochloa chinensis*, *Lolium multiflorum*, *Lolium perenne*, *Lolium rigidum*, *Phalaris brachystachys*, *Phalaris minor*, *Phalaris paradoxa* and *Poa annua*, especially preferably selected from the group consisting of *Alopecurus myosuroides*, *Alopecurus aequalis*, *Apera spica-venti*, *Echinochloa crus-galli*, *Echinochloa oryzoides*, *Leptochloa chinensis*, *Lolium multiflorum*, *Lolium rigidum*, *Phalaris minor* and *Poa annua*, and in particular selected from the group consisting of *Alopecurus myosuroides*, *Lolium multiflorum*, *Lolium rigidum* and *Phalaris minor*.

The compositions, uses and methods of this invention are also suitable for controlling PSII-resistant dicotyledonous weeds, more specifically PSII-resistant dicotyledonous weeds selected from the group consisting of *Amaranthus albus*, *Amaranthus blitoides*, *Amaranthus hybridus*, *Amaranthus palmeri*, *Amaranthus powellii*, *Amaranthus retroflexus*, *Amaranthus tuberculatus*, *Amaranthus rudis*, *Amaranthus viridis*, *Ambrosia artemisiifolia*, *Anthemis arvensis*, *Capsella bursa-pastoris*, *Centaurea cyanus*, *Chenopodium album*, *Chenopodium ficifolium*, *Chenopodium polyspermum*, *Chenopodium hybridum*, *Conyza bonariensis*, *Conyza canadensis*, *Descurania sophia*, *Galium aparine*, *Galium spurium*, *Galium tricornutum*, *Kochia scoparia*, *Matricaria chamomilla*, *Matricaria discoidea*, *Matricaria inodora*, *Papaver rhoeas*, *Raphanus raphanistrum*, *Sinapis alba*, *Sinapis arvensis*, *Sisymbrium officinale*, *Sisymbrium orientale*, *Stellaria media* and *Thlaspi arvense*, preferably selected from the group consisting of *Amaranthus powellii*, *Amaranthus retroflexus*, *Amaranthus tuberculatus*, *Amaranthus rudis*, *Anthemis arvensis*, *Capsella bursa-pastoris*, *Centaurea cyanus*, *Chenopodium album*, *Descurania sophia*, *Kochia scoparia*, *Matricaria chamomilla*, *Matricaria inodora*, *Papaver rhoeas*, *Sisymbrium officinale*, *Stellaria media* and *Thlaspi arvense*, more preferably selected from the group consisting of *Amaranthus powellii*, *Ama-*

*ranthus retroflexus, Amaranthus tuberculatus, Amaranthus rudis, Chenopodium album, Matricaria chamomilla, Matricaria inodora, Papaver rhoeas* and *Stellaria media*, and in particular *Papaver rhoeas*.

The compositions according to the invention are suitable as herbicides as such or as appropriately formulated agrochemical compositions. As used herein, the term "agrochemical composition" refers to a composition according to the invention further comprising one or more auxiliaries customary in crop protection.

Thus, the invention also relates to agrochemical compositions comprising a herbicidally effective amount of herbicide A, herbicide B, optionally at least one herbicide C (as defined herein), optionally at least one safener D (as defined herein) and one or more auxiliaries customary in crop protection.

The herbicide A, the herbicide B, optionally at least one herbicide C (as defined herein) and optionally at least one safener D (as defined herein) can be converted into customary types of agrochemical compositions, e.g. solutions, emulsions, suspensions, dusts, powders, pastes, granules, pressings, and mixtures thereof. These and further types of agrochemical compositions are defined in the "Catalogue of pesticide formulation types and international coding system", Technical Monograph No. 2, 6$^{th}$ Ed. May 2008, CropLife International.

The agrochemical compositions can be prepared in a known manner, such as described by Mollet and Grubemann, Formulation technology, Wiley V C H, Weinheim, 2001; or Knowles, New developments in crop protection product formulation, Agrow Reports DS243, T&F Informa, London, 2005.

Thus, the invention also relates to a process for preparing the composition (more specifically the agrochemical composition) as defined herein which comprises mixing herbicide A, herbicide B, optionally herbicide C and/or safener D and one or more auxiliaries customary in crop protection.

The term "auxiliaries customary in crop protection" includes but is not limited to solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof.

Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetaines and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneimines.

Suitable adjuvants are compounds, which have a neglectable or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidones, polyvinylacetates, polyvinyl alcohols, polyacrylates, biological or synthetic waxes, and cellulose ethers.

The agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the agrochemical composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of useful agricultural area.

According to one embodiment, either individual components of the agrochemical composition according to the invention or partially premixed components, e.g. agrochemical components comprising herbicide A, herbicide B, optionally at least one herbicide C (as defined herein) and optionally at least one safener D (as defined herein) may be mixed by the user in a spray tank and further auxiliaries and additives may be added, if appropriate.

In another embodiment, individual components of the agrochemical composition according to the invention such as parts of a kit or parts of a binary or ternary mixture may be mixed by the user himself in a spray tank and further auxiliaries may be added, if appropriate.

In another embodiment, either individual components of the agrochemical composition according to the invention or partially premixed components, e.g. components comprising herbicide A, herbicide B, optionally at least one herbicide C (as defined herein) and optionally at least one safener D (as defined herein) can be applied jointly (e.g. after tank mixing) or consecutively.

Accordingly, the agrochemical composition may be provided in the form of a single package formulation comprising herbicide A, herbicide B, optionally at least one herbicide C (as defined herein) and optionally at least one safener D (as defined herein) together with liquid and/or solid carriers, and, if desired, one or more surfactants and, if desired, one or more further auxiliaries customary in crop protection. The formulation may be provided in the form of a two package formulation, wherein one package comprises a formulation of herbicide A and herbicide B while the other package comprises a formulation comprising at least one herbicide C and/or safener D, and wherein both formulations comprise at least one carrier material, if desired, one or more surfactants and, if desired, one or more further auxiliaries customary in crop protection. The formulation may also be provided in the form of a two package formulation, wherein one package comprises a formulation of herbicide A and herbicide B and optionally the safener D, while the other package comprises a formulation of the at least one herbicide C, and wherein both formulations comprises at least one carrier material, if desired, one or more surfactants and, if desired, one or more further auxiliaries customary in crop protection. In the case of two package formulations the two formulations are preferably mixed prior to application. Preferably the mixing is performed as a tank mix, i.e. the formulations are mixed immediately prior or upon dilution with water.

The compositions according to the invention control vegetation on non-crop areas very efficiently, especially at high rates of application. They act against broad-leafed weeds and grass weeds in crops such as wheat, barley, rice, corn, oilseed rape, canola, sunflowers, soybeans and cotton without causing any significant damage to the crop plants. This effect is mainly observed at low rates of application.

The compositions according to the invention are applied to the plants mainly by spraying. Here, the application can be carried out using, for example, water as carrier by customary spraying techniques using spray liquor amounts of from about 50 to 1000 l/ha (for example from 300 to 400 l/ha). The herbicidal compositions may also be applied by the low-volume or the ultra-low-volume method, or in the form of microgranules.

The herbicidal compositions according to the present invention can be applied pre- or post-emergence or together with the seed of a crop plant. It is also possible to apply the compounds and compositions by applying seed, pretreated with a composition of the invention, of a crop plant. If the herbicides A and B and, if appropriate, herbicide C, are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by).

In a further embodiment, the composition according to the invention can be applied by treating seed. The treatment of seed comprises essentially all procedures familiar to the person skilled in the art (seed dressing, seed coating, seed dusting, seed soaking, seed film coating, seed multilayer coating, seed encrusting, seed dripping and seed pelleting) based on compositions according to the invention. Here, the herbicidal compositions can be applied diluted or undiluted.

The term "seed" comprises seed of all types, such as, for example, corns, seeds, fruits, tubers, seedlings and similar forms. Here, preferably, the term seed describes corns and seeds. The seed used can be the seed of the useful plants mentioned above, but also the seed of transgenic plants or plants obtained by customary breeding methods.

Moreover, it may be advantageous to apply the compositions of the present invention on their own or jointly in combination with other crop protection agents, for example with agents for controlling pests or phytopathogenic fungi or bacteria or with groups of active compounds which regulate growth. Also of interest is the miscibility with mineral salt solutions which are employed for treating nutritional and trace element deficiencies. Non-phytotoxic oils and oil concentrates can also be added.

When employed in plant protection, the amounts of active substances applied, i.e. herbicides A and B and, if appropriate, herbicide C, without formulation auxiliaries, are, depending on the kind of effect desired, from 0.1 to 10000 grams per hectare (g/ha), preferably from 10 to 7500 g/ha, more preferably from 25 to 5000 g/ha and in particular from 50 to 3000 g/ha.

In the methods and uses of the invention, the application rate of the herbicide A is generally from 0.1 to 2000 g/ha, preferably 10 to 1,000 g/ha, more preferably 10 to 750 g/ha and in particular 10 to 500 g/ha. In another embodiment, the application rate of the herbicide A is from 50 to 1,000 g/ha, preferably 75 to 750 g/ha and more preferably 100 to 500 g/ha.

In the methods and uses of the invention, the application rate of the herbicide B (preferably quinclorac (B.1) or quinmerac (B.2), in particular quinmerac (B.2)) is generally from 0.1 to 5000 g/ha, preferably 10 to 1,400 g/ha, more preferably 10 to 700 g/ha and in particular 10 to 400 g/ha. In another embodiment, the application rate of the herbicide B (preferably quinclorac (B.1) or quinmerac (B.2), in particular quinmerac (B.2)) is from 20 to 1,400 g/ha, preferably 45 to 700 g/ha and more preferably 100 to 400 g/ha.

In the methods and uses of the invention, the application rate of the herbicide C (in case of salts calculated as the acid) is generally from 0.1 to 10000 g/ha.

Preferably, the application rate of the herbicide C (in case of salts calculated as the acid) is from 2 to 6400 g/ha. The aforementioned application rate is particularly suitable for use in oilseed rape.

In another embodiment, the application rate of the herbicide C (in case of salts calculated as the acid) is from 2 to 1800 g/ha. The aforementioned application rate is particularly suitable for use in rice.

In the methods and uses of the invention, the application rate of the safener D (in case of salts calculated as the acid) is generally from 1 to 2500 g/ha, preferably 2 to 2000 g/ha and more preferably 5 to 1500 g/ha.

In treatment of plant propagation materials such as seeds, e.g. by dusting, coating or drenching seed, amounts of active substance of from 0.1 to 5000 g, preferably from 5 to 2500 g, more preferably from 50 to 2000 g and in particular from 100 to 1500 g, per 100 kilogram of plant propagation material (preferably seeds) are generally required.

In another embodiment of the invention, to treat the seed, the amounts of active substances applied, i.e. herbicides A and B and, if appropriate, herbicide C are generally employed in amounts of from 0.001 to 10 kg per 100 kg of seed.

The compositions and methods according to the invention are useful for controlling undesirable vegetation in various crop plants. Examples of suitable crops are the following: *Allium cepa* (onions), *Allium sativum* (garlic), *Ananas comosus* (pineapples), *Arachis hypogaea* [peanuts (groundnuts)], *Asparagus officinalis* (asparagus), *Avena sativa* (oat), *Beta vulgaris* spec. *altissima* (sugar beet), *Beta vulgaris* spec. *rapa* (turnips), *Brassica napus* var. *napus* (rapeseed, canola), *Brassica napus* var. *napobrassica* (swedes), *Brassica rapa* var. *silvestris* (winter turnip rape), *Brassica oleracea* (cabbage), *Brassica nigra* (black mustard), *Camellia sinensis* (tea plants), *Carthamus tinctorius* (safflower), *Carya illinoinensis* (pecan trees), *Citrus limon* (lemons), *Citrus sinensis* (orange trees), *Coffea arabica* (*Coffea canephora*, *Coffea liberica*) (coffee plants), *Cucumis sativus* (cucumber), *Cynodon dactylon* (Bermudagrass), *Daucus carota* subspec. *sativa* (carrot), *Elaeis guineensis* (oil palms), *Fragaria vesca* (strawberries), *Glycine max* (soybeans), *Gossypium hirsutum* (*Gossypium arboreum*, *Gossypium herbaceum*, *Gossypium vitifolium*), *Helianthus annuus* (sunflowers), *Hevea brasiliensis* (rubber plants), *Hordeum vulgare* (barley), *Humulus lupulus* (hops), *Ipomoea batatas* (sweet potatoes), *Juglans regia* (walnut trees), *Lens culinaris* (lentil), *Linum usitatissimum* (flax), *Lycopersicon lycopersicum* (tomatoes), *Malus* spec. (apple trees), *Manihot esculenta* (cassava), *Medicago sativa* [alfalfa (lucerne)], *Musa* spec. (banana plants), *Nicotiana tabacum* (*N. rustica*) (tobacco), *Olea europaea* (olive trees), *Oryza sativa* (rice), *Phaseolus lunatus* (limabeans), *Phaseolus vulgaris* (snapbeans, green beans, dry beans), *Picea abies* (Norway spruce), *Pinus* spec. (pine trees), *Pistacia vera* (pistachio), *Pisum sativum* (English peas), *Prunus avium* (cherry trees), *Prunus persica* (peach trees), *Pyrus communis* (pear trees), *Prunus armeniaca* (apricot), *Prunus cerasus* (sour cherry), *Prunus dulcis* (almond trees) and *prunus domestica* (plum trees), *Ribes sylvestre* (redcurrants), *Ricinus communis* (castor-oil plants), *Saccharum officinarum* (sugar cane), *Secale cereale* (rye), *Sinapis alba*, *Solanum tuberosum* (Irish potatoes), *Sorghum bicolor* (*S. vulgare*) (*Sorghum*), *Theobroma cacao* (cacao plants), *Trifolium pratense* (red clover), *Triticum aestivum* (wheat), *Triticale* (*Triticale*), *Triticum durum* (durum wheat, hard wheat), *Vicia faba* (tick beans), *Vitis vinifera* (grapes), *Zea mays* (Indian corn, sweet corn, maize).

Preferred crops are *Allium cepa, Allium sativum, Arachis hypogaea, Beta vulgaris* spec. *altissima, Brassica napus* var. *napus, Brassica oleracea, Cynodon dactylon, Daucus carota* subspec. *Sativa, Glycine max, Gossypium hirsutum,* (*Gossypium arboreum, Gossypium herbaceum, Gossypium vitifolium*), *Helianthus annuus, Hordeum vulgare, Lens culinaris, Linum usitatissimum, Lycopersicon lycopersicum, malus* spec., *Medicago sativa, Oryza sativa, Phaseolus lunatus, Phaseolus vulgaris, Pisum sativum, Saccharum officinarum, Secale cereale, Solanum tuberosum, Sorghum bicolor* (*S. vulgare*), *Triticale, Triticum aestivum, Triticum durum, Vicia faba, Vitis vinifera* and *Zea mays*.

In another embodiment, the crop plant is selected from wheat, barley, rye, oat, triticale, maize, sunflower, rice, legume crops (like soybeans, peas, Vicia-beans, Phaseolus-beans, Vigna-beans, peanuts, chickpeas, lentils, alfalfa, lupins etc.), oilseed rape, canola, cotton, potato, sugarbeet, sugarcane, bulb vegetables (like onion, garlic, shallot, etc), carrot, tomato, brassica vegetable (like cabbage, cauliflower, broccoli, brussel sprouts, curly kale, kohlrabi, etc), leaf vegetable (like salad, lettuce, endive, radicchio, rucola, chicory, etc.), bell pepper, cucumber, eggplant, pumpkin, melon, pepper, zucchini, parsley, parsnip, radish, horseradish, leek, asparagus, celery, artichoke, tobacco, hop, citrus fruits (like orange, lemon, limon, pomelo, grapefruit, mandarin, nectarines, etc.), stonefruits (like apricot, cherry, peach, plum, etc.), pomefruits (like apple, pear, quince, etc), nuts (like almond, walnut, etc), grape, oilpalm, olives, and turfgrasses (like bahiagrass, bentgrass, bermudagrass, bluegrass, buffalograss, carpetgrass, centipedegrass, fescues, kikuyugrass, ryegrass, St. Augustine grass, zoysia grass).

In a preferred embodiment, the crop plant is selected from the group consisting of wheat, barley, rye, triticale, oat, corn (maize), sunflower, rice, soybeans, peas, beans, peanuts, oilseed rape, canola, cotton, potato, sugarbeet, sugarcane, turfgrasses and vegetables.

In an even more preferred embodiment, the crop plant is selected from the group consisting of wheat, barley, rye, triticale, oat, corn (maize), sunflower, rice, soybeans, peas, Vicia-beans, Phaseolus-beans, peanuts, oilseed rape, canola, cotton, potato, sugarbeet, sugarcane, turfgrasses and vegetables.

In an especially preferred embodiment, the undesirable vegetation is controlled in cereals, oilseed rape, sunflower, corn and legumes. In particular, the cereals are selected from the group consisting of wheat, barley, rye, oat, and *Triticale*.

In another particularly preferred embodiment, the undesirable vegetation is controlled in crops selected from the genus *Brassica*, in particular oilseed rape.

In another particularly preferred embodiment, the undesirable vegetation is controlled in crops selected from the genus *Oryza*, in particular *Oryza sativa*. In another embodiment, the undesirable vegetation is controlled in direct-seeded rice or transplanted rice.

The compositions, uses and methods according to the invention can also be used in genetically modified plants. The term "genetically modified plants" is to be understood as plants whose genetic material has been modified by the use of recombinant DNA techniques to include an inserted sequence of DNA that is not native to that plant species'genome or to exhibit a deletion of DNA that was native to that species'genome, wherein the modification(s) cannot readily be obtained by cross breeding, mutagenesis or natural recombination alone. Often, a particular genetically modified plant will be one that has obtained its genetic modification(s) by inheritance through a natural breeding or propagation process from an ancestral plant whose genome was the one directly treated by use of a recombinant DNA technique. Typically, one or more genes have been integrated into the genetic material of a genetically modified plant in order to improve certain properties of the plant. Such genetic modifications also include but are not limited to targeted post-translational modification of protein(s), oligo- or polypeptides. e.g., by inclusion therein of amino acid mutation(s) that permit, decrease, or promote glycosylation or polymer additions such as prenylation, acetylation farnesylation, or PEG moiety attachment.

Plants that have been modified by breeding, mutagenesis or genetic engineering, e.g. have been rendered tolerant to applications of specific classes of herbicides, such as auxinic herbicides such as dicamba or 2,4-D; bleacher herbicides such as 4-hydroxyphenylpyruvate dioxygenase (HPPD) inhibitors or phytoene desaturase (PDS) inhibitors; acetolactate synthase (ALS) inhibitors such as sulfonylureas or imidazolinones; enolpyruvyl shikimate 3-phosphate synthase (EPSP) inhibitors such as glyphosate; glutamine synthetase (GS) inhibitors such as glufosinate; protoporphyrinogen-IX oxidase inhibitors; lipid biosynthesis inhibitors such as acetylCoA carboxylase (ACCase) inhibitors; or oxynil (i.e. bromoxynil or ioxynil) herbicides as a result of conventional methods of breeding or genetic engineering; furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxinic herbicides, or ACCase inhibitors. These herbicide resistance technologies are, for example, described in Pest Management Science 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein. Several cultivated plants have been rendered tolerant to herbicides by mutagenesis and conventional methods of breeding, e.g., Clearfield® summer rape (Canola, BASF SE, Germany) being tolerant to imidazolinones, e.g., imazamox, or ExpressSun® sunflowers (DuPont, USA) being tolerant to sulfonyl ureas, e.g., tribenuron. Genetic engineering methods have been used to render cultivated plants such as soybean, cotton, corn, beets and rape, tolerant to herbicides such as glyphosate, imidazolinones and glufosinate, some of which are under development or commercially available under the brands or trade names RoundupReady® (glyphosate tolerant, Monsanto, USA), Cultivance® (imidazolinone tolerant, BASF SE, Germany) and LibertyLink® (glufosinate tolerant, Bayer CropScience, Germany).

Furthermore, plants are also covered that are by the use of recombinant DNA techniques capable to synthesize one or more insecticidal proteins, especially those known from the bacterial genus Bacillus, particularly from Bacillus thuringiensis, such as delta-endotoxins, e.g., CryIA(b), CryIA(c), CryIF, CryIF(a2), CryIIA(b), CryIIIA, CryIIIB(b1) or Cry9c; vegetative insecticidal proteins (VIP), e.g., VIP1, VIP2, VIP3 or VIP3A; insecticidal proteins of bacteria colonizing nematodes, e.g., photorhabdus spp. or xenorhabdus spp.; toxins produced by animals, such as scorpion toxins, arachnid toxins, wasp toxins, or other insect-specific neurotoxins; toxins produced by fungi, such as Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxy-steroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilbene synthase, bibenzyl synthase, chitinases or glucanases. In the context of the present invention these insecticidal proteins or toxins are to be understood expressly also as including pre-toxins, hybrid proteins, truncated or otherwise modified proteins. Hybrid proteins are characterized by a new combination of protein domains, (see, e.g., WO 02/015701). Further examples of such toxins or genetically modified plants capable of synthesizing such toxins are disclosed, e.g., in EP-A 374 753, WO 93/007278, WO 95/34656, EP-A 427 529, EP-A 451 878, WO 03/18810 and WO 03/52073. The methods for producing such genetically modified plants are generally known to the person skilled in the art and are described, e.g., in the publications mentioned above. These insecticidal proteins contained in the genetically modified plants impart to the plants producing these proteins tolerance to harmful pests from all taxonomic groups of arthropods, especially to beetles (Coleoptera), two-winged insects (Diptera), and moths (Lepidoptera) and to nematodes (Nematoda). Genetically modified plants capable to synthesize one or more insecticidal proteins are, e.g., described in the publications mentioned above, and some of which are commercially available such as YieldGard® (corn cultivars producing the Cry1Ab toxin), YieldGard® Plus (corn cultivars producing Cry1Ab and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); NewLeaf® (potato cultivars producing the Cry3A toxin); Bt-Xtra®, NatureGard®, KnockOut®, BiteGard®, Protecta®, Bt11 (e.g., Agrisure® CB) and Bt176 from Syngenta Seeds SAS, France, (corn cultivars producing the Cry1Ab toxin and PAT enzyme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the Cry1F toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e.g., EP-A 392 225), plant disease resistance genes (e.g., potato culti-vars, which express resistance genes acting against Phytophthora infestans derived from the Mexican wild potato, Solanum bulbocastanum) or T4-lyso-zym (e.g., potato cultivars capable of synthesizing these proteins with increased resistance against bacteria such as Erwinia amylovora). The methods for producing such genetically modified plants are generally known to the person skilled in the art and are described, e.g., in the publications mentioned above.

Furthermore, plants are also covered that are by the use of recombinant DNA techniques capable to synthesize one or more proteins to increase the productivity (e.g., bio-mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of ingredients or new ingredients, specifically to improve human or animal nutrition, e.g., oil crops that produce health-promoting long-chain omega-3 fatty acids or unsaturated omega-9 fatty acids (e.g., Nexera® rape, Dow AgroSciences, Canada).

Furthermore, plants are also covered that contain by the use of recombinant DNA techniques a modified amount of ingredients or new ingredients, specifically to improve raw material production, e.g., potatoes that produce increased amounts of amylopectin (e.g. Amflora® potato, BASF SE, Germany).

The following examples serve to illustrate the invention.

EXAMPLES

The effect of the herbicidal compositions according to the invention of herbicides A and B on the growth of undesirable plants compared to the herbicidally active compounds alone was demonstrated by the following greenhouse experiments:

The test plants have been seeded, separately for each species, in plastic containers in sandy loamy soil containing 5% of organic matter.

For the pre-emergence treatment, the active compounds, suspended or emulsified in water, were applied directly after sowing by means of finely distributing nozzles. The containers were irrigated gently to promote germination and growth and subsequently covered with transparent plastic hoods until the plants had rooted. This cover caused uniform germination of the test plants unless this was adversely affected by the active compounds.

The plants have been cultivated due to their individual requirements at 10-25° C. and 20-35° C. The plants were irrigated due to their necessity.

The racemic mixture (±)-2-exo-(2-Methylbenzyloxy)-1-methyl-4-isopropyl-7-oxabicyclo[2.2.1]heptane was used as herbicide A and formulated as emulsifiable concentrates with an active ingredient concentration of 50 g/l, 100 g/l or 750 g/l respectively.

Quinmerac (herbicide B.2) was used as a wettable powder (WP) formulation having an active ingredient concentration of 50%.

In the following experiments, the herbicidal activity for the individual herbicidal compositions (solo and mixture applications) was assessed 20 days after treatment (DAT).

The evaluation for the damage on undesired weeds caused by the chemical compositions was carried out using a scale from 0 to 100%, compared to the untreated control plants. Here, 0 means no damage and 100 means complete destruction of the plants.

The plants used in the greenhouse experiments belonged to the following species:

| EPPO Code | Scientific name |
|---|---|
| ABUTH | Abutilon theophrasti |
| ALOMY | Alopecurus myosuroides |
| AMARE | Amaranthus retroflexus |
| ANTAR | Anthemis arvensis |
| AVEFA | Avena fatua |
| DIGSA | Digitaria sanguinalis |
| ECHCG | Echinochloa crus-galli |
| GERDI | Geranium dissectum |
| LOLMU | Lolium multiflorum |
| PAPRH | Papaver rhoeas |
| POLCO | Polygonum convolvulus |
| SETVI | Setaria viridis |
| SORHA | Sorghum halepense |
| STEME | Stellaria media |

Colby's equation was applied to determine whether the combination of herbicide A and herbicide B shows a synergistic effect (see S. R. Colby, "Calculating synergistic and antagonistic responses of herbicide combinations", Weeds 1967, 15, pp. 20-22).

$$E = X + Y - (X \cdot Y / 100)$$

where X=effect in percent using herbicide A at an application rate a;

Y=effect in percent using herbicide B at application rate b;

E=expected effect (in %) of herbicide A+ herbicide B at application rates a+b.

The value E corresponds to the effect (plant damage or injury) which is to be expected if the activity of the individual compounds is additive. If the observed effect is higher than the value E calculated according to the Colby equation, a synergistic effect is present.

Table 1 below relates to the herbicidal activity, in greenhouse trials, of the individual actives and the combinations applied at different rates and ratios, in pre-emergence application at 20 days after treatment (DAT).

TABLE 1

Preemergence application of herbicide A and herbicide B.2 (quinmerac)

| | solo application | | | | combination | | |
|---|---|---|---|---|---|---|---|
| | herbicide A | | quinmerac | | herbicide A + quinmerac | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| ABUTH | 250 | 65 | 200 | 0 | 250 + 200 | 75 | 65 |
| ABUTH | 62.5 | 25 | 50 | 0 | 62.5 + 50 | 35 | 25 |
| ALOMY | 100 | 95 | 250 | 0 | 100 + 250 | 100 | 95 |
| ANTAR | 100 | 0 | 250 | 0 | 100 + 250 | 65 | 0 |
| AMARE | 100 | 30 | 250 | 0 | 100 + 250 | 65 | 30 |

TABLE 1-continued

Preemergence application of herbicide A and herbicide B.2 (quinmerac)

| | solo application | | | | combination | | |
|---|---|---|---|---|---|---|---|
| | herbicide A | | quinmerac | | herbicide A + quinmerac | | |
| Weed species | use rate (g ai/ha) | herbicidal activity (%) | use rate (g ai/ha) | herbicidal activity (%) | use rate (g ai/ha) | herbicidal activity (%) | Colby expected herbicidal activity E (%) |
| AVEFA | 100 | 10 | 250 | 0 | 100 + 250 | 30 | 10 |
| AVEFA | 62.5 | 30 | 50 | 0 | 62.5 + 50 | 40 | 30 |
| AVEFA | 50 | 0 | 125 | 0 | 50 + 125 | 40 | 0 |
| AVEFA | 31.25 | 0 | 25 | 0 | 31.25 + 25 | 35 | 0 |
| DIGSA | 100 | 90 | 250 | 0 | 100 + 250 | 95 | 90 |
| DIGSA | 50 | 70 | 125 | 0 | 50 + 125 | 80 | 70 |
| DIGSA | 25 | 0 | 62.5 | 0 | 25 + 62.5 | 65 | 0 |
| DIGSA | 12.5 | 0 | 31.25 | 0 | 12.5 + 31.25 | 30 | 0 |
| ECHCG | 25 | 98 | 62.5 | 0 | 25 + 62.5 | 100 | 98 |
| ECHCG | 12.5 | 95 | 31.25 | 0 | 12.5 + 31.25 | 100 | 95 |
| GERDI | 250 | 85 | 200 | 0 | 250 + 200 | 95 | 85 |
| GERDI | 100 | 95 | 250 | 50 | 100 + 250 | 100 | 98 |
| GERDI | 25 | 0 | 62.5 | 0 | 25 + 62.5 | 30 | 0 |
| GERDI | 12.5 | 0 | 31.25 | 0 | 12.5 + 31.25 | 30 | 0 |
| LOLMU | 250 | 98 | 200 | 25 | 98 + 25 | 100 | 99 |
| LOLMU | 100 | 70 | 250 | 0 | 100 + 250 | 80 | 70 |
| PAPRH | 12.5 | 70 | 31.25 | 0 | 12.5 + 31.25 | 80 | 70 |
| POLCO | 250 | 0 | 200 | 0 | 250 + 200 | 25 | 0 |
| POLCO | 125 | 0 | 100 | 0 | 125 + 100 | 20 | 0 |
| SETVI | 25 | 95 | 62.5 | 0 | 25 + 62.5 | 98 | 95 |
| SETVI | 12.5 | 90 | 31.25 | 0 | 12.5 + 31.25 | 95 | 90 |
| SORHA | 250 | 95 | 200 | 25 | 250 + 200 | 98 | 96 |
| SORHA | 25 | 98 | 62.5 | 0 | 25 + 62.5 | 100 | 98 |
| STEME | 125 | 40 | 100 | 0 | 125 + 100 | 60 | 40 |
| STEME | 62.5 | 0 | 50 | 0 | 62.5 + 50 | 25 | 0 |

As can be seen from the data in Table 1, the combination of herbicide A and herbicide B exhibits an unexpected synergistic effect in that the herbicidal activity against various weed species in a pre-emergence treatment is significantly higher than would be predicted based on the values for each of the compounds individually.

The invention claimed is:

1. A herbicidal composition comprising a herbicidally effective amount of (a) (±)-2-exo-(2-Methylbenzyloxy)-1-methyl-4-isopropyl-7-oxabicyclo[2.2.1]heptane, any of its individual enantiomers or any non-racemic mixture thereof (herbicide A) and (b) at least one quinolinecarboxylic acid selected from quinclorac (B.1), quinmerac (B.2) and agriculturally acceptable salts or esters thereof (herbicide B) wherein the weight ratio of herbicide A to herbicide B is from 1:0.2 to 1:28.

2. The composition of claim 1, wherein the herbicide A is (±)-2-exo-(2-Methylbenzyloxy)-1-methyl-4-isopropyl-7-oxabicyclo[2.2.1]heptane.

3. The composition of claim 1, wherein the quinolinecarboxylic acid is quinmerac (B.2) or an agriculturally acceptable salt or ester thereof.

4. The composition of claim 1, further comprising at least one herbicide C selected from the group consisting of acetochlor (C.1), aclonifen (C.2), amicarbazone (C.3), amidosulfuron (C.4), aminopyralid (C.5), amitrole (C.6), asulam (C.7), atrazine (C.8), azimsulfuron (C.9), beflubutamid (C.10), benfluralin (C.11), bensulfuron (C.12), bensulide (C.13), bentazone (C.14), benzobicyclon (C.15), bicyclopyrone (C.16), bifenox (C.17), bispyribac (C.18), bromoxynil (C.19), carbetamide (C.20), carfentrazone (C.21), chloridazon (C.22), chlorpropham (C.23), chlorsulfuron (C.24), chlorthal (C.25), chlorotoluron (C.26), clethodim (C.27), clodinafop (C.28), clomazone (C.29), clopyralid (C.30), cyclosulfamuron (C.31), cycloxydim (C.32), cyclopyrimorate (C.33), cyhalofop (C.34), 2,4-D (C.35), dazomet (C.36), 2,4-DB (C.37), desmedipham (C.38), dicamba (C.39), dichloroprop (C.40), dichloroprop-P (C.41), diclofop (C.42), diflufenican (C.43), diflufenzopyr (C.44), dimethachlor (C.45), dimethenamid (C.46), dimethenamid-P (C.47), diquat (C.48), dithiopyr (C.49), diuron (C.50), ethametsulfuron (C.51), ethofumesate (C.52), fenoxaprop (C.53), fenoxaprop-P (C.54), fenquinotrione (C.55), flazasulfuron (C.56), florasulam (C.57), fluazifop (C.58), fluazifop-P (C.59), flucarbazone (C.60), flufenacet (C.61), flumioxazin (C.62), fluometuron (C.63), flupyrsulfuron (C.64), fluorochloridone (C.65), fluroxypyr (C.66), flurtamone (C.67), foramsulfuron (C.68), glufosinate (C.69), glufosinate-P (C.70), glyphosate (C.71), halauxifen (C.72), halosulfuron (C.73), haloxyfop-P (C.74), indaziflam (C.75), imazamox (C.76), imazapic (C.77), imazapyr (C.78), imazaquin (C.79), imazethapyr (C.80), imazosulfuron (C.81), iodosulfuron (C.82), iofensulfuron (C.83), ioxynil (C.84), isoproturon (C.85), isoxaben (C.86), isoxaflutole (C.87), lenacil (C.88), linuron (C.89), MCPA (C.90), MCPB (C.91), mecoprop (C.92), mecoprop-P (C.93), mesosulfuron (C.94), mesotrione (C.95), metam (C.96), metamitron (C.97), methiozoline (C.98), methobromuron (C.99), metolachlore (C.100), S-metolachlore (C.101), metosulam (C.102), metribuzin (C.103), metsulfuron (C.104), molinate (C.105), monosodium methyl arsenate (MSMA) (C.106), napropamide (C.107), napropamide-M (C.108), nicosulfuron (C.109), orthosulfamuron (C.110), oryzalin (C.111), oxadiargyl (C.112), oxadiazon (C.113), oxasulfuron (C.114), oxyfluorfen (C.115), pendimethalin (C.116), penoxsulam (C.117), pethoxamid (C.118), phenmedipham (C.119), picloram (C.120), picolinafen (C.121), pinoxaden (C.122), pretilachlor (C.123), prodiamine (C.124), profoxydim (C.125), prometryne (C.126), propanil (C.127), propaquizafop (C.128), propoxycarbazone (C.129), propyzamide (C.130), prosulfocarb (C.131), prosulfuron (C.132), pyraflufen (C.133), pyridate (C.134), pyroxasulfone (C.135), pyroxsulam (C.136), quinoclamine (C.137), quizalofop (C.138), quizalofop-P (C.139), rimsulfuron (C.140), saflufenacil (C.141), sethoxydim (C.142), siduron (C.143), simazine (C.144), sulcotrione (C.145), sulfentrazone (C.146), sulfosulfuron (C.147), tembotrione (C.148), tepraloxydim (C.149), terbuthylazine (C.150), thiencarbazone (C.151), thifensulfuron (C.152), tolpyralate (C.153), topramezone (C.154), tralkoxydim (C.155), tri-allate (C.156), triasulfuron (C.157), tribenuron (C.158), triclopyr (C.159), trifloxysulfuron (C.160), trifludimoxazin (C.161), trifluralin (C.162), triflusulfuron (C.163), tritosulfuron (C.164), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof.

5. The composition of claim 1, further comprising at least one safener D selected from the group consisting of benoxacor (D.1), cloquintocet (D.2), cyometrinil (D.3), cyprosulfamide (D.4), dichlormid (D.5), dicyclonon (D.6), dietholate (D.7), fenchlorazole (D.8), fenclorim (D.9), flurazole (D.10), fluxofenim (D.11), furilazole (D.12), isoxadifen (D.13), mefenpyr (D.14), mephenate (D.15), naphthaleneacetic acid (D.16), naphthalic anhydride (D.17), oxabetrinil (D.18), 4-(dichloroacetyl)-1-oxa-4-azaspiro[4.5]decane (MON4660, CAS 71526-07-3) (D.19), 2,2,5-trimethyl-3-(dichloroacetyl)-1,3-oxazolidine (R-29148, CAS 52836-31-4) (D.20), N-(2-Methoxybenzoyl)-4-[(methylaminocarbonyl)amino]benzenesulfonamide (CAS 129531-12-0) (D.21), and agriculturally acceptable salts, esters or amides thereof.

6. The composition of claim 1, further comprising one or more auxiliaries customary in crop protection.

7. The composition of claim 1, wherein the weight ratio of herbicide A to herbicide B is from 1:0.2 to 1:9.4.

8. The composition of claim 1, wherein the weight ratio of herbicide A to quinclorac (herbicide B.1) is from 1:0.2 to 1:28 and the weight ratio of herbicide A to quinmerac (herbicide B.2) is from 1:0.2 to 1:4.

9. A method for controlling undesirable vegetation, the method comprising applying the composition of claim 1 to the undesirable vegetation, a locus of the undesirable vegetation, soil, or water to prevent the emergence or growth of the undesirable vegetation.

10. The method of claim 9, wherein the undesirable vegetation is controlled in crop plants selected from the group consisting of wheat, barley, rye, triticale, oat, corn (maize), sunflower, rice, soybeans, peas, *Vicia*-beans, *Phaseolus*-beans, peanuts, oilseed rape, canola, cotton, potato, sugarbeet, sugarcane, turfgrasses and vegetables.

11. The method of claim 9, wherein the undesirable vegetation is selected from the genera *Agropyron, Alopecurus, Apera, Avena, Brachiaria, Bromus, Cynodon, Digitaria, Echinochloa, Eleusine, Ischaemum, Leptochloa, Lolium, Panicum, Phalaris, Poa, Rottboellia, Setaria, Aethusa, Abutilon, Amaranthus, Ambrosia, Ammi, Anthemis, Capsella, Centaurea, Chenopodium, Conium, Conyza, Descurainia, Galium, Geranium, Kochia, Matricaria, Papaver, Polygonum, Raphanus, Sinapis, Sisymbrium, Stellaria* and *Thlaspi*.

12. The method of claim 9, wherein the undesirable vegetation is selected from the genera *Alopecurus, Avena, Digitaria, Echinochloa, Lolium, Setaria, Sorghum, Abutilon, Amaranthus, Anthemis, Geranium, Papaver, Polygonum* and *Stellaria*.

13. The method of claim 9, wherein the undesirable vegetation is a herbicide resistant or tolerant weed species.

14. The method of claim 9, wherein the herbicide A is applied in an amount of from 10 to 1,000 g/ha and the herbicide B is applied in an amount of from 10 to 1,400 g/ha.

15. The method of claim 9, wherein the herbicide A is (±)-2-exo-(2-Methylbenzyloxy)-1-methyl-4-isopropyl-7-oxabicyclo[2.2.1]heptane.

16. The method of claim 9, wherein the quinolinecarboxylic acid is quinmerac (B.2) or an agriculturally acceptable salt or ester thereof.

17. The method of claim 9, wherein the weight ratio of herbicide A to quinclorac and (herbicide B) is from 1:0.2 to 1:28 and the weight ratio of herbicide A to quinmerac (herbicide B.2) is from 1:0.2 to 1:4.

18. The method of claim 9, wherein the weight ratio of herbicide A to herbicide B is from 1:0.2 to 1:9.4.

19. The method of claim 9, wherein the composition further comprises at least one herbicide C selected from the group consisting of acetochlor (C.1), aclonifen (C.2), amicarbazone (C.3), amidosulfuron (C.4), aminopyralid (C.5), amitrole (C.6), asulam (C.7), atrazine (C.8), azimsulfuron (C.9), beflubutamid (C.10), benfluralin (C.11), bensulfuron (C.12), bensulide (C.13), bentazone (C.14), benzobicyclon (C.15), bicyclopyrone (C.16), bifenox (C.17), bispyribac (C.18), bromoxynil (C.19), carbetamide (C.20), carfentrazone (C.21), chloridazon (C.22), chlorpropham (C.23), chlorsulfuron (C.24), chlorothal (C.25), chlorotoluron (C.26), clethodim (C.27), clodinafop (C.28), clomazone (C.29), clopyralid (C.30), cyclosulfamuron (C.31), cycloxydim (C.32), cyclopyrimorate (C.33), cyhalofop (C.34), 2,4-D (C.35), dazomet (C.36), 2,4-DB (C.37), desmedipham (C.38), dicamba (C.39), dichloroprop (C.40), dichloroprop-P (C.41), diclofop (C.42), diflufenican (C.43), diflufenzopyr (C.44), dimethachlor (C.45), dimethenamid (C.46), dimethenamid-P (C.47), diquat (C.48), dithiopyr (C.49), diuron (C.50), ethametsulfuron (C.51), ethofumesate (C.52), fenoxaprop (C.53), fenoxaprop-P (C.54), fenquinotrione (C.55), flazasulfuron (C.56), florasulam (C.57), fluazifop (C.58), fluazifop-P (C.59), flucarbazone (C.60), flufenacet (C.61), flumioxazin (C.62), fluometuron (C.63), flupyrsulfuron (C.64), fluorochloridone (C.65), fluroxypyr (C.66), flurtamone (C.67), foramsulfuron (C.68), glufosinate (C.69), glufosinate-P (C.70), glyphosate (C.71), halauxifen (C.72), halosulfuron (C.73), haloxyfop-P (C.74), indaziflam (C.75), imazamox (C.76), imazapic (C.77), imazapyr (C.78), imazaquin (C.79), imazethapyr (C.80), imazosulfuron (C.81), iodosulfuron (C.82), iofensulfuron (C.83), ioxynil (C.84), isoproturon (C.85), isoxaben (C.86), isoxaflutole (C.87), lenacil (C.88), linuron (C.89), MCPA (C.90), MCPB (C.91), mecoprop (C.92), mecoprop-P (C.93), mesosulfuron (C.94), mesotrione (C.95), metam (C.96), metamitron (C.97), methiozoline (C.98), methobromuron (C.99), metolachlore (C.100), S-metolachlore (C.101), metosulam (C.102), metribuzin (C.103), metsulfuron (C.104), molinate (C.105), monosodium methyl arsenate (MSMA) (C.106), napropamide (C.107), napropamide-M (C.108), nicosulfuron (C.109), orthosulfamuron (C.110), oryzalin (C.111), oxadiargyl (C.112), oxadiazon (C.113), oxasulfuron (C.114), oxyfluorfen (C.115), pendimethalin (C.116), penoxsulam (C.117), pethoxamid (C.118), phenmedipham (C.119), picloram (C.120), picolinafen (C.121), pinoxaden (C.122), pretilachlor (C.123), prodiamine (C.124), profoxydim (C.125), prometryne (C.126), propanil (C.127), propaquizafop (C.128), propoxycarbazone (C.129), propyzamide (C.130), prosulfocarb (C.131), prosulfuron (C.132), pyraflufen (C.133), pyridate (C.134), pyroxasulfone (C.135), pyroxsulam (C.136), quinoclamine (C.137), quizalofop (C.138), quizalofop-P (C.139), rimsulfuron (C.140), saflufenacil (C.141), sethoxydim (C.142), siduron (C.143), simazine (C.144), sulcotrione (C.145), sulfentrazone (C.146), sulfosulfuron (C.147), tembotrione (C.148), tepraloxydim (C.149), terbuthylazine (C.150), thiencarbazone (C.151), thifensulfuron (C.152), tolpyralate (C.153), topramezone (C.154), tralkoxydim (C.155), tri-allate (C.156), triasulfuron (C.157), tribenuron (C.158), triclopyr (C.159), trifloxysulfuron (C.160), trifludimoxazin (C.161), trifluralin (C.162), triflusulfuron (C.163), tritosulfuron (C.164), 4-amino-3-chloro-6-(4-chloro-2-fluoro-3-methoxyphenyl)-5-fluoropyridine-2-carboxylic acid (C.165), benzyl 4-amino-3-chloro-6-(4-chloro-2-fluoro-3-methoxyphenyl)-5-fluoropyridine-2-carboxylate (CAS 1390661-72-9, C.166), and agriculturally acceptable salts, esters or amides thereof.

20. The method of claim 9, wherein the composition further comprises at least one safener D selected from the group consisting of benoxacor (D.1), cloquintocet (D.2), cyometrinil (D.3), cyprosulfamide (D.4), dichlormid (D.5), dicyclonon (D.6), dietholate (D.7), fenchlorazole (D.8), fenclorim (D.9), flurazole (D.10), fluxofenim (D.11), furilazole (D.12), isoxadifen (D.13), mefenpyr (D.14), mephenate (D.15), naphthaleneacetic acid (D.16), naphthalic anhydride (D.17), oxabetrinil (D.18), 4-(dichloroacetyl)-1-oxa-4-azaspiro[4.5]decane (MON4660, CAS 71526-07-3) (D.19), 2,2,5-trimethyl-3-(dichloroacetyl)-1,3-oxazolidine (R-29148, CAS 52836-31-4) (D.20), N-(2-Methoxybenzoyl)-4-1(methylaminocarbonyl)aminobenzenesulfonamide (CAS 129531-12-0) (D.21), and agriculturally acceptable salts, esters or amides thereof.

\* \* \* \* \*